(12) United States Patent
Cable et al.

(10) Patent No.: US 9,233,863 B2
(45) Date of Patent: Jan. 12, 2016

(54) RARE EARTH REMOVAL OF HYDRATED AND HYDROXYL SPECIES

(75) Inventors: Robert Cable, Las Vegas, NV (US);
Carl Hassler, Gig Harbor, WA (US);
John Burba, Parker, CO (US)

(73) Assignee: Molycorp Minerals, LLC, Greenwood Village, CO (US)

( * ) Notice: Subject to any disclaimer, the term of this patent is extended or adjusted under 35 U.S.C. 154(b) by 610 days.

(21) Appl. No.: 13/432,987

(22) Filed: Mar. 28, 2012

(65) Prior Publication Data
US 2012/0261345 A1    Oct. 18, 2012

Related U.S. Application Data

(63) Continuation-in-part of application No. 13/356,581, filed on Jan. 23, 2012, now abandoned.

(60) Provisional application No. 61/474,902, filed on Apr. 13, 2011, provisional application No. 61/475,155, filed on Apr. 13, 2011, provisional application No. 61/539,780, filed on Sep. 27, 2011, provisional (Continued)

(51) Int. Cl.
| | |
|---|---|
| *B01D 15/04* | (2006.01) |
| *B01D 17/00* | (2006.01) |
| *C02F 1/72* | (2006.01) |
| *C02F 1/28* | (2006.01) |
| *C02F 1/66* | (2006.01) |
| *C02F 1/70* | (2006.01) |
| *C02F 1/00* | (2006.01) |
| *C02F 101/10* | (2006.01) |
| *C02F 101/20* | (2006.01) |

(52) U.S. Cl.
CPC . *C02F 1/72* (2013.01); *C02F 1/281* (2013.01);
*C02F 1/66* (2013.01); *C02F 1/705* (2013.01);
*C02F 2001/007* (2013.01); *C02F 2101/103* (2013.01); *C02F 2101/20* (2013.01); *C02F 2303/16* (2013.01); *Y02W 10/37* (2015.05)

(58) Field of Classification Search
CPC ........ C02F 1/281; C02F 2101/20; C02F 1/72;
C02F 1/66; C02F 1/705; C02F 2303/16;
C02F 2001/007; C02F 2101/103
USPC .......... 210/660, 665, 669, 688, 912, 683, 684
See application file for complete search history.

(56) References Cited

U.S. PATENT DOCUMENTS

| | | |
|---|---|---|
| 646,931 A | 4/1900 | Greer |
| 1,739,840 A | 12/1929 | Kendall |
| 2,564,241 A | 8/1951 | Warf |
| 2,567,661 A | 9/1951 | Ayres |

(Continued)

FOREIGN PATENT DOCUMENTS

| | | |
|---|---|---|
| CA | 2396510 | 2/2003 |
| CA | 2481961 | 10/2003 |

(Continued)

OTHER PUBLICATIONS

U.S. Appl. No. 14/142,386, filed Dec. 27, 2013, Nichols et al.

(Continued)

*Primary Examiner* — Matthew O Savage
(74) *Attorney, Agent, or Firm* — Sheridan Ross P.C.

(57) ABSTRACT

This disclosure relates generally to methods and rare earth-containing additives for removing target materials in the form of hydroxides, carbonates, hydrates, or oxyhydroxyls from, a typically aqueous, liquid medium.

35 Claims, 95 Drawing Sheets

Related U.S. Application Data application No. 61/546,803, filed on Oct. 13, 2011, provisional application No. 61/614,427, filed on Mar. 22, 2012, provisional application No. 61/476,667, filed on Apr. 18, 2011, provisional application No. 61/558,887, filed on Nov. 11, 2011, provisional application No. 61/564,132, filed on Nov. 28, 2011, provisional application No. 61/614,418, filed on Mar. 22, 2012, provisional application No. 61/613,883, filed on Mar. 21, 2012, provisional application No. 61/613,857, filed on Mar. 21, 2012, provisional application No. 61/538,634, filed on Sep. 23, 2011, provisional application No. 61/553,809, filed on Oct. 31, 2011.

(56) References Cited

U.S. PATENT DOCUMENTS

| | | |
|---|---|---|
| 2,647,858 A | 8/1953 | Weisz |
| 2,835,558 A | 5/1958 | Vaaler |
| 2,847,332 A | 8/1958 | Ramadanoff |
| 2,872,286 A | 2/1959 | Finzel |
| 3,194,629 A | 7/1965 | Dreibelbis et al. |
| 3,259,568 A | 7/1966 | Jordan et al. |
| 3,337,452 A | 8/1967 | Teske et al. |
| 3,347,786 A | 10/1967 | Baer et al. |
| 3,377,274 A | 4/1968 | Burke |
| 3,385,915 A | 5/1968 | Hamling |
| 3,575,853 A | 4/1971 | Gaughan et al. |
| 3,617,568 A | 11/1971 | Ries, Jr. |
| 3,617,569 A | 11/1971 | Daniels et al. |
| 3,635,797 A | 1/1972 | Battistoni et al. |
| 3,658,724 A | 4/1972 | Stiles |
| 3,692,671 A | 9/1972 | Recht et al. |
| 3,736,255 A | 5/1973 | Ghassemi et al. |
| 3,753,686 A | 8/1973 | Wilder et al. |
| 3,758,418 A | 9/1973 | Leonard, Jr. et al. |
| 3,761,571 A | 9/1973 | Woodhead |
| 3,768,989 A | 10/1973 | Goetzinger et al. |
| 3,838,759 A | 10/1974 | Schmoelz et al. |
| 3,849,537 A | 11/1974 | Allgulin |
| 3,850,835 A | 11/1974 | Marantz et al. |
| 3,865,728 A | 2/1975 | Abbott et al. |
| 3,916,585 A | 11/1975 | Barks |
| 3,926,807 A | 12/1975 | Evers et al. |
| 3,956,118 A | 5/1976 | Kleber et al. |
| 3,965,118 A | 6/1976 | Van Rheenen |
| 4,001,375 A | 1/1977 | Longo |
| 4,018,678 A | 4/1977 | Peniston |
| 4,046,687 A | 9/1977 | Schulze |
| 4,054,516 A | 10/1977 | Izumi et al. |
| 4,059,520 A | 11/1977 | Roller |
| 4,078,058 A | 3/1978 | Fox |
| 4,080,290 A | 3/1978 | Klantschi et al. |
| 4,088,754 A | 5/1978 | Monafo |
| 4,094,777 A | 6/1978 | Sugier et al. |
| 4,096,064 A | 6/1978 | Du Fresne |
| 4,101,631 A | 7/1978 | Ambrosini et al. |
| 4,127,644 A | 11/1978 | Norman et al. |
| 4,145,282 A | 3/1979 | Bruckenstein |
| 4,200,609 A | 4/1980 | Byrd |
| 4,213,859 A | 7/1980 | Smakman et al. |
| 4,218,431 A | 8/1980 | Spevack |
| 4,230,682 A | 10/1980 | Bamberger |
| 4,231,893 A | 11/1980 | Woodhead |
| 4,233,444 A | 11/1980 | Doonan |
| 4,251,496 A | 2/1981 | Longo et al. |
| 4,313,925 A | 2/1982 | Bamberger |
| 4,346,063 A | 8/1982 | Cahn et al. |
| 4,386,063 A | 5/1983 | Boden |
| 4,404,197 A | 9/1983 | Fox et al. |
| 4,432,959 A | 2/1984 | Shimamura |
| 4,433,196 A | 2/1984 | Yang et al. |
| 4,436,655 A | 3/1984 | Masotti et al. |
| 4,474,580 A | 10/1984 | Mackenzie et al. |
| 4,474,896 A | 10/1984 | Chao |
| 4,477,315 A | 10/1984 | Tomaszewski |
| 4,498,706 A | 2/1985 | Ilardi et al. |
| 4,507,206 A | 3/1985 | Hughes |
| 4,566,975 A | 1/1986 | Allgulin |
| 4,581,229 A | 4/1986 | Petrow |
| 4,585,583 A | 4/1986 | Roberson et al. |
| 4,588,088 A | 5/1986 | Allen |
| 4,596,659 A | 6/1986 | Nomura et al. |
| 4,622,149 A | 11/1986 | Devuyst et al. |
| 4,636,289 A | 1/1987 | Mani et al. |
| 4,652,054 A | 3/1987 | Copenhafer et al. |
| 4,661,330 A | 4/1987 | Chane-ching et al. |
| 4,665,050 A | 5/1987 | Degen et al. |
| 4,701,261 A | 10/1987 | Gibbs et al. |
| 4,714,694 A | 12/1987 | Wan et al. |
| 4,717,554 A | 1/1988 | Nomura et al. |
| 4,738,799 A | 4/1988 | Troy |
| 4,746,457 A | 5/1988 | Hassick et al. |
| 4,753,728 A | 6/1988 | VanderBilt et al. |
| 4,781,944 A | 11/1988 | Jones |
| 4,786,483 A | 11/1988 | Audeh |
| 4,793,935 A | 12/1988 | Stillman |
| 4,814,152 A | 3/1989 | Yan |
| 4,818,483 A | 4/1989 | Culling |
| 4,828,832 A | 5/1989 | De Cuellar et al. |
| 4,831,519 A | 5/1989 | Morton |
| 4,842,898 A | 6/1989 | Gradeff |
| 4,843,102 A | 6/1989 | Horton |
| 4,849,223 A | 7/1989 | Pratt |
| 4,857,280 A | 8/1989 | Kay et al. |
| 4,859,432 A | 8/1989 | David et al. |
| 4,861,519 A | 8/1989 | Tusa et al. |
| 4,881,176 A | 11/1989 | Kononov |
| 4,881,976 A | 11/1989 | Gradeff |
| 4,889,771 A | 12/1989 | Gradeff et al. |
| 4,891,067 A | 1/1990 | Rappas et al. |
| 4,902,426 A | 2/1990 | Macedo et al. |
| 4,917,875 A | 4/1990 | Moore et al. |
| 4,920,195 A | 4/1990 | Kankare et al. |
| 4,935,146 A | 6/1990 | O'Neill et al. |
| 4,946,592 A | 8/1990 | Galaj et al. |
| 4,968,322 A | 11/1990 | Miyawaki et al. |
| 4,973,501 A | 11/1990 | Gradeff |
| 4,997,425 A | 3/1991 | Shioya et al. |
| 4,999,174 A | 3/1991 | Wilson et al. |
| 5,002,747 A | 3/1991 | Le Loarer |
| 5,004,711 A | 4/1991 | Grodek |
| 5,013,534 A | 5/1991 | Dissaux et al. |
| 5,017,532 A | 5/1991 | Sonnenberg et al. |
| 5,024,769 A | 6/1991 | Gallup |
| 5,028,736 A | 7/1991 | Girrbach et al. |
| 5,043,072 A | 8/1991 | Hitotsuyanagi et al. |
| 5,053,139 A | 10/1991 | Dodwell et al. |
| 5,061,560 A | 10/1991 | Tajima et al. |
| 5,064,628 A | 11/1991 | Chane-ching et al. |
| 5,066,408 A | 11/1991 | Powell |
| 5,066,758 A | 11/1991 | Honel et al. |
| 5,071,587 A | 12/1991 | Perman |
| 5,080,926 A | 1/1992 | Porter et al. |
| 5,082,570 A | 1/1992 | Higgins et al. |
| 5,104,660 A | 4/1992 | Chvapil et al. |
| 5,116,418 A | 5/1992 | Kaliski |
| 5,116,620 A | 5/1992 | Chvapil et al. |
| 5,124,044 A | 6/1992 | Cassidy et al. |
| 5,126,116 A | 6/1992 | Krause et al. |
| 5,130,052 A | 7/1992 | Kreh et al. |
| 5,133,948 A | 7/1992 | King et al. |
| 5,145,587 A | 9/1992 | Ishii et al. |
| 5,152,936 A | 10/1992 | Tajima et al. |
| 5,161,385 A | 11/1992 | Schumacher |
| 5,178,768 A | 1/1993 | White, Jr. et al. |
| 5,183,750 A | 2/1993 | Nishide et al. |
| 5,192,452 A | 3/1993 | Mitsui et al. |
| 5,204,452 A | 4/1993 | Dingilian |
| 5,207,877 A | 5/1993 | Weinberg et al. |
| 5,207,995 A | 5/1993 | Bosserman |
| 5,213,779 A | 5/1993 | Kay et al. |
| 5,227,168 A | 7/1993 | Chvapil et al. |

(56) References Cited

U.S. PATENT DOCUMENTS

| | | |
|---|---|---|
| 5,236,595 A | 8/1993 | Wang et al. |
| 5,238,488 A | 8/1993 | Wilhelm |
| 5,248,398 A | 9/1993 | Cordani |
| 5,260,066 A | 11/1993 | Wood et al. |
| 5,262,063 A | 11/1993 | Yen |
| 5,281,253 A | 1/1994 | Thompson |
| 5,326,737 A | 7/1994 | Kay et al. |
| 5,328,669 A | 7/1994 | Han et al. |
| 5,330,770 A | 7/1994 | Kuno |
| 5,336,415 A | 8/1994 | Deans |
| 5,338,460 A | 8/1994 | Yen |
| 5,342,540 A | 8/1994 | Perez |
| 5,344,479 A | 9/1994 | Kerfoot et al. |
| 5,348,662 A | 9/1994 | Yen et al. |
| 5,352,365 A | 10/1994 | Fuller |
| 5,356,437 A | 10/1994 | Pedersen et al. |
| 5,358,643 A | 10/1994 | Mcclintock |
| 5,362,717 A | 11/1994 | Dingilian |
| 5,368,703 A | 11/1994 | Brewster |
| 5,389,352 A | 2/1995 | Wang |
| 5,393,435 A | 2/1995 | Deans |
| 5,403,495 A | 4/1995 | Kust et al. |
| 5,409,522 A | 4/1995 | Durham et al. |
| 5,422,489 A | 6/1995 | Bhargava |
| 5,422,907 A | 6/1995 | Bhargava |
| 5,433,855 A | 7/1995 | Campbell et al. |
| 5,433,865 A | 7/1995 | Laurent |
| 5,433,931 A | 7/1995 | Bosserman |
| 5,446,286 A | 8/1995 | Bhargava |
| 5,455,489 A | 10/1995 | Bhargava |
| 5,482,534 A | 1/1996 | Leonard et al. |
| 5,500,131 A | 3/1996 | Metz |
| 5,500,198 A | 3/1996 | Liu et al. |
| 5,503,766 A | 4/1996 | Kulperger |
| 5,505,766 A | 4/1996 | Chang |
| 5,520,811 A | 5/1996 | Dick et al. |
| 5,529,811 A | 6/1996 | Sinko |
| 5,543,056 A | 8/1996 | Murcott |
| 5,543,058 A | 8/1996 | Miller |
| 5,543,126 A | 8/1996 | Ota et al. |
| 5,545,604 A | 8/1996 | Demmel |
| 5,551,976 A | 9/1996 | Allen |
| 5,556,545 A | 9/1996 | Volchek et al. |
| 5,573,673 A | 11/1996 | Hayashi et al. |
| 5,575,915 A | 11/1996 | Nakamura et al. |
| 5,575,919 A | 11/1996 | Santina |
| 5,580,535 A | 12/1996 | Hoke et al. |
| 5,603,838 A | 2/1997 | Misra et al. |
| 5,611,934 A | 3/1997 | Shepperd, III et al. |
| 5,618,406 A | 4/1997 | Demmel |
| 5,637,258 A | 6/1997 | Goldburt et al. |
| 5,649,894 A | 7/1997 | White et al. |
| 5,660,802 A | 8/1997 | Archer et al. |
| 5,681,475 A | 10/1997 | Lamensdorf |
| 5,683,953 A | 11/1997 | Mills |
| 5,688,378 A | 11/1997 | Khoe et al. |
| 5,689,038 A | 11/1997 | Bartram et al. |
| 5,698,212 A | 12/1997 | Hagiwara |
| 5,702,592 A | 12/1997 | Suri et al. |
| 5,707,508 A | 1/1998 | Surma et al. |
| 5,711,930 A | 1/1998 | Albers et al. |
| 5,712,218 A | 1/1998 | Chopin et al. |
| 5,712,219 A | 1/1998 | Klabunde et al. |
| 5,728,404 A | 3/1998 | Von Rheinbaben et al. |
| 5,730,995 A | 3/1998 | Shirono et al. |
| 5,759,855 A | 6/1998 | Pierschbacher et al. |
| 5,759,939 A | 6/1998 | Klabunde et al. |
| 5,762,891 A | 6/1998 | Downey et al. |
| 5,783,057 A | 7/1998 | Tomita et al. |
| 5,795,836 A | 8/1998 | Jin et al. |
| 5,820,966 A | 10/1998 | Krause et al. |
| 5,833,841 A | 11/1998 | Koslowsky |
| 5,859,064 A | 1/1999 | Cronce |
| 5,876,610 A | 3/1999 | Clack et al. |
| 5,897,675 A | 4/1999 | Mangold et al. |
| 5,897,781 A | 4/1999 | Dourdeville |
| 5,897,784 A | 4/1999 | Mills |
| 5,910,253 A | 6/1999 | Fuerstenau et al. |
| 5,914,287 A | 6/1999 | Saito |
| 5,914,436 A | 6/1999 | Klabunde et al. |
| 5,918,555 A | 7/1999 | Winegar |
| 5,922,926 A | 7/1999 | Back et al. |
| 5,928,504 A | 7/1999 | Hembre et al. |
| 5,938,837 A | 8/1999 | Hanawa et al. |
| 5,939,087 A | 8/1999 | Hagiwara |
| 5,952,665 A | 9/1999 | Bhargava |
| 5,976,383 A | 11/1999 | Guess et al. |
| 5,990,373 A | 11/1999 | Klabunde |
| 5,994,260 A | 11/1999 | Bonneau |
| 6,001,152 A | 12/1999 | Sinha |
| 6,001,157 A | 12/1999 | Nogami |
| 6,017,553 A | 1/2000 | Burrell et al. |
| 6,030,537 A | 2/2000 | Shaniuk et al. |
| 6,036,886 A | 3/2000 | Chhabra et al. |
| 6,045,925 A | 4/2000 | Klabunde et al. |
| 6,048,821 A | 4/2000 | Demmel et al. |
| 6,057,488 A | 5/2000 | Koper et al. |
| 6,059,978 A | 5/2000 | Pacifi et al. |
| 6,063,266 A | 5/2000 | Grande |
| 6,087,294 A | 7/2000 | Klabunde et al. |
| 6,093,236 A | 7/2000 | Klabunde et al. |
| 6,093,325 A | 7/2000 | Stone |
| 6,093,328 A | 7/2000 | Santina |
| 6,099,819 A | 8/2000 | Srinivas et al. |
| 6,114,038 A | 9/2000 | Castro et al. |
| 6,123,323 A | 9/2000 | Yoneda et al. |
| 6,132,623 A | 10/2000 | Nikolaidis et al. |
| 6,136,749 A | 10/2000 | Gadkaree et al. |
| 6,143,318 A | 11/2000 | Gilchrist et al. |
| 6,146,539 A | 11/2000 | Mills |
| 6,177,015 B1 | 1/2001 | Blakey et al. |
| 6,180,016 B1 | 1/2001 | Johnston et al. |
| 6,187,192 B1 | 2/2001 | Johnston et al. |
| 6,187,205 B1 | 2/2001 | Martin et al. |
| 6,197,201 B1 | 3/2001 | Misra et al. |
| 6,197,204 B1 | 3/2001 | Heskett |
| 6,200,482 B1 | 3/2001 | Winchester et al. |
| 6,203,709 B1 | 3/2001 | Min et al. |
| 6,207,177 B1 | 3/2001 | Jany |
| 6,210,460 B1 | 4/2001 | Zuliani |
| 6,214,238 B1 | 4/2001 | Gallup |
| 6,221,118 B1 | 4/2001 | Yoshida et al. |
| 6,221,602 B1 | 4/2001 | Barbera-Guillem et al. |
| 6,221,903 B1 | 4/2001 | Courchesne |
| 6,224,898 B1 | 5/2001 | Balogh et al. |
| 6,238,566 B1 | 5/2001 | Yoshida et al. |
| 6,238,686 B1 | 5/2001 | Burrell et al. |
| 6,248,369 B1 | 6/2001 | Nier |
| 6,248,605 B1 | 6/2001 | Harkonen et al. |
| 6,258,334 B1 | 7/2001 | Gadkaree et al. |
| 6,264,841 B1 | 7/2001 | Tudor |
| 6,294,006 B1 | 9/2001 | Andou |
| 6,299,851 B1 | 10/2001 | Li et al. |
| 6,300,640 B1 | 10/2001 | Bhargava et al. |
| 6,309,533 B1 | 10/2001 | Shelp et al. |
| 6,312,604 B1 | 11/2001 | Denkewicz et al. |
| 6,319,108 B1 | 11/2001 | Adefris et al. |
| 6,326,326 B1 | 12/2001 | Feng et al. |
| 6,328,779 B1 | 12/2001 | He et al. |
| 6,338,800 B1 | 1/2002 | Kulperger et al. |
| 6,341,567 B1 | 1/2002 | Robertson et al. |
| 6,342,163 B1 | 1/2002 | DeLonge et al. |
| 6,350,383 B1 | 2/2002 | Douglas |
| 6,351,932 B1 | 3/2002 | Hummel |
| 6,361,824 B1 | 3/2002 | Yekimov et al. |
| 6,368,510 B2 | 4/2002 | Friot |
| 6,372,003 B1 | 4/2002 | Kasai et al. |
| 6,375,834 B1 | 4/2002 | Guess et al. |
| 6,383,273 B1 | 5/2002 | Kepner et al. |
| 6,383,395 B1 | 5/2002 | Clarke et al. |
| 6,391,207 B1 | 5/2002 | Cluyse |
| 6,391,869 B1 | 5/2002 | Parks et al. |
| 6,395,659 B2 | 5/2002 | Seto et al. |
| 6,395,736 B1 | 5/2002 | Parks et al. |

(56) References Cited

U.S. PATENT DOCUMENTS

| | | |
|---|---|---|
| 6,403,563 B1 | 6/2002 | Geroni et al. |
| 6,403,653 B1 | 6/2002 | Hobson et al. |
| 6,406,676 B1 | 6/2002 | Sundkvist |
| 6,409,926 B1 | 6/2002 | Martin |
| 6,410,603 B1 | 6/2002 | Hobson et al. |
| 6,417,423 B1 | 7/2002 | Koper et al. |
| 6,420,434 B1 | 7/2002 | Braue et al. |
| 6,428,705 B1 | 8/2002 | Allen et al. |
| 6,440,300 B1 | 8/2002 | Randall et al. |
| 6,444,143 B2 | 9/2002 | Bawendi et al. |
| 6,452,184 B1 | 9/2002 | Taskar et al. |
| 6,460,535 B1 | 10/2002 | Nisewander et al. |
| 6,461,535 B1 | 10/2002 | de Esparza |
| 6,468,499 B1 | 10/2002 | Balachandran et al. |
| 6,475,451 B1 | 11/2002 | Leppin et al. |
| 6,524,487 B2 | 2/2003 | Kulperger et al. |
| 6,524,540 B1 | 2/2003 | Heinig |
| 6,528,451 B2 | 3/2003 | Brezny et al. |
| 6,536,672 B1 | 3/2003 | Outwater |
| 6,537,382 B1 | 3/2003 | Bartram et al. |
| 6,542,487 B1 | 4/2003 | Ishii et al. |
| 6,542,540 B1 | 4/2003 | Leung et al. |
| 6,551,514 B1 | 4/2003 | Misra et al. |
| 6,562,092 B1 | 5/2003 | Ito et al. |
| 6,562,403 B2 | 5/2003 | Klabunde et al. |
| 6,569,224 B2 | 5/2003 | Kerfoot et al. |
| 6,569,393 B1 | 5/2003 | Hoke et al. |
| 6,569,490 B2 | 5/2003 | Yadav et al. |
| 6,572,672 B2 | 6/2003 | Yadav et al. |
| 6,576,092 B2 | 6/2003 | Granite et al. |
| 6,576,156 B1 | 6/2003 | Ratna et al. |
| 6,585,787 B2 | 7/2003 | Yamasaki et al. |
| 6,589,496 B1 | 7/2003 | Yabe et al. |
| 6,599,428 B1 | 7/2003 | Douglas |
| 6,599,429 B1 | 7/2003 | Azizian |
| 6,602,111 B1 | 8/2003 | Fujie et al. |
| 6,602,671 B1 | 8/2003 | Bawendi et al. |
| 6,602,994 B1 | 8/2003 | Cash |
| 6,610,264 B1 | 8/2003 | Buchanan et al. |
| 6,613,230 B2 | 9/2003 | Krulik et al. |
| 6,623,642 B2 | 9/2003 | Robertson |
| 6,627,632 B2 | 9/2003 | Parks et al. |
| 6,653,519 B2 | 11/2003 | Koper et al. |
| 6,666,903 B1 | 12/2003 | Green |
| 6,680,211 B2 | 1/2004 | Barbera-Guillem et al. |
| 6,689,178 B2 | 2/2004 | Ito et al. |
| 6,706,082 B2 | 3/2004 | Ota et al. |
| 6,706,195 B2 | 3/2004 | Jensen et al. |
| 6,716,895 B1 | 4/2004 | Terry |
| 6,719,828 B1 | 4/2004 | Lovell et al. |
| 6,723,349 B1 | 4/2004 | Hill et al. |
| 6,740,141 B2 | 5/2004 | Espin et al. |
| 6,749,746 B2 | 6/2004 | Mokrzycki |
| 6,749,748 B1 | 6/2004 | Macpherson et al. |
| 6,770,483 B2 | 8/2004 | Lyon |
| 6,774,361 B2 | 8/2004 | Bawendi et al. |
| 6,780,332 B2 | 8/2004 | Shiau et al. |
| 6,790,363 B2 | 9/2004 | Vempati |
| 6,790,420 B2 | 9/2004 | Breen et al. |
| 6,790,521 B1 | 9/2004 | Taketomi et al. |
| 6,800,204 B2 | 10/2004 | Harck et al. |
| 6,808,692 B2 | 10/2004 | Oehr |
| 6,821,414 B1 | 11/2004 | Johnson et al. |
| 6,821,427 B2 | 11/2004 | Macpherson et al. |
| 6,821,434 B1 | 11/2004 | Moore et al. |
| 6,824,690 B1 | 11/2004 | Zhao et al. |
| 6,827,766 B2 | 12/2004 | Carnes et al. |
| 6,827,874 B2 | 12/2004 | Souter |
| 6,833,123 B2 | 12/2004 | Huang et al. |
| 6,843,617 B2 | 1/2005 | Chowdhury et al. |
| 6,843,919 B2 | 1/2005 | Klabunde et al. |
| 6,843,923 B2 | 1/2005 | Morton |
| 6,846,432 B2 | 1/2005 | Mills |
| 6,849,187 B2 | 2/2005 | Shaniuk |
| 6,852,903 B1 | 2/2005 | Brown et al. |
| 6,855,665 B1 | 2/2005 | Blake et al. |
| 6,858,147 B2 | 2/2005 | Dukhin et al. |
| 6,860,924 B2 | 3/2005 | Rajagopalan et al. |
| 6,861,002 B2 | 3/2005 | Hughes |
| 6,862,825 B1 | 3/2005 | Lowndes |
| 6,863,825 B2 | 3/2005 | Witham et al. |
| 6,864,213 B2 | 3/2005 | Labarge et al. |
| 6,881,424 B1 | 4/2005 | Kemp et al. |
| 6,881,766 B2 | 4/2005 | Hain |
| 6,887,302 B2 | 5/2005 | Rajagopalan et al. |
| 6,887,566 B1 | 5/2005 | Hung et al. |
| 6,896,809 B2 | 5/2005 | Qian et al. |
| 6,901,684 B2 | 6/2005 | Ito et al. |
| 6,905,527 B2 | 6/2005 | Ito et al. |
| 6,905,698 B1 | 6/2005 | Aldcroft et al. |
| 6,908,560 B2 | 6/2005 | Guter |
| 6,908,570 B2 | 6/2005 | Green |
| 6,908,628 B2 | 6/2005 | Herruzo Cabrera |
| 6,914,033 B2 | 7/2005 | Gislason et al. |
| 6,914,034 B2 | 7/2005 | Vo |
| 6,916,756 B2 | 7/2005 | Schindler et al. |
| 6,919,029 B2 | 7/2005 | Meng et al. |
| 6,921,739 B2 | 7/2005 | Smith et al. |
| 6,927,501 B2 | 8/2005 | Baarman et al. |
| 6,942,840 B1 | 9/2005 | Broderick |
| 6,946,076 B2 | 9/2005 | Mills |
| 6,946,578 B2 | 9/2005 | Nakano et al. |
| 6,957,743 B2 | 10/2005 | Johnston et al. |
| 6,960,329 B2 | 11/2005 | Sellakumar |
| 6,974,564 B2 | 12/2005 | Biermann et al. |
| 6,977,039 B2 | 12/2005 | Knoll et al. |
| 6,986,798 B2 | 1/2006 | Bessho et al. |
| 6,987,129 B2 | 1/2006 | Mak et al. |
| 6,998,080 B2 | 2/2006 | Stadermann et al. |
| 7,008,559 B2 | 3/2006 | Chen |
| 7,014,782 B2 | 3/2006 | D'Emidio et al. |
| 7,025,800 B2 | 4/2006 | Campbell et al. |
| 7,025,943 B2 | 4/2006 | Zhou et al. |
| 7,029,516 B2 | 4/2006 | Campbell et al. |
| 7,030,163 B2 | 4/2006 | Duneas |
| 7,033,419 B1 | 4/2006 | Granite et al. |
| RE39,098 E | 5/2006 | Klabunde et al. |
| 7,037,480 B2 | 5/2006 | Bhinde |
| 7,048,853 B2 | 5/2006 | Witham et al. |
| 7,048,860 B2 | 5/2006 | Oishi |
| 7,049,382 B2 | 5/2006 | Haftka et al. |
| 7,056,454 B2 | 6/2006 | Fujino |
| 7,060,233 B1 | 6/2006 | Srinivas et al. |
| 7,067,294 B2 | 6/2006 | Singh et al. |
| 7,074,336 B1 | 7/2006 | Teter et al. |
| 7,078,071 B2 | 7/2006 | Taketomi et al. |
| 7,081,428 B1 | 7/2006 | Thampi |
| 7,083,730 B2 | 8/2006 | Davis |
| 7,094,383 B2 | 8/2006 | Wang et al. |
| 7,101,415 B2 | 9/2006 | Torres et al. |
| 7,101,493 B2 | 9/2006 | Colucci |
| 7,112,237 B2 | 9/2006 | Zeller et al. |
| 7,129,684 B2 | 10/2006 | Park |
| 7,141,227 B2 | 11/2006 | Chan |
| 7,156,888 B2 | 1/2007 | Mochizuki |
| 7,156,994 B1 | 1/2007 | Archer |
| 7,157,009 B2 | 1/2007 | Nichols |
| 7,160,465 B2 | 1/2007 | Kirts et al. |
| 7,160,505 B2 | 1/2007 | Belbachir et al. |
| 7,179,849 B2 | 2/2007 | Terry |
| 7,183,235 B2 | 2/2007 | Lovell et al. |
| 7,186,671 B2 | 3/2007 | Smith et al. |
| 7,192,602 B2 | 3/2007 | Fechner et al. |
| 7,211,320 B1 | 5/2007 | Cooper et al. |
| 7,214,836 B2 | 5/2007 | Brown et al. |
| 7,238,287 B2 | 7/2007 | Kulperger |
| 7,241,629 B2 | 7/2007 | Dejneka et al. |
| 7,250,174 B2 | 7/2007 | Lee et al. |
| 7,252,694 B2 | 8/2007 | Woo et al. |
| 7,252,769 B2 | 8/2007 | Dickinson |
| 7,256,049 B2 | 8/2007 | Bennett et al. |
| 7,264,670 B2 | 9/2007 | Ruger et al. |
| 7,276,640 B2 | 10/2007 | Mulukutla et al. |
| 7,279,129 B2 | 10/2007 | Lanz et al. |

(56) References Cited

U.S. PATENT DOCUMENTS

| | | |
|---|---|---|
| 7,282,153 B2 | 10/2007 | Barrett et al. |
| 7,291,217 B2 | 11/2007 | Phelps et al. |
| 7,291,272 B2 | 11/2007 | Bourke et al. |
| 7,291,315 B2 | 11/2007 | Obee et al. |
| 7,297,263 B2 | 11/2007 | Nelson et al. |
| 7,297,656 B2 | 11/2007 | Zhang et al. |
| 7,300,587 B2 | 11/2007 | Smith et al. |
| 7,300,589 B2 | 11/2007 | Witham et al. |
| 7,311,842 B2 | 12/2007 | Kim |
| 7,329,356 B2 | 2/2008 | Brady |
| 7,329,359 B2 | 2/2008 | Roark |
| 7,335,622 B2 | 2/2008 | Koyanaka et al. |
| 7,335,808 B2 | 2/2008 | Koper et al. |
| 7,338,603 B1 | 3/2008 | McNew et al. |
| 7,341,618 B2 | 3/2008 | Bayer et al. |
| 7,341,667 B2 | 3/2008 | Kennard et al. |
| 7,341,977 B2 | 3/2008 | Klabunde et al. |
| 7,361,279 B2 | 4/2008 | Hernandez et al. |
| 7,368,388 B2 | 5/2008 | Small et al. |
| 7,368,412 B2 | 5/2008 | Tranter et al. |
| 7,374,690 B2 | 5/2008 | Reddy |
| 7,378,372 B2 | 5/2008 | Sylvester |
| 7,381,431 B2 | 6/2008 | Baker |
| 7,384,573 B2 | 6/2008 | Brummett |
| 7,422,759 B2 | 9/2008 | Kepner et al. |
| 7,429,330 B2 | 9/2008 | Vo et al. |
| 7,431,758 B2 | 10/2008 | Ota et al. |
| 7,438,828 B2 | 10/2008 | Young |
| 7,445,718 B2 | 11/2008 | Misra et al. |
| 7,459,086 B2 | 12/2008 | Gaid |
| 7,468,413 B2 | 12/2008 | Yokota et al. |
| 7,473,474 B2 | 1/2009 | Toreki et al. |
| 7,476,311 B2 | 1/2009 | Litz et al. |
| 7,481,939 B2 | 1/2009 | Haley |
| 7,491,335 B2 | 2/2009 | Reddy et al. |
| 7,495,033 B1 | 2/2009 | Chane-ching |
| 7,498,005 B2 | 3/2009 | Yadav |
| 7,524,475 B2 | 4/2009 | Cho et al. |
| 7,524,808 B2 | 4/2009 | Fütterer et al. |
| 7,534,287 B2 | 5/2009 | Zeller et al. |
| 7,534,453 B1 | 5/2009 | Rzigalinski et al. |
| 7,557,072 B2 | 7/2009 | Fütterer et al. |
| 7,560,023 B2 | 7/2009 | Miyazawa et al. |
| 7,566,393 B2 | 7/2009 | Klabunde et al. |
| 7,572,416 B2 | 8/2009 | Alward et al. |
| 7,588,744 B1 | 9/2009 | Sylvester |
| 7,588,782 B2 | 9/2009 | Moerck et al. |
| 7,591,952 B2 | 9/2009 | Young |
| 7,611,620 B2 | 11/2009 | Carson et al. |
| 7,635,415 B2 | 12/2009 | Lestage et al. |
| 7,645,540 B2 | 1/2010 | Boone et al. |
| 7,655,594 B2 | 2/2010 | Okun et al. |
| 7,658,904 B2 | 2/2010 | Boen et al. |
| 7,661,483 B2 | 2/2010 | Mulukutla et al. |
| 7,682,443 B2 | 3/2010 | Sato et al. |
| 7,686,976 B2 | 3/2010 | Witham et al. |
| 7,691,289 B2 | 4/2010 | Okun et al. |
| 7,704,920 B2 | 4/2010 | Yang et al. |
| 7,713,399 B2 | 5/2010 | Martinie et al. |
| 7,723,279 B2 | 5/2010 | Lestage et al. |
| 7,728,132 B2 | 6/2010 | Harvey |
| 7,732,372 B2 | 6/2010 | Hampden-Smith et al. |
| 7,740,984 B2 | 6/2010 | Bushong et al. |
| 7,763,384 B2 | 7/2010 | Boone et al. |
| 7,790,042 B2 | 9/2010 | Nichols |
| 7,807,296 B2 | 10/2010 | Vu et al. |
| 7,820,100 B2 | 10/2010 | Garfield et al. |
| 7,947,640 B2 | 5/2011 | Shah et al. |
| 8,066,874 B2 | 11/2011 | Burba et al. |
| 8,119,555 B2 | 2/2012 | Banerjee et al. |
| 2001/0009831 A1 | 7/2001 | Schink et al. |
| 2001/0012856 A1 | 8/2001 | Parks et al. |
| 2002/0003116 A1 | 1/2002 | Golden |
| 2002/0005383 A1 | 1/2002 | Voute et al. |
| 2002/0044901 A1 | 4/2002 | Wilson et al. |
| 2002/0066702 A1 | 6/2002 | Liu |
| 2002/0074295 A1 | 6/2002 | Cohen |
| 2002/0187990 A1 | 12/2002 | Parks et al. |
| 2003/0024879 A1 | 2/2003 | Carson et al. |
| 2003/0133990 A1 | 7/2003 | Hursey et al. |
| 2003/0149406 A1 | 8/2003 | Martineau et al. |
| 2003/0156981 A1 | 8/2003 | Mills |
| 2003/0180213 A1 | 9/2003 | Carnes et al. |
| 2003/0203977 A1 | 10/2003 | Klabunde et al. |
| 2003/0207949 A1 | 11/2003 | Klabunde et al. |
| 2004/0031764 A1 | 2/2004 | Heinig |
| 2004/0043914 A1 | 3/2004 | Kaziska et al. |
| 2004/0045906 A1 | 3/2004 | Wiseman |
| 2004/0050795 A1 | 3/2004 | Park et al. |
| 2004/0091417 A1 | 5/2004 | Yadav |
| 2004/0109853 A1 | 6/2004 | McDaniel |
| 2004/0202703 A1 | 10/2004 | Meyer-Ingold et al. |
| 2004/0241424 A1 | 12/2004 | Barbera-Guillem |
| 2005/0008861 A1 | 1/2005 | Yadav et al. |
| 2005/0058689 A1 | 3/2005 | McDaniel |
| 2005/0067347 A1 | 3/2005 | Vanhulle et al. |
| 2005/0069464 A1 | 3/2005 | Obee et al. |
| 2005/0084755 A1 | 4/2005 | Boone et al. |
| 2005/0119497 A1 | 6/2005 | Hong et al. |
| 2005/0126338 A1 | 6/2005 | Yadav |
| 2005/0126430 A1 | 6/2005 | Lightner, Jr. et al. |
| 2005/0129589 A1 | 6/2005 | Wei et al. |
| 2005/0136486 A1 | 6/2005 | Haushalter |
| 2005/0153171 A1 | 7/2005 | Beatty et al. |
| 2005/0257724 A1 | 11/2005 | Guinther et al. |
| 2005/0288181 A1 | 12/2005 | Tranter et al. |
| 2006/0000763 A1 | 1/2006 | Rinker et al. |
| 2006/0018954 A1 | 1/2006 | Kuttler |
| 2006/0020795 A1 | 1/2006 | Gasparini |
| 2006/0030622 A1 | 2/2006 | Mak et al. |
| 2006/0049091 A1 | 3/2006 | Cheetham et al. |
| 2006/0062831 A1 | 3/2006 | Meyer-Ingold et al. |
| 2006/0070947 A1 | 4/2006 | Conrad |
| 2006/0120930 A1 | 6/2006 | Mizukami |
| 2006/0173083 A1 | 8/2006 | Klipper |
| 2006/0178609 A1 | 8/2006 | Horn et al. |
| 2006/0198883 A1 | 9/2006 | Parks et al. |
| 2006/0199301 A1 | 9/2006 | Basheer et al. |
| 2006/0199733 A1 | 9/2006 | Grier et al. |
| 2006/0224237 A1 | 10/2006 | Furst et al. |
| 2006/0228275 A1 | 10/2006 | Rutman |
| 2006/0246149 A1 | 11/2006 | Buchholz et al. |
| 2006/0257728 A1 | 11/2006 | Mortensen et al. |
| 2006/0275564 A1 | 12/2006 | Grah et al. |
| 2007/0000836 A1 | 1/2007 | Elefritz et al. |
| 2007/0012631 A1 | 1/2007 | Coffey et al. |
| 2007/0102672 A1 | 5/2007 | Hamilton |
| 2007/0114179 A1 | 5/2007 | Badger |
| 2007/0128424 A1 | 6/2007 | Omori et al. |
| 2007/0128491 A1 | 6/2007 | Chisholm |
| 2007/0134307 A1 | 6/2007 | Xiao et al. |
| 2007/0142783 A1 | 6/2007 | Huey et al. |
| 2007/0149405 A1 | 6/2007 | Spitler et al. |
| 2007/0151851 A1 | 7/2007 | Tanaka |
| 2007/0158251 A1 | 7/2007 | Chau |
| 2007/0167971 A1 | 7/2007 | Huey et al. |
| 2007/0169626 A1 | 7/2007 | Sullivan |
| 2007/0170115 A1 | 7/2007 | Skillicorn |
| 2007/0191217 A1 | 8/2007 | Twigg |
| 2007/0254141 A1 | 11/2007 | Morse et al. |
| 2007/0286796 A1 | 12/2007 | Koper et al. |
| 2007/0298085 A1 | 12/2007 | Lestage et al. |
| 2008/0023403 A1* | 1/2008 | Rawson et al. ............... 210/665 |
| 2008/0050440 A1 | 2/2008 | Wakamura et al. |
| 2008/0050471 A1 | 2/2008 | Omasa |
| 2008/0058206 A1 | 3/2008 | Misra et al. |
| 2008/0058689 A1 | 3/2008 | Holloway et al. |
| 2008/0081120 A1 | 4/2008 | Van Ooij et al. |
| 2008/0097271 A1 | 4/2008 | Lo et al. |
| 2008/0102136 A1 | 5/2008 | Koper et al. |
| 2008/0146860 A1 | 6/2008 | Doumbos |
| 2008/0199539 A1 | 8/2008 | Baker et al. |
| 2008/0213906 A1 | 9/2008 | Aurand et al. |
| 2008/0254146 A1 | 10/2008 | Huey et al. |

(56) References Cited

U.S. PATENT DOCUMENTS

| | | | |
|---|---|---|---|
| 2008/0254147 A1 | 10/2008 | Huey et al. | |
| 2008/0262285 A1 | 10/2008 | Black et al. | |
| 2008/0302267 A1 | 12/2008 | Defalco | |
| 2008/0311311 A1 | 12/2008 | Khan et al. | |
| 2009/0001011 A1 | 1/2009 | Knipmeyer et al. | |
| 2009/0011240 A1 | 1/2009 | Lenz et al. | |
| 2009/0011930 A1 | 1/2009 | Hagemeyer | |
| 2009/0012204 A1 | 1/2009 | Drechsler et al. | |
| 2009/0069844 A1 | 3/2009 | Green et al. | |
| 2009/0071887 A1 | 3/2009 | Ruech | |
| 2009/0098016 A1 | 4/2009 | Koper et al. | |
| 2009/0101588 A1 | 4/2009 | Misra et al. | |
| 2009/0101837 A1 | 4/2009 | Kourtakis et al. | |
| 2009/0107919 A1 | 4/2009 | Burba, III et al. | |
| 2009/0107925 A1 | 4/2009 | Burba, III et al. | |
| 2009/0108777 A1 | 4/2009 | Hyde et al. | |
| 2009/0111289 A1 | 4/2009 | Vinther | |
| 2009/0111689 A1 | 4/2009 | Burba, III | |
| 2009/0112043 A1 | 4/2009 | Burba, III et al. | |
| 2009/0120802 A1 | 5/2009 | Ciampi et al. | |
| 2009/0130169 A1 | 5/2009 | Bernstein | |
| 2009/0202434 A1 | 8/2009 | Da Cruz | |
| 2009/0206042 A1 | 8/2009 | Landau et al. | |
| 2009/0264574 A1 | 10/2009 | Van Ooij et al. | |
| 2009/0294381 A1 | 12/2009 | Coffey et al. | |
| 2009/0298738 A1 | 12/2009 | Kneipp et al. | |
| 2009/0299253 A1 | 12/2009 | Hursey | |
| 2010/0003203 A1 | 1/2010 | Karpov et al. | |
| 2010/0042206 A1 | 2/2010 | Yadav et al. | |
| 2010/0044317 A1 | 2/2010 | Witham et al. | |
| 2010/0055456 A1 | 3/2010 | Perera et al. | |
| 2010/0155330 A1 | 6/2010 | Burba et al. | |
| 2010/0168498 A1 | 7/2010 | Burba et al. | |
| 2010/0187178 A1 | 7/2010 | Burba et al. | |
| 2010/0230359 A1 | 9/2010 | Whitehead et al. | |
| 2010/0243542 A1 | 9/2010 | Burba, III et al. | |
| 2010/0255559 A1 | 10/2010 | Burba, III et al. | |
| 2010/0258448 A1 | 10/2010 | Whitehead et al. | |
| 2010/0264084 A1 | 10/2010 | Midorikawa et al. | |
| 2011/0000854 A1 | 1/2011 | Nichols et al. | |
| 2011/0002971 A1 | 1/2011 | Hassler et al. | |
| 2011/0033337 A1 | 2/2011 | Burba, III et al. | |
| 2011/0067315 A1 | 3/2011 | Cho et al. | |
| 2011/0110817 A1 | 5/2011 | Lupo et al. | |
| 2011/0303871 A1 | 12/2011 | Burba et al. | |
| 2011/0309017 A1 | 12/2011 | Hassler et al. | |
| 2012/0021025 A1 | 1/2012 | Bendejacq et al. | |
| 2012/0031827 A1 | 2/2012 | Burba et al. | |
| 2012/0074071 A1 | 3/2012 | Hassler et al. | |
| 2012/0103909 A1 | 5/2012 | Burba et al. | |
| 2012/0328681 A1 | 12/2012 | Hassler et al. | |
| 2014/0007773 A1 | 1/2014 | Burba | |
| 2014/0117273 A1 | 5/2014 | Nichols et al. | |

FOREIGN PATENT DOCUMENTS

| | | |
|---|---|---|
| CA | 2494992 | 2/2004 |
| CA | 2530705 | 6/2006 |
| CN | 1248486 | 3/2000 |
| EP | 0049593 | 4/1982 |
| EP | 0191893 | 8/1986 |
| EP | 0541158 | 5/1993 |
| EP | 0597173 | 5/1994 |
| EP | 0812619 | 12/1997 |
| EP | 0939431 | 1/1999 |
| EP | 1201607 | 2/2002 |
| EP | 1080144 | 8/2002 |
| EP | 1369381 | 12/2003 |
| EP | 1452229 | 9/2004 |
| EP | 1071500 | 2/2005 |
| EP | 1870150 | 12/2007 |
| EP | 1992394 | 11/2008 |
| EP | 2161067 | 3/2010 |
| EP | 2177252 | 4/2010 |
| GB | 1447264 | 8/1976 |
| GB | 2426469 | 11/2006 |
| JP | 61-187931 | 8/1986 |
| JP | 63-287547 | 11/1988 |
| JP | 11-51917 | 6/1989 |
| JP | H2-17220 | 4/1990 |
| JP | 6-207561 | 7/1994 |
| JP | 9-141274 | 6/1997 |
| JP | 10-165948 | 6/1998 |
| JP | H11-10170 | 1/1999 |
| JP | 11-090413 | 4/1999 |
| JP | 11-302684 | 11/1999 |
| JP | 2000-024647 | 1/2000 |
| JP | 2000-107596 | 4/2000 |
| JP | 2002-153864 | 5/2002 |
| JP | 2002-205062 | 7/2002 |
| JP | 2002-263641 | 9/2002 |
| JP | 2002-282686 | 10/2002 |
| JP | 2002-349234 | 12/2002 |
| JP | 2004-008950 | 1/2004 |
| JP | 2004-016214 | 1/2004 |
| JP | 2004-050069 | 2/2004 |
| JP | 2004-057870 | 2/2004 |
| JP | 2004-148289 | 5/2004 |
| JP | 2004-275839 | 10/2004 |
| JP | 2004-305915 | 11/2004 |
| JP | 2004-314058 | 11/2004 |
| JP | 2004-330012 | 11/2004 |
| JP | 2005-023373 | 1/2005 |
| JP | 2005-028312 | 2/2005 |
| JP | 2005-048181 | 2/2005 |
| JP | 2005-246197 | 9/2005 |
| JP | 2005-288363 | 10/2005 |
| JP | 2006-036995 | 2/2006 |
| JP | 2006-320847 | 11/2006 |
| JP | 07-081932 | 3/2007 |
| JP | 2007-098366 | 4/2007 |
| JP | 2007-283168 | 11/2007 |
| JP | 2008-024912 | 2/2008 |
| JP | 2010-083741 | 4/2010 |
| KR | 960000309 | 1/1996 |
| RU | 2136607 | 9/1999 |
| RU | 2178599 | 1/2002 |
| SU | 663291 | 5/1979 |
| WO | WO 95/11195 | 4/1995 |
| WO | WO 97/12672 | 4/1997 |
| WO | WO 97/25275 | 7/1997 |
| WO | WO 98/07493 | 2/1998 |
| WO | WO 99/28239 | 6/1999 |
| WO | WO 00/24680 | 5/2000 |
| WO | WO 01/32799 | 5/2001 |
| WO | WO 01/32820 | 5/2001 |
| WO | WO 01/36333 | 5/2001 |
| WO | WO 01/78506 | 10/2001 |
| WO | WO 03/092748 | 11/2003 |
| WO | WO 2004/016553 | 2/2004 |
| WO | WO 2004/032624 | 4/2004 |
| WO | WO 2004/076770 | 9/2004 |
| WO | WO 2004/096433 | 11/2004 |
| WO | WO 2005/028707 | 3/2005 |
| WO | WO 2005/042130 | 5/2005 |
| WO | WO 2005/056175 | 6/2005 |
| WO | WO 2005/075000 | 8/2005 |
| WO | WO 2005/081722 | 9/2005 |
| WO | WO 2006/011764 | 2/2006 |
| WO | WO 2006/044784 | 4/2006 |
| WO | WO 2006/047613 | 5/2006 |
| WO | WO 2006/070153 | 7/2006 |
| WO | WO 2006/102008 | 9/2006 |
| WO | WO 2006/117424 | 11/2006 |
| WO | WO 2006/131473 | 12/2006 |
| WO | WO 2007/011877 | 1/2007 |
| WO | WO 2007/041553 | 4/2007 |
| WO | WO 2007/120910 | 10/2007 |
| WO | WO 2008/010844 | 1/2008 |
| WO | WO 2008/151173 | 12/2008 |
| WO | WO 2009/064845 | 5/2009 |
| WO | WO 2009/097672 | 8/2009 |
| WO | WO 2009/102854 | 8/2009 |

(56) References Cited

FOREIGN PATENT DOCUMENTS

| WO | WO 2009/142823 | 11/2009 |
|----|----------------|---------|
| WO | WO 2010/010569 | 1/2010 |
| WO | WO 2010/010570 | 1/2010 |
| WO | WO 2010/010571 | 1/2010 |
| WO | WO 2010/010574 | 1/2010 |
| WO | WO 2010/019934 | 2/2010 |

OTHER PUBLICATIONS

"Ammonia," Wikipedia, modified Aug. 6, 2013, 25 pages.
Holder "In vitro inactivation of silver sulphadiazine by the addition of cerium salts." Burns, including thermal injury, Mar. 1982, vol. 8, No. 4, pp. 274-277, Medline Accession # 1982162046, Doc. # PUBMED ID: 7066726 (Abstract).
Mancini "Pharmacology of the rare earths. Nlanthanum." Arch Fisiol, 1926, vol. 24, No. 2, pp. 162-175, Biosis accession # 1927:7297, Doc. # PREV1920100009524; BAO1; 9524 (Abstract).
Monafo et al. "Cerium nitrate: a new topical antiseptic for extensive burns." Surgery, Oct. 1976, vol. 80, No. 4, pp. 465-473, Medline Accession # 1977015843, Doc. # 135364 (Abstract).
International Preliminary Report on Patentability for International (PCT) Patent Application No. PCT/US12/27308, mailed Feb. 19, 2013 24 pages.
International Preliminary Report on Patentability for International (PCT) Patent Application No. PCT/US12/30991, mailed May 10, 2013 8 pages.
International Preliminary Report on Patentability for International (PCT) Patent Application No. PCT/US2011/053131, mailed Apr. 4, 2013 8 pages.
Extended Search Report for European Patent Application No. 11827669.0, dated Mar. 4, 2014 7 pages.
International Preliminary Report on Patentability for International (PCT) Patent Application No. PCT/US2011/053134, mailed Apr. 4, 2013 8 pages.
International Preliminary Report on Patentability for International (PCT) Patent Application No. PCT/US12/30974, mailed May 17, 2013 18 pages.
International Preliminary Report on Patentability for International (PCT) Patent Application No. PCT/US2012/030976, mailed Oct. 24, 2013 8 pages.
Haron et al. "Sorption removal of arsenic by cerium-exchanged zeolite," Poster at E-MRS Fall Meeting 2007, Symposium F, Sep. 17-21, 2007, 2 pages. (Abstract).
International Search Report and Written Opinion for International (PCT) Patent Application No. PCT/US12/27308, mailed Aug. 7, 2012 10 pages.
International Search Report for International (PCT) Patent Application No. PCT/US12/30991, mailed Jun. 29, 2012.
Written Opinion for International (PCT) Patent Application No. PCT/US12/30991, mailed Jun. 29, 2012.
International Preliminary Report on Patentability for International (PCT) Patent Application No. PCT/US12/22267, mailed Jan. 25, 2013 26 pages.
International Search Report and Written Opinion for International (PCT) Patent Application No. PCT/US12/30974, mailed Sep. 28, 2012 12 pages.
International Preliminary Report on Patentability for International (PCT) Patent Application No. PCT/US12/22269, mailed Jan. 9, 2013 25 pages.
International Search Report and Written Opinion for International (PCT) Patent Application No. PCT/US2012/030976, mailed Sep. 12, 2012 9 pages.
Takeno "Atlas of Eh-pH diagrams: Intercomparison of thermodynamic databases," National Institute of Advanced Industrial Science and Technology, May 2005, 287 pages.
U.S. Appl. No. 11/958,602, filed Jun. 2012, Burba et al.
U.S. Appl. No. 11/958,644, filed Jun. 2012, Burba et al.
U.S. Appl. No. 11/958,968, filed Jul. 2012, Burba et al.
U.S. Appl. No. 13/356,581, filed Jul. 2012, Cable et al.
U.S. Appl. No. 13/356,574, filed Jul. 2012, Hassler et al.
U.S. Appl. No. 13/410,081, filed Sep. 2012, Hassler et al.
U.S. Appl. No. 13/432,895, filed Oct. 2012, Hassler et al.
U.S. Appl. No. 13/433,097, filed Oct. 2012, Hassler et al.
U.S. Appl. No. 13/434,214, filed Oct. 2012, Burba, III.
"APV Engineered Coatings Kynar®," Presentation by APV Engineered Coatings, http://www.apvcoatings.com/cms/resource_library/files/8537e627f567af63/kynar_presentation_weiss_inc_fiber_board_cement_pdf_.pdf, date unknown, 30 pages.
"Bastnasite," available at htt://webmineral.com/data/Bastnasite-(Ce).shtml, accessed Jul. 30, 2007, 6 pages.
"Benchtop Granulator™," LCI Corporation Technical Bulletin TB-GR-101, 2004, http://replay.waybackmachine.org/20040518160414/http://www.lcicorp.com/granulation/Docs/benchtop_tb.pdf, 1 page.
"Carbonates," available on the Molycorp website Dec. 13, 2005, pp. 22-30.
"Cerium: A Guide to its role in Chemical Technology," Molycorp, 1992, 48 pages.
"Clear Choices for Clean Drinking Water," Consumer Reports, Jan. 2003, pp. 33-37.
"Distinguishing Adsorption and Surface Precipitation of Phosphate and Arsenate on Hydrous Iron Oxides," http://www.eng.nus.edu.sg/EResnews/0206/rd/rd_1.html, accessed Jul. 25, 2010, 4 pages.
"Drinking Water Contaminants: National Primary Drinking Water Regulations." U.S. Environmental Protection Agency, updated Jan. 11, 2011, 8 pages.
"Drinking Water Treatment Units—Aesthetic Effects." NSF International Standard/American National Standard, prepared by The NSF Joint Committee on Drinking Water Treatment Units, last revised Oct. 2007, NSF/ANSI 42-2007a, 75 pages.
"Drinking Water System Components—Health Effects." NSF International Standard/American National Standard, prepared by the NSF Joint Committee on Drinking Water Additives, NSF/ANSI 61-2009, Last Revised Aug. 2009, 197 pages.
"Drinking Water Treatment Units—Health Effects." NSF International Standard/American National Standard, prepared by the NSF Joint Committee on Drinking Water Treatment Units, last revised Aug. 2009, NSF/ANSI 53-2009e, 121 pages.
"Homogeneous Reactions of As and Se Oxoanions in Aqueous Solutions, and the Photooxidation of their Reduced Species in the X-ray Beam," available at http://geoweb.princeton.edu/research/geochemistry/research/aqueous-oxoanion.html, accessed May 6, 2009.
"Hydrometallurgy," Hazen Research, Inc., available at http://www.hazenusa.com/hydrometallurgy-1.php, accessed Dec. 21, 2006, 7 pages.
"NanoActive Cerium Oxide," NanoScale Corporation, NA106.v.3 Apr. 1, 2008, 2 pages.
"NanoActive Granules," NanoScale Corporation, available at http://www.nanoscalecorp.com/content.php/chemicals/granules/, printed Apr. 2, 2010, 2 pages.
"NanoActive Metal Oxides," NanoScale Corporation, available at http://www.nanoscalecorp.com/content.php/chemicals/home/, printed Apr. 2, 2010, 2 pages.
"NanoActive Powders," NanoScale Corporation, available at http://www.nanoscalecorp.com/content.php/chemicals/powders/, printed Apr. 2, 2010, 2 pages.
"NanoActive Suspensions," NanoScale Corporation, available at http://www.nanoscalecorp.com/content.php/chemicals/suspensions/, printed Apr. 2, 2010, 2 pages.
"National Primary Drinking Water Regulations." U.S. Environmental Protection Agency, May 2009, EPA 816-F-09-004, 6 pages.
"New Products Kynar Aquatec from Arkema Inc.," metalmag Magazine, posted May 28, 2009, 2 pages.
"PolyGoneLines," Schaner's Waste Water Products, Inc., available at http://www.struvite.com/products.html#polygone_lines, date unknown, 3 pages.
"Point-of-Use/Entry Treatment of Drinking Water" U.S. Environmental Protection Agency, Jul. 1991, 154 pages.
"Potentiometry," date unknown, 14 pages.

(56) References Cited

OTHER PUBLICATIONS

"Radial Xtruder® Model EXDCS-60," LCI Corporation Technical Bulletin, 2006, http://replay.waybackmachine.org/20060511144227/http://www.lcicorp.com/granulation/Docs/xtruder60G_%20tb.pdf, 2 pages.

"Tributyltin," Extoxnet, Pesticide Information Project, publication date Sep. 1993, available at http://pmep.cce.cornell.edu/profiles/extoxnet/pyrethrins-ziram/tributyltin-ext.html, accessed Jul. 3, 2008, 6 pages.

"Twin Dome Extruder Model TDG-80G," LCI Corporation Technical Bulletin, 2006, http://replay.waybackmachine.org/20060511145629/http://www.lcicorp.com/granulation/Docs/tdg80_extruder_%20tb.pdf, 2 pages.

"UI Arsenic water treatment project shows promise," University of Idaho, Environmental News Network, Dec. 3, 2002, 2 pages.

"Virus," Wikipedia the free encyclopedia, http://wn.wikipedia.org/w/index.php?title=Virus&printable=yes, last modified Mar. 16, 2009, 28 pages.

Abanades et al., "Thermochemical hydrogen production from a two-step solar-driven water-splitting cycle based on cerium oxides," Solar Energy, 2006, vol. 80, pp. 1611-1623.

Adschiri et al., "Hydrothermal Synthesis of Metal Oxide Fine Particles at Supercritical Conditions," Ind. Eng. Chem. Res., 2000, vol. 39, pp. 4901-4907.

Ahmed et al., "Paper 3: Arsenic Mitigation Technologies in South and East Asia," Arsenic Contamination in Groundwater in South and East Asian Countries, vol. II Technical Report, No. 31303, Mar. 2005, pp. 166-207.

Ahmed et al., eds., "Arsenic Mitigation in Bangladesh," Outcome of the International Workshop on Arsenic Mitigation in Bangladesh, Dhaka, Jan. 14-16, 2002, published Oct. 2002, 67 pages.

Ahmed, "An Overview of Arsenic Removal Technologies in Bangladesh and India," Buet-Unu International Workshop on Technologies for Arsenic Removal from Drinking Water, May 5-7, 2001, pp. 251-269.

Ahmed, "Water Supply Options," available at http://www.physics.harvard.edu/~wilson/arsenic/conferences/Feroze_Ahmed/Sec_3 . . . , accessed May 8, 2009, 25 pages, Jan. 29, 2002.

Al-Abed et al., "Arsenic Release from Iron Rich Mineral Processing Waste; Influence of pH and Redox Potential," Chemosphere, 2007, vol. 66, pp. 775-782.

Alam et al., "Chemical Extraction of Arsenic from Contaminated Soil," J. Environ Sci Health a Tox Hazard Subst Environ Eng., 41 (4), pp. 631-643 (2006).

Alam et al., "Extraction of arsenic in a synthetic arsenic-contaminated soil using phosphate," Chemosphere, 2001, vol. 43, pp. 1035-1041.

Ali et al., "Fate of Arsenic in Wastes Generated from Arsenic Removal Units," In Proceedings of BUET-UNU Symposium on Fate of Arsenic in the Environment, Dhaka, Feb. 5-6, 2003, Bangladesh University of Engineering and Technology and United Nations University, Bangladesh, pp. 147-159.

Amimono, "Arsenic removal by inorganic ion-exchanger," available at http://www.apec-vc.or.jp/e/modules/tinyd00/index.php?id=63&kh_open_cid_00=7, accessed May 8, 2009, 3 pages.

Arsenate, Wikipedia, available at http://en.wikipedia.org/w/index.php?title=Arsenate&printable=yes, accessed May 6, 2009, 2 pages.

Australian Drinking Water Guidelines, H2O: Part V Facts Sheets, date unknown, 355 pages.

Baker et al., "Present General Status of Understanding of Heteropoly Electrolytes and a Tracing of Some Major Highlights in the History of Their Elucidation," Chem. Rev., 1998, vol. 98(1), pp. 3-50.

Banu et al., "Fabrication of Diffaction-encoded micro-particles using nano-imprint lithography," J. Micromech. Microeng., 2007, vol. 17, pp. S116-S121.

BAUER_et al. "Recovery of Cerium and Lanthanum by Ozonation of Lanthanide Solutions." U.S. Department of the Interior Bureau of Mines, May 1968, 15 pages.

Bommaraju et al. "Chlorine" Kirk-Othmer Encyclopedia of Chemical Technology, published online Nov. 2002, vol. 6, John Wiley & Sons, pp. 130-211.

Burkes et al., "The Bacteriostatic Activity of Cerium, Lanthanum, and Thallium," Journal of Bacteriology, 1947, vol. 54, pp. 417-424.

Candries, M. et al., "Foul Release System and Drag," Consolidation of Technical Advances in the Protective and Marine Coatings Industry, Proceedings of the PCE 2001 Conference, pp. 273-286, Antwerp, 12 pages.

Cartwright, P.S., "A Residential Drinking Water Treatment Primer: Part 1," Water Conditioning and Purification, Feb. 2008, 6 pages.

Casey, "Mystery Ceramic could lead to cheaper, stronger hydrogen fuel cells," gas2.0, Oct. 12, 2009, available at http://gas2.org/2009/10/12/mystery-ceramic-could-lead-to-cheaper-stronger-solid- . . . 3 pages.

Chambers et al., "Modern approaches to marine antifouling coatings," Surface & Coatings Technology, 2006, vol. 201, pp. 3642-3652.

Chang et al., "Wet air oxidation of a reactive dye solution using CoAlPO4-5 and CeO2 catalysts," Chemosphere, Aug. 2003, vol. 52, No. 6, pp. 943-949.

Chi et al., "Preparation of Enriched Cerium Oxide from Bastnasite with Hydrochloric Acid by Two-Step Leaching," Metallurgical and Materials Transactions B, Apr. 2006, vol. 37(2), pp. 155-160.

ClearWater Filtration Systems, Press Release, "New Filtration Patent to Revolutionize Home Water Filtration: Arsenic Levels Can Now be Controlled," date unknown, 1 page.

Clifford et al., "Oxidizing Arsenic III to Arsenic V for Better Removal," Water & Wastes Digest, Water Quality Products, Mar. 2001, vol. 6, No. 3, available at http://www.wwdmag.com/Oxidizing-Arsenic-III-to-Arsenic-V-for-Better-Removal- . . . , accessed May 6, 2009, 2 pages.

Coronado et al., "Polyoxometalate-based Molecular Materials," Chem. Rev., 1998, vol. 98, No. 1, pp. 273-296.

Corvini et al., "Mercury Removal from Natural Gas and Liquid Streams," UOP LLC, date unknown, 11 pages.

Creaser et al., "X-ray photoelectron spectroscopic study of the oxidation and reduction of a cerium(III) oxide/cerium foil substrate," Catalysis Letters, 1994, vol. 23, pp. 13-24.

Dauber, "Anaerobtechnik. Handbuch der anaeroben Behandlung von Abwasser and Schlamm," 1993, pp. 340-341 (includes translation).

Dejneka et al., "Rare earth-doped glass microbarcodes," PNAS, Jan. 2003, vol. 100(2), pp. 389-393.

Devito et al. "Mercury" Kirk-Othmer Encyclopedia of Chemical Technology, published online Aug. 2005, vol. 15, John Wiley & Sons, pp. 1-22.

Dos Santos et al., "Review paper on current technologies for decolourisation of textile wastewaters: Perspectives for Anaerobic biotechnology," Bioresource Technology, 2007, vol. 98, pp. 2369-2385.

Eggeman "Sodium Hydroxide." Kirk-Othmer Encyclopedia of Chemical Technology, published online Apr. 2011, John Wiley & Sons, pp. 1-16.

Emsley, The Elements, Third Edition, 1998, pp. 22-23, 26-27, 54-55, 110-111.

Everett et al., "Study of the Uncatalyzed Oxidation of Arsenic(III) by Cerium(IV) in Perchloric Acid Medium," Anal. Chem., Oct. 1971, vol. 43(12), pp. 1541-1547.

Feldman "Sodium Chloride." Kirk-Othmer Encyclopedia of Chemical Technology, published online Oct. 2011, John Wiley & Sons, pp. 1-27.

Fertonani et al., "Solid State Reactions of Mercury with Pure Noble Metals Part 2 Mercury iridium system," Journal of Thermal Analysis and Calorimetry, 2002, vol. 67, pp. 403-409.

Filtronics "NXT-2 Adsorptive media for arsenic removal," at http://www.filtronics.com/nxt2.htm, date unknown, copyright 1998, 2008, 2 pages.

Firsching et al., "Solubility Products of the Trivalent Rare-Earth Phosphates," J. Chem. Eng. Data, 1991, vol. 36, pp. 93-95.

Firsching, "Solubility Products of the Trivalent Rare-Earth Arsenates," J. Chem. Eng. Data, 1992, vol. 37, pp. 497-499.

Friend-Gray, "An Appetite for Apatite: A Study of Black Apatite Adsorption Effects on Organic and Non-Organic Environmental

(56) References Cited

OTHER PUBLICATIONS

Contaminants," Inquiry Journal, Spring 2008, at http://www.unh.edu/inquiryjournal/08/articles/friendgray.html, 6 pages.

Fry "Electrochemical Processing, Organic." Kirk-Othmer Encyclopedia of Chemical Technology, published online Oct. 2004, vol. 9, John Wiley & Sons, pp. 652-685.

Fujikawa et al., "Similteneous removal of arsenic, iron and manganese in biological treatment unit," available at http://www.apec-vc.or.jp/e/modules/tinyd00/index.php?id=65&kh_open_cid_00=7, accessed May 8, 2009, 3 pages.

Fujikawa et al., "The aim of this special edition," Kyoto University, available at http://www.apec-vc.or.jp/e/modules/tinyd00/index.php?id=61&kh_open_cid_00=7, accessed May 8, 2009.

Gaur et al., "Surface Modification of Activated Carbon for the Removal of Water Impurities," Water Conditioning & Purification, Jun. 2008, 5 pages.

Goldberg, "Competitive Adsorption of Arsenate and Arsenite on Oxides and Clay Minerals," Soil Sci. Soc. Am. J., 2002, vol. 66, pp. 413-421.

Gordon, "Network Progress: An Update from the Secretariat," World Health Organization: International Network to Promote Household Water Treatment and Safe Storage, Issue 2, May 2005, 10 pages.

Gouzerh et al., "Main-Group Element, Organic, and Organometallic Derivatives of Polyoxometalates," Chem. Re., 1998, vol. 98, No. 1, pp. 77-112.

Granite et al., "Novel Sorbents for Mercury Removal from Flue Gas," Ind. Eng. Chem. Res., 2000, vol. 39, pp. 1020-1029.

Granite et al., "Sorbents for Mercury Capture from Fuel Gas with Application to Gasification Systems," Ind. Eng. Chem. Res., 2006, vol. 45, pp. 4844-4848.

Granite et al., "Techniques for Mercury Control and Measurement in Gasification Systems," Presented at the 5th International Symposium on Gas Cleaning at High Temperature, Morgantown, WV, Sep. 2002, pp. 1-5.

Grotheer "Electrochemical Processing, Inorganic." Kirk-Othmer Encyclopedia of Chemical Technology, published online Dec. 2000, vol. 9, John Wiley & Sons, pp. 618-652.

Gupta et al., "Novel Fluoropolymer-Based Striving for," www.PCIMAG.COM, Jul. 2007, pp. 70-80.

Hakuta et al., "Production of Ultra-fine Ceria Particles by Hydrothermal Synthesis Under Supercritical Conditions," Journal of Materials Science Letters, 1998, vol. 17, pp. 1211-1213.

Harck, "Arsenic in the US," Clean Water Filtration Systems, Jan. 2002, 42 pages.

Haron et al., "Sorption removal of arsenic by cerium-exchanged zeolite P," Materials Science and Engineering B, 2008, vol. 149, pp. 204-208.

Harper et al., "Removal of arsenic from wastewater using chemical precipitation methods," Water Environment Research, 1992, vol. 64(3), pp. 200-203.

Hayes et al., "The Phase Stability of Cerium Species in Aqueous Systems," Journal of the Electrochemical Society, 2002, vol. 149(12), pp. C623-C630.

Heckert et al., "The role of cerium redox state in the SOD mimetic activity of nanoceria," Biomaterials, Jun. 2008, vol. 29, pp. 2705-2709.

Hemmila et al., "Progress in Lanthanides as Luminescent Probes," Journal of Fluorescence, vol. 15, No. 4, Jul. 2005, pp. 529-542.

Henderson et al., "Redox properties of water on the oxidized and reduced surfaces of $CeO_2(111)$," Surface Science, Feb. 20, 2003, vol. 526(1-2), pp. 1-18.

Higuchi et al., "Electronic structure of protonic conductor $SrCeO_3$ by soft-X-ray spectroscopy," Solid State Ionics, Nov. 2004, vol. 175, pp. 549-552.

Hill, "Introduction: Polyoxometalates—Multicomponent Molecular Vehicles to Probe Fundamental Issues and Practical Problems," Chem. Re., 1998, vol. 98, No. 1, pp. 1-2.

Hisham et al. "Hydrogen Chloride." Kirk-Othmer Encyclopedia of Chemical Technology, published online Dec. 2004, vol. 13, John Wiley & Sons, pp. 808-837.

Ho et al., "Removal of fluoride from water through ion exchange by mesoporous Ti oxohydroxide," Journal of Colloid and Interface Science, 2004, vol. 272, pp. 399-403.

Housecroft et al., "Inorganic Chemistry," 2001, Pearson Prentice Hall, chapter 7, pp. 170-186; chapter 14, pp. 338-344; Appendix 11, pp. 752-754; chapter 24, pp. 622-640.

Ishihara et al., "Pore size control for mesoporous titanium hydroxide prepared with mixed template molecules and its fluoride ion-exchange property," Microporous and Mesoporous Materials, 2009, vol. 122, pp. 87-92.

Jadhav, "Development and Evaluation of Nanoscale Sorbents for Mercury Capture from Warm Fuel Gas," Aug. 25, 2006, 44 pages.

Jang et al., "Remediation of Arsenic-Contaminated Solids and Washing Effluents," Chemosphere, 2005, vol. 60, pp. 344-354.

Jeannin, "The Nomenclature of Polyoxometalates: How to Connect a Name and a Structure," Chem. Rev., 1998, vol. 98, No. 1, pp. 51-76.

Jiang et al., "Biological nano-mineralization of Ce phosphate by Saccharomyces cerevisiae," Article in Press, Chemical Geology, 2010, vol. xxx, pp. xxx-xxx, 9 pages.

Johannesson et al., "The solubility control of rare earth elements in natural terrestrial waters and the significance of $PO_4^{3-}$ and $CO_3^{2-}$ in limiting dissolved rare earth concentrations: A review of recent information," Aquatic Geochemistry, 1995, vol. 1, pp. 157-173.

Johnston et al., "Safe Water Technology for Arsenic Removal," Technologies for Arsenic Removal from Drinking Water, pp. 1-22, date unknown.

Jones et al., "Arsenic 2000: An Overview of the Arsenic Issue in Bangladesh," Water Aid Bangladesh, Dec. 2000, 70 pages.

Kaczur et al. "Chlorine Oxygen Acids and Salts, Chlorous Acid, Chlorites, and Chlorine Dioxide." Kirk-Othmer Encyclopedia of Chemical Technology, published online Dec. 2000, John Wiley & Sons, pp. 1-26.

Kahakachchi et al., "Extraction of arsenic species from spiked soils and standard reference materials," Analyst, 2004, vol. 129, pp. 714-718.

Katsoulis, "A Survey of Applications of Polyoxometalates," Chem. Rev., 1998, vol. 98, No. 1, pp. 359-388.

Kim "Ionomers" Kirk-Othmer Encyclopedia of Chemical Technology, published online Apr. 2005, vol. 14, John Wiley & Sons, pp. 1-32.

Kim et al., "Carbonate Effects in the Electrochemical Oxidation of Arsenite," Electrochemical Methods for Wastewater and Potable Water Treatment, Preprints of Extended Abstracts, vol. 42, No. 2, 2002.

Kirk et al., "Pigments," Kirk-Othmer Encyclopedia of Chemical Technology, Fourth Edition, vol. 19, 1996, John Wiley & Sons, pp. 1-77.

Kirk-Othmer, ed., "Colorants for Foods, Drugs, Cosmetics, and Medical Devices," Encyclopedia of Chemical Technology, Fourth Edition, vol. 6, 1998, John Wiley & Sons, pp. 892-941.

Kirk-Othmer, ed., "Dye Carriers," Encyclopedia of Chemical Technology, Fourth Edition, vol. 8, 1998, John Wiley & Sons, pp. 533-600.

Klabunde, K., "Overview of NanoScale: Its Technology and Capabilities," slideshow presentation by NanoScale, date unknown, 31 pages.

Klemperer et al., "Polyocoanion Chemistry Moves toward the Future: From Solids and Solutions to Surfaces," Chem. Rev., 1998, vol. 98, No. 1, pp. 297-306.

Kozhevnikov, "Catalysis by Heteropoly Acids and Multicomponent Polyoxometalates in Liquid-Phase Reactions," Chem. Rev., 1998, vol. 98, No. 1, pp. 171-198.

Kozlova et al., "Overall water splitting over $Pt/TiO_2$ catalyst with $Ce^{3+}/Ce^{4+}$ shuttle charge transfer system," International Journal of Hydrogen Energy, 2009, vol. 34, pp. 138-146.

Kreh et al., "Selective Oxidations with Ceric Methanesulfonate and Ceric Trifluoromethanesulfonate," Tetrahedron Letters, 1987, vol. 28, No. 10, pp. 1067-1068.

Kreutzberger "Chloroformates and Carbonates." Kirk-Othmer Encyclopedia of Chemical Technology, published online Apr. 2001, vol. 6, John Wiley & Sons, pp. 290-323.

(56) References Cited

OTHER PUBLICATIONS

Kroschwitz et al., eds., "Lanthanides," Kirk-Othmer Encyclopedia of Chemical Technology, Fourth Edition, vol. 14, 1995, John Wiley & Sons, pp. 1091-1115.
Lambert, Human Health and Toxicology Information Sheet for Lanthanum Concentrate (5210/5212) and Lanthanum Lantanum Chloride (5240/5241), pp. 1-8, University of California, Irvine.
Lancaster et al., eds., "Tertiary Phosphorus Removal," WERF, last updated Nov. 4, 2008, pp. 1-19.
Lemke et al. "Sodium and Sodium Alloys." Kirk-Othmer Encyclopedia of Chemical Technology, published online Apr. 2001, John Wiley & Sons, pp. 1-34.
Lemont et al., "Promising optimization of the CeO2/CeCl3 cycle by reductive dissolution of cerium(IV) oxide," International Journal of Hydrogen Energy, 2008, vol. 33, pp. 7355-7360.
Li et al., "Synergism between rare earth cerium(IV) ion and vanillin on the corrosion of steel in $H_2SO_4$ solution: Weight loss, electrochemical, UV—vis, FTIR, XPS, and AFM approaches," Applied Surface Science, Jun. 2008, vol. 254, pp. 5574-5586.
Liederbach "Metal Anodes" Kirk-Othmer Encyclopedia of Chemical Technology, published online Dec. 2000, vol. 15, John Wiley & Sons, pp. 1-17.
Lin et al."Catalytic wet air oxidation of phenol by various $CeO_2$ catalysts," Water Research, 2002, vol. 36, pp. 3009-3014.
Link et al., "Inorganic Nanoparticles for Transfection of Mammalian Cells and Removal of Viruses from Aqueous Solutions," Biotechnology and Bioengineering, vol. 98, No. 5, Dec. 1, 2007, pp. 1083-1093.
Lipps et al., "Arsenic Removal from Drinking Water by Adsorptive Media," U.S. EPA Demonstration Project at Spring Brook Mobile Home Park in Wales, ME, Six-Month Evaluation Report, Sep. 2006, 12 pages.
Liu et al. "Effect of CeO2 doping on catalytic activity of Fe2O3/gamma-Al2O(3) catalyst for catalytic wet peroxide oxidation of azo dyes," J. Hazard. Mater., May 8, 2007, vol. 143(1-2), pp. 448-454, School of Municipal & Environmental Engineering, Harbin Institute of Technology, China.
Liu et al., "Development of $Fe_2O_3$—$CeO_2$—$TiO_2/\gamma$—$AL_2O_3$ as catalyst for catalytic wet air oxidation of methyl orange azo dye under room condition," Applied Catalysts B: Environmental, Mar. 2007, vol. 72(3-4), pp. 205-211 (Abstract only).
Lopez-Anton et al., "Retention of mercury in activated carbons in coal combustion and gasification flue gases," Fuel Processing Technology, Jun. 20, 2002, vol. 77-78, pp. 353-358.
Lowell et al., "Selection of Metal Oxides for Removing SO2 From Flue Gas," Ind. Eng. Chem. Proc. Des. Dev., 1971, vol. 10, No. 3, pp. 384-390.
Magalhães, "Arsenic. An environmental problem limited by solubility," Pure Appl. Chem., 2002, vol. 74(10), pp. 1843-1850.
Marshall "Chlorocarbons and Chlorohydrocarbons." Kirk-Othmer Encyclopedia of Chemical Technology, published online Apr. 2003, vol. 6, John Wiley & Sons, pp. 226-253.
Meloche et al., "Solubility product relations in the rare earth hydrous hydroxides," Analytica Chimica Acta, 1959, vol. 20, pp. 415-418.
Mendiratta et al. "Chloric Acid and Chlorates." Kirk-Othmer Encyclopedia of Chemical Technology, published online May 2005, vol. 6, John Wiley & Sons, pp. 103-120.
Mizuno et al., "Heterogeneous Catalysis," Chem. Rev., 1998, vol. 98, No. 1, pp. 199-218.
Morton et al. "Reduced Phosphorus Compounds in the Environment," Critical Reviews in Environmental Science and Technology, 2005, vol. 35, No. 4, pp. 333-364.
Muller et al., "Polyoxometalates: Very Large Clusters—Nanoscale Magnets," Chem. Rev., 1998, vol. 98, No. 1, pp. 239-272.
Mullins et al., "Electron spectroscopy of single crystal and polycrystalline cerium oxide surfaces," Surface Science, Jul. 1998, vol. 409, pp. 307-319.
Municipal Wastewater Treatment Plant Energy Baseline Study, Pg&E New Construction Energy management Program, prepared by M/J Industrial Solutions, San Francisco, CA, Jun. 2003, 43 pages.
Municipal Water Treatment —> Potable Water: Adding Fluoride, compiled Jul. 26, 2011, 5 pages.
Municipal Water Treatment, compiled Jul. 26, 2011, 7 pages.
Murcott et al., "Innovative and Sustainable Technologies to Address the Global Arsenic Crisis," Sandia National Laboratories 2005 Vendor's Forum, Albuquerque, New Mexico, Nov. 2, 2005, 85 pages.
Mushak, "Potential Impact of Acid Precipitation on Arsenic and Selenium," Environmental Health Perspectives, 1985, vol. 65, pp. 105-113.
Nilchi et al., "Adsorption of selected ions on hydrous cerium oxide," Journal of Radioanalytical and Nuclear Chemistry, 2009, vol. 279(1), pp. 65-74.
Ohashi, "Arsenic removal technology—Arsenic removal using manganese oxide," available at http://www.apec-vc.or.jp/e/modules/tinyd00/index.php?id=64&kh_open_cid_00=7, accessed May 8, 2009, 5 pages.
Oztekin, "Recovery of Acides from Salt Forms," Desalinatio, 2007, vol. 212, pp. 62-69.
Paulenova et al., "Redox potentials and kinetics of the Ce3+/Ce4+ redox reaction and solubility of cerium sulfates in sulfuric acid solutions," Journal of Power Sources, vol. 109, 2002, pp. 431-438.
Peng et al., "Ceria nanoparticles supported on carbon nanotubes for the removal of arsenate from water," Materials Letters, 2005, vol. 59, pp. 399-403.
PhosGuard Product Description, at http://www.seachem.com/Products/product_pages/PhosGuard.html, copyright 2007-2011, 2 pages.
Portzer et al., "Development of novel sorbents for mercury control at elevated temperatures in coal-derived syngas: Results of initial screening of candidate materials," Fuel Process. Technol., 2004, vol. 85, pp. 621-630.
Pradeep, T., "Affordable clean water using nanotechnology," Indian Institute of Technology Madras, Potential Environmental Benefits of Nanotechnology: Fostering safe innovation-led growth, OECD Jul. 15-17, 2009, 58 pages.
Press Release, "Arkema proudly announces a new water-based fluoropolymer platform: Kynar® Aquatec™," Arkema Inc., Jun. 26, 2006, available at http://www.arkemasalescorner.com/kynar.page.cfm?pag=985&PRR_ID=669, 1 page.
Press Release, "Kynar Aquatec® FMA Resins: Cool-Roof Coatings are Now Significantly Longer Lasting," Arkema Inc., Aug. 24, 2009, available at http://www.arkema-inc.com/index.cfm?pag=343&PRR, 1 page.
Primer for Municipal Wastewater Treatment Systems, U.S. Environmental Protection Agency, EP 832-R-04-001, Sep. 2004, pp. 1-29.
Product Sheet for FXPb1 Carbon Filters, Filtrex Techno ogies Pvt. Ltd, dated unknown, 2 pages.
PURASPEC 1156 Mercury Removal, Johnson Matthey Catalysts 2003, 2 pages.
Puszynski et al., "Demonstration Project for Arsenic Removal from Drinking Water at Keystone, South Dakota," Mar. 15, 2005, 23 pages.
Qureshi et al., "Synthesis, Dehydration Studies, and Cation-Exchange Behavior of a New Phase of Niobium(V) Phosphate," Bull. Chem. Soc. Jpn., Oct. 1986, vol. 59, pp. 3247-3255.
Raichur et al., "Adsorption of fluoride onto mixed rare earth oxides," Separation and Purification Technology, 2001, vol. 24, pp. 121-127.
Reitzel et al., "Identification of Dissolved Nonreactive Phosphorus in Freshwater by Precipitation with Aluminum and Subsequent $^{31}P$ NMR Analysis," Environ. Sci. Technol., 2009, vol. 43(14), pp. 5391-5397.
Rhule et al., "Polyoxometalates in Medicine," Chem. Re., 1998, vol. 98, No. 1, pp. 327-358.
Romeo et al., "XPS Study of the Reduction of Cerium Dioxide," Surface and Interface Analysis, May 1993, vol. 20, pp. 508-512.
Romero et al., "Syntheses, Crystal Structures, and Characterization of Bismuth Phosphates," Inorg. Chem., 1994, 33, pp. 1869-1874.
Sadakane et al., "Electrochemical Properties of Polyoxometalates as Electrocatalysts," Chem. Re., 1998, vol. 98, No. 1, pp. 219-238.
Seida et al., "Synthesis of clay-cerium hydroxide conjugates for the adsorption of Arsenic," Adsorption Science and Technology, Dec. 2005, vol. 23, No. 8, pp. 607-618.

(56) References Cited

OTHER PUBLICATIONS

Shankar, P.A., "Coconut Shell Based Activated Carbon with No Green House Gas Emission," Water Conditioning & Purification, Mar. 2008, 4 pages.
Sharmin, "Arsenic Removal Processes on Trial in Bangladesh," Technologies for Arsenic Removal from Drinking Water, BUET-UNU International Workshop, Dhaka, Bangladesh, May 5-7, 2001, pp. 23-30.
Shimoto, "Arsenic Removal Technology—Cerium adsorbent," available at http://www.apec-vc.or.jp/e/modules/tinyd00/index.php?id=62&kh_open_cid_00=7, accessed May 8, 2009, 4 pages.
Singh et al., "Ce0.67Cr0.33O2.11: A New Low-Temperature 02 Evolution Material and H2 Generation Catalyst by Thermochemical Splitting of Watert" Chem. Matter. 2009, 7 pages.
Smith et al., "American Rare Earth Minerals: The Indispensable Resource for Clean Energy Technologies," Molycorp Minerals, LLC, Prepared for Congressional Leaders Jan. 29, 2009, 21 pages.
Song et al., "Mechanism of the Photocatalytic Degradation of C.I. Reactive Black 5 at pH 12.0 Using SrTiO3/Ce02 as the Catalyst," Environmental Science & Technology, 2007, vol. 41, No. 16, pp. 5846-5853, College of Biological and Environmental Engineering, China.
Song et al., "Photocatalytic degradation of C.I. Direct Red 23 in aqueous solutions under UV irradiation using SrTiO3/CeO2 composite as the catalyst," Journal of Hazardous Materials, Apr. 15, 2008, vol. 152(3), pp. 1301-1308.
Spiro et al., "Heterogeneous Catalysis in Solution. Part II. The Effect of Platinum on Oxidation-Reduction Reactions," J. Chem. Soc., 1965, pp. 78-96.
Spotnitz et al., "Mediated electrosynthesis with cerium (IV) in methanesulphonic acid," Journal of Applied Chemistry, Mar. 1990, vol. 20, No. 2, 209-215.
Stiltner, "Mercury Removal from Natural Gas and Liquid Streams," 2001, UOP LLC, 10 pages.
Surasitani et al., "Kinetics of the Ruthenium-Catalyzed Arsenic (III)-Cerium(IV) Reaction," J. Phys. Chem., 1959, vol. 63(6), pp. 890-892.
Tahir, Muhammad Aslam, "Project-3: Innovative Low Cost Arsenic Removal Technologies," Thesis entitled Assessment of Arsenic and other Health Significant Water Quality Parameters in Ground Water of Northern Punjab, Department of Chemistry/ Bahauddin Zakariya University Multan, 2004, pp. 92-134.
Tannehill, "Naturally Occurring Arsenic and Mercury" Proceedings from the Seventy-Fifth Gas Processors Association Conference, May 2007, pp. 54-55.
Thill et al., "Cytotoxicity of CeO2 Nanoparticles for *Escherichia coli*. Physico-Chemical Insight of the Cytotoxicity Mechanism," Environ. Sci. Technol., 2006, vol. 40(19), pp. 6151-6156.
Tokunaga et al., "Removal of fluoride ions from aqueous solutions by multivalent metal compounds," International Journal of Environmental Studies, 1995, vol. 48(1), pp. 17-28.
Trovarelli, "Cerium Dioxide : a key component in environmental catalysis," Rich MAC Magazine, La Chimica e L'Industria, Sep. 1996, vol. 78, pp. 823-829.
Tu, C., "A Study of Availability of Soil Arsenic (in Chinese)," Journal of Southwest Agricultural University, Dec. 1992, vol. 14 (6), pp. 447 (includes English translation).
Viricelle et al., "Transformation of cerium(III) hydroxycarbonate into ceria. Part 1—Nucleation and growth rates of ceria," J. Chem. Soc., Faraday Trans., 1995, 91(24), pp. 4431-4435.
Vu et al., "Review of Arsenic Removal Technologies for Contaminated Groundwaters," Argonne National Laboratory, Apr. 2003, 41 pages.
Wakita et al., "A Synthetic Study of the Solid Solutions in the Systems $La_2(CO_3)_3 \cdot 8H_2O$—$CE_2(CO_3) \cdot H_2O$ and $La(OH)CO_3$—$CE(OH)CO_3$," Bulletin of the Chemical Society of Japan, 1979, vol. 52(2), pp. 428-432.
Wasay et al., "Adsorption of fluoride, phosphate, and arsenate ions on lanthanum-impregnated silica gel," Water Environment Research, vol. 68, No. 3 (May-Jun. 1996), pp. 295-300.
Weil et al. "Sulfur Compounds." Kirk-Othmer Encyclopedia of Chemical Technology, published online Dec. 2000, vol. 23, John Wiley & Sons, pp. 1-84.
Weinstock, "Homogeneous-Phase Electron-Transfer Reactions of Polyoxometalates," Chem. Re., 1998, vol. 98, No. 1, pp. 113-170.
Williams et al., "Drinking water: New disinfecting medium boosts water treatment," Filtration+Separation, Mar./Apr. 2010, pp. 16-19.
Worthington et al., "Kinetics and Analytical Applications of the Ruthenium Catalyzed Reaction between Cerium(IV) and Arsenic(III) in Sulferic Acid Medium," Analytical Chemistry, Sep. 1970, vol. 42, No. 11, pp. 1157-1164.
Wu et al., "Effect of pH of Medium on Hydrothermal Synthesis of Nanocrystalline Cerium(IV) Oxide Powders," Journal of the American Ceramic Society, 2002, vol. 85(10), pp. 2462-2468.
Yamase, "Photo- and Electrochromism of Polyoxometalates and Related Materials," Chem. Re., 1998, vol. 98, No. 1, pp. 307-326.
Yang et al., "Decontamination of Chemical Warfare Agents," Chem Rev., 1992, vol. 92, pp. 1729-1743.
Yates et al., "Kinetics of the Iodide-catalyzed Reaction between Cerium(IV) and Arsenic(III)," J. Am. Chem. Soc., Aug. 1956, vol. 78(16), pp. 3950-3953.
Yon et al. "Adsorption, Gas Separation." Kirk-Othmer Encyclopedia of Chemical Technology, published online Apr. 2003, vol. 1, John Wiley & Sons, pp. 617-663.
Yong et al., "Nitrogen and Phosphorous Removal in Municipal Wastewater Treatment Plants in China: A Review," International Journal of Chemical Engineering, accepted Apr. 26, 2010, 10 pages.
Yotsumoto et al., "Latest functions and introduction cost of water treatment technique, Water treatment technique using cerium based adsorbent and examples," Plant and Process, 2005, vol. 47, No. 8, pp. 60-63, Japan (Abstract Only).
Youngran, J. et al., "Effect of competing solutes on arsenic (V) adsorption using iron and aluminum oxides," Journal of Environmental Sciences, vol. 19(8), 2007, pp. 910-919.
Yu et al., "The Phase Stability of Cerium Species in Aqueous Systems," Journal of the Electrochemical Society, 2006, vol. 153(1), pp. C74-C79.
Yuliati et al., "Ce L[sub]III-edge XANES Study on Valence of alumina-supported cerium oxide," Photon Factory Activity Report 2004 #22 Part B, User's Report, 2005, pp. 56.
Zhang et al., "Arsenate adsorption on an Fe—Ce bimetal oxide adsorbent: Role of surface properties," Environ. Sci. Technol., Aug. 2005, vol. 39, pp. 7246-7253.
Zhang Yu et al: "Arsenic(V) removal with a Ce(IV)-doped iron oxide adsorbent," Chemosphere, vol. 51(9), Jun. 2003, pp. 945-952.
Zhou et al., "Cryptography based on the absorption/emission features of multicolor semiconductor nanocrystal quantum dots," Optics Express, Jun. 2004, vol. 12(13), pp. 2925-2931.
International Search Report for International (PCT) Patent Application No. PCT/US11/53131, mailed Apr. 13, 2012 4 pages.
Written Opinion for International (PCT) Patent Application No. PCT/US11/53131, mailed Apr. 13, 2012 5 pages.
International Search Report for International (PCT) Patent Application No. PCT/US11/53134, mailed Apr. 13, 2012 4 pages.
Written Opinion for International (PCT) Patent Application No. PCT/US11/53134, mailed Apr. 13, 2012 4 pages.
International Search Report for International (PCT) Patent Application No. PCT/US12/22267, mailed May 10, 2012 2 pages.
Written Opinion for International (PCT) Patent Application No. PCT/US12/22267, mailed May 10, 2012 2 pages.
International Search Report for International (PCT) Patent Application No. PCT/US12/22269, mailed May 4, 2012 2 pages.
Written Opinion for International (PCT) Patent Application No. PCT/US12/22269, mailed May 4, 2012 5 pages.

\* cited by examiner

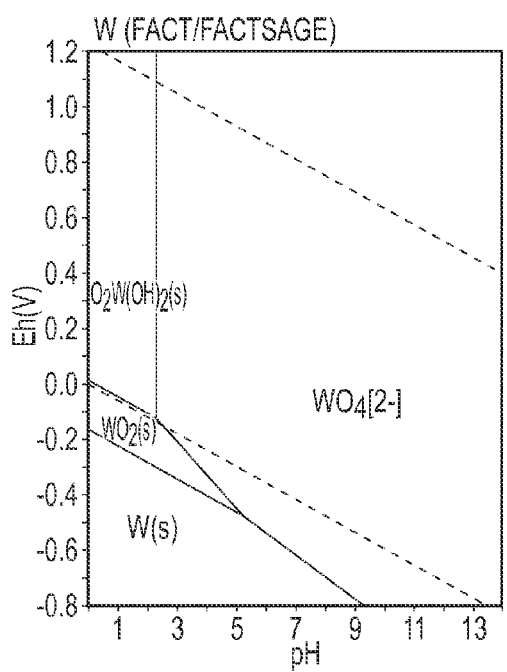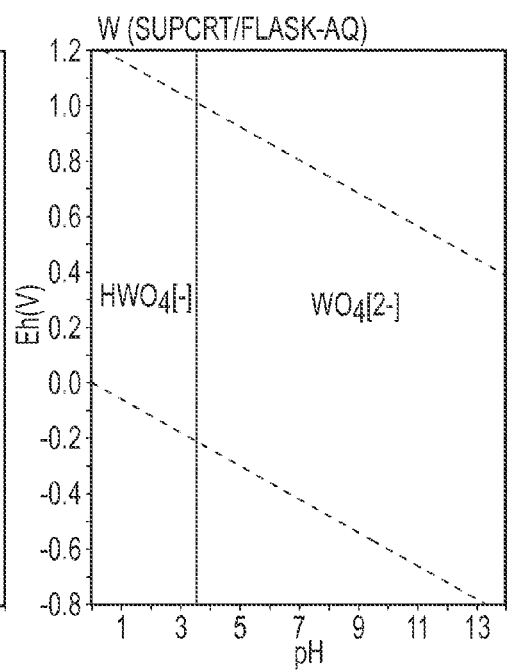
FIG.31A
PRIOR ART
FIG.31B
PRIOR ART

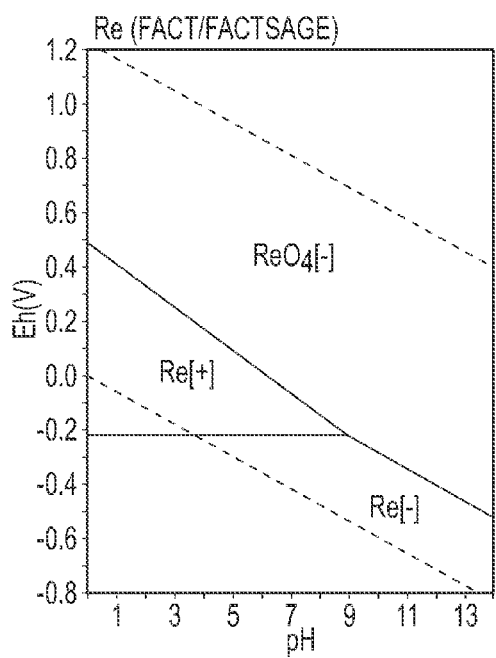 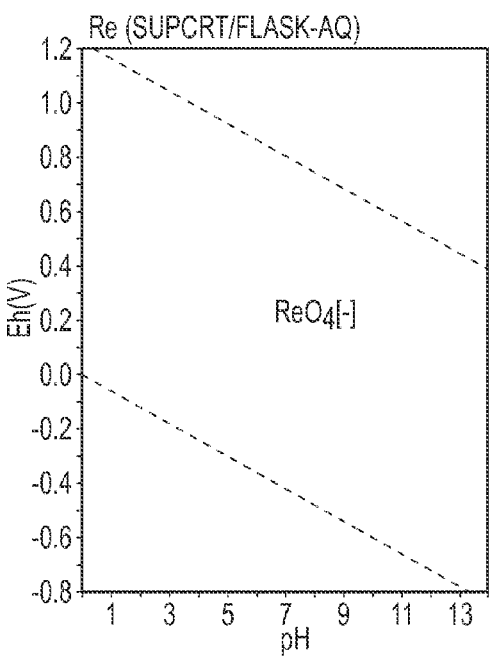
FIG.32A PRIOR ART
FIG.32B PRIOR ART

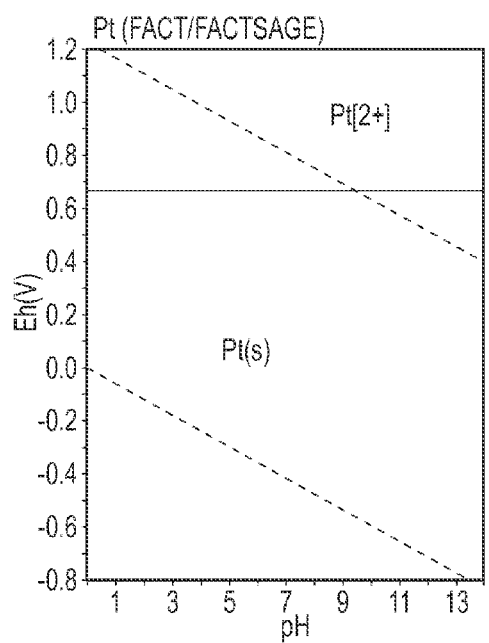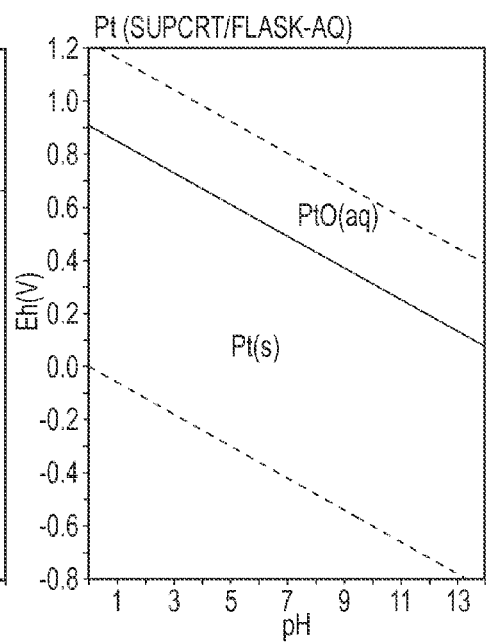
FIG.35A
PRIOR ART
FIG.35B
PRIOR ART

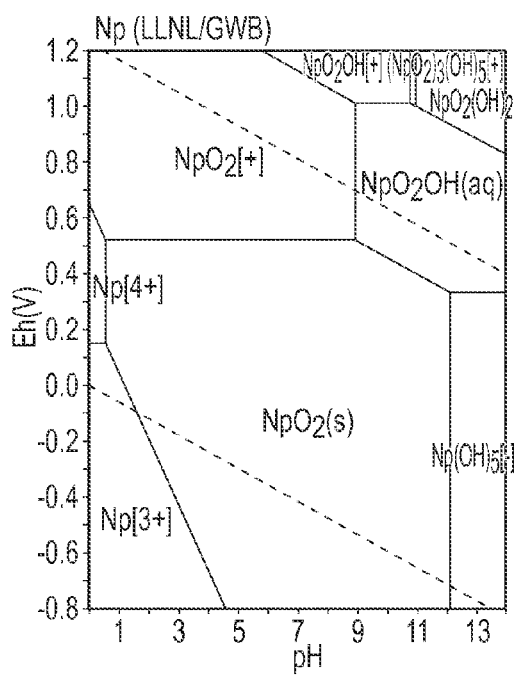 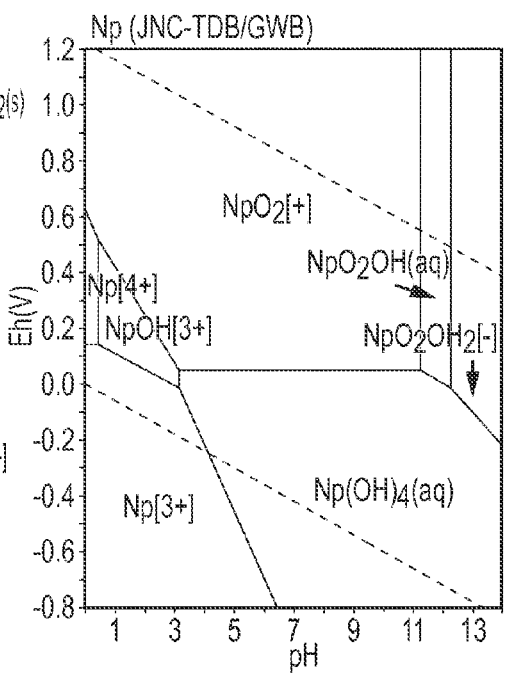
FIG.46A PRIOR ART
FIG.46B PRIOR ART

PRIOR ART FIG.47A

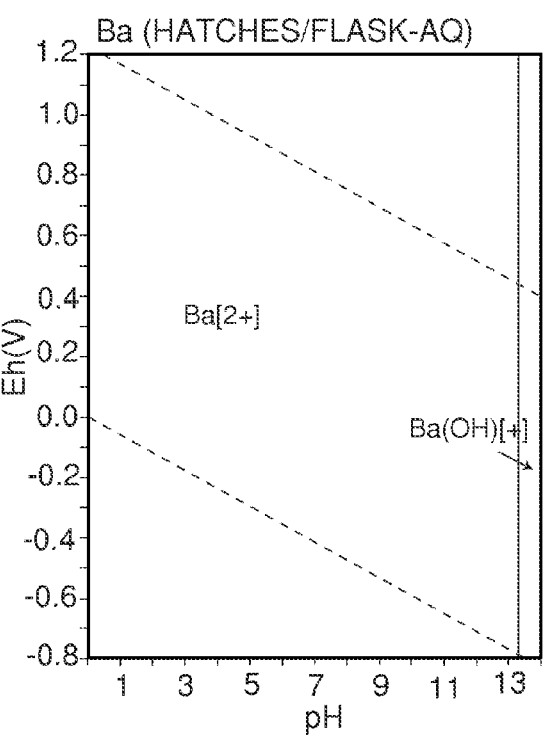

RARE EARTH REMOVAL OF HYDRATED AND HYDROXYL SPECIES

CROSS REFERENCE TO RELATED APPLICATIONS

The present application is a Continuation-in-Part of Ser. No. 13/356,581 filed Jan. 23, 2012, entitled "Rare Earth Removal of Hydrated and Hydroxyl Species" and claims the benefits of U.S. Provisional Application Serial Nos.:

61/474,902 with a filing date of Apr. 13, 2011, entitled "Process for Treating Waters and Water Handling Systems Using Rare Earth Metals";

61/475,155 with a filing date of Apr. 13, 2011, entitled "Methods and Devices for Removing Oxyanions Using Reduction/Oxidation and Soluble and Insoluble Rare Earths";

61/539,780 with a filing date of Sep. 27, 2011, entitled "Method for Removing Target Materials From a Fluid Stream using Rare Earths and/or a Rare Earth-Containing Additive";

61/553,809 with a filing date of Oct. 31, 2011, entitled "Process for Treating Waters and Water Handling Systems Using Rare Earth Metals";

61/546,803 with a filing date of Oct. 13, 2011, entitled "Process Using Rare Earths to Remove Oxyhydrated Species From Aqueous Streams";

61/614,427, with a filing date of Mar. 22, 2012, entitled "Rare Earth Removal of Hydrated and Hydroxyl Species";

61/476,667, with a filing date of Apr. 18, 2011, 61/553,809, with a filing date of Oct. 31, 2011, entitled entitled "Process for Treating Waters and Water Handling Systems Using Rare Earth Metals";

61/558,887, with a filing date of Nov. 11, 2011, entitled "Process for Treating Waters and Water Handling Systems Using Rare Earth Metals";

61/564,132, with a filing date of Nov. 28, 2011, entitled "Process for Treating Waters and Water Handling Systems Using Rare Earth Metals";

61/614,418, with a filing date of Mar. 22, 2012, entitled "Rare Earth Removal of Phosphorus-Containing Materials";

61/613,883, with a filing date of Mar. 21, 2012, entitled "Rare Earth Removal of Phosphorus-Containing Materials";

61/613,857, with a filing date of Mar. 21, 2012, entitled "Non-Metal Containing Oxyanion Removal From Waters Using Rare Earths";

61/538,634, with a filing date of Sep. 23, 2011, entitled "Rare Earth Contaminant Removal in Pools, Hot Tubs, and Spas";

each of which is incorporated in its entirety herein by this reference.

Cross reference is made to U.S. patent application Ser. No. 13/244,092 filed Sep. 23, 2011, entitled "Process for Treating Waters and Water Handling Systems to Remove Scales and Reduce the Scaling Tendency", which is incorporated herein by this reference in its entirety.

Cross reference is made to U.S. patent application Ser. No. 13/244,117 filed Sep. 23, 2011, entitled "Particulate Cerium Dioxide And An In Situ Method For Making And Using The Same", which is incorporated herein by this reference in its entirety.

Cross reference is made to U.S. patent application Ser. No. 13/410,081 filed Mar. 2, 2012, entitled "Contaminant Removal From Waters Using Rare Earths", which is incorporated herein by this reference in its entirety.

Cross reference is made to U.S. patent application Ser. No. 13/356,574 filed Jan. 23, 2012, entitled "Rare Earth Removal of Phosphorus-Containing Materials", which is incorporated herein by this reference in its entirety.

Cross reference is made to U.S. patent application Ser. No. 13/433,097 filed Mar. 28, 2012, entitled "Non-Metal-Containing Oxyanion Removal From Waters Using Rare Earths", which is incorporated herein by this reference in its entirety.

Cross reference is made to U.S. patent application Ser. No. 13/432,895 filed Mar. 28, 2012, entitled "Rare Earth Removal of Phosphorus-Containing Materials", which is incorporated herein by this reference in its entirety.

FIELD OF INVENTION

The present disclosure is related generally to rare earth removal of hydrated and hydroxyl species, more particularly to rare earth removal of metal and metalloid-containing hydrated and/or hydroxyl species.

BACKGROUND OF THE INVENTION

As fresh water resources grow increasingly scarce, water quality is rapidly becoming a major global concern. In addition to high levels of pollution from industrial and municipal sources and saltwater intrusion into fresh water acquifers, commonly used disinfectants in drinking water, particularly free chlorine (in the form of $HOCl/OCl^-$) and monochloramine ($NH_2Cl$), react with metals and metalloids to produce soluble products. Monochloramine, for example, is believed to react with lead to produce soluble Pb(II) products, leading to elevated Pb levels in drinking water.

Various technologies have been used to remove contaminants from municipal, industrial, and recreational waters. Examples of such techniques include adsorption on high surface area materials, such as alumina and activated carbon, ion exchange with anion exchange resins, co-precipitation and electrodialysis. However, most technologies for contaminant removal are hindered by the difficulty of removing problematic contaminants, more particularly the difficulty of removing metal and metalloid contaminant species.

SUMMARY OF THE INVENTION

These and other needs are addressed by the various embodiments and configurations of this disclosure. The present disclosure is directed to the use of rare earth-containing compositions to remove various contaminants, including metal and metalloid target materials.

In one embodiment, a composition has the formula:

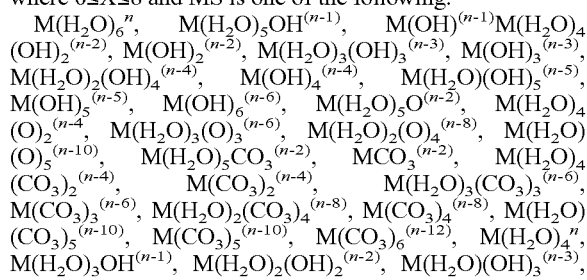

(1)

where $0 \leq X \leq 8$ and MS is one of the following:

$M(H_2O)_6^n$, $M(H_2O)_5OH^{(n-1)}$, $M(OH)^{(n-1)}M(H_2O)_4(OH)_2^{(n-2)}$, $M(OH)_2^{(n-2)}$, $M(H_2O)_3(OH)_3^{(n-3)}$, $M(OH)_3^{(n-3)}$, $M(H_2O)_2(OH)_4^{(n-4)}$, $M(OH)_4^{(n-4)}$, $M(H_2O)(OH)_5^{(n-5)}$, $M(OH)_5^{(n-5)}$, $M(OH)_6^{(n-6)}$, $M(H_2O)_5O^{(n-2)}$, $M(H_2O)_4(O)_2^{(n-4)}$, $M(H_2O)_3(O)_3^{(n-6)}$, $M(H_2O)_2(O)_4^{(n-8)}$, $M(H_2O)(O)_5^{(n-10)}$, $M(H_2O)_5CO_3^{(n-2)}$, $MCO_3^{(n-2)}$, $M(H_2O)_4(CO_3)_2^{(n-4)}$, $M(CO_3)_2^{(n-4)}$, $M(H_2O)_3(CO_3)_3^{(n-6)}$, $M(CO_3)_3^{(n-6)}$, $M(H_2O)_2(CO_3)_4^{(n-8)}$, $M(CO_3)_4^{(n-8)}$, $M(H_2O)(CO_3)_5^{(n-10)}$, $M(CO_3)_5^{(n-10)}$, $M(CO_3)_6^{(n-12)}$, $M(H_2O)_4^n$, $M(H_2O)_3OH^{(n-1)}$, $M(H_2O)_2(OH)_2^{(n-2)}$, $M(H_2O)(OH)_3^{(n-3)}$, $M(H_2O)_3O^{(n-2)}$, $M(H_2O)_2(O)_2^{(n-4)}$, and $M(H_2O)(O)_3^{(n-6)}$. "M" is a metal or metalloid having an atomic number selected from the group consisting of 5, 13, 22-33, 40-52, 56, 72-84, and 88-94. The symbol "n" is a real number ≤8 and represents a charge or oxidation state of "M".

In one application, the composition is in a liquid media or medium, and the media or medium comprises a pH and Eh sufficient to favor MS as the primary species of M.

In one application, M is one or more of boron, vanadium, chromium, cadmium, antimony, lead, and bismuth.

In one embodiment, a method contacts, in a medium, a rare earth-containing additive with a metal or metalloid target material to remove the target material. The target material is in the form of a hydroxide, carbonate, hydrate, or oxyhydroxyl as a primary species.

In one embodiment, a method is provided that contacts, in a medium, a rare earth-containing additive with one or more of a metal or metalloid hydroxide, carbonate, and hydrate to remove the metal or metalloid hydroxide, carbonate, and/or hydrate.

The rare earth-containing additive can be water soluble or water insoluble.

In one application, the target material has an atomic number selected from the group consisting of 5, 13, 22-33, 40-52, 56, 72-84, and 88-94.

In one application, the contacting step comprises the substeps:
(a) introducing, to the medium, an oxidizing agent to oxidize a target material-containing species to a primary species in the form of one or more of a metal or metalloid hydroxide, carbonate, oxyhydroxyl, and hydrate, the target material-containing species being different from the metal or metalloid hydroxide, carbonate, oxyhydroxyl, and/or hydrate; and
(b) thereafter contacting, in the medium, the rare earth-containing additive with the metal or metalloid hydroxide, carbonate, oxyhydroxyl, and/or hydrate to remove the metal or metalloid hydroxide, carbonate, oxyhydroxyl, and/or hydrate.

In one application, the contacting step comprises the substeps:
(a) introducing, to the medium, a reducing agent to reduce a target material-containing species comprising the metal or metalloid to a primary species in the form of the metal or metalloid hydroxide, carbonate, oxyhydroxyl, and/or hydrate, the target material-containing species being different from the metal or metalloid hydroxide, carbonate, oxyhydroxyl, and/or hydrate; and
(b) thereafter contacting, in the medium, the rare earth-containing additive with the metal or metalloid hydroxide, carbonate, oxyhydroxyl, and/or hydrate to remove the metal or metalloid hydroxide, carbonate, oxyhydroxyl, and/or hydrate.

In one application, the contacting step comprises the substeps:
(a) introducing, to the medium, a base and/or base equivalent to convert a target material-containing species comprising the metal or metalloid to a primary species in the form of the metal or metalloid hydroxide, carbonate, oxyhydroxl, and/or hydrate, the target material-containing species being different from the metal or metalloid hydroxide, carbonate, oxyhydroxyl, and/or hydrate; and
(b) thereafter contacting, in the medium, the rare earth-containing additive with the metal or metalloid hydroxide, carbonate, and/or hydrate to remove the metal or metalloid hydroxide, carbonate, oxyhydroxyl, and/or hydrate.

In one application, the contacting step comprises the substeps:
(a) introducing, to the medium, an acid and/or acid equivalent to convert a target material-containing species comprising the metal or metalloid to a primary species in the form of the metal or metalloid hydroxide, carbonate, oxyhydroxyl, and/or hydrate, the target material-containing species being different from the metal or metalloid hydroxide, carbonate, oxyhydroxyl, and/or hydrate; and
(b) thereafter contacting, in the medium, the rare earth-containing additive with the metal or metalloid hydroxide, carbonate, oxyhydroxyl, and/or hydrate to remove the metal or metalloid hydroxide, carbonate, oxyhydroxyl, and/or hydrate.

The disclosure can have a number of advantages. For example, the rare earth-containing composition can remove effectively a large number of target materials, whether in the form of dissolved or undissolved species. As an illustration, the composition can remove lead and lead species in various forms, including as a colloid, hydrate, carbonate, hydroxide, and oxyhydroxyl. The pH and/or Eh can be adjusted to produce a selected primary target material species, which is removed more effectively by the rare earth composition compared to rare earth removal of other target material species. High levels of removal of selected target materials can therefore be realized.

These and other advantages will be apparent from the disclosure.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" refers to the penetration of one substance into the inner structure of another substance, as distinguished from adsorption.

"Adsorption" refers to the adherence of atoms, ions, molecules, polyatomic ions, or other substances to the surface of another substance, called the adsorbent. Typically, the attractive force for adsorption can be in the form of a bond and/or force, such as covalent bonds, metallic bonds, coordination bonds, ionic bonds, hydrogen bonds, electrostatic forces (e.g., van der Waals and/or London's forces), and the like.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The term "water" refers to any aqueous stream. The water may originate from any aqueous stream may be derived from any natural and/or industrial source. Non-limiting examples of such aqueous streams and/or waters are drinking waters, potable waters, recreational waters, waters derived from manufacturing processes, wastewaters, pool waters, spa waters, cooling waters, boiler waters, process waters, municipal waters, sewage waters, agricultural waters, ground waters, power plant waters, remediation waters, co-mingled water and combinations thereof.

The terms "agglomerate" and "aggregate" refer to a composition formed by gathering one or more materials into a mass.

A "binder" generally refers to one or more substances that bind together a material being agglomerated. Binders are typically solids, semi-solids, or liquids. Non-limiting examples of binders are polymeric materials, tar, pitch, asphalt, wax, cement water, solutions, dispersions, powders, silicates, gels, oils, alcohols, clays, starch, silicates, acids, molasses, lime, lignosulphonate oils, hydrocarbons, glycerin, stearate, or combinations thereof. The binder may or may not chemically react with the material being agglomerated. Non-liming examples of chemical reactions include hydration/dehydration, metal ion reactions, precipitation/gelation reactions, and surface charge modification.

A "carbonate" generally refers to a chemical compound containing the carbonate radical or ion ($CO_3^{-2}$). Most familiar carbonates are salts that are formed by reacting an inorganic base (e.g., a metal hydroxide with carbonic acid ($H_2CO_3$). Normal carbonates are formed when equivalent amounts of acid and base react; bicarbonates, also called acid carbonates or hydrogen carbonates, are formed when the acid is present in excess. Examples of carbonates include sodium carbonate, ($Na_2CO_3$), sodium bicarbonate ($NaHCO_3$), and potassium carbonate ($K_2CO_3$).

The term "clarification" or "clarify" refers to the removal of suspended and, possibly, colloidal solids by gravitational settling techniques.

The term "coagulation" refers to the destabilization of colloids by neutralizing the forces that keep colloidal materials suspended. Cationic coagulants provide positive electrical charge to reduce the negative charge (zeta potential) of the colloids. The colloids thereby form larger particles (known as flocs).

The term "composition" generally refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

"Chemical species" or "species" are atoms, elements, molecules, molecular fragments, ions, compounds, and other chemical structures.

"Chemical transformation" refers to process where at least some of a material has had its chemical composition transformed by a chemical reaction. A "chemical transformation" differs from "a physical transformation". A physical transformation refers to a process where the chemical composition has not been chemically transformed but a physical property, such as size or shape, has been transformed.

The term "contained within the water" generally refers to materials suspended and/or dissolved within the water. Water is typically a solvent for dissolved materials and water-soluble material. Furthermore, water is typically not a solvent for insoluble materials and water-insoluble materials. Suspended materials are substantially insoluble in water and dissolved materials are substantially soluble in water. The suspended materials have a particle size.

"De-toxify" or "de-toxification" includes rendering a target material, such as chemical and/or biological target material non-toxic or non-harmful to a living organism, such as, for example, human or other animal. The target material may be rendered non-toxic by converting the target material into a non-toxic or non-harmful form or species.

The term "digest" or "digestion" refers to the use of microorganisms, particularly bacteria, to digest target materials. This is commonly established by mixing forcefully contaminated water with bacteria and molecularly oxygen.

The term "disinfect" or "disinfecting" refers to the use of an antimicrobial agent to kill or inhibit the growth of microorganisms, such as bacteria, fungi, protozoans, and viruses. Common antimicrobial agents include, oxidants, reductants, alchohols, aldehydes, halogens, phenolics, quaternary ammonium compounds, silver, copper, ultraviolet light, and other materials.

The term "flocculation" refers to a process using a flocculant, which is typically a polymer, to form a bridge between flocs and bind the particles into large agglomerates or clumps. Bridging occurs when segments of the polymer chain adsorb on different particles and help particles aggregate.

The term "fluid" refers to a liquid, gas or both.

A "halogen" is a nonmetal element from Group 17 IUPAC Style (formerly: VII, VIIA) of the periodic table, comprising fluorine (F), chlorine (Cl), bromine (Br), iodine (I), and astatine (At). The artificially created element 117, provisionally referred to by the systematic name ununseptium, may also be a halogen.

A "halide compound" is a compound having as one part of the compound at least one halogen atom and the other part the compound is an element or radical that is less electronegative (or more electropositive) than the halogen. The halide compound is typically a fluoride, chloride, bromide, iodide, or astatide compound. Many salts are halides having a halide anion. A halide anion is a halogen atom bearing a negative charge. The halide anions are fluoride ($F^-$), chloride ($Cl^-$), bromide ($Br^-$), iodide ($I^-$) and astatide ($At^-$).

A "hydroxyl" generally refers to a chemical functional group containing an oxygen atom connected by a covalent bond to a hydrogen atom. When it appears in a chemical speices, the hydroxyl group imparts some of the reactive and interactive properties of water (ionizability, hydrogen bonding, etc.). Chemical species containing one or more hydroxyl groups are typically referred to as "hydroxyl species". The neutral form of the hydroxyl group is a hydroxyl radical. The anion form of the hydroxyl group ($OH^-$) is called "an hydroxide" or "hydroxide anion".

The term "hydrated species" generally refers to any of a class of compounds or other species containing chemically combined with water, whether occurring as a solid or a fluid component and whether occurring as a compound or charged species. In the case of some hydrates, as washing soda, $Na_2CO_3.10H_2O$, the water is loosely held and is easily lost on heating; in others, as sulfuric acid, $SO_3.H_2O$, or $H_2SO_4$, it is strongly held as water of constitution.

The term "inorganic material" generally refers to a chemical compound or other species that is not an organic material.

The term "insoluble" refers to materials that are intended to be and/or remain as solids in water. Insoluble materials are able to be retained in a device, such as a column, or be readily recovered from a batch reaction using physical means, such as filtration. Insoluble materials should be capable of prolonged exposure to water, over weeks or months, with little loss of mass. Typically, a little loss of mass refers to less than about 5% mass loss of the insoluble material after a prolonged exposure to water.

An "ion" generally refers to an atom or group of atoms having a charge. The charge on the ion may be negative or positive.

"Organic carbons" or "organic material" generally refer to any compound of carbon except such binary compounds as carbon oxides, the carbides, carbon disulfide, etc.; such ternary compounds as the metallic cyanides, metallic carbonyls, phosgene, carbonyl sulfide, etc.; and the metallic carbonates, such as alkali and alkaline earth metal carbonates.

The term "oxidizing agent" generally refers to one or both of a chemical substance and physical process that transfers and/or assists in removal of one or more electrons from a substance. The substance having the one or more electrons being removed is oxidized. In regards to the physical process, the physical process may removal and/or may assist in the removal of one or more electrons from the substance being oxidized. For example, the substance to be oxidized can be oxidized by electromagnetic energy when the interaction of the electromagnetic energy with the substance be oxidized is sufficient to substantially remove one or more electrons from the substance. On the other hand, the interaction of the electromagnetic energy with the substance being oxidized may not be sufficient to remove one or more electrons, but may be enough to excite electrons to higher energy state, were the electron in the excited state can be more easily removed by one or more of a chemical substance, thermal energy, or such.

The terms "oxyanion" and/or "oxoanion" generally refers to anionic chemical compounds having a negative charge with a generic formula of $A_xO_y^{z-}$ (where A represents a chemical element other than oxygen, "O" represents the element oxygen and x, y and z represent real numbers). In the embodiments having oxyanions as a chemical contaminant, "A" represents metal, metalloid, and/or non-metal elements. Examples for metal-based oxyanions include chromate, tungstate, molybdate, aluminates, zirconate, etc. Examples of metalloid-based oxyanions include arsenate, arsenite, antimonate, germanate, silicate, etc. Examples of non-metal-based oxyanions include phosphate, selemate, sulfate, etc. Preferably, the oxyanion includes oxyanions of elements having an atomic number of 7, 13 to 17, 22 to 26, 31 to 35, 40 to 42, 44, 45, 49 to 53, 72 to 75, 77, 78, 82, 83 85, 88, and 92. These elements include These elements include nitrogen, aluminum, silicon, phosphorous, sulfur, chlorine, titanium, vanadium, chromium, manganese, barium, arsenic, selenium, bromine, gallium, germanium, zirconium, niobium, molybdenum, ruthenium, rhodium, indium, tin, iodine, antimony, tellurium, hafnium, tantalum, tungsten, rhenium, iridium, platinum, lead, bismuth astatine, radium, and uranium.

The terms "oxyspecies" and/or "oxospecies" generally refer to cationic, anionic, or neutral chemical compounds with a generic formula of $A_xO_y$ (where A represents a chemical element other than oxygen, O represents the element oxygen and x and y represent real numbers). In the embodiments having oxyanions as a chemical contaminant, "A" represents metal, metalloid, and/or non-metal elements. An oxyanion or oxoanion are a type of oxyspecies or oxospecies.

The term "polish" refers to any process, such as filtration, to remove small (usually microscopic) particulate material or very small low concentrations of dissolved target material from water.

The terms "pore volume" and "pore size", respectively, refer to pore volume and pore size determinations made by any suite measure method. Preferably, the pore size and pore volume are determined by any suitable Barret-Joyner-Halenda method for determining pore size and volume. Furthermore, it can be appreciated that as used herein pore size and pore diameter can used interchangeably.

"Precipitation" generally refers to the removal of a dissolved target material in the form of an insoluble target material-laden rare earth composition. The target material-laden rare earth composition can comprise a target-laden cerium (IV) composition, a target-laden rare earth-containing additive composition, a target-laden rare composition comprising a rare earth other than cerium (IV), or a combination thereof. Typically, the target material-laden rare earth composition comprises an insoluble target material-laden rare earth composition. For example, "precipitation" includes processes, such as adsorption and absorption of the target material by one or more of the cerium (IV) composition, the rare earth-containing additive, or a rare earth other than cerium (IV). The target-material laden composition can comprise a +3 rare earth, such as cerium (III), lanthanum (III) or other lanthanoid having a +3 oxidation state.

A "principal species" generally refers to the major species in which a cation is present, under a specified set of conditions. Although usually applied to cations, the term "principal species" may be negatively charged or uncharged.

A "radical" generally refers to an atom or group of atoms that are joined together in some particular spatial structure and commonly take part in chemical reactions as a single unit. A radical is more generally an atom, molecule, or ion (group of atoms is probably ok) with one or more unpaired electrons. A radical may have a net positive or negative charge or be neutral.

"Rare earth" refers to one or more of yttrium, scandium, lanthanum, cerium, praseodymium, neodymium, samarium, europium, gadolinium, terbium, dysprosium, holmium erbium, thulium, ytterbium, and lutetium. As will be appreciated, lanthanum, cerium, praseodymium, neodymium, samarium, europium, gadolinium, terbium, dysprosium, holmium erbium, thulium, ytterbium, and lutetium are known as lanthanoids.

The terms "rare earth", "rare earth-containing composition", "rare earth-containing additive" and "rare earth-containing particle" refer both to singular and plural forms of the terms. By way of example, the term "rare earth" refers to a single rare earth and/or combination and/or mixture of rare earths and the term "rare earth-containing composition" refers to a single composition comprising a single rare earth and/or a mixture of differing rare earth-containing compositions containing one or more rare earths and/or a single composition containing one or more rare earths. The terms "rare earth-containing additive" and "rare earth-containing particle" are additives or particles including a single composition comprising a single rare earth and/or a mixture of differing rare earth-containing compositions containing one or more rare earths and/or a single composition containing one or more rare earths. The term "processed rare earth composition" refers not only to any composition containing a rare earth other than non-compositionally altered rare earth-containing minerals. In other words, as used herein "processed rare earth-containing composition" excludes comminuted naturally occurring rare earth-containing minerals. However, as used herein "processed rare earth-containing composition" includes a rare earth-containing mineral where one or both of the chemical composition and chemical structure of the rare earth-containing portion of the mineral has been compositionally altered. More specifically, a comminuted naturally occurring bastnasite would not be considered a processed rare earth-containing composition and/or processed rare earth-containing additive. However, a synthetically prepared bastnasite or a rare earth-containing composition prepared by a chemical transformation of naturally occurring bastnasite would be considered a processed rare earth-containing composition and/or processed rare earth-containing additive. The processed rare earth and/or rare-containing composition and/or additive are, in one application, not a naturally occurring mineral but synthetically manufactured. Exemplary naturally occurring rare earth-containing minerals include bastnasite (a carbonate-fluoride mineral) and monazite. Other naturally occurring rare earth-containing minerals include aeschynite, allanite, apatite, britholite, brockite, cerite, fluorcerite, fluorite, gadolinite, parisite, stillwellite, synchisite, titanite, xenotime, zircon, and zirconolite. Exemplary uranium minerals include uraninite ($UO_2$), pitchblende (a mixed oxide, usually $U_3O_8$), brannerite (a complex oxide of uranium, rare-earths, iron and titanium), coffinite (uranium silicate), carnotite, autunite, davidite, gummite, torbernite and uranophane. In one formulation, the rare earth-containing composition is substantially free of one or more elements in Group 1, 2, 4-15, or 17 of the Periodic Table, a radioactive species, such as uranium, sulfur, selenium, tellurium, and polonium.

The term "reducing agent", "reductant" or "reducer" generally refers to an element or compound that donates one or more electrons to another species or agent this is reduced. In the reducing process, the reducing agent is oxidized and the other species, which accepts the one or more electrons, is reduced.

The terminology "removal", "remove" or "removing" includes the sorbtion, precipitation, conversion, detoxification, deactivation, and/or combination thereof of a target material contained in a water and/or water handling system.

The term "soluble" refers to a material that readily dissolves in a fluid, such as water or other solvent. For purposes of this disclosure, it is anticipated that the dissolution of a soluble material would necessarily occur on a time scale of minutes rather than days. For the material to be considered to be soluble, it is necessary that the material/composition has a significant solubility in the fluid such that upwards of about 5 g of the material will dissolve in about one liter of the fluid and be stable in the fluid.

The term "sorb" refers to adsorption, absorption or both adsorption and absorption.

The term "suspension" refers to a heterogeneous mixture of a solid, typically in the form of particulates dispersed in a liquid. In a suspension, the solid particulates are in the form of a discontinuous phase dispersed in a continuous liquid phase. The term "colloid" refers to a suspension comprising solid particulates that typically do not settle-out from the continuous liquid phase due to gravitational forces. A "colloid" typically refers to a system having finely divided particles ranging from about 10 to 10,000 angstroms in size, dispersed within a continuous medium. As used hereinafter, the terms "suspension", "colloid" or "slurry" will be used interchangeably to refer to one or more materials dispersed and/or suspended in a continuous liquid phase.

The term "surface area" refers to surface area of a material and/or substance determined by any suitable surface area measurement method. Preferably, the surface area is determined by any suitable Brunauer-Emmett-Teller (BET) analysis technique for determining the specific area of a material and/or substance.

The term "water handling system" refers to any system containing, conveying, manipulating, physically transforming, chemically processing, mechanically processing, purifying, generating and/or forming the aqueous composition, treating, mixing and/or co-mingling the aqueous composition with one or more other waters and any combination thereof.

A "water handling system component" refers to one or more unit operations and/or pieces of equipment that process and/or treat water (such as a holding tank, reactor, purifier, treatment vessel or unit, mixing vessel or element, wash circuit, precipitation vessel, separation vessel or unit, settling tank or vessel, reservoir, pump, aerator, cooling tower, heat exchanger, valve, boiler, filtration device, solid liquid and/or gas liquid separator, nozzle, tender, and such), conduits interconnecting the unit operations and/or equipment (such as piping, hoses, channels, aqua-ducts, ditches, and such) and the water conveyed by the conduits. The water handling system components and conduits are in fluid communication.

The terms "water" and "water handling system" will be used interchangeably. That is, the term "water" may used to refer to "a water handling system" and the term "water handling system" may be used to refer to the term "water".

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. metal or metalloid having an atomic number selecting from the group consisting of 5, 13, 22-33, 40-52, 72-84, and 89-94

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of the disclosure.

FIGS. 8A-F depict prior art Pourbaix diagrams under specified conditions for primary species of iron;

FIGS. 9A-E depict prior art Pourbaix diagrams under specified conditions for primary species of cobalt;

FIGS. 10A-E depict prior art Pourbaix diagrams under specified conditions for primary species of nickel;

FIGS. 11A-E depict prior art Pourbaix diagrams under specified conditions for primary species of copper;

FIGS. 16A-D depict prior art Pourbaix diagrams under specified conditions for primary species of zirconium;

FIGS. 19A-F depict prior art Pourbaix diagrams under specified conditions for primary species of technetium;

FIGS. 23A-E depict prior art Pourbaix diagrams under specified conditions for primary species of silver;

FIGS. 26A-E depict prior art Pourbaix diagrams under specified conditions for primary species of tin;

FIGS. 27A-D depict prior art Pourbaix diagrams under specified conditions for primary species of antimony;

FIGS. 31A-B depict prior art Pourbaix diagrams under specified conditions for primary species of tungsten;

FIGS. 32A-B depict prior art Pourbaix diagrams under specified conditions for primary species of rhenium;

FIGS. 35A-B depict prior art Pourbaix diagrams under specified conditions for primary species of platinum;

FIGS. 38A-E depict prior art Pourbaix diagrams under specified conditions for primary species of lead;

FIGS. 45A-G depict prior art Pourbaix diagrams under specified conditions for primary species of uranium;

FIGS. 46A-E depict prior art Pourbaix diagrams under specified conditions for primary species of neptunium;

FIGS. 47A-F depict prior art Pourbaix diagrams under specified conditions for primary species of plutonium;

DETAILED DESCRIPTION

General Overview

Figure 1:
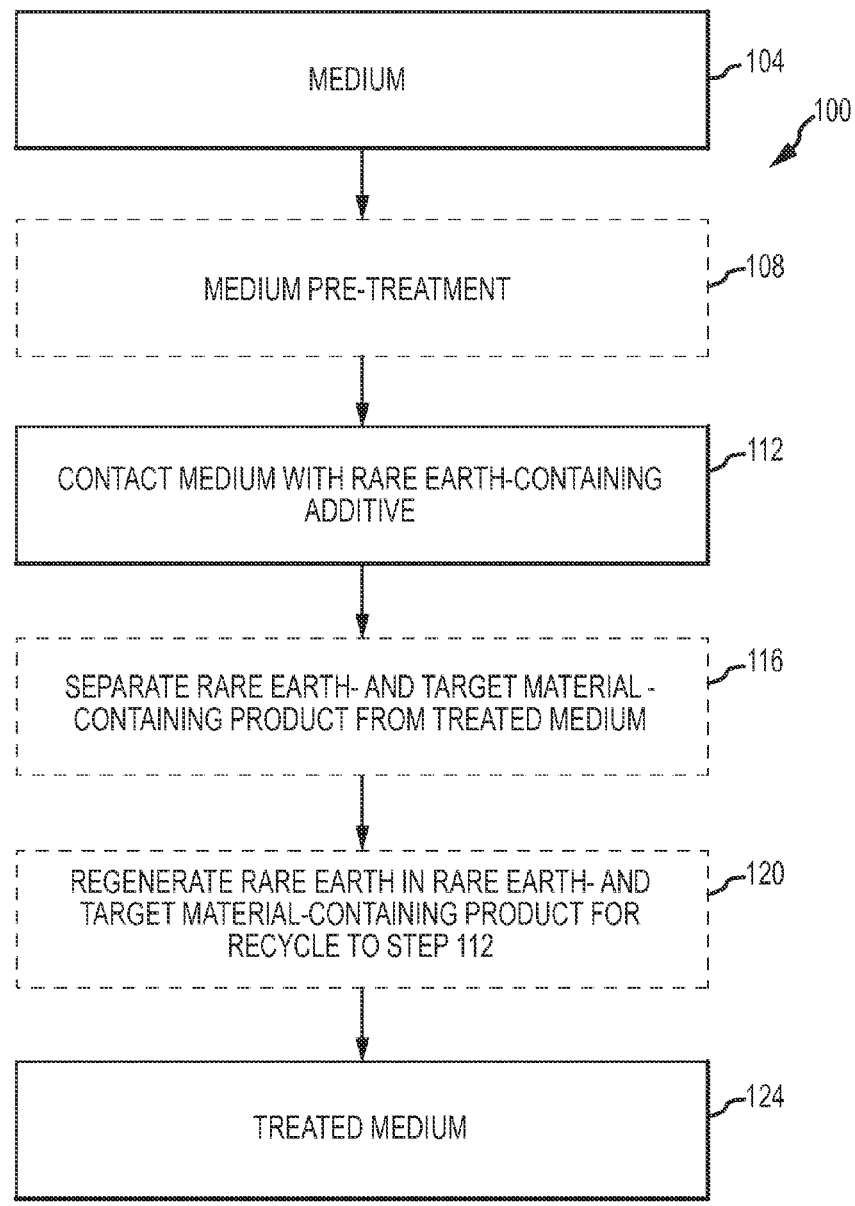
FIG. 1 depicts a water handling system and method according to an embodiment.
Figure 2A:
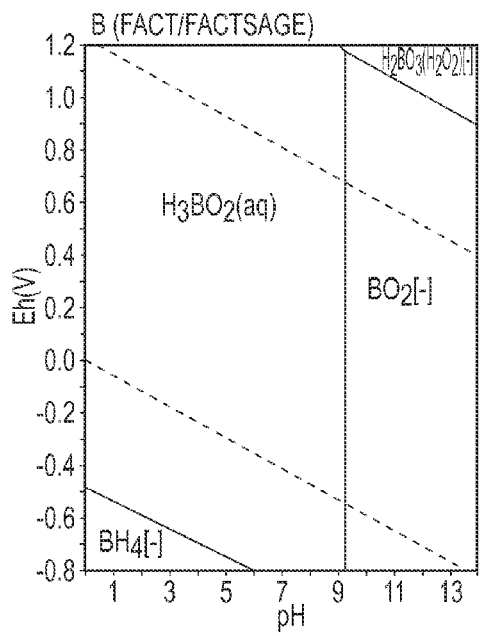
FIGS. 2A-E depict prior art Pourbaix diagrams under specified conditions for primary species of boron.
Figure 2B:
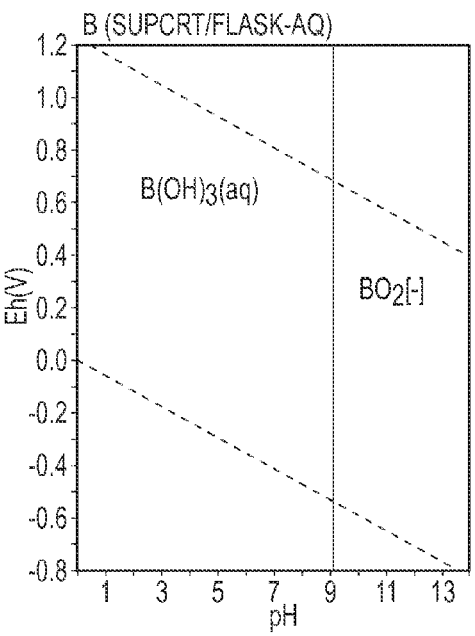
Figure 2C:
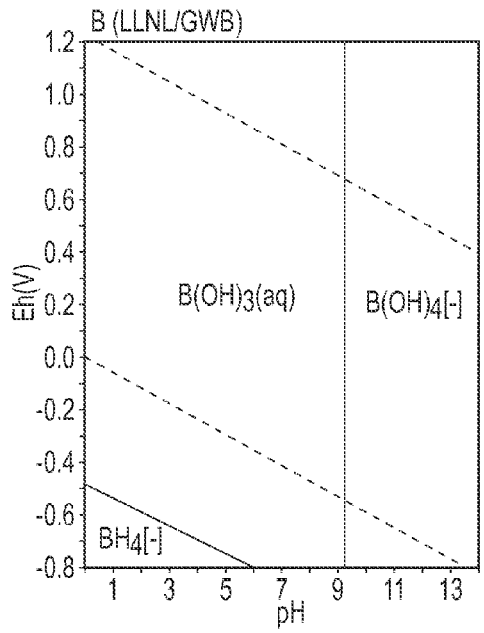
Figure 2D:
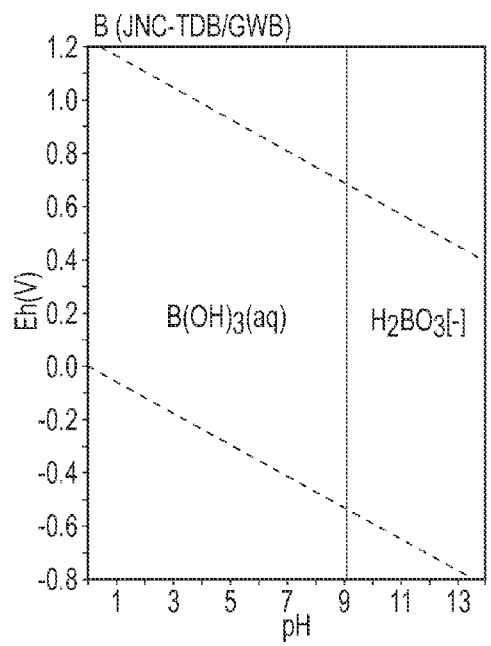
Figure 2E:
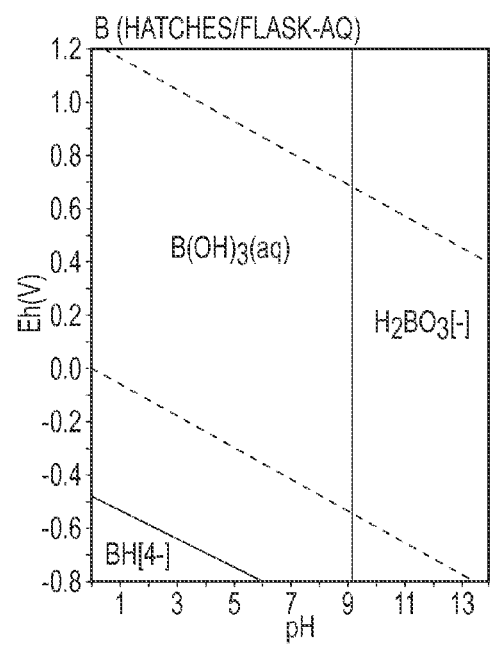
Figure 3A:
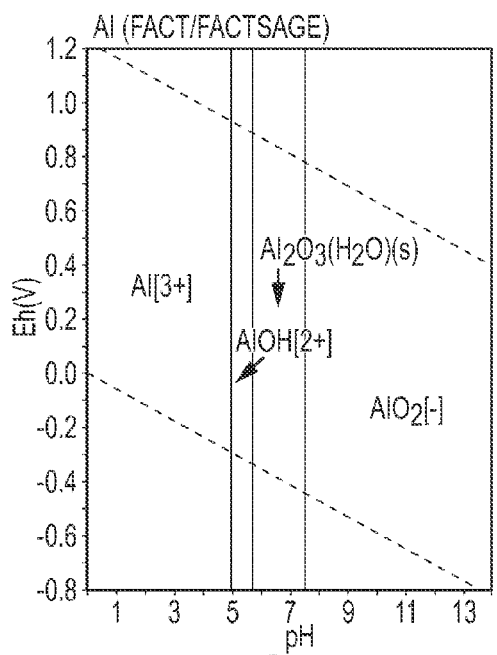
FIGS. 3A-E depict prior art Pourbaix diagrams under specified conditions for primary species of aluminum.
Figure 3B:
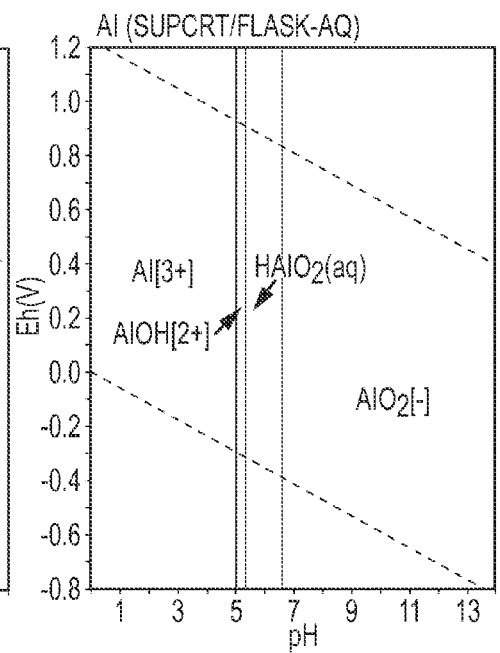
Figure 3C:
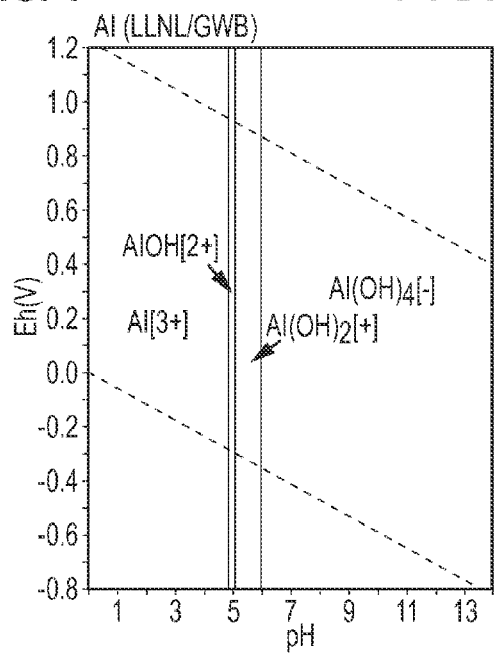
Figure 3D:
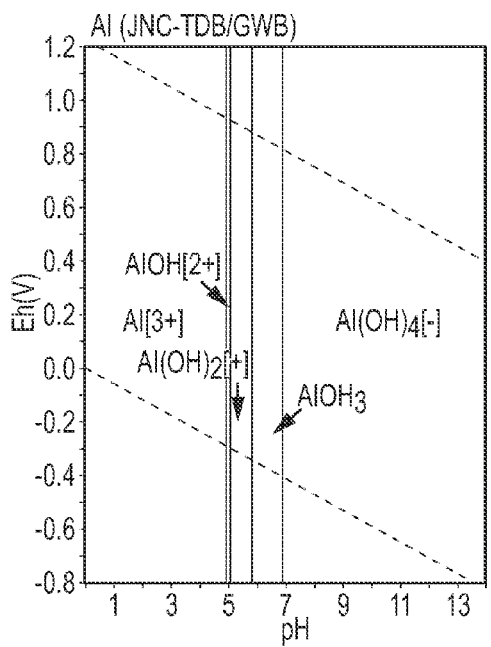
Figure 3E:
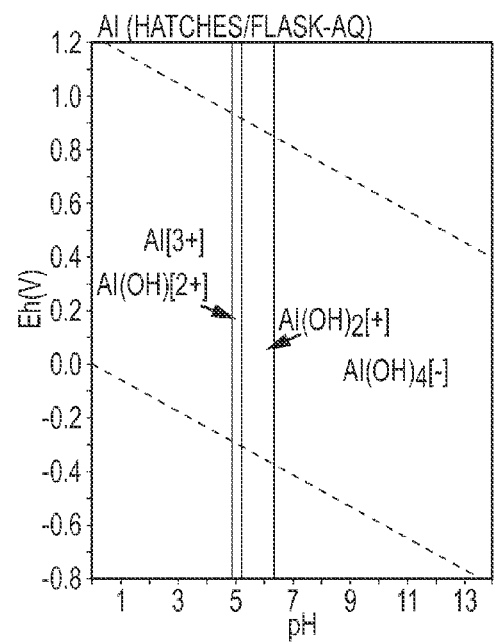
Figure 4A:
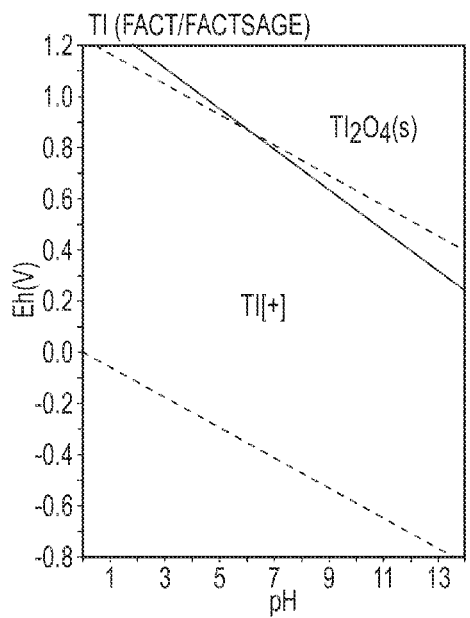
FIGS. 4A-D depict prior art Pourbaix diagrams under specified conditions for primary species of thallium.
Figure 4B:
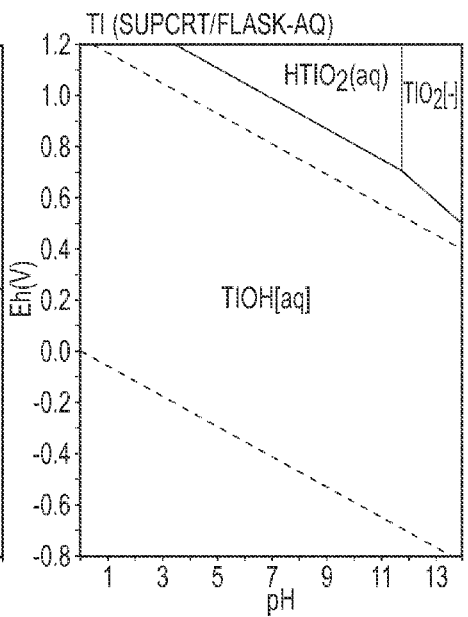
Figure 4C:
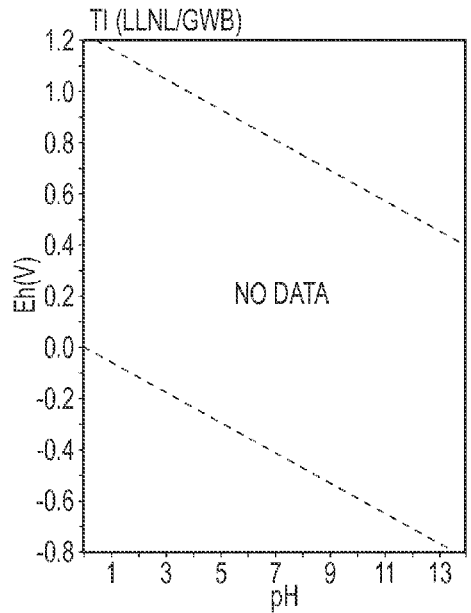
Figure 4D:
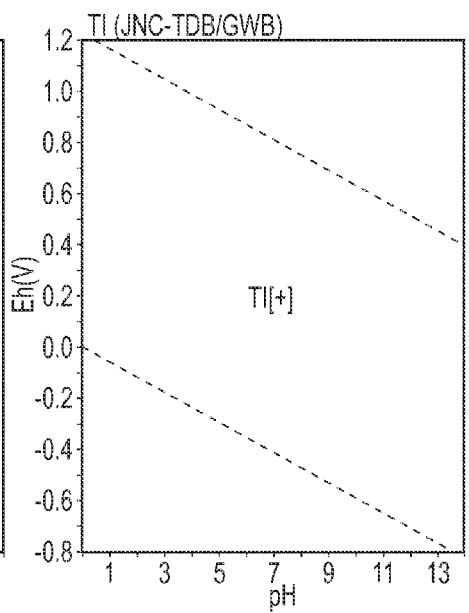
Figure 5A:
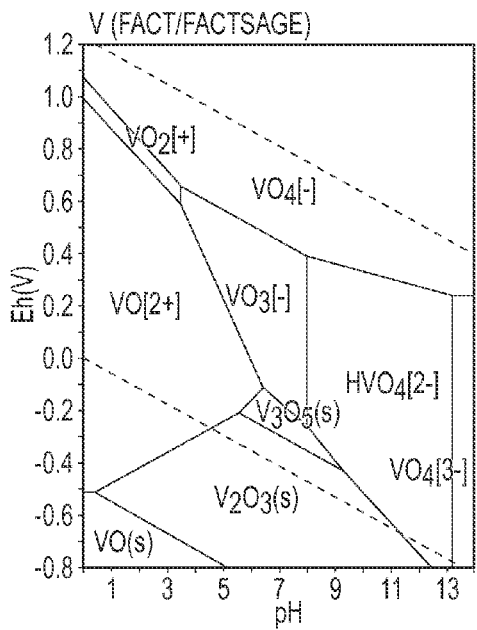
FIGS. 5A-E depict prior art Pourbaix diagrams under specified conditions for primary species of vanadium.
Figure 5B:
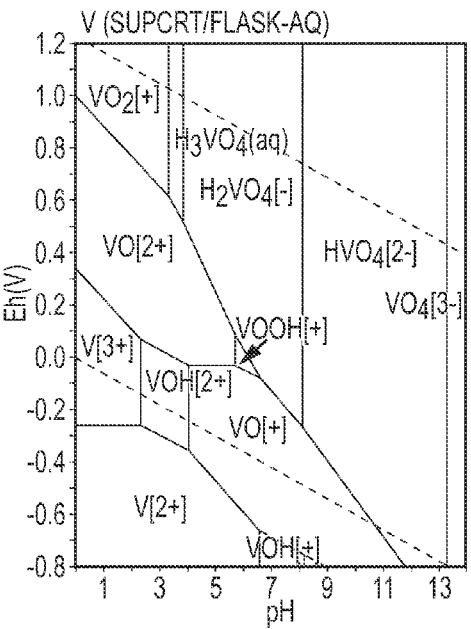
Figure 5C:
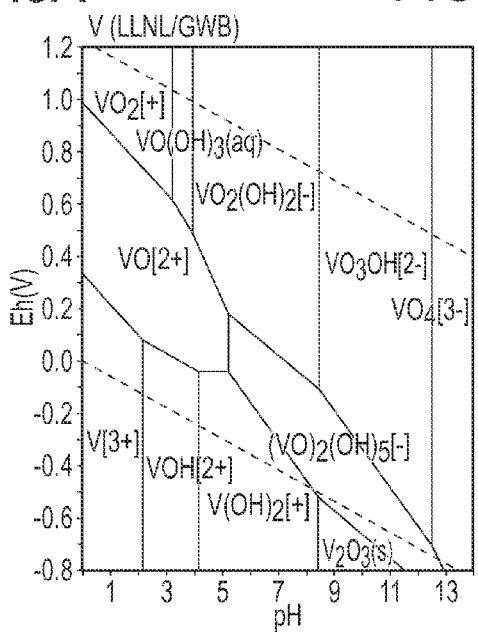
Figure 5D:
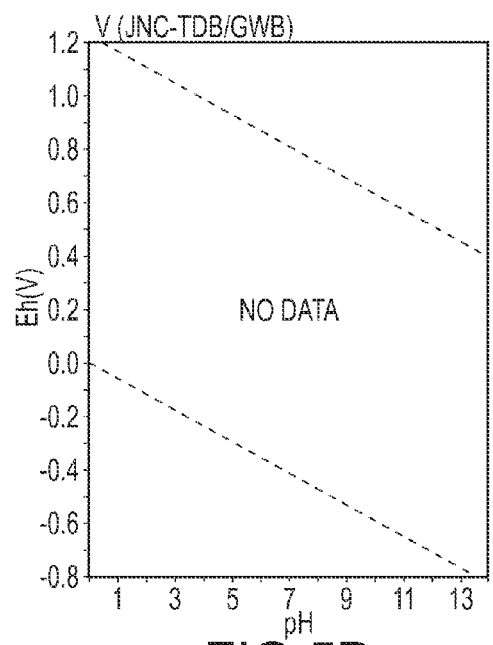
Figure 5E:
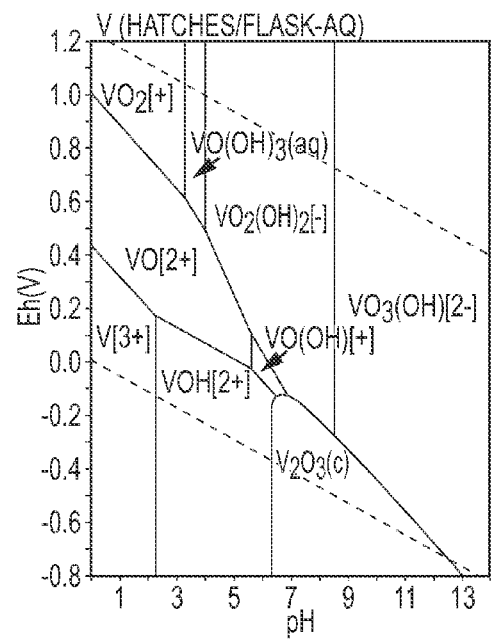
Figure 6A:
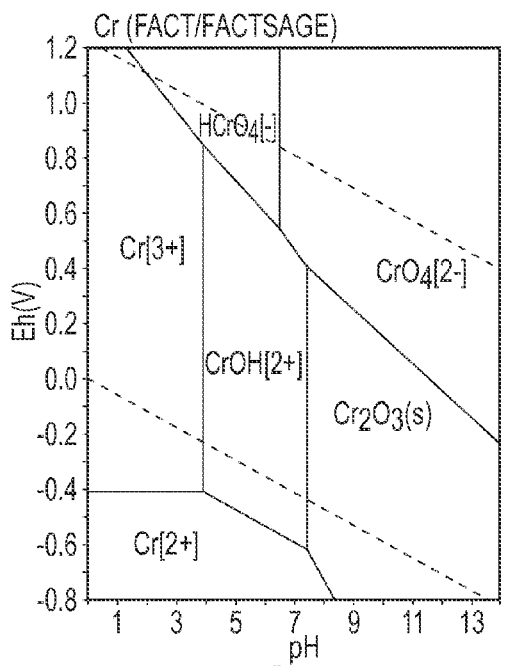
FIGS. 6A-E depict prior art Pourbaix diagrams under specified conditions for primary species of chromium.
Figure 6B:
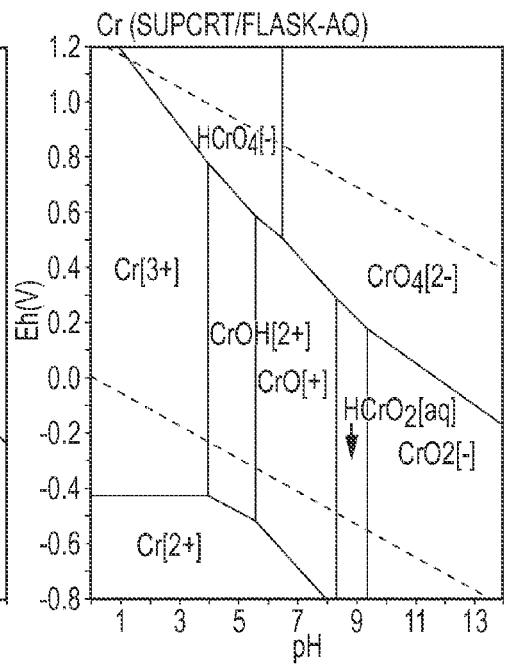
Figure 6C:
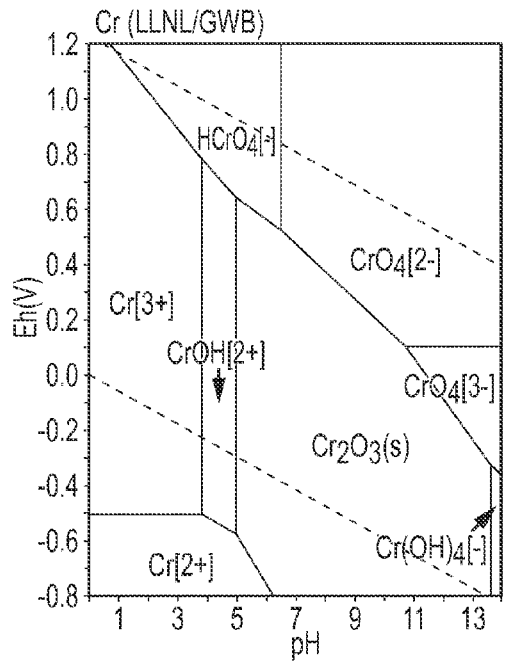
Figure 6D:
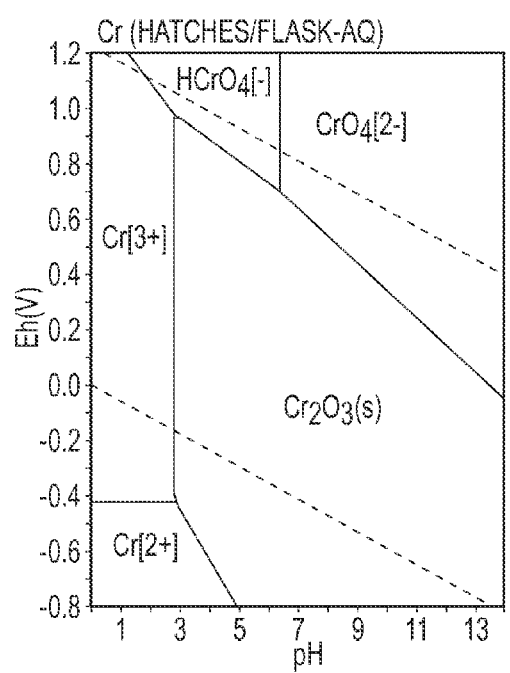
Figure 6E:
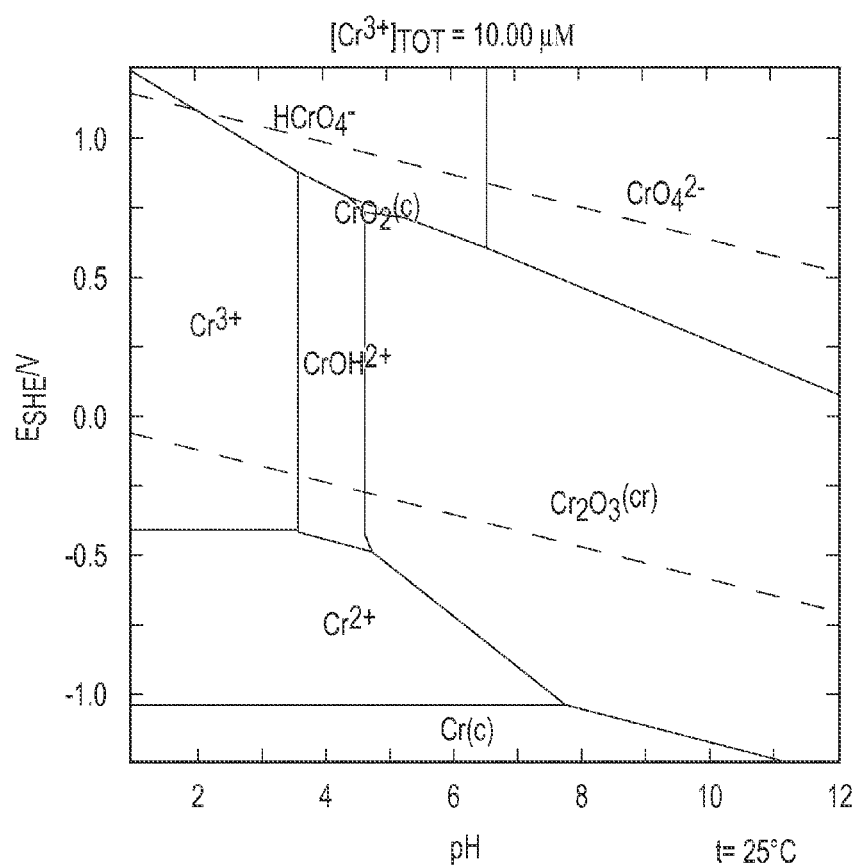
Figure 7A:
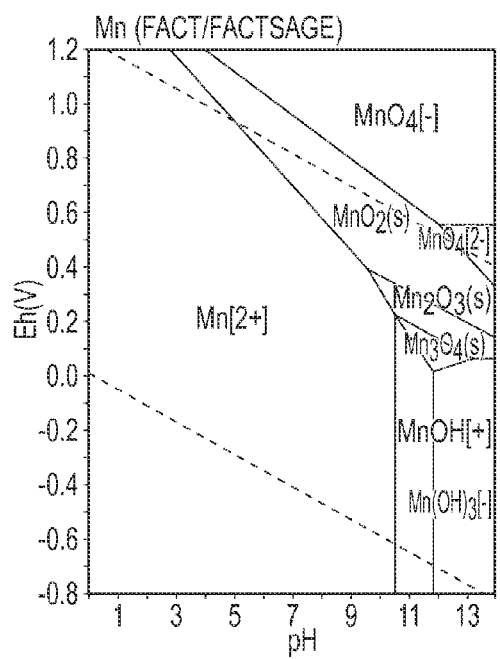
FIGS. 7A-F depict prior art Pourbaix diagrams under specified conditions for primary species of manganese.
Figure 7B:
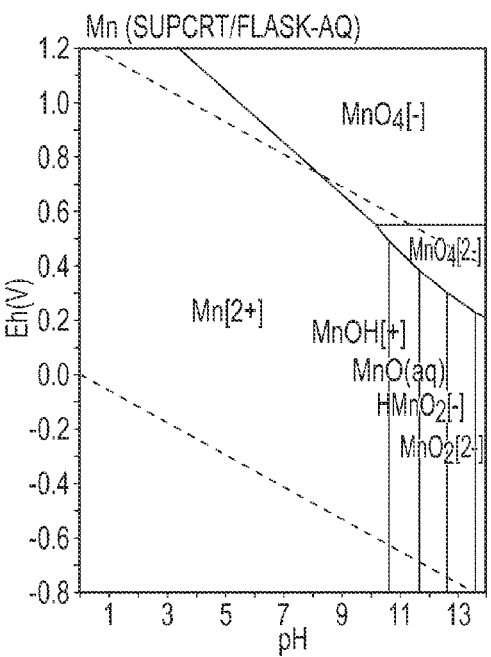
Figure 7C:
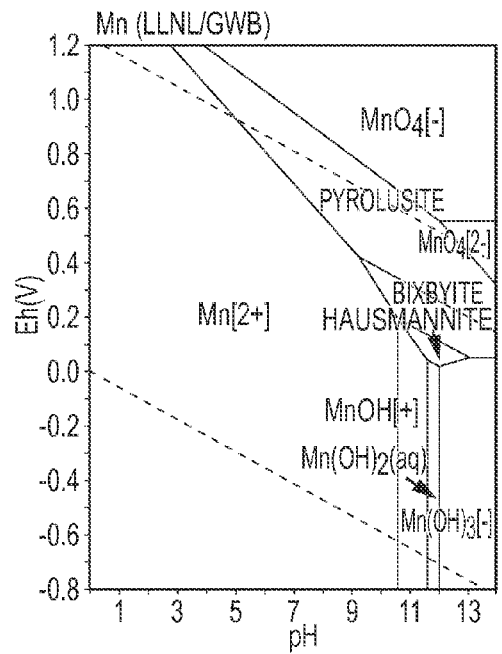
Figure 7D:
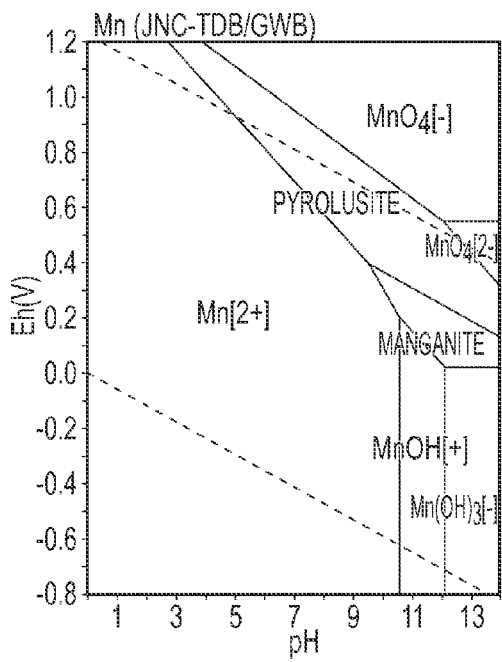
Figure 7E:
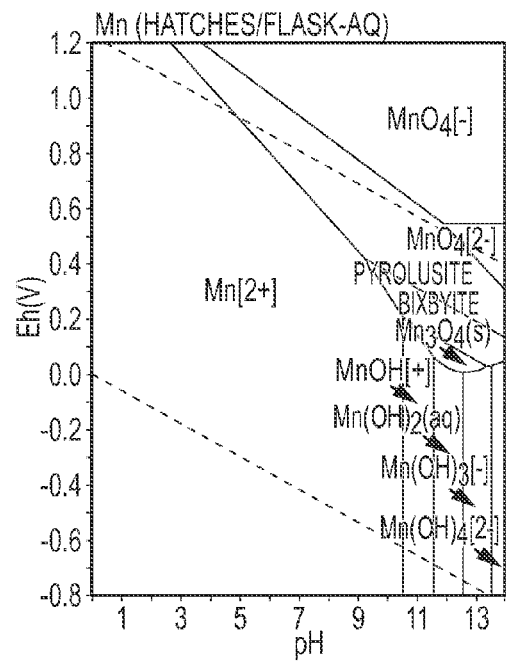
Figure 7F:
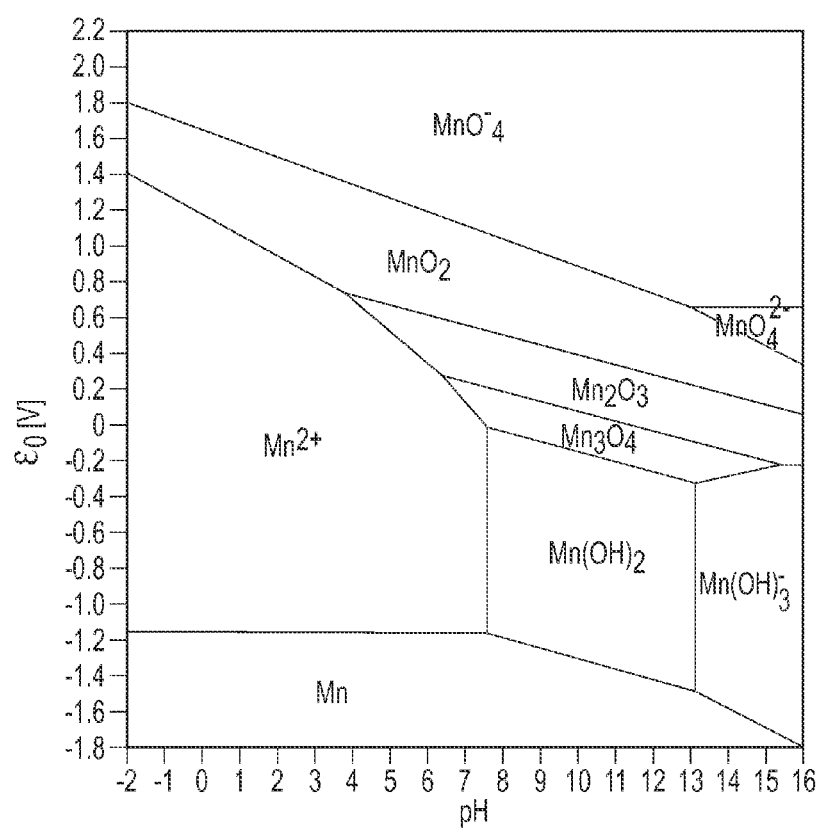
Figure 8B:
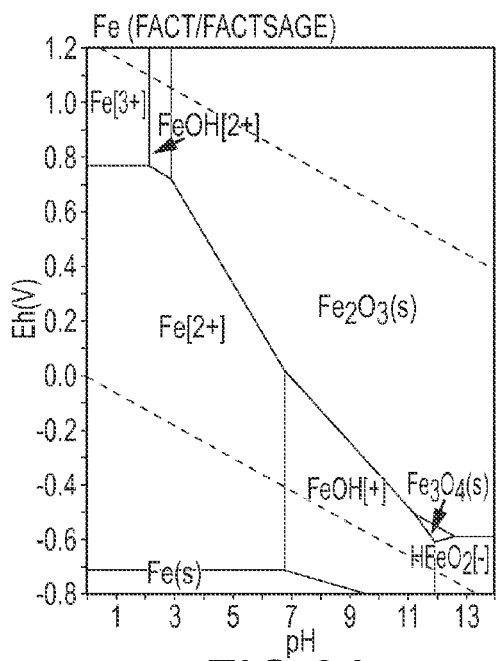
Figure 8B:
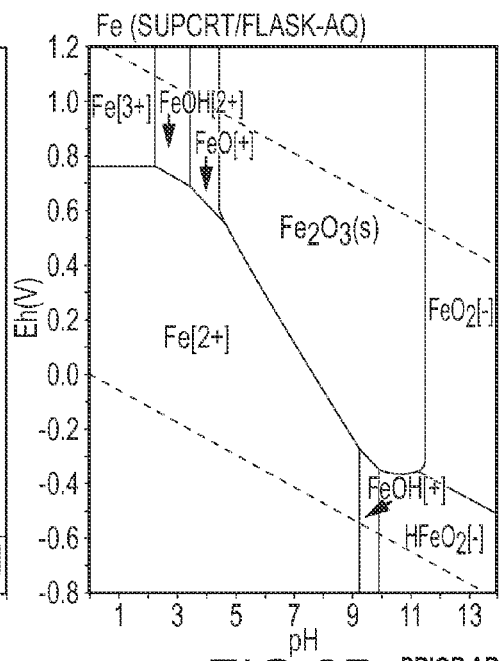
Figure 8C:
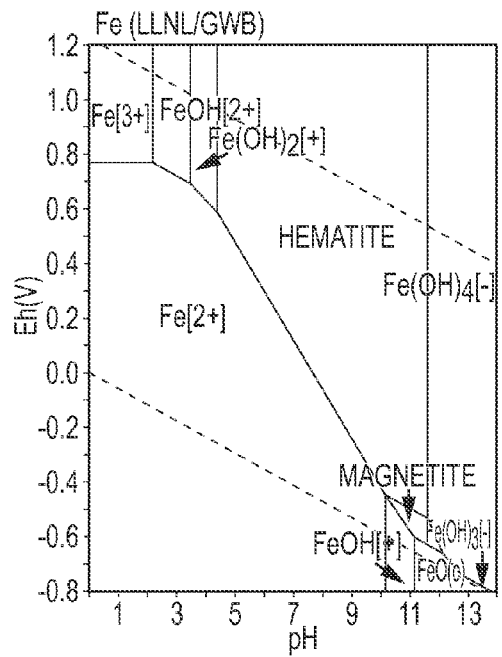
Figure 8D:
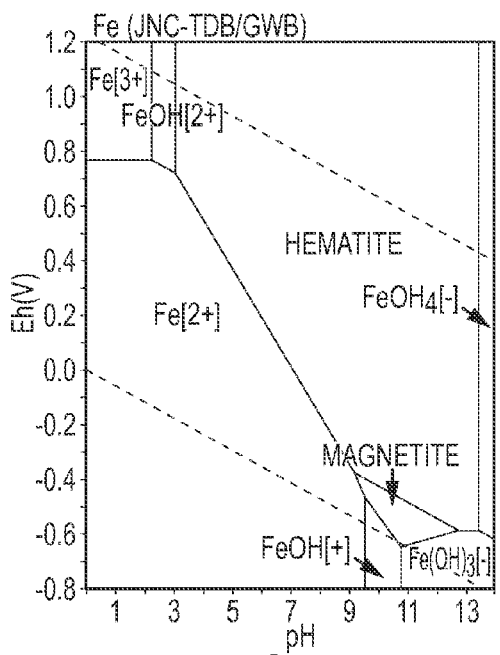
Figure 8E:
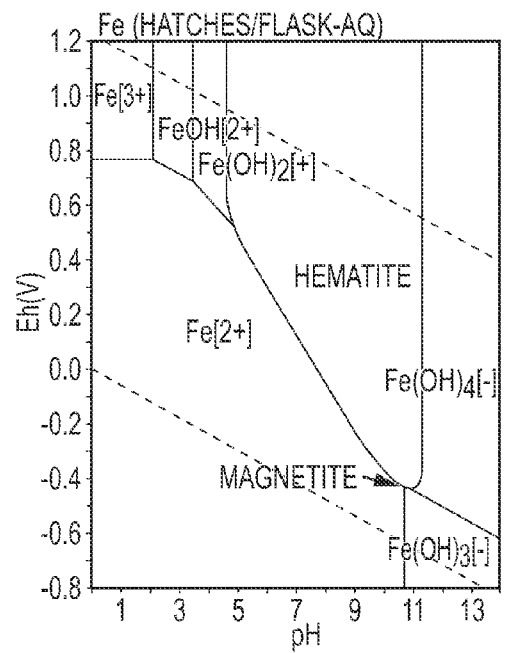
Figure 8F:
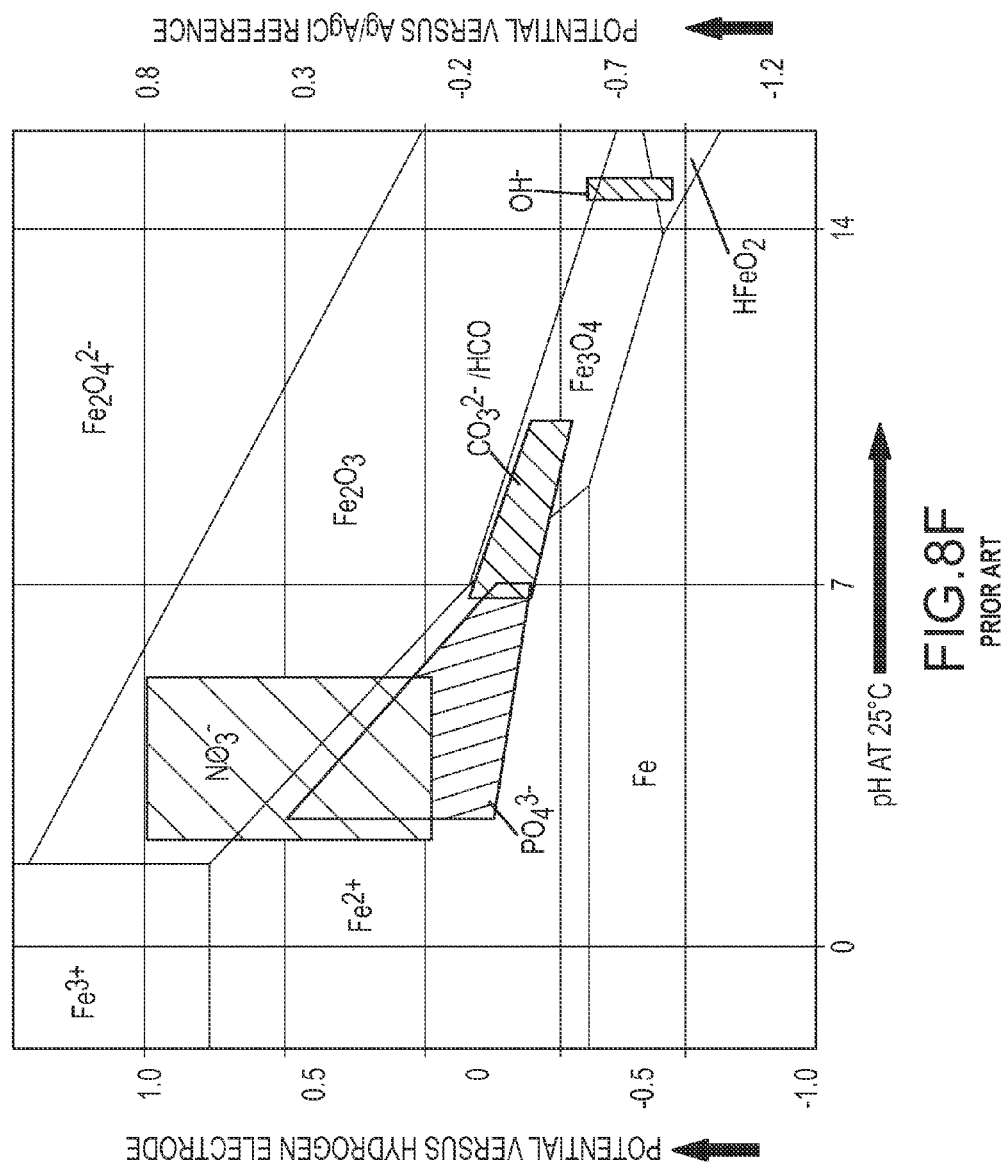
Figure 9B:
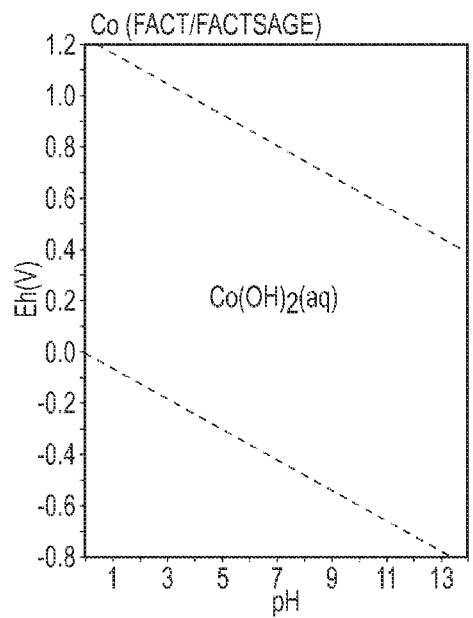
Figure 9B:
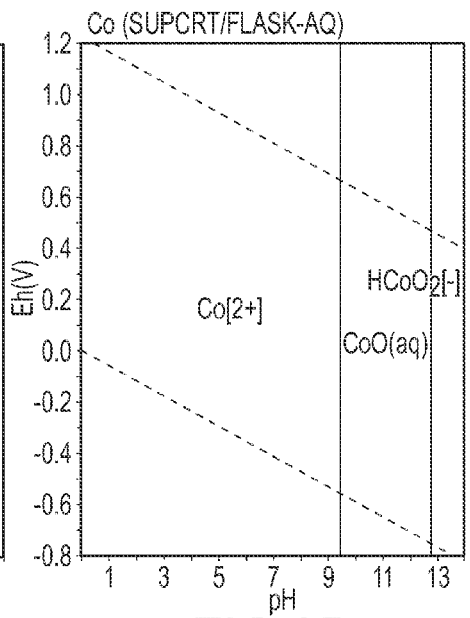
Figure 9C:
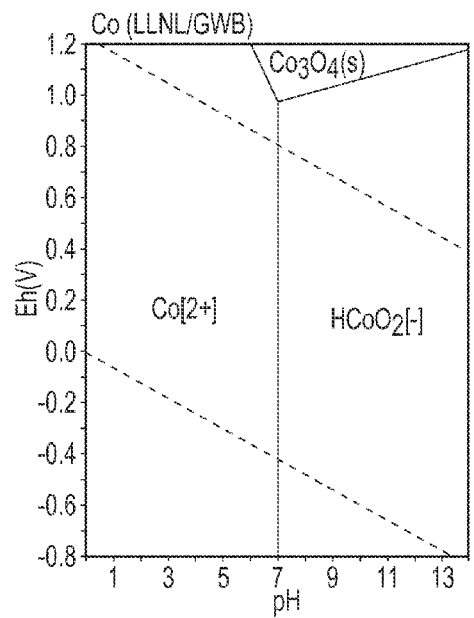
Figure 9D:
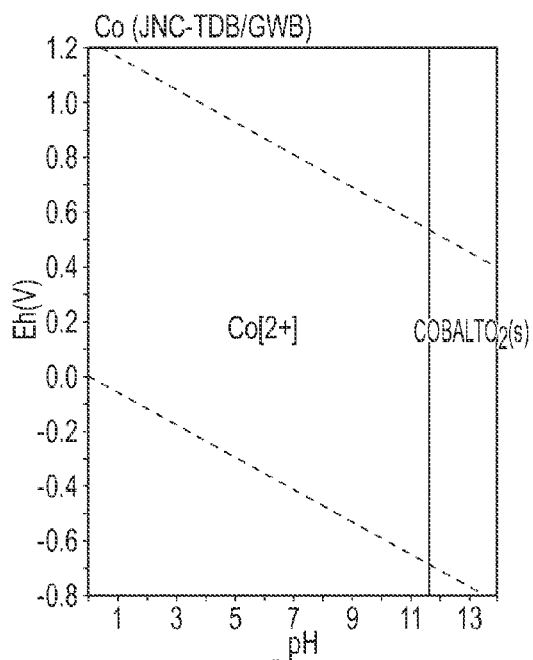
Figure 9E:
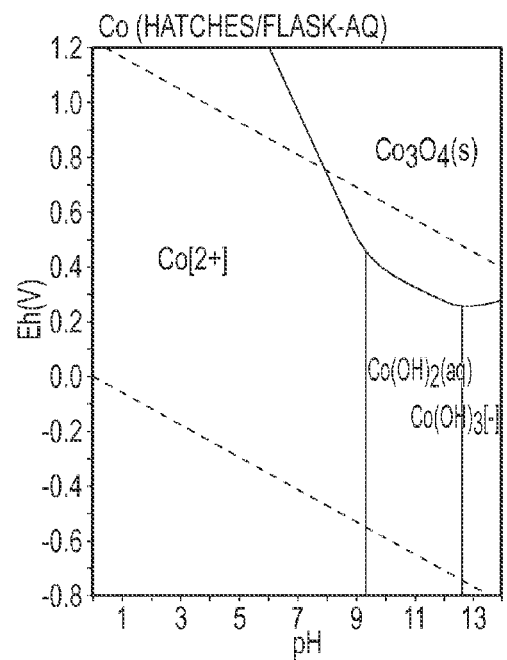
Figure 10B:
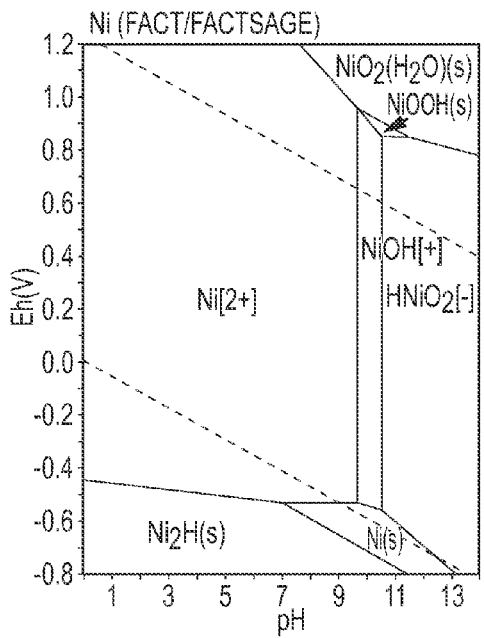
Figure 10B:
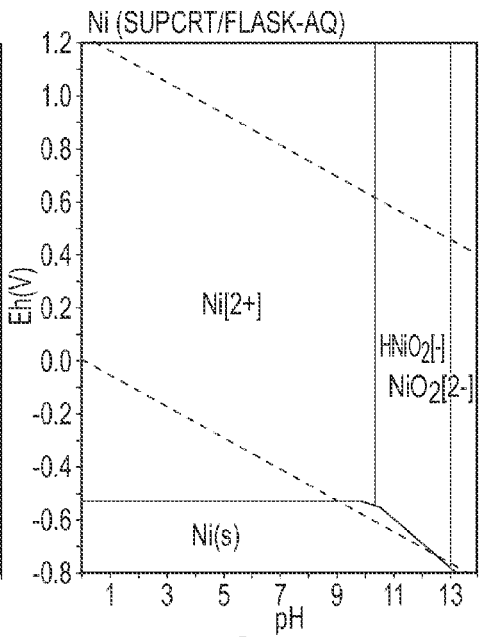
Figure 10C:
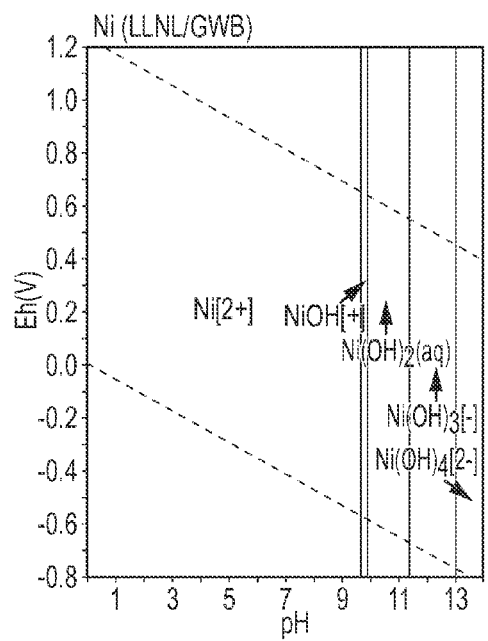
Figure 10D:
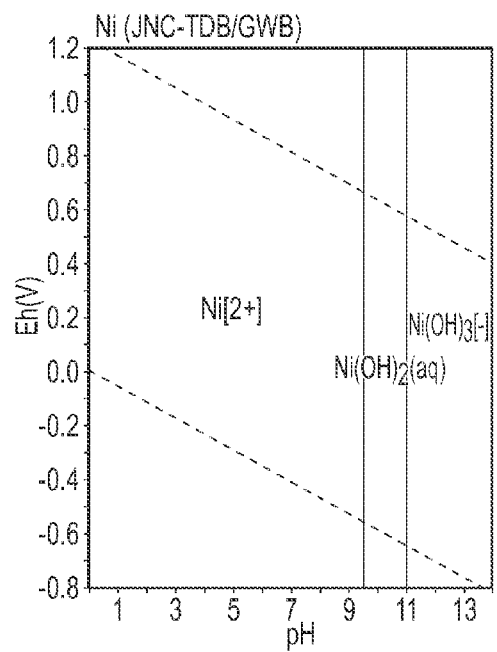
Figure 10E:
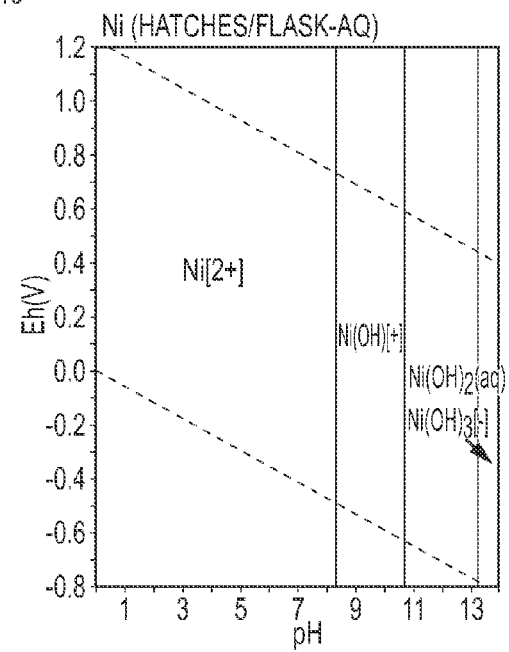
Figure 11B:
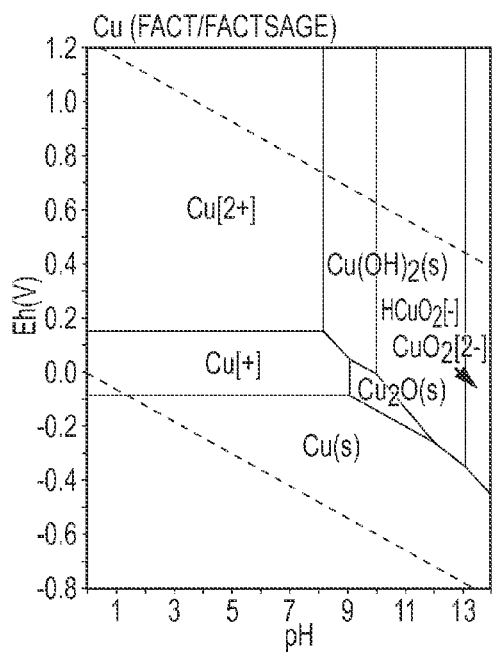
Figure 11B:
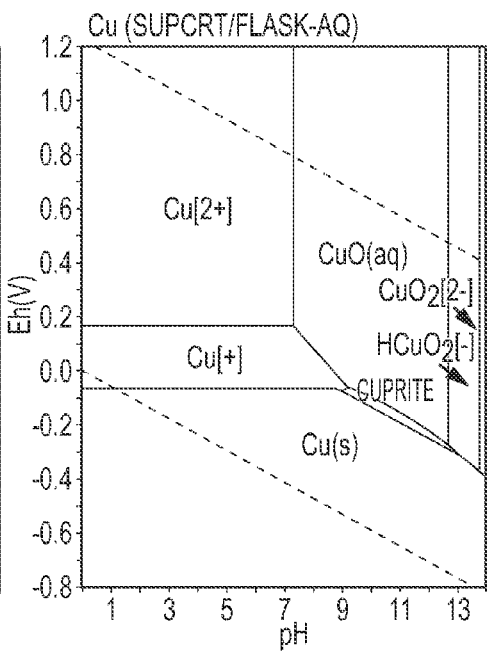
Figure 11C:
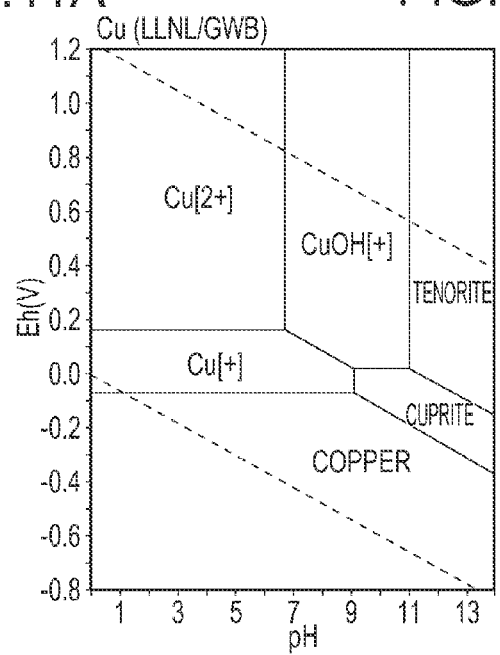
Figure 11D:
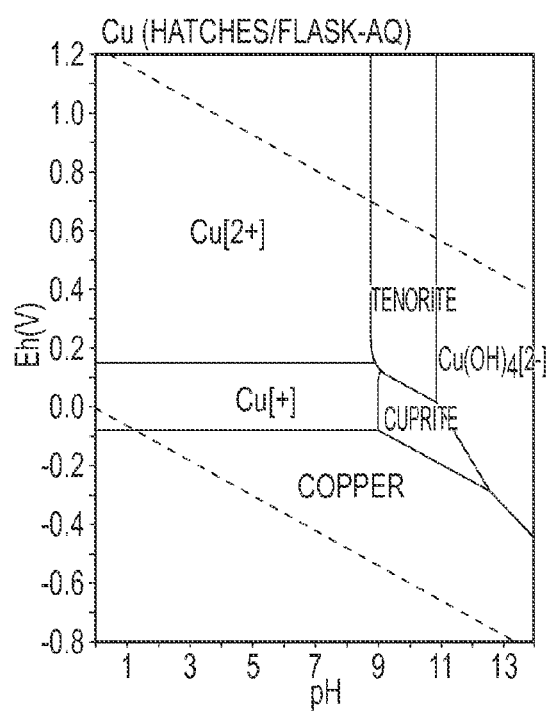
Figure 11E:
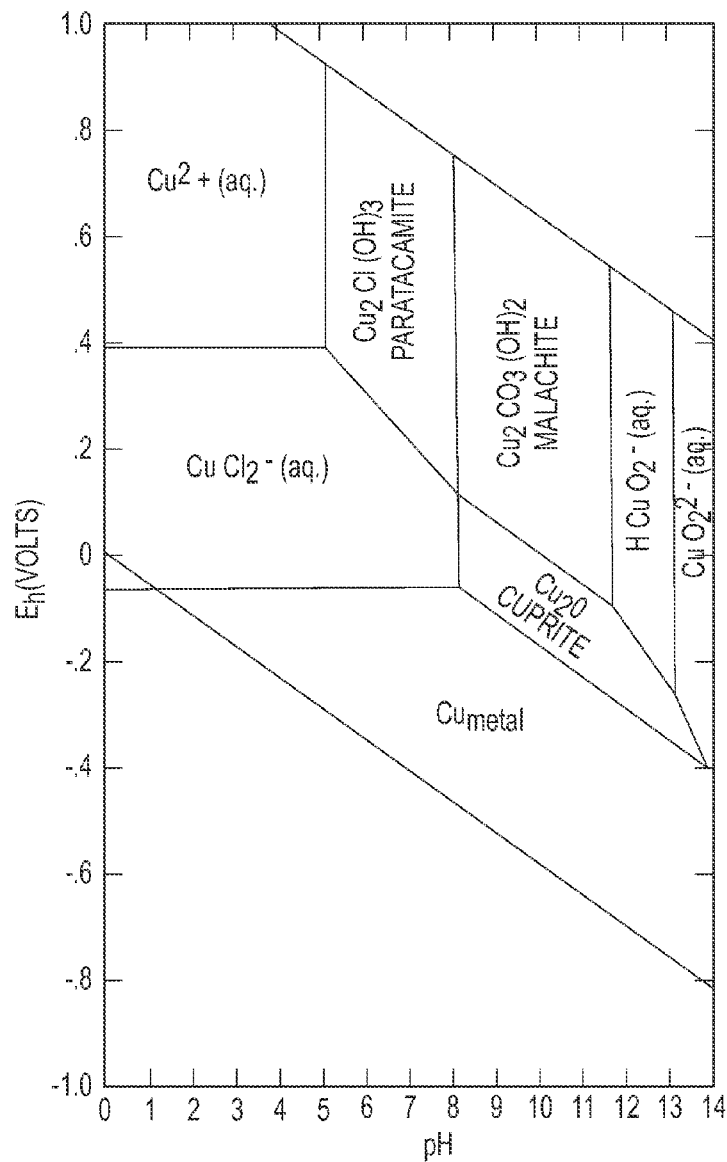
Figure 12A:
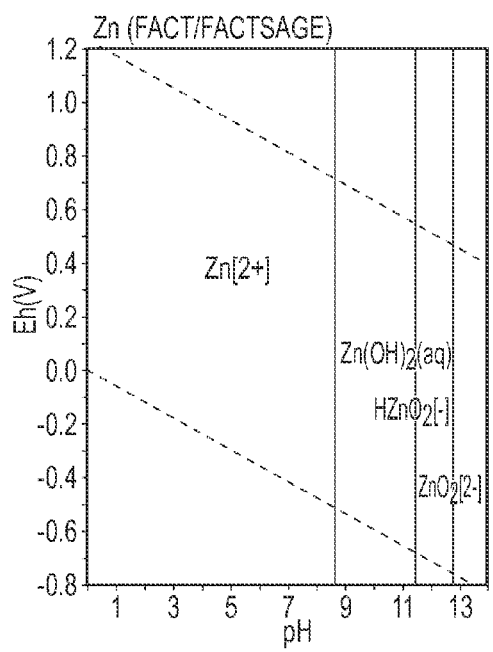
FIGS. 12A-D depict prior art Pourbaix diagrams under specified conditions for primary species of zinc.
Figure 12B:
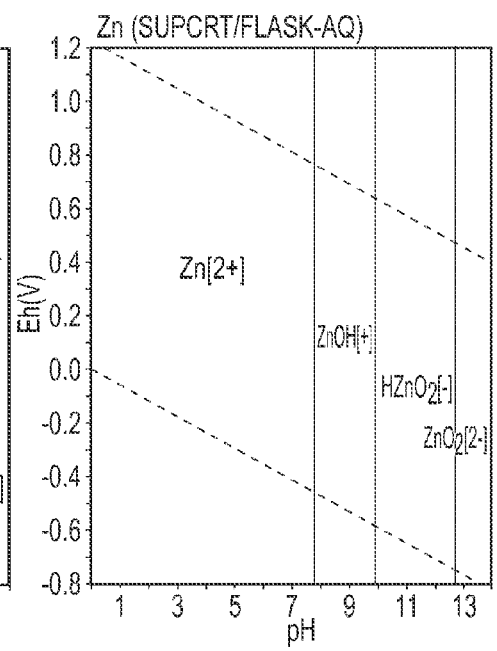
Figure 12C:
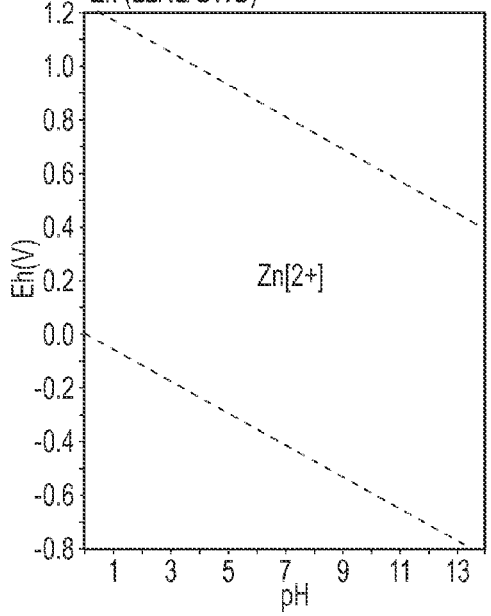
Figure 12D:
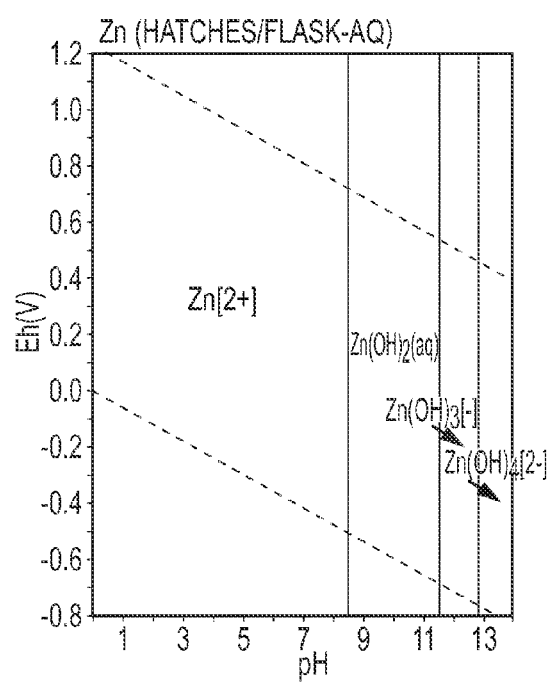
Figure 13A:
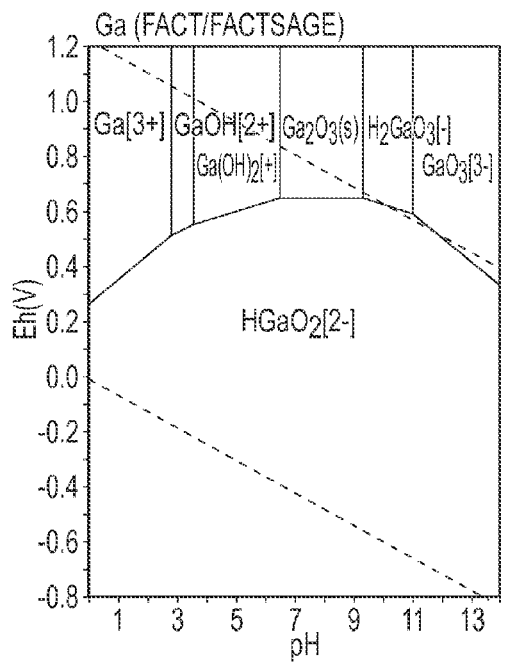
FIGS. 13A-B depict prior art Pourbaix diagrams under specified conditions for primary species of gallium.
Figure 13B:
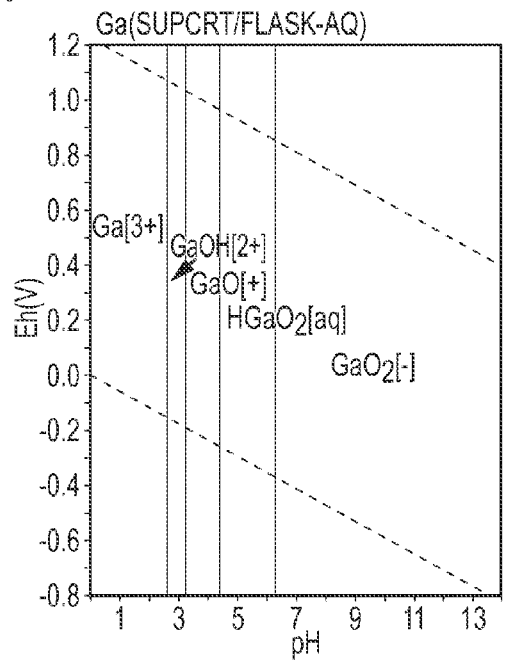
Figure 14:
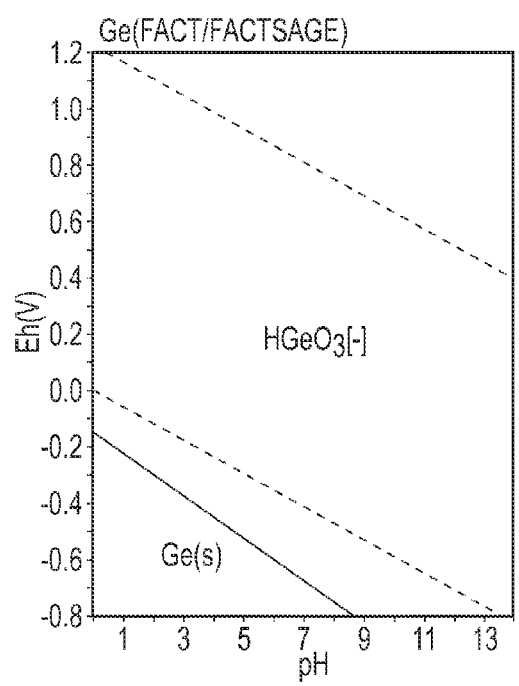
FIG. 14 depicts a prior art Pourbaix diagram under specified conditions for primary species of germanium.
Figure 15A:
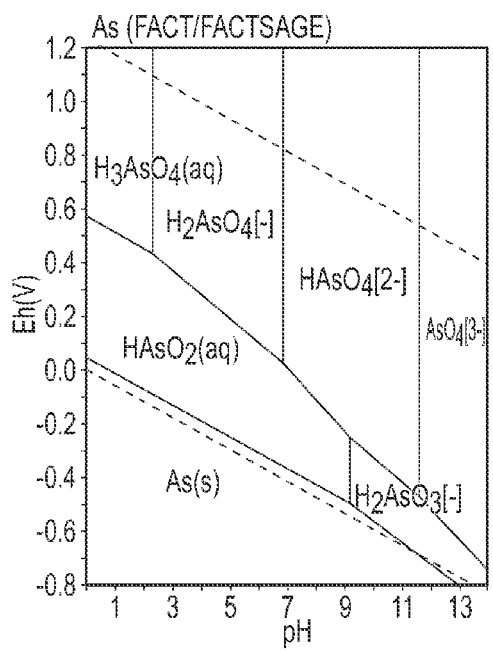
FIGS. 15A-D depict prior art Pourbaix diagrams under specified conditions for primary species of arsenic.
Figure 15B:
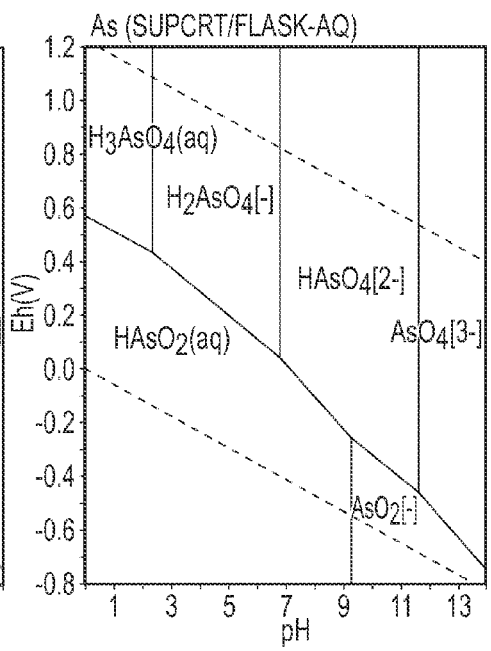
Figure 15C:
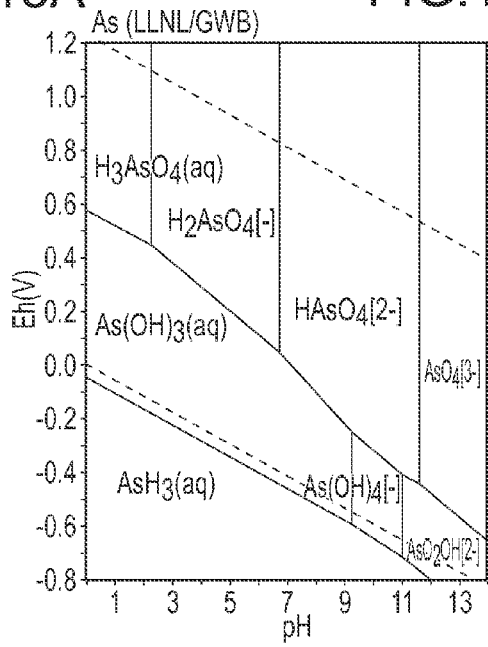
Figure 15D:
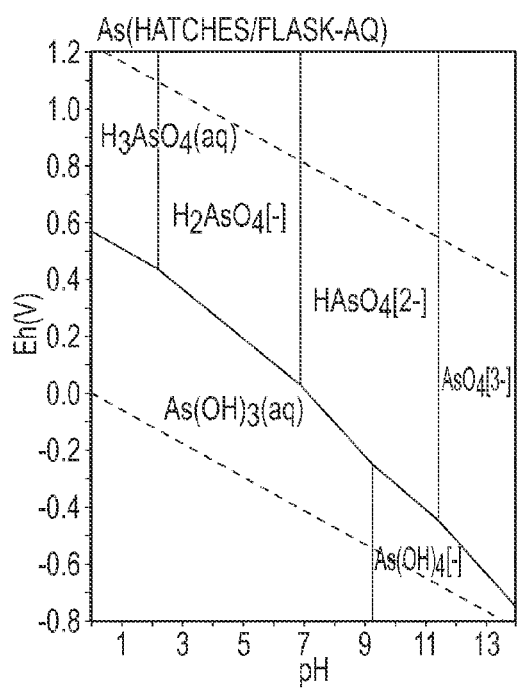
Figure 16B:
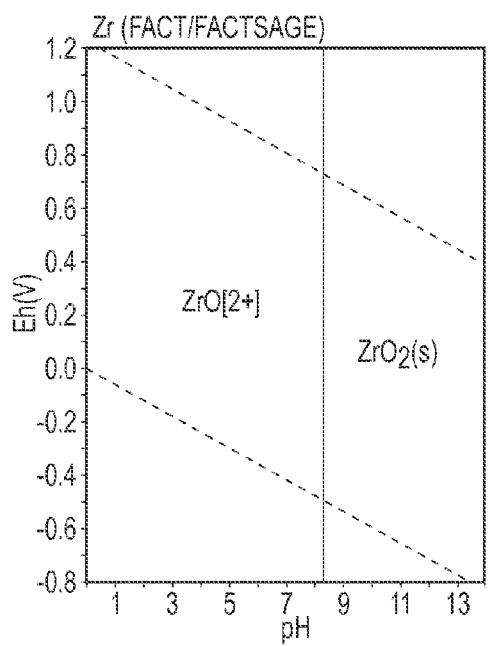
Figure 16B:
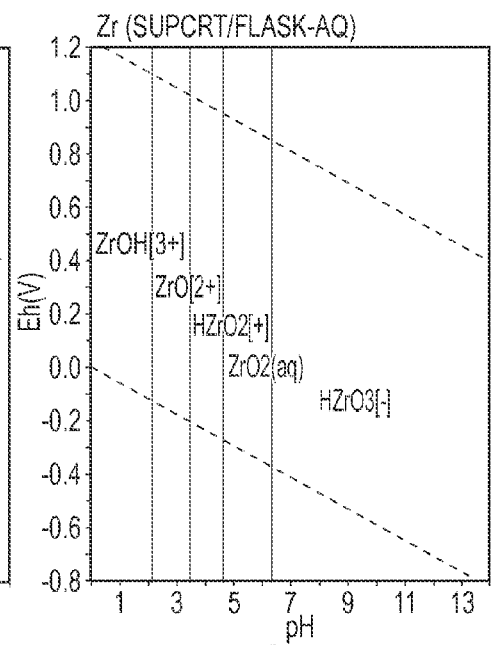
Figure 16C:
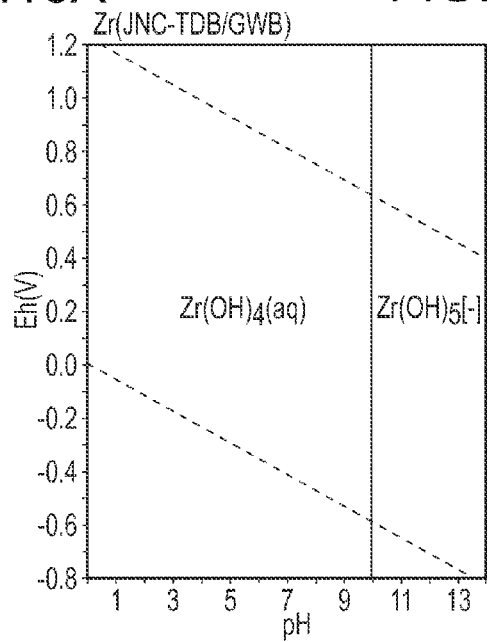
Figure 16D:
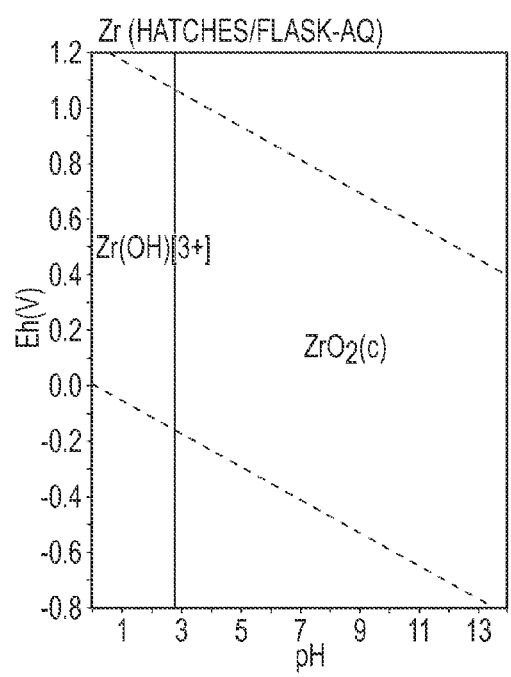
Figure 17A:
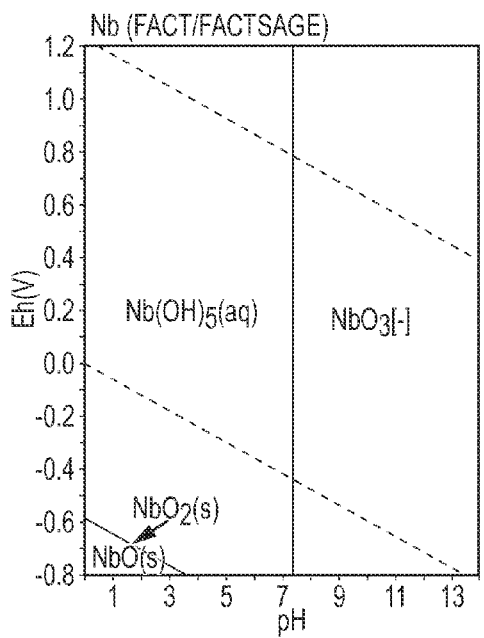
FIGS. 17A-D depict prior art Pourbaix diagrams under specified conditions for primary species of niobium.
Figure 17B:
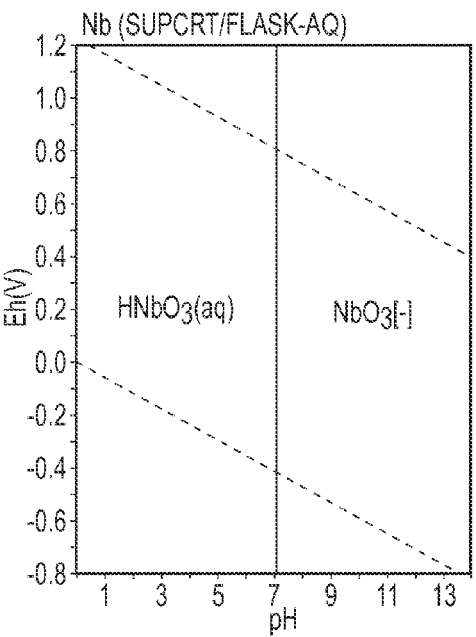
Figure 17C:
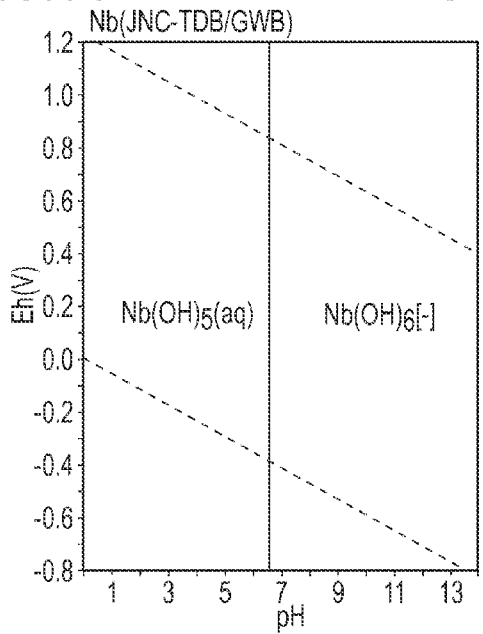
Figure 17D:
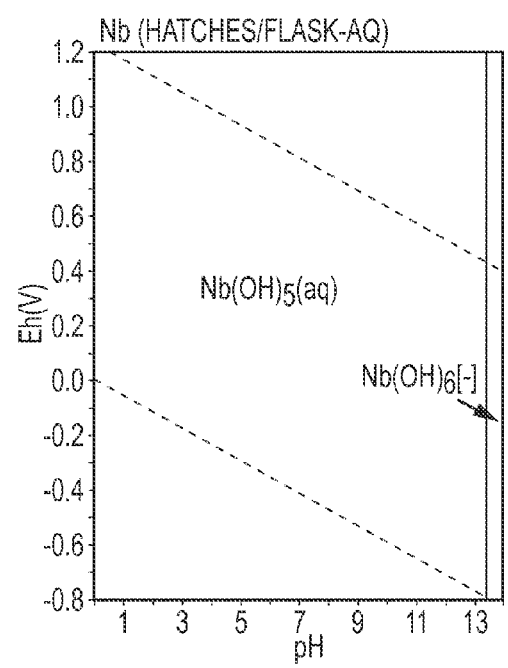
Figure 18A:
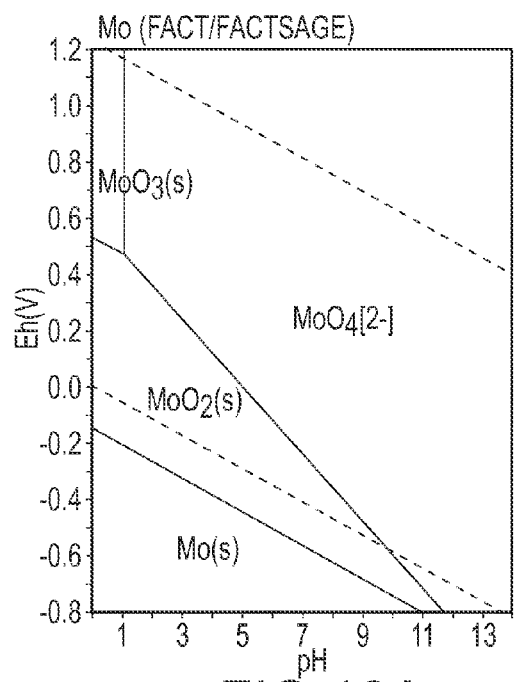
FIGS. 18A-C depict prior art Pourbaix diagrams under specified conditions for primary species of molybdenum.
Figure 18B:
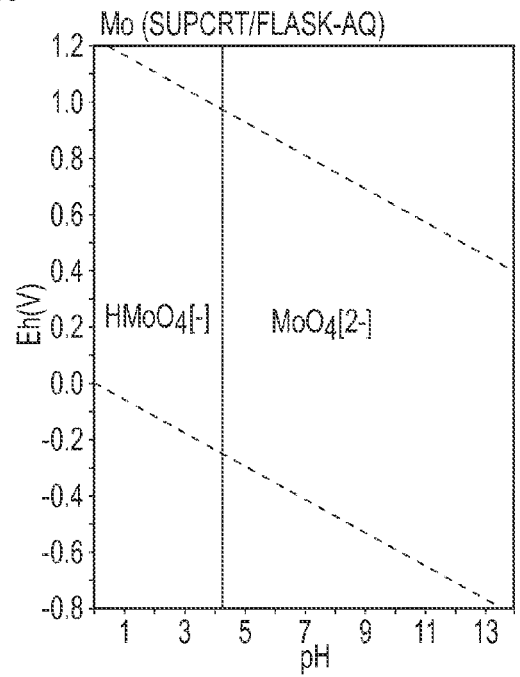
Figure 18C:
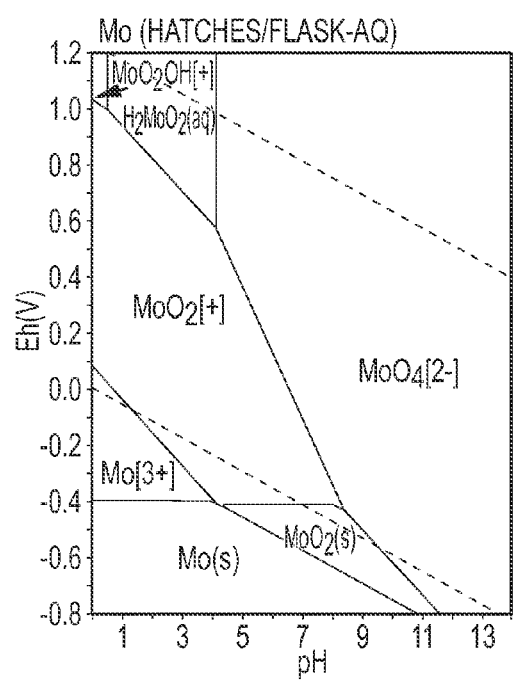
Figure 19B:
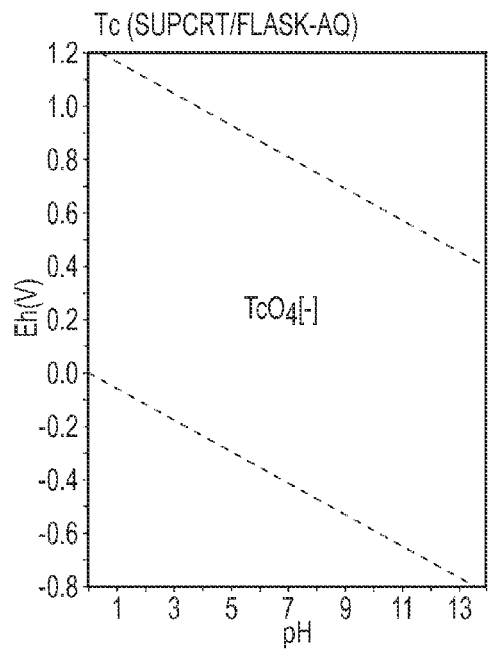
Figure 19B:
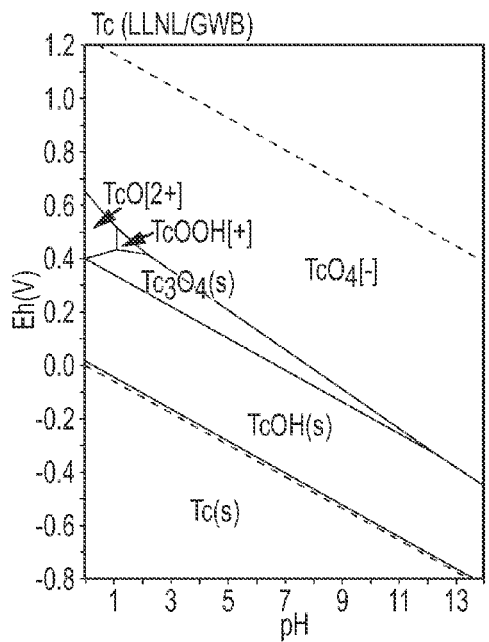
Figure 19C:
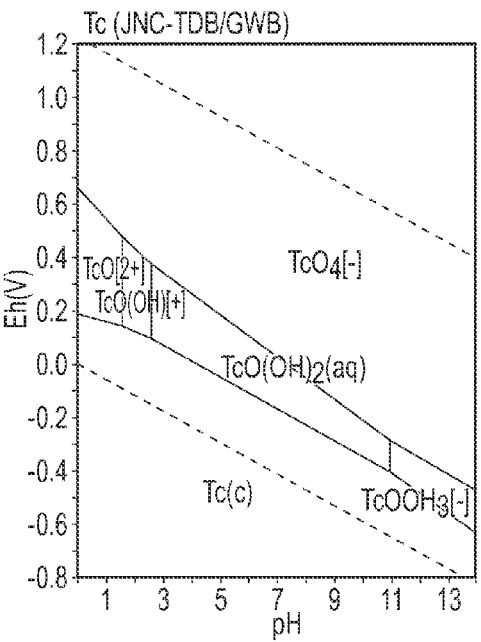
Figure 19E:
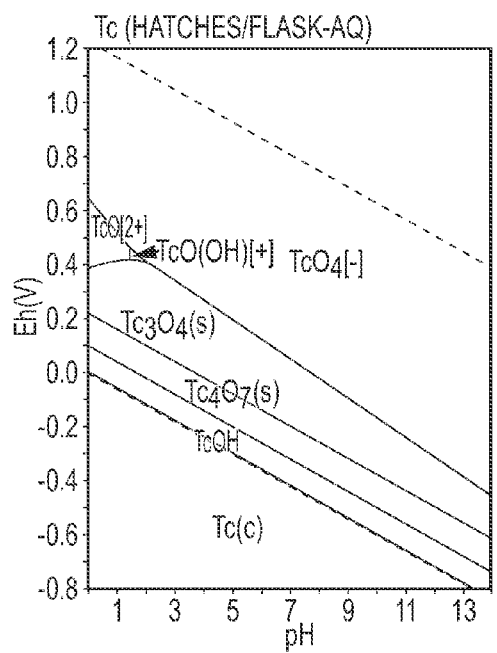
Figure 19E:
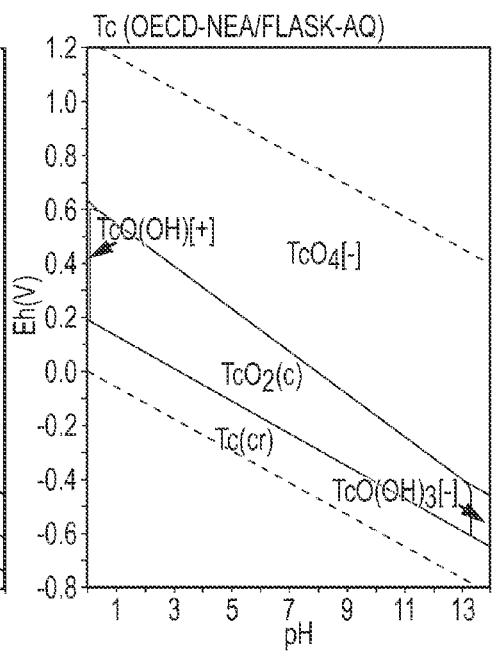
Figure 19F:
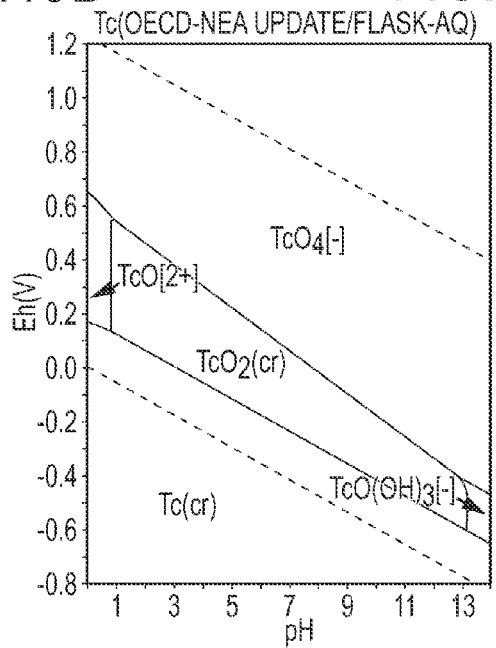
Figure 20A:
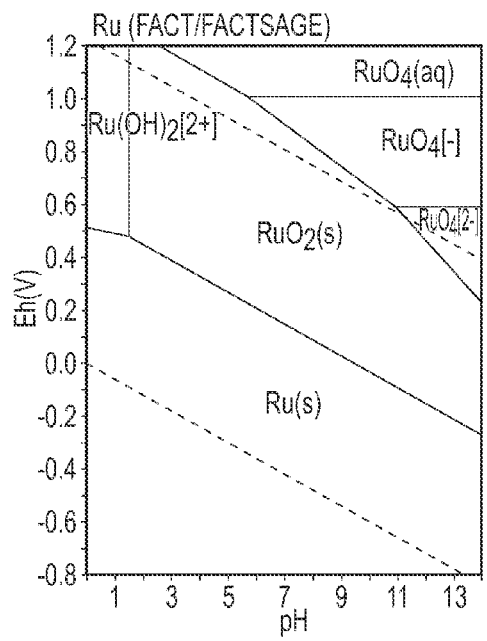
FIGS. 20A-D depict prior art Pourbaix diagrams under specified conditions for primary species of ruthenium.
Figure 20B:
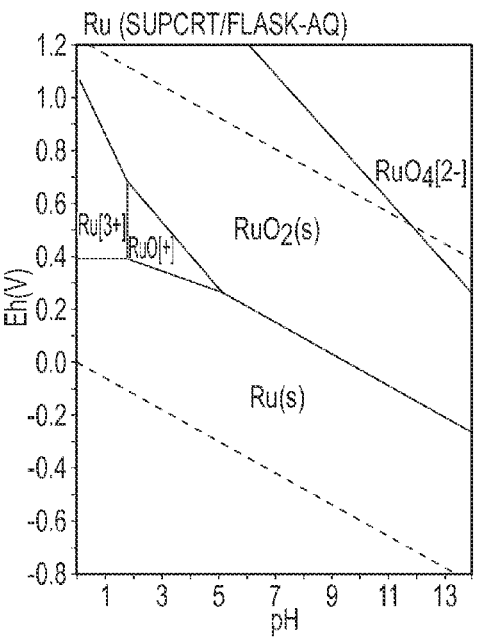
Figure 20C:
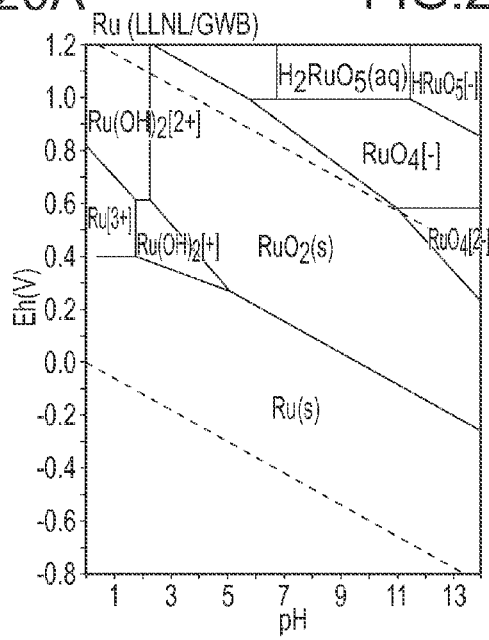
Figure 20D:
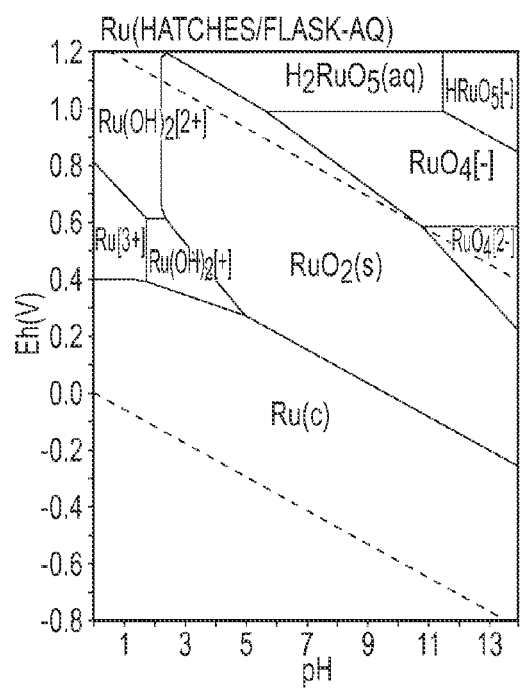
Figure 21A:
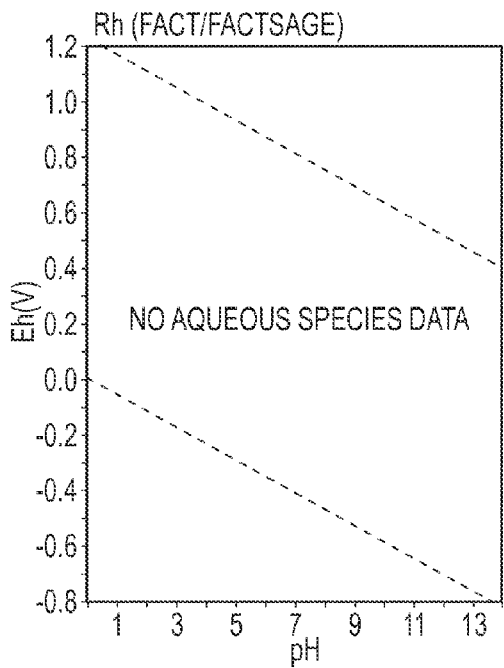
FIGS. 21A-B depicts a prior art Pourbaix diagram under specified conditions for primary species of rhodium.
Figure 21B:
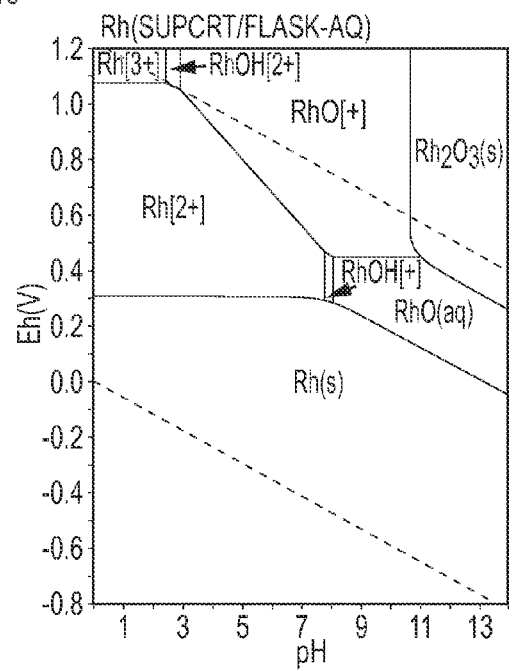
Figure 22A:
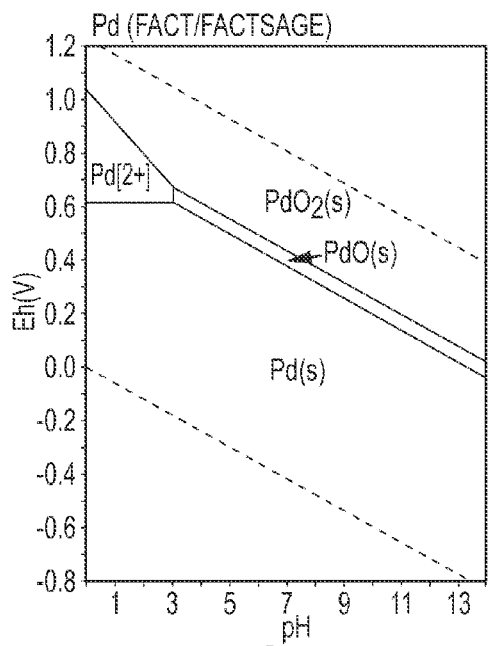
FIGS. 22A-C depict prior art Pourbaix diagrams under specified conditions for primary species of palladium.
Figure 22B:
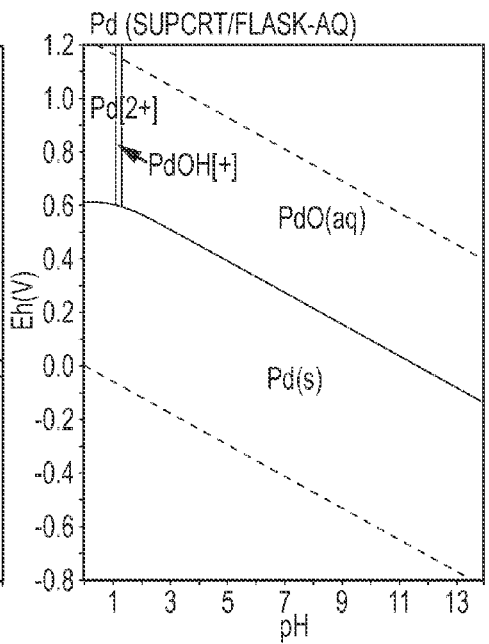
Figure 22C:
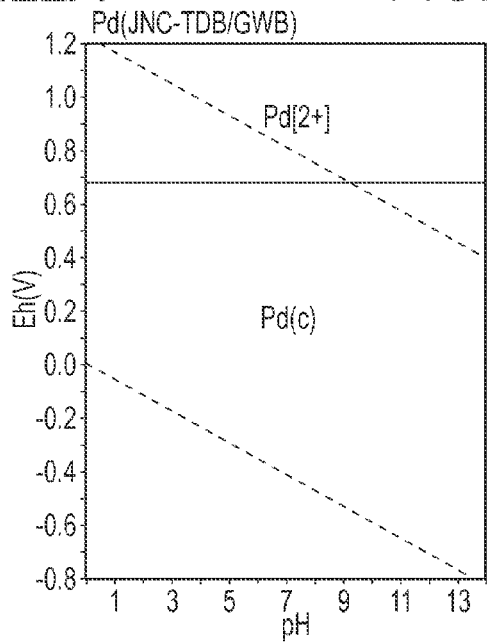
Figure 23B:
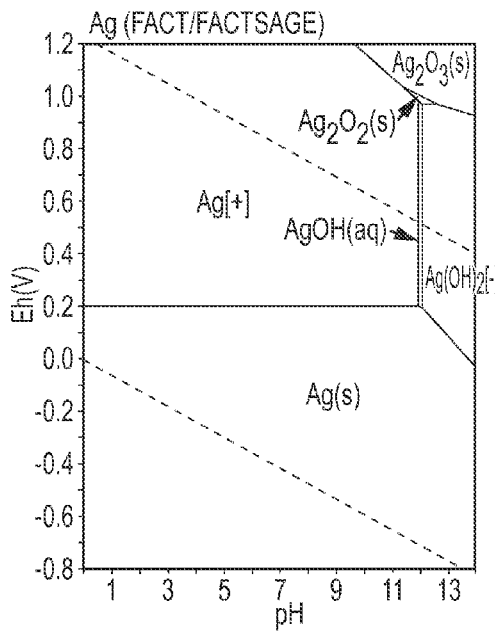
Figure 23B:
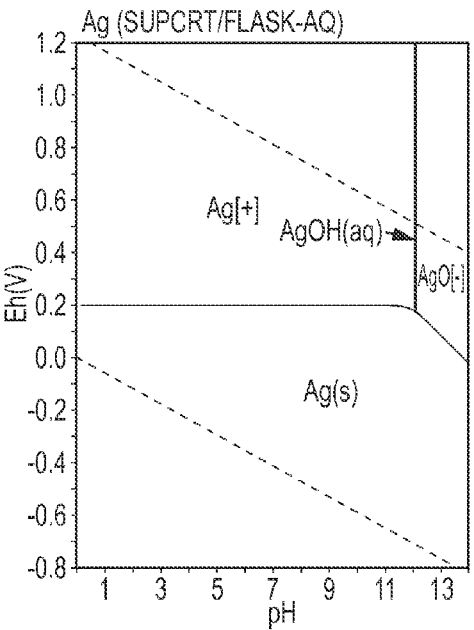
Figure 23C:
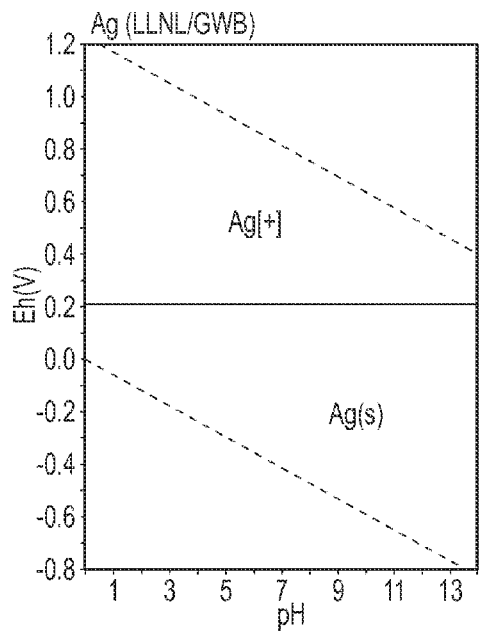
Figure 23D:
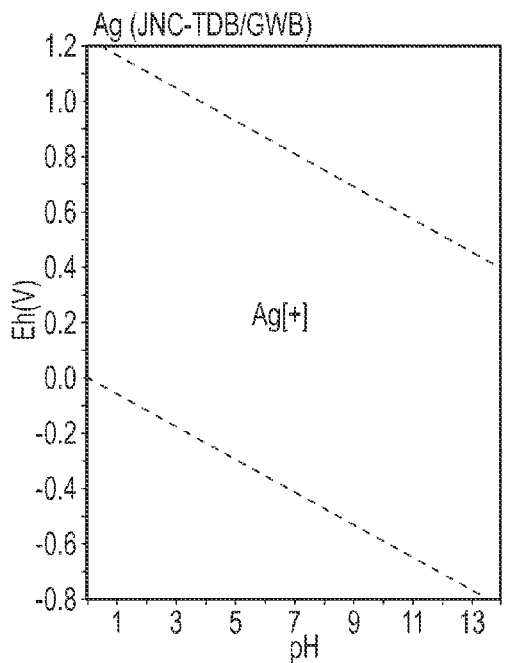
Figure 23E:
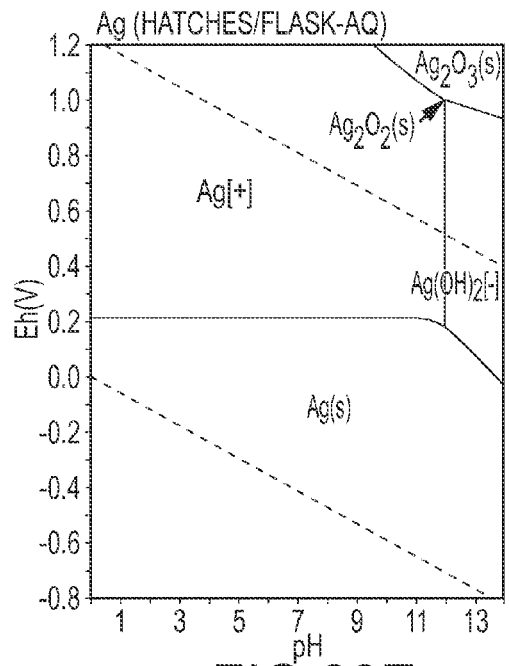
Figure 24A:
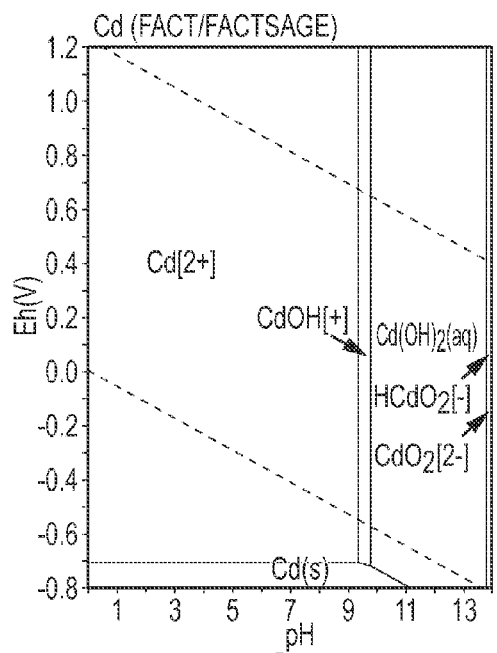
FIGS. 24A-C depict prior art Pourbaix diagrams under specified conditions for primary species of cadmium.
Figure 24B:
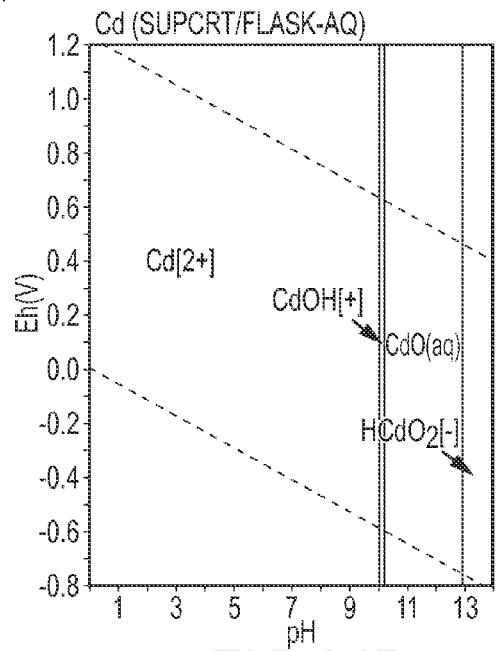
Figure 24C:
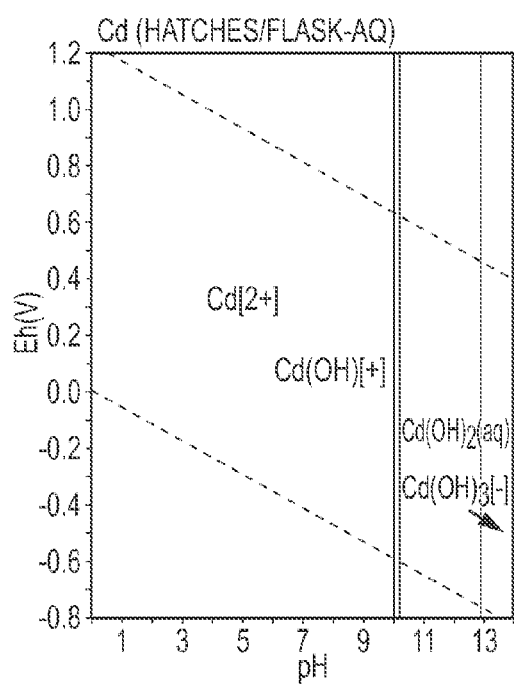
Figure 25A:
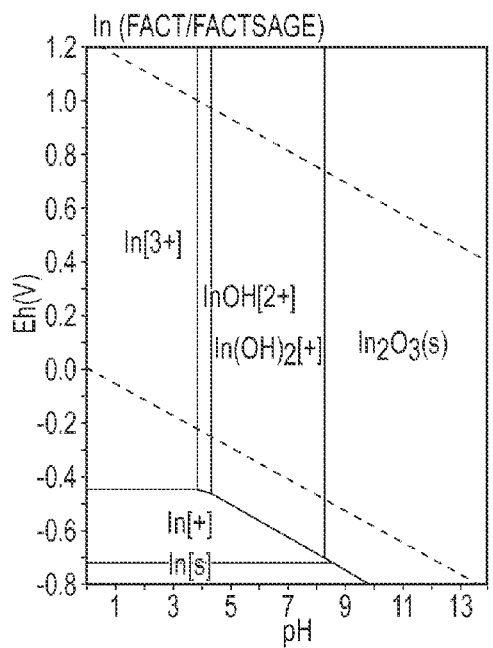
FIGS. 25A-B depict prior art Pourbaix diagrams under specified conditions for primary species of indium.
Figure 25B:
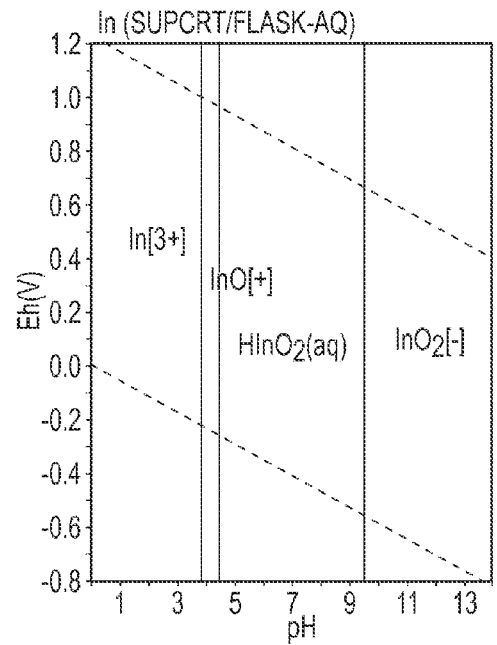
Figure 26B:
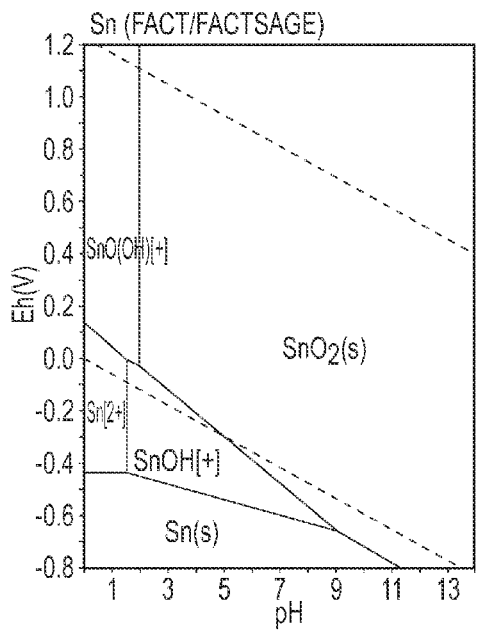
Figure 26B:
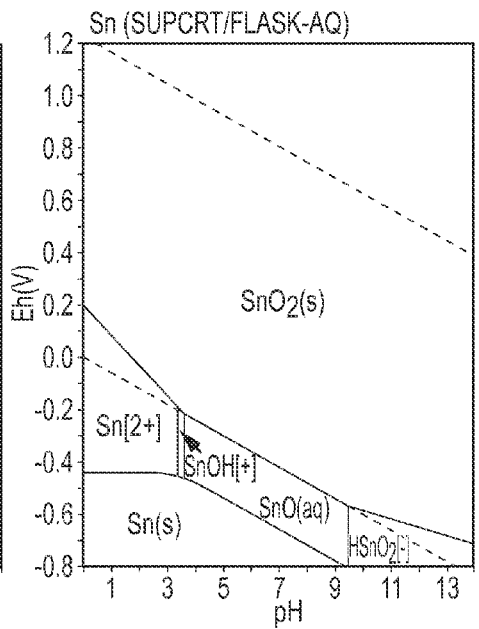
Figure 26C:
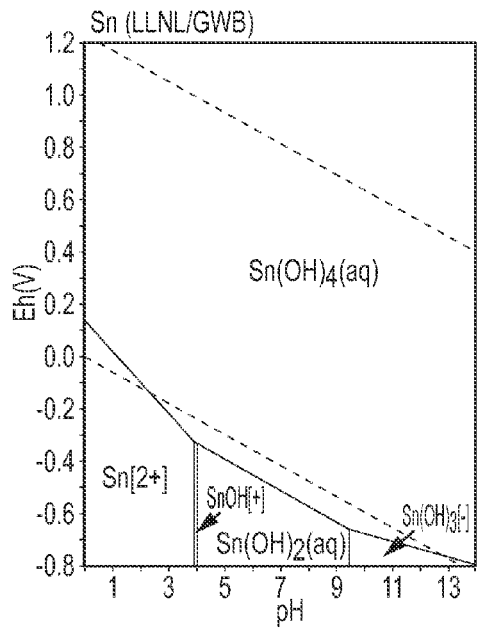
Figure 26E:
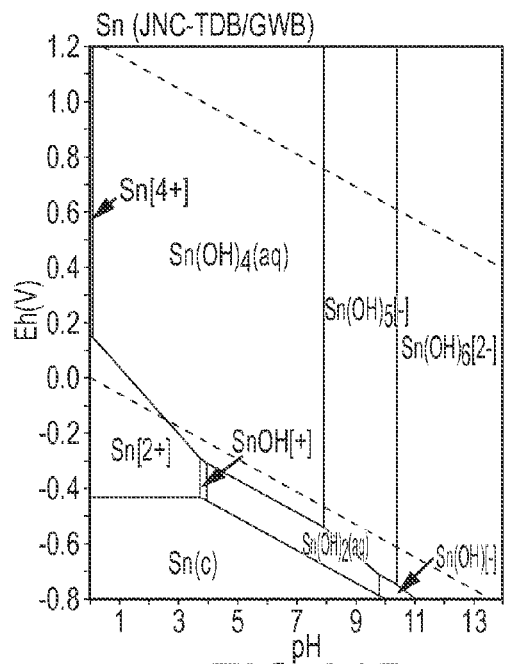
Figure 26E:
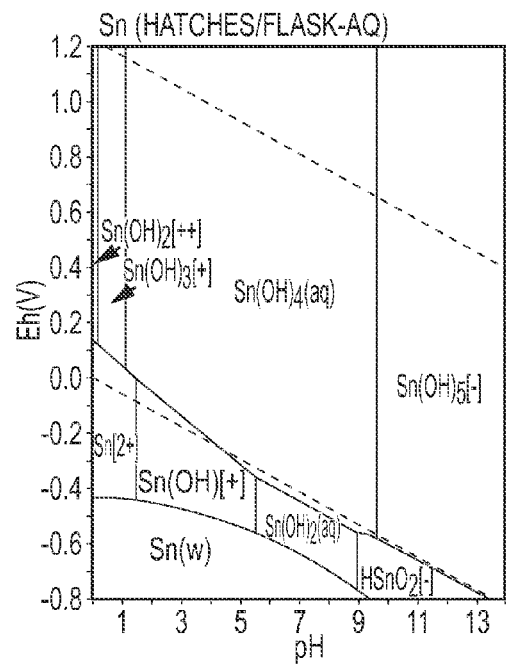
Figure 27B:
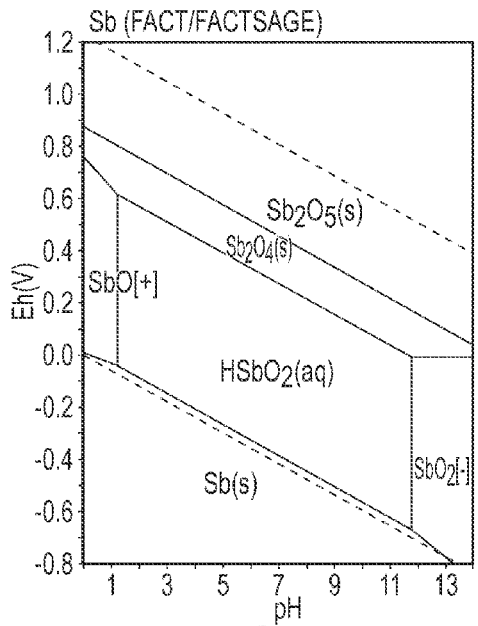
Figure 27B:
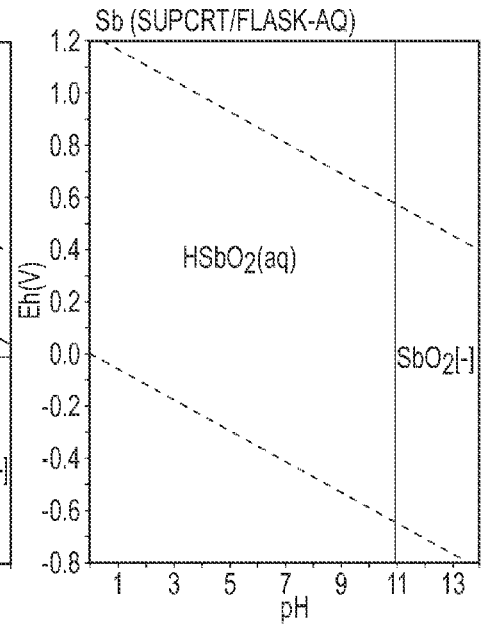
Figure 27C:
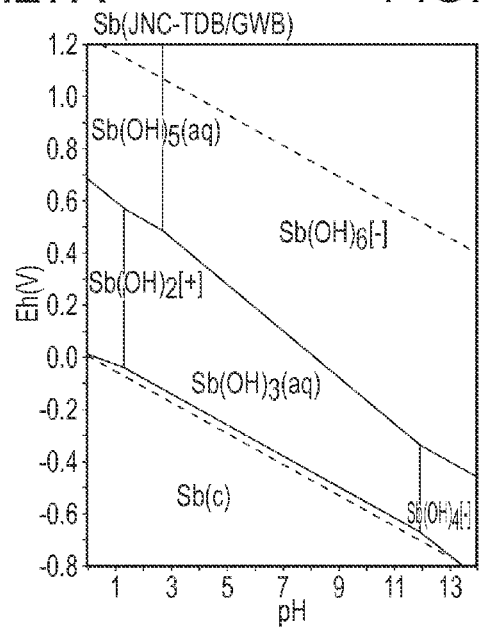
Figure 27D:
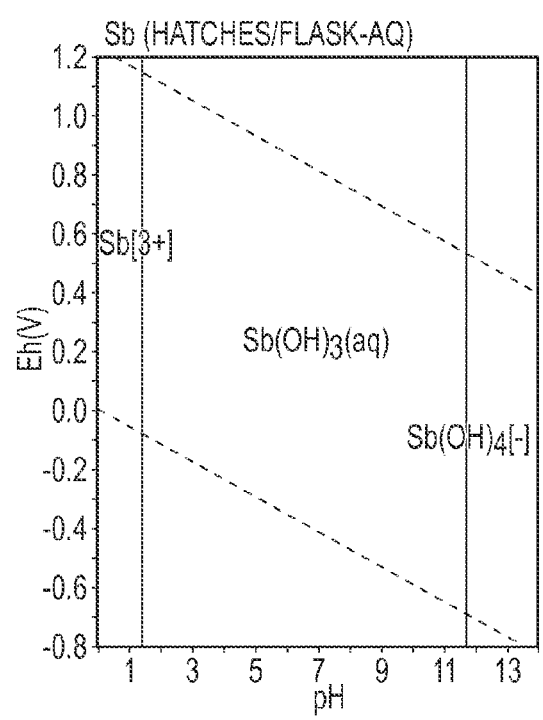
Figure 28:
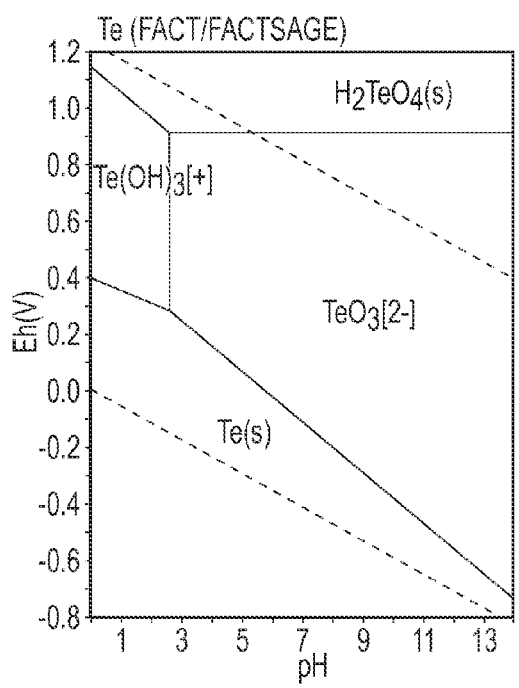
FIG. 28 depicts a prior art Pourbaix diagram under specified conditions for primary species of tellurium.
Figure 29:
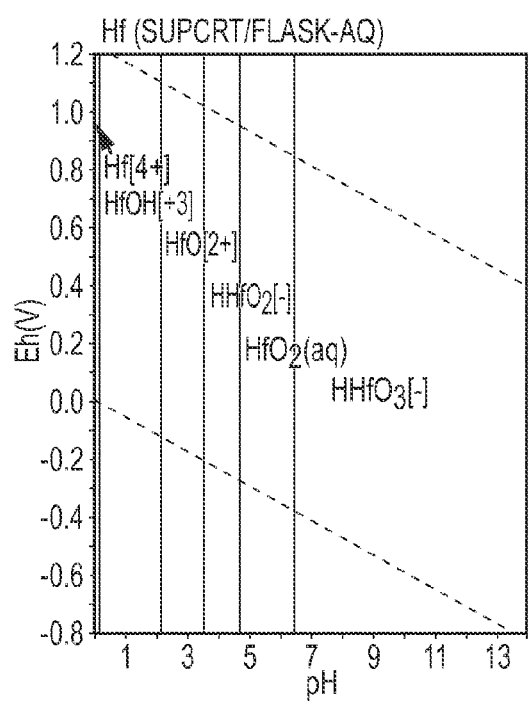
FIG. 29 depicts a prior art Pourbaix diagram under specified conditions for primary species of hafnium.
Figure 30:
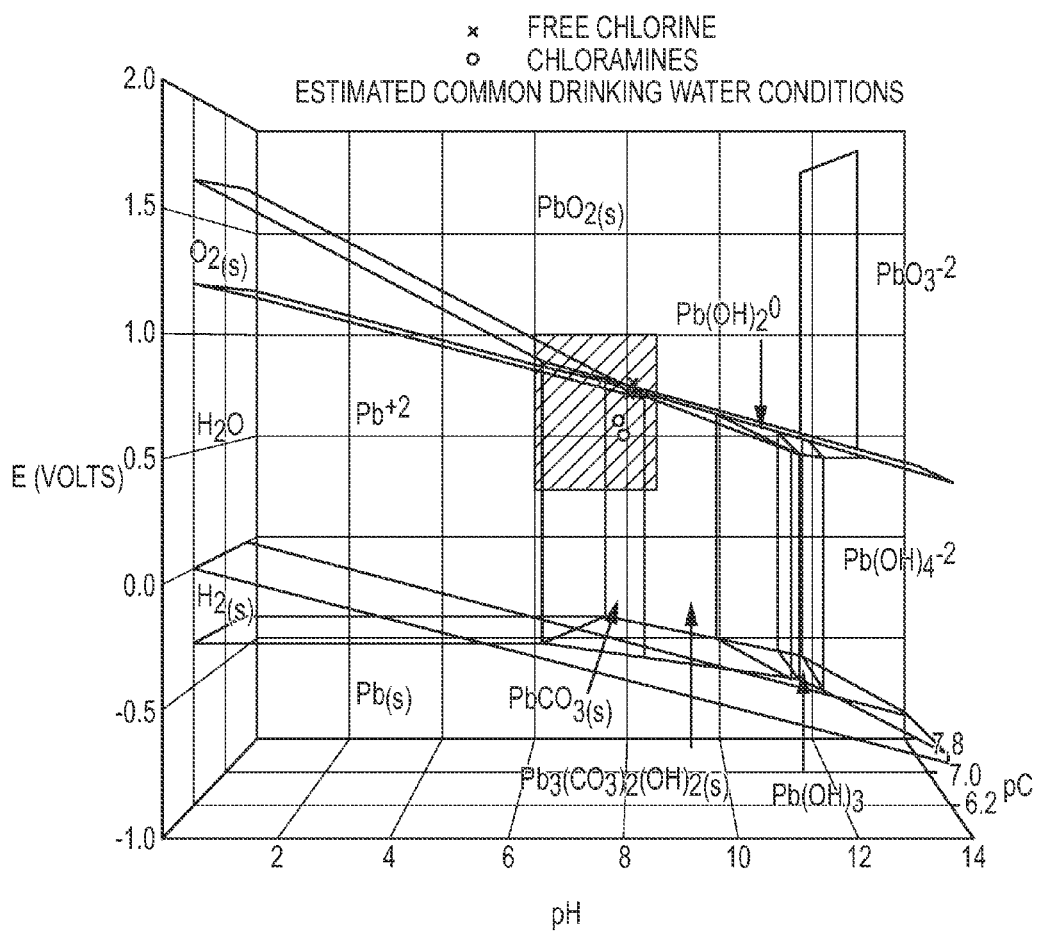
FIG. 30 depicts a prior art Pourbaix diagram under specified conditions for primary species of lead.
Figure 33:
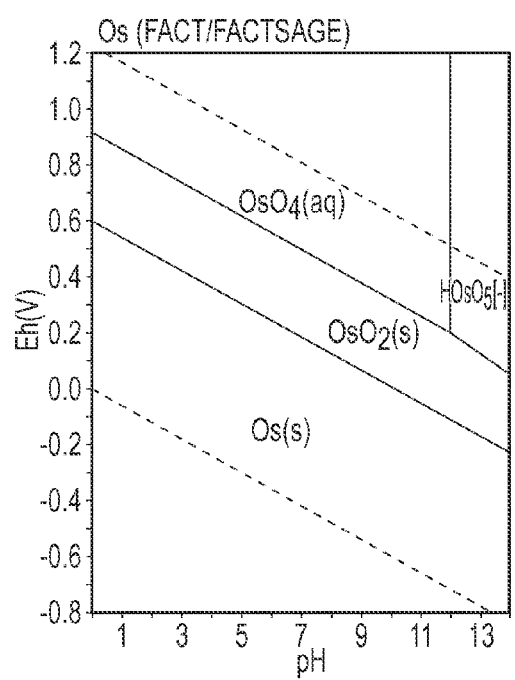
FIG. 33 depicts a prior art Pourbaix diagram under specified conditions for primary species of osmium.
Figure 34:
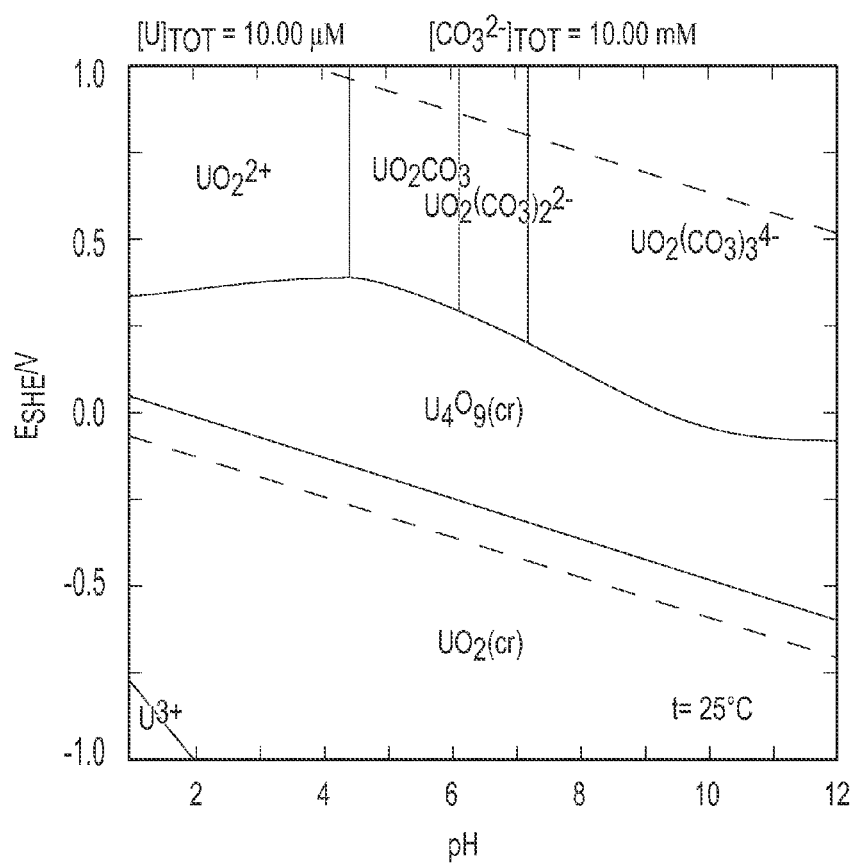
FIG. 34 depicts a prior art Pourbaix diagram under specified conditions for primary species of uranium.
Figure 36A:
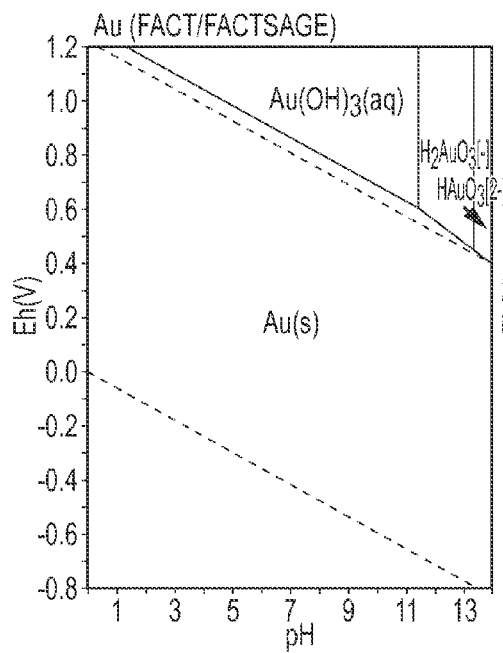
FIGS. 36A-C depict prior art Pourbaix diagrams under specified conditions for primary species of gold.
Figure 36B:
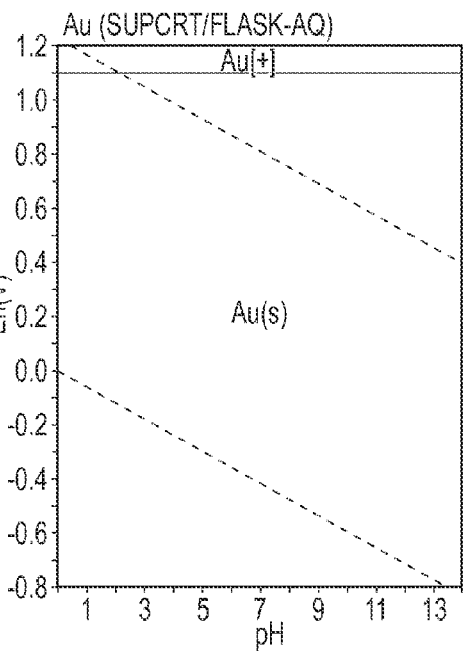
Figure 36C:
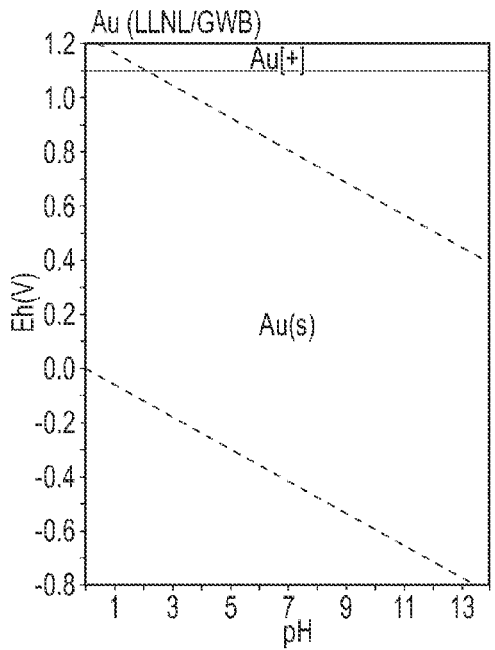
Figure 37A:
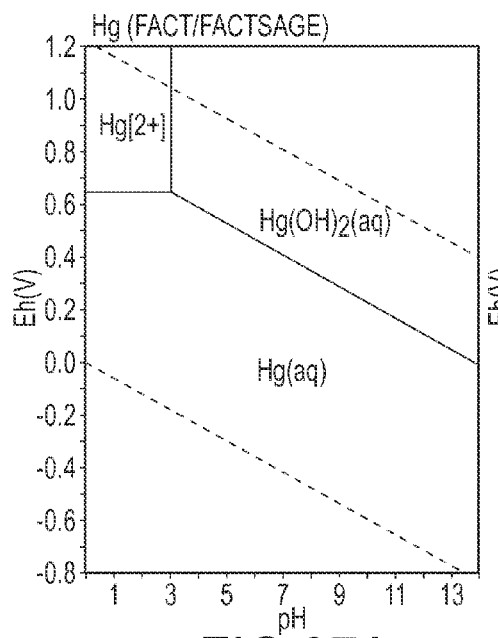
FIGS. 37A-D depict prior art Pourbaix diagrams under specified conditions for primary species of mercury.
Figure 37B:
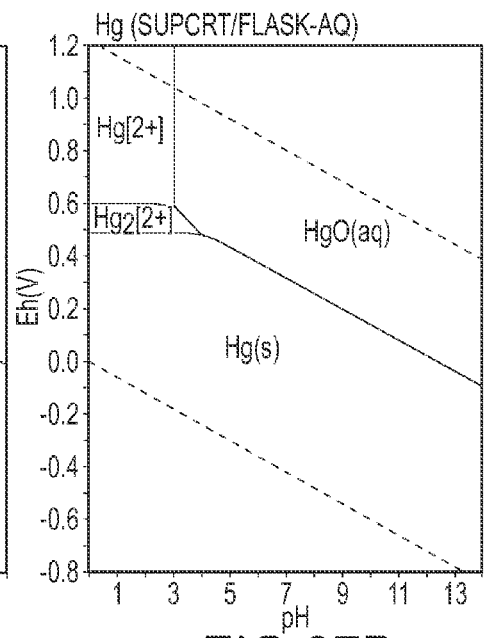
Figure 37C:
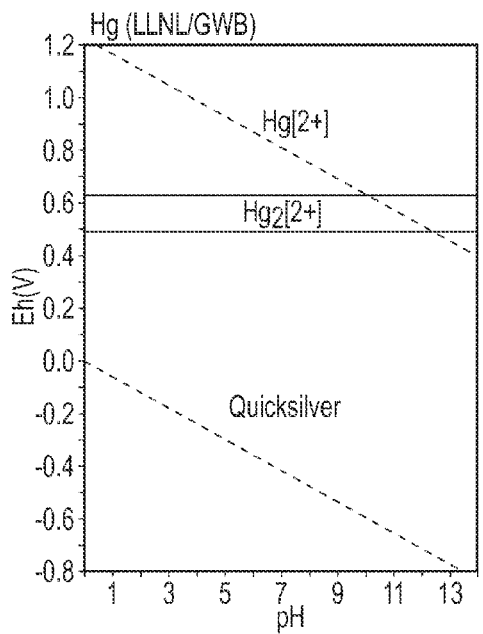
Figure 37D:
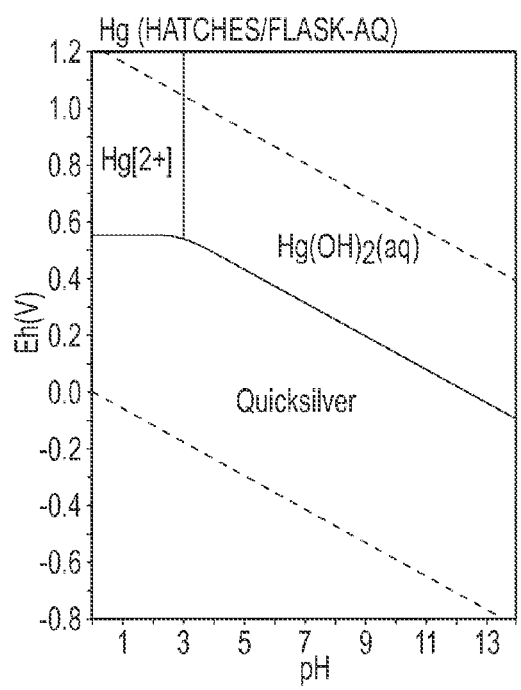
Figure 38A:
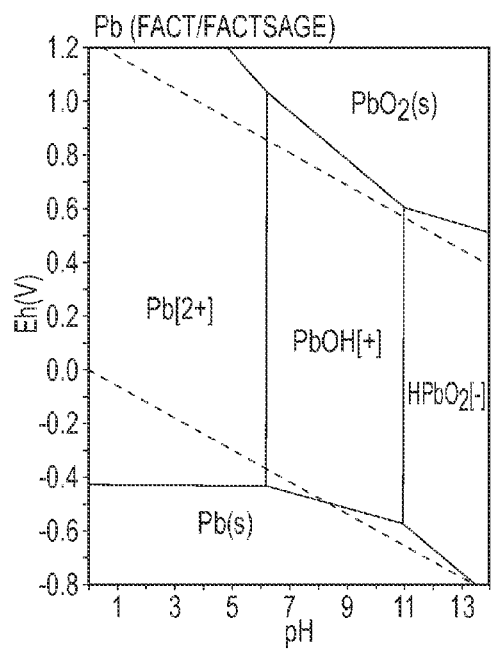
Figure 38B:
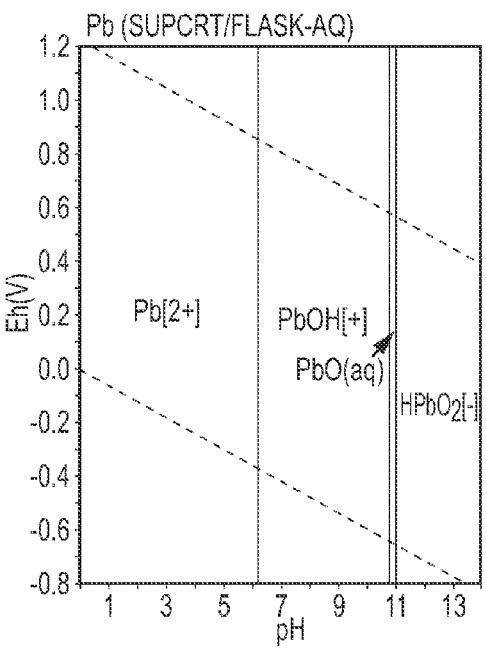
Figure 38C:
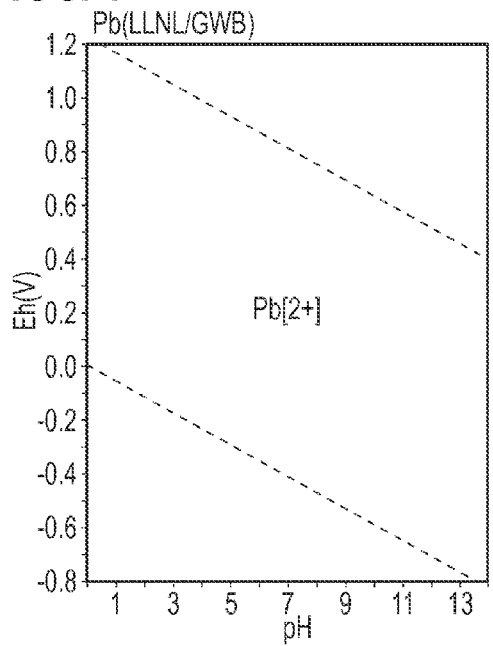
Figure 38E:
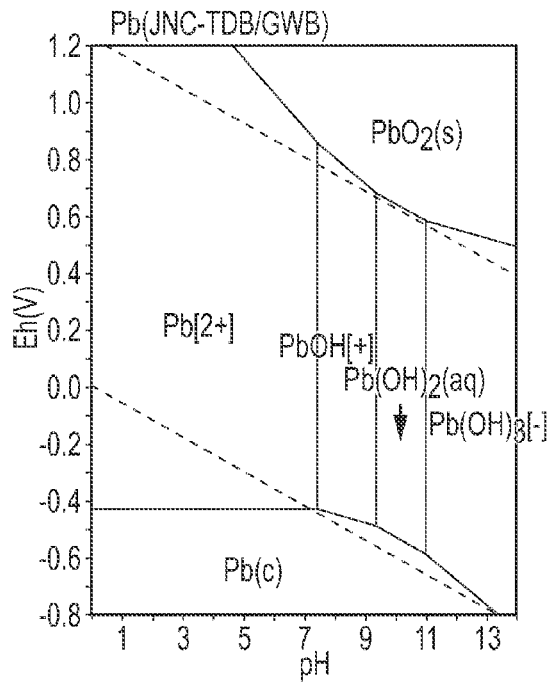
Figure 38E:
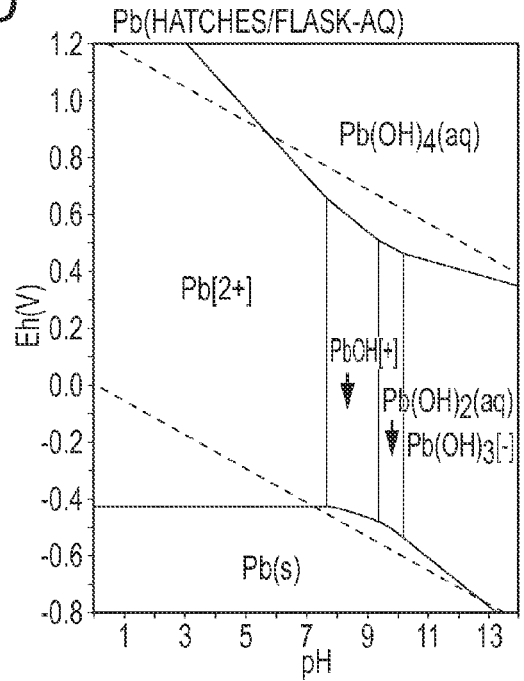

As illustrated by FIG. 1, the present disclosure is directed to removal from and/or detoxification of water, a water-handling system, or an aqueous medium or other aqueous media, of a target material or target material-containing species, such as a pollutant or contaminant, by a rare earth-containing composition, additive, or particle. Preferably, the rare earth-containing composition, additive, or particle is a processed rare earth-containing composition, additive or particle. In some embodiments, the target material or target material-containing species is removed and/or detoxified by forming a target material-laden rare earth-containing composition comprising the target material, target material-containing species, or a derivative thereof. The target material is one or more of an inorganic oxyspecies (other than an oxyanion), a hydroxyl species, which may comprise a hydroxide ion or hydroxyl radical, a hydrated species, or a combination thereof. The rare earth-containing composition may be soluble or insoluble and commonly is cerium, a cerium-containing compound, lanthanum, a lanthanum-containing compound, or a mixture thereof. A more common rare earth-containing composition is cerium (IV) oxide, cerium (III) oxide, a cerium (IV) salt, a cerium (III) salt, lanthanum (III) oxide, a lanthanum (III) salt, or a mixture thereof. The target material-laden rare earth composition comprises one or more of the target material and/or species thereof or a portion of the target material and/or species thereof.

Rare Earth-Containing Additive

The rare earth-containing composition, additive, and/or particles may be water-soluble, water-insoluble, a combination of water-soluble and/or water-insoluble rare earth-containing compositions, additives, and/or particles, a partially water-soluble rare earth-containing composition, additive, and/or particles, and/or a partially water-insoluble rare earth-containing composition additive and/or particles.

Commonly, the rare earth-containing composition, additive, and/or particles comprise cerium, in the form of a cerium-containing compound and/or dissociated ionic form of cerium, lanthanum, in the form of a lanthanum-containing compound and/or dissociated ionic form of lanthanum, or a mixture thereof. More common rare earth-containing composition, additives, and particles are cerium (IV) oxides, cerium (III) oxides, cerium (IV) salts, cerium (III) salts, lanthanum (III) oxides, lanthanum (III) salts, or mixtures and/or combinations thereof.

The rare earth-containing composition, additive, and/or particles may contain one or more rare earths, and be in any suitable form, such as a free-flowing powder, a liquid formulation, or other form. Examples of rare earth-containing compositions, additives, and particles include cerium (III) oxides, cerium (IV) oxides, ceric (IV) salts (such as ceric chloride, ceric bromide, ceric iodide, ceric sulfate, ceric nitrate, ceric chlorate, and ceric oxalate), cerium (III) salts (such as cerous chloride, cerous bromide, cerous iodide, cerous sulfate, cerous nitrate, cerous chlorate, cerous chloride, and cerous oxalate), lanthanum (III) oxides, a lanthanum (III) salts (such as lanthanum chloride, lanthanum bromide, lanthanum iodide, lanthanum chlorate, lanthanum sulfate, lanthanum oxalate, and lanthanum nitrate), and mixtures thereof.

The rare earth and/or rare earth-containing composition in the rare earth-containing additive can be rare earths in elemental, ionic or compounded forms. The rare earth and/or rare earth-containing composition can be contained in a fluid, such as water, or in the form of nanoparticles, particles larger than nanoparticles, agglomerates, or aggregates or combinations and/or mixtures thereof. The rare earth and/or rare earth-containing composition can be supported or unsupported. The rare earth and/or rare earth-containing composition can comprise one or more rare earths. The rare earths may be of the same or different valence and/or oxidation states and/or numbers. The rare earths can be a mixture of different rare earths, such as two or more of yttrium, scandium, cerium, lanthanum, praseodymium, and neodymium.

The rare earth and/or rare earth-containing composition is, in one application, a processed rare earth-containing composition and does not include, or is substantially free of, a naturally occurring and/or derived mineral. In one formulation, the rare earth and/or rare earth-containing composition is substantially free of one or more elements in Group 1, 2, 4-15, or 17 of the Periodic Table, and is substantially free of a radioactive species, such as uranium, sulfur, selenium, tellurium, and polonium.

In some formulations, the rare earth-containing composition comprises one or more rare earths. While not wanting to be limited by example, the rare earth-containing composition can comprise a first rare earth and a second rare earth. The first and second rare earths may have the same or differing atomic numbers. In some formulations, the first rare earth comprises cerium (III) and the second rare earth comprises a rare earth other than cerium (III). The rare earth other than cerium (III) can be one or more trivalent rare earths, cerium (IV), or any other rare other than trivalent cerium. For example, a mixture of rare earth-containing compositions can comprise a first rare earth having a +3 oxidation state and a second rare earth having a +4 oxidation state. In some embodiments, the first and second rare earths are the same and comprise cerium. More specifically, the first rare earth comprises cerium (III) and the second rare earth comprises cerium (IV). Preferably, the cerium is primarily in the form of a water-soluble cerium (III) salt, with the remaining cerium being present as cerium oxide, a substantially water insoluble cerium composition.

In one formulation, the cerium is primarily in the form of cerium (IV) oxide while the remaining cerium is present as a dissociated cerium (III) salt. For rare earth-containing compositions having a mixture of +3 and +4 oxidations states commonly at least some of the rare earth has a +4 oxidation sate, more commonly at least most of the rare earth has a +4 oxidation state, more commonly at least about 75 wt % of the rare earth has a +4 oxidation state, even more commonly at least about 90 wt % of the rare earth has a +4 oxidation state, and yet even more commonly at least about 98 wt % of the rare earth has a +4 oxidation state. The rare earth-containing composition commonly includes at least about 1 ppm, more commonly at least about 10 ppm, and even more commonly at least about 100 ppm of a cerium (III) salt. While in some embodiments, the rare earth-containing composition includes at least about 0.0001 wt % cerium (III) salt, preferably at least about 0.001 wt % cerium (III) salt and even more preferably at least about 0.01 wt % cerium (III) salt calculated as cerium oxide. Moreover, in some embodiments, the rare earth composition-containing commonly has at least about 20,000 ppm cerium (IV), more commonly at least about 100,000 ppm cerium (IV) and even more commonly at least about 250,000 ppm cerium (IV).

In some formulations, the molar ratio of cerium (IV) to cerium (III) is about 1 to about $1 \times 10^{-6}$, more commonly is about 1 to about $1 \times 10^{-5}$, even more commonly is about 1 to about $1 \times 10^{-4}$, yet even more commonly is about 1 to about $1 \times 10^{-3}$, still yet even more commonly is about 1 to about $1 \times 10^{-2}$, still yet even more commonly is about 1 to about $1 \times 10^{-1}$, or still yet even more commonly is about 1 to about 1. Moreover, in some formulations the molar ratio of cerium (III) to cerium (IV) is about 1 to about $1 \times 10^{-6}$, more commonly is about 1 to about $1 \times 10^{-5}$, even more commonly is about 1 to about $1 \times 10^{-4}$, yet even more commonly is about 1 to about $1 \times 10^{-3}$, still yet even more commonly is about 1 to about $1 \times 10^{-2}$, still yet even more commonly is about 1 to about $1 \times 10^{-1}$, or still yet even more commonly is about 1 to about 1. Further, these molar ratios apply for any combinations of soluble and insoluble forms of Ce(III) and soluble and insoluble forms of Ce(IV).

In one formulation, the cerium is primarily in the form of a dissociated cerium (III) salt, with the remaining cerium being present as cerium (IV) oxide. For rare earth-containing compositions having a mixture of +3 and +4 oxidations states commonly at least some of the rare earth has a +3 oxidation sate, more commonly at least most of the rare earth has a +3 oxidation state, more commonly at least about 75 wt % of the rare earth has a +3 oxidation state, even more commonly at least about 90 wt % of the rare earth has a +3 oxidation state, and yet even more commonly at least about 98 wt % of the rare earth has a +3 oxidation state. The rare earth-containing composition commonly includes at least about 1 ppm, more commonly at least about 10 ppm, and even more commonly at least about 100 ppm cerium (IV) oxide. While in some embodiments, the rare earth-containing composition includes at least about 0.0001 wt % cerium (IV), preferably at least about 0.001 wt % cerium (IV) and even more preferably at least about 0.01 wt % cerium (IV) calculated as cerium oxide. Moreover, in some embodiments, the rare earth composition-containing commonly has at least about 20,000 ppm cerium (III), more commonly at least about 100,000 ppm cerium (III) and even more commonly at least about 250,000 ppm cerium (III).

In some formulations, the molar ratio of cerium (III) to cerium (IV) is about 1 to about $1\times10^{-6}$, more commonly is about 1 to about $1\times10^{-5}$, even more commonly is about 1 to about $1\times10^{-4}$, yet even more commonly is about 1 to about $1\times10^{-3}$, still yet even more commonly is about 1 to about $1\times10^{-2}$, still yet even more commonly is about 1 to about $1\times10^{-1}$, or still yet even more commonly is about 1 to about 1. Moreover, in some formulations the molar ratio of cerium (IV) to cerium (III) is about 1 to about $1\times10^{-6}$, more commonly is about 1 to about $1\times10^{-5}$, even more commonly is about 1 to about $1\times10^{-4}$, yet even more commonly is about 1 to about $1\times10^{-3}$, still yet even more commonly is about 1 to about $1\times10^{-2}$, still yet even more commonly is about 1 to about $1\times10^{-1}$, or still yet even more commonly is about 1 to about 1. Further, these molar ratios apply for any combinations of soluble and insoluble forms of Ce(III) and soluble and insoluble forms of Ce(IV).

Having a mixture of +3 and +4 cerium, preferably in the form of a dissociated cerium (III) salt and a cerium (IV) composition, can be advantageous. Preferred, non-limiting examples of cerium (IV) compositions are: cerium (IV) dioxide, cerium (IV) oxide, cerium (IV) oxyhydroxide, cerium (IV) hydroxide, and hydrous cerium (IV) oxide. For example, having dissociated cerium (III) provides for the opportunity to take advantage of cerium (III) solution sorbtion and/or precipitation chemistries, such as, but not limited to, the formation of insoluble cerium oxyanion compositions. Furthermore, having a cerium (IV) composition presents, provides for the opportunity to take advantage of sorbtion and oxidation/reduction chemistries of cerium (IV), such as, the strong interaction of cerium (IV) with compositions such as metal and/or metalloid target material-containing species. Commonly, cerium (IV) is also referred to as cerium (+4) and/or ceric.

In one formulation, the rare earth composition comprises a water-soluble rare earth composition having a +3 oxidation state. Non-limiting examples of suitable water-soluble rare earth compositions include rare earth chlorides, rare earth bromides, rare earth iodides, rare earth astatides, rare earth nitrates, rare earth sulfates, rare earth oxalates, rare earth perchlorates, rare earth carbonates, and mixtures thereof. In one formulation, the rare earth-containing additive includes water-soluble cerium (III) and lanthanum (III) compositions. In some applications, the water-soluble cerium composition comprises cerium (III) chloride, $CeCl_3$. Commonly, cerium (III) is also referred to as cerium (+3) and/or cerous.

More preferably, the rare earth composition comprises a water-soluble cerium +3 composition. Non-limiting examples of suitable water-soluble cerium +3 compositions are cerium (III) chloride, cerium (III) nitrate, cerium (III) sulfate, cerium (III) oxalate, and a mixture thereof.

In some formulations, the water-soluble cerium (III) composition may comprise, in addition to cerium, one or more other water soluble rare earths. The rare earths other than cerium include yttrium, scandium, lanthanum, praseodymium, neodymium, samarium, europium, gadolinium, terbium, dysprosium, holmium, erbium, thulium, ytterbium, and lutetium. The other rare earths may and may not be water-soluble.

In some formulations, the water-soluble cerium-containing additive contains water-soluble cerium (III) and one or more other water-soluble trivalent rare earths (such as, but not limited to, one or more of lanthanum, neodymium, praseodymium and samarium). The molar ratio of cerium (III) to the other trivalent rare earths is commonly at least about 1:1, more commonly at least about 10:1, more commonly at least about 15:1, more commonly at least about 20:1, more commonly at least about 25:1, more commonly at least about 30:1, more commonly at least about 35:1, more commonly at least about 40:1, more commonly at least about 45:1, and more commonly at least about 50:1.

In some formulations, the water-soluble cerium-containing additive contains cerium (III) and one or more of water-soluble lanthanum, neodymium, praseodymium and samarium. The water-soluble rare earth-containing additive commonly includes at least about 0.01 wt. % of one or more of lanthanum, neodymium, praseodymium and samarium. The water-soluble rare earth-containing additive commonly has on a dry basis no more than about 10 wt. % La, more commonly no more than about 9 wt. % La, even more commonly no more than about 8 wt. % La, even more commonly no more than about 7 wt % La, even more commonly no more than about 6 wt. % La, even more commonly no more than about 5 wt. % La, even more commonly no more than about 4 wt. % La, even more commonly no more than about 3 wt. % La, even more commonly no more than about 2 wt. % La, even more commonly no more than about 1 wt. % La, even more commonly no more than about 0.5 wt. % La, and even more commonly no more than about 0.1 wt. % La. The water-soluble rare earth-containing additive commonly has on a dry basis no more than about 8 wt. % Nd, more commonly no more than about 7 wt. % Nd, even more commonly no more than about 6 wt. % Nd, even more commonly no more than about 5 wt. % Nd, even more commonly no more than about 4 wt. % Nd, even more commonly no more than about 3 wt % Nd, even more commonly no more than about 2 wt. % Nd, even more commonly no more than about 1 wt. % Nd, even more commonly no more than about 0.5 wt. % Nd, and even more commonly no more than about 0.1 wt. % Nd. The water-soluble rare earth-containing additive commonly has on a dry basis no more than about 5 wt. % Pr, more commonly no more than about 4 wt. % Pr, even more commonly no more than about 3 wt. % Pr, even more commonly no more than about 2.5 wt. % Pr, even more commonly no more than about 2.0 wt. % Pr, even more commonly no more than about 1.5 wt. % Pr, even more commonly no more than about 1.0 wt. % Pr, even more commonly no more than about 0.5 wt. % Pr, even more commonly no more than about 0.4 wt. % Pr, even more commonly no more than about 0.3 wt. % Pr, even more commonly no more than about 0.2 wt. % Pr, and even more commonly no more than about 0.1 wt. % Pr. The water-soluble rare earth-containing additive commonly has on a dry basis no more than about 3 wt. % Sm, more commonly no more than about 2.5 wt. % Sm, even more commonly no more than about 2.0 wt. % Sm, even more commonly no more than about 1.5 wt. % Sm, even more commonly no more than about 1.0 wt. % Sm, even more commonly no more than about 0.5 wt. % Sm, even more commonly no more than about 0.4 wt. % Sm, even more commonly no more than about 0.3 wt. % Sm, even more commonly no more than about 0.2 wt. % Sm, even more commonly no more than about 0.1 wt. % Sm, even more commonly no more than about 0.05 wt. % Sm, and even more commonly no more than about 0.01 wt. % Sm.

In some formulations, the water-soluble cerium-containing additive contains water-soluble cerium (III) and one or more other water-soluble trivalent rare earths (such as one or more of lanthanum, neodymium, praseodymium and samarium). The molar ratio of cerium (III) to the other trivalent rare earths is commonly at least about 1:1, more commonly at least about 10:1, more commonly at least about 15:1, more commonly at least about 20:1, more commonly at least about 25:1, more commonly at least about 30:1, more commonly at least about 35:1, more commonly at least about 40:1, more commonly at least about 45:1, and more commonly at least about 50:1.

In one formulation, the rare earth-containing additive consists essentially of a water-soluble cerium (III) salt, such as a cerium (III) chloride, cerium (III) bromide, cerium (III) iodide, cerium (III) astatide, cerium perhalogenates, cerium (III) carbonate, cerium (III) nitrate, cerium (III) sulfate, cerium (III) oxalate and mixtures thereof. The rare earth in this formulation commonly is primarily cerium (III), more commonly at least about 75 mole % of the rare earth content of the rare earth-containing additive is cerium (III), that is no more than about 25 mole % of the rare earth content of the rare earth-containing additive comprises rare earths other than cerium (III). Even more commonly, the rare earth in this formulation commonly is primarily at least about 80 mole % cerium (III), yet even more commonly at least about 85 mole % cerium (III), still yet even more commonly at least about 90 mole % cerium (III), and yet still even more commonly at least about 95 mole % cerium (III).

The rare earth composition may comprise a water insoluble composition, such as a water-insoluble rare earth oxide, oxy-hydroxide, and/or hydrous oxide. The insoluble rare earth composition may be in the form of a dispersion, suspension or slurry of rare earth particulates. The rare earth particulates can have an average particle size ranging from the sub-micron, to micron or greater than micron. The insoluble rare earth composition may have a surface area of at least about 1 $m^2/g$. Commonly, the insoluble rare earth has a surface area of at least about 70 $m^2/g$. In another formulation, the insoluble rare earth composition may have a surface area from about 25 $m^2/g$ to about 500 $m^2/g$.

In some formulations, the rare earth composition may be agglomerated. Commonly, the rare earth composition may be in the form of agglomerate, the agglomerate comprising a polymeric binder and rare earth-containing composition.

In one formulation, the rare earth-containing additive comprises a rare earth and/or rare earth-containing composition comprising at least some water insoluble cerium (IV) and water-soluble cerium (III) and/or lanthanum (III). The rare earth and/or rare earth-containing composition comprise at least some water-soluble cerium (III), typically in the form of water-soluble cerium (III) salt. Commonly, the rare earth-containing additive comprises more than about 1 wt. % of a water-soluble cerium (III) composition, more commonly more than about 5 wt. % of a water-soluble cerium (III) composition, even more commonly more than about 10 wt. % of a water-soluble cerium (III) composition, yet even more commonly more than about 20 wt. % of a water-soluble cerium (III) composition, still yet even more commonly more than about 30 wt. % of a water-soluble cerium (III) composition, or still yet even more commonly more than about 40 wt. % of a water-soluble cerium (III) composition.

In accordance with some formulations, the rare earth-containing additive typically comprises more than about 50 wt. % of a water-soluble cerium (III) composition, more typically the rare earth-containing additive comprises more than about 60 wt. % of a water-soluble cerium (III) composition, even more typically the rare earth-containing additive comprises more than about 65 wt. % of a water-soluble cerium (III) composition, yet even more typically the rare earth-containing additive comprises more than about 70 wt. % of a water-soluble cerium (III) composition, still yet even more typically the rare earth-containing additive comprises more than about 75 wt. % of a water-soluble cerium (III) composition, still yet even more typically the rare earth-containing additive comprises more than about 80 wt. % of a water-soluble cerium (III) composition, still yet even more typically the rare earth-containing additive comprises more than about 85 wt. % of a water-soluble cerium (III) composition, still yet even more typically the rare earth-containing additive comprises more than about 90 wt. % of a water-soluble cerium (III) composition, still yet even more typically the rare earth-containing additive comprises more than about 95 wt. % of a water-soluble cerium (III) composition, still yet even more typically the rare earth-containing additive comprises more than about 98 wt. % of a water-soluble cerium (III) composition, still yet even more typically the rare earth-containing additive comprises more than about 99 wt. % of a water-soluble cerium (III) composition, or yet still eve more typically comprises about 100 wt. % of a water-soluble cerium (III) composition.

In some formulations, the rare earth-containing additive comprises one or more nitrogen-containing materials. The one or more nitrogen-containing materials, commonly, comprise one or more of ammonia, an ammonium-containing composition, a primary amine, a secondary amine, a tertiary amine, an amide, a cyclic amine, a cyclic amide, a polycyclic amine, a polycyclic amide, and combinations thereof. The nitrogen-containing materials are typically less than about 1 ppm, less than about 5 ppm, less than about 10 ppm, less than about 25 ppm, less than about 50 ppm, less about 100 ppm, less than about 200 ppm, less than about 500 ppm, less than about 750 ppm or less than about 1000 ppm of the water-soluble rare earth-containing additive. Commonly, the rare earth-containing additive comprises a water-soluble cerium (III) and/or lanthanum (III) composition. More commonly, the rare earth-containing additive comprises cerium (III) chloride. The rare earth-containing additive is typically dissolved in a liquid. The liquid is the rare earth-containing additive is dissolved in is preferably water.

In some formulations, the rare earth-containing additive is in the form of one or more of: an aqueous solution containing substantially dissociated, dissolved forms of the rare earths and/or rare earth-containing compositions; free flowing granules, powder, particles, and/or particulates of rare earths and/or rare earth-containing compositions containing at least some water-soluble cerium (III); free flowing aggregated granules, powder, particles, and/or particulates of rare earths and/or rare earth-containing compositions substantially free of a binder and containing at least some water-soluble cerium (III); free flowing agglomerated granules, powder, particles, and/or particulates comprising a binder and rare earths and/or rare earth-containing compositions one or both of in an aggregated and non-aggregated form and containing at least some water-soluble cerium (III); rare earths and/or rare earth-containing compositions containing at least some water-soluble cerium (III) and supported on substrate; and combinations thereof.

Regarding particulate forms of rare earth-containing compositions, the particles, in one formulation, have a particle size may be from about 1 nanometer to about 1000 nanometers. In another embodiment the particles may have a particle size less than about 1 nanometer. In yet another embodiment the particles may have a particle size from about 1 micrometer to about 1,000 micrometers.

Regarding rare earths and/or rare earth-containing compositions supported on a substrate, suitable substrates can include porous and fluid permeable solids having a desired shape and physical dimensions. The substrate, for example, can be a sintered ceramic, sintered metal, micro-porous carbon, glass fiber, cellulosic fiber, alumina, gamma-alumina, activated alumina, acidified alumina, a metal oxide containing labile anions, crystalline alumino-silicate such as a zeolite, amorphous silica-alumina, ion exchange resin, clay, ferric sulfate, porous ceramic, and the like. Such substrates can be in the form of mesh, such as screens, tubes, honeycomb structures, monoliths, and blocks of various shapes, including cylinders and toroids. The structure of the substrate will vary depending on the application. Suitable structural forms of the substrate can include a woven substrate, non-woven substrate, porous membrane, filter, fabric, textile, or other fluid permeable structure. The rare earth-containing additive can be incorporated into or coated onto a filter block or monolith for use as a filter, such as a cross-flow type filter. The rare earth and/or rare earth-containing additive can be in the form of particles coated on to or incorporated in the substrate. In some configurations, the rare earth and/or rare earth-containing additive can be ionically substituted for cations in the substrate. Typically, the rare earth-coated substrate comprises at least about 0.1% by weight, more typically 1% by weight, more typically at least about 5% by weight, more typically at least about 10% by weight, more typically at least about 15% by weight, more typically at least about 20% by weight, more typically at least about 25% by weight, more typically at least about 30% by weight, more typically at least about 35% by weight, more typically at least about 40% by weight, more typically at least about 45% by weight, and more typically at least about 50% by weight rare earth and/or rare earth-containing composition. Typically, the rare earth-coated substrate includes no more than about 95% by weight, more typically no more than about 90% by weight, more typically no more than about 85% by weight, more typically no more than about 80% by weight, more typically no more than about 75% by weight, more typically no more than about 70% by weight, and even more typically no more than about 65% by weight rare earth and/or rare earth-containing composition.

In some formulations, the rare earth-containing additive includes a rare earth-containing composition supported on, coated on, or incorporated into a substrate, preferably the rare earth-containing composition is in the form of particulates. The rare earth-containing particulates can, for example, be supported or coated on the substrate with or without a binder. The binder may be any suitable binder, such as those set forth herein.

Further regarding formulations comprising the rare earth-containing additive comprising rare earth-containing granules, powder, particles, and/or particulates agglomerated and/or aggregated together with or without a binder, such formulations commonly have a mean, median, or $P_{90}$ particle size of at least about 1 µm, more commonly at least about 5 µm, more commonly at least about 10 µm, still more commonly at least about 25 µm. In some formulations, the rare earth-containing agglomerates or aggregates have a mean, median, or $P_{90}$ particle size distribution from about 100 to about 5,000 microns; a mean, median, or $P_{90}$ particle size distribution from about 200 to about 2,500 microns; a mean, median, or $P_{90}$ particle size distribution from about 250 to about 2,500 microns; or a mean, median, or $P_{90}$ particle size distribution from about 300 to about 500 microns. In other formulations, the agglomerates and/or aggregates can have a mean, median, or $P_{90}$ particle size distribution of at least about 100 nm, specifically at least about 250 nm, more specifically at least about 500 nm, even more specifically at least about 1 µm and yet even more specifically at least about 0.5 nm, the mean, median, or $P_{90}$ particle size distribution of the agglomerates and/or aggregates can be up to about 1 micron or more. Moreover, the rare earth-containing particulates, individually and/or in the form of agglomerates and/or aggregates, can have in some cases a surface area of at least about 5 $m^2/g$, in other cases at least about 10 $m^2/g$, in other cases at least about 70 $m^2/g$, in yet other cases at least about 85 $m^2/g$, in still yet other cases at least about 100 $m^2/g$, in still yet other cases at least about 115 $m^2/g$, in still yet other cases at least about 125 $m^2/g$, in still yet other cases at least about 150 $m^2/g$, in still yet other cases at least about 300 $m^2/g$, and in still yet other cases at least about 400 $m^2/g$. In some configurations, the rare earth-containing particulates, individually and/or in the form of agglomerates or aggregates commonly can have a surface area from about 50 to about 500 $m^2/g$, or more commonly from about 110 to about 250 $m^2/g$. Commonly, the rare earth-containing agglomerate includes more than 10.01 wt. %, more commonly more than about 85 wt. %, even more commonly more than about 90 wt. %, yet even more commonly more than about 92 wt. % and still yet even more commonly from about 95 to about 96.5 wt. % rare earth-containing particulates, with the balance being primarily the binder. Stated another way, the binder can be less than about 15% by weight of the agglomerate, in some cases less than about 10% by weight, in still other cases less than about 8% by weight, in still other cases less than about 5% by weight, and in still other cases less than about 3.5% by weight of the agglomerate. In some formulations, the rare earth-containing particulates are in the form of powder and have aggregated nano-crystalline domains. The binder can include one or more polymers selected from the group consisting of thermosetting polymers, thermoplastic polymers, elastomeric polymers, cellulosic polymers and glasses. Preferably, the binder comprises a fluorocarbon-containing polymer and/or an acrylic-polymer.

In one embodiment, the rare earth-containing composition is in the form of a colloid, suspension, or slurry of particulates. The particulates commonly can have a mean, median and/or $P_{90}$ particle size of less than about 1 nanometer, more commonly a mean, median and/or $P_{90}$ particle size from about 1 nanometer to about 1,000 nanometers, even more commonly a mean, median and/or $P_{90}$ particle size from about 1 micron to about 1,000 microns, or yet even more commonly a mean, median and/or $P_{90}$ particle size of at least about 1,000 microns. Preferably, the particulates have a mean, median and/or $P_{90}$ particle size from about 0.1 to about 1,000 nm, more preferably from about 0.1 to about 500 nm. Even more preferably, the cerium (IV) particulates have a mean, median and/or $P_{90}$ particle size from about 0.2 to about 100 nm.

In some embodiments, the particulates may have a mean and/or median surface area of at least about 1 $m^2/g$, preferably a mean and/or median surface area of at least about 70 $m^2/g$. In other embodiments, the particulates may preferably have a mean and/or median surface area from about 25 $m^2/g$ to about 500 $m^2/g$ and more preferably, a mean and/or median surface area of about 100 to about 250 $m^2/g$. In some embodiments, the particulates may be in the form of one or more of a granule, crystal, crystallite, and particle.

In one application, the particulates comprise cerium (IV), typically as cerium (IV) oxide. The weight percent (wt. %) cerium (IV) content based on the total rare earth content of the cerium (IV) particulates typically is at least about 50 wt. % cerium (IV), more typically at least about 60 wt. % cerium (IV), even more typically at least about 70 wt. % cerium (IV), yet even more typically at least about 75 wt. % cerium (IV), still yet even more typically at least about 80 wt. % cerium (IV), still yet even more typically at least about 85 wt. % cerium (IV), still yet even more typically at least about 90 wt. % cerium (IV), still yet even more typically at least about 95 wt. % cerium (IV), and even more typically at least about 99 wt. % cerium (IV). Preferably, the cerium (IV) particulate is substantially devoid of rare earths other than cerium (IV). More preferably, the weight percent (wt. %) cerium (IV) content based on the total rare earth content of the cerium (IV)

particulates is about 100 wt. % cerium (IV) and comprises one or more of cerium (IV) oxide, cerium (IV) hydroxide, cerium (IV) oxyhydroxyl, cerium (IV) hydrous oxide, cerium (IV) hydrous oxyhydroxyl, $CeO_2$, and/or $Ce(IV)(O)_w(OH)_x(OH)_y \cdot zH_2O$, where w, x, y and can be zero or a positive, real number.

The Medium (or Media) 104

The medium (or media) 104 can be any fluid stream. The fluid stream may be derived from any source containing one or more target materials. Commonly, the medium (or media) 104 is derived from any aqueous source containing one or more target materials. Non-limiting examples of a suitable medium (or media) 104 is recreational waters, municipal waters (such as, sewage, waste, agricultural, or ground waters), industrial (such as cooling, boiler, or process waters), wastewaters, well waters, septic waters, drinking waters, naturally occurring waters, (such as a lake, pond, reservoir, river, or stream), and/or other waters and/or aqueous process streams.

Non-limiting examples of recreational waters are swimming pool waters, brine pool waters, therapy pool waters, diving pool waters, sauna waters, spa waters, and hot tub waters. Non-limiting examples of municipal waters are drinking waters, waters for irrigation, well waters, waters for agricultural use, waters for architectural use, reflective pool waters, water-fountain waters, water-wall waters, use, non-potable waters for municipal use and other non-potable municipal waters. Wastewaters include without limitation, municipal and/or agricultural run-off waters, septic waters, waters formed and/or generated during an industrial and/or manufacturing process, waters formed and/or generated by a medical facility, waters associated with mining, mineral production, recovery and/or processing (including petroleum), evaporation pound waters, and non-potable disposal waters, Well waters include without limitation waters produced from a subsurface well for the purpose of human consumption, agricultural use (including consumption by a animal, irrigation of crops or consumption by domesticated farm animals), mineral-containing waters, waters associated with mining and petroleum production. Non-limiting examples of naturally occurring waters include associated with rains, storms, streams, rivers, lakes, aquifers, estuaries, lagoons, and such.

The medium (or media) 104 is typically obtained from one or more of the above sources and processed, conveyed and/or manipulated by a water handling system. The medium (or media) can be primarily the water in a water handling system.

The water handling system components and configuration can vary depending on the treatment process, water, and water source. While not wanting to limited by example, municipal and/or wastewater handling systems typically one or more of the following process units: clarifying, disinfecting, coagulating, aerating, filtering, separating solids and liquids, digesting, and polishing. The number and ordering of the process units can vary. Furthermore, some process units may occur two or more times within a water handling system. It can be appreciated that the one or more process units are in fluid communication.

The water handling system may or may not have a clarifier. Some water handling systems may have more than one clarifier, such as primary and final clarifiers. Clarifiers typically reduce cloudiness of the water by removing biological matter (such as bacteria and/or algae), suspended and/or dispersed chemicals and/or particulates from the water. Commonly a clarification process occurs before and/or after a filtration process.

The water handling system may or may not contain a filtering process. Typically, the water handling system contains at least one filtering process. Non-limiting examples of common filtering processes include without limitation screen filtration, trickling filtration, particulate filtration, sand filtration, macro-filtration, micro-filtration, ultra-filtration, nano-filtration, reverse osmosis, carbon/activated carbon filtration, dual media filtration, gravity filtration and combinations thereof. Commonly a filtration process occurs before and/or after a disinfection process. For example, a filtration process to remove solid debris, such as solid organic matter and grit from the water typically precedes the disinfection process. In some embodiments, a filtration process, such as an activated carbon and/or sand filtrations follows the disinfection process. The post-disinfection filtration process removes at least some of the chemical disinfectant remaining in the treated water.

The water handling system may or may not include a disinfection process. The disinfection process may include without limitation treating the aqueous stream and/or water with one or more of fluorine, fluorination, chlorine, chlorination, bromine, bromination, iodine, iodination, ozone, ozonation, electromagnetic irradiation, ultra-violet light, gama rays, electrolysis, chlorine dioxide, hypochlorite, heat, ultra-sound, trichloroisocyanuric acid, soaps/detergents, alcohols, bromine chloride (BrCl), cupric ion ($Cu^{2+}$), silver, silver ion ($Ag^+$) permanganate, phenols, and combinations thereof. Preferably, the water handling system contains a single disinfection process, more preferably the water handling system contains two or more disinfection processes. Disinfection process are typically provided to one of at least remove, kill and/or detoxify pathogenic material contained in the water. Typically, the pathogenic material comprises biological contaminants, in particular biological contaminants comprising the target materials. In some embodiments, the disinfection process converts the target material species into a species that can be removed and/or detoxified by the rare earth-containing composition, additive, and/or particle or particulate.

The water handling system may or may not include coagulation. The water handling system may contain one or more coagulation processes. Typically, the coagulation process includes adding a flocculent to the water in the water handling system. Typical flocculants include aluminum sulfate, polyelectrolytes, polymers, lime and ferric chloride. The flocculent aggregates the particulate matter suspended and/or dispersed in the water, the aggregated particulate matter forms a coagulum. The coagulation process may or may not include separating the coagulum from the liquid phase. In some embodiments, coagulation may comprise part, or all, the entire clarification process. In other embodiments, the coagulation process is separate and distinct from the clarification process. Typically, the coagulation process occurs before the disinfection process.

The water handling system may or may not include aeration. Within the water handing system, aeration comprises passing a stream of air and/or molecular oxygen through the water contained in the water handling system. The aeration process promotes oxidation of contaminants contained in the water being processed by the water handling system, preferably the aeration promotes the oxidation of biological contaminates, such as target materials. In some embodiments, the aeration process converts the target material species into a species that can be removed and/or detoxified by the rare earth-containing composition, additive, and/or particle or particulate. The water handling system may contain one or more aeration processes. Typically, the disinfection process occurs after the aeration process.

The water handling system may or may not have one or more of a heater, a cooler, and a heat exchanger to heat and/or cool the water being processed by the water handling system. The heater may be any method suitable for heating the water. Non-limiting examples of suitable heating processes are solar heating systems, electromagnetic heating systems (such as, induction heating, microwave heating and infrared), immersion heaters, and thermal transfer heating systems (such as, combustion, stream, hot oil, and such, where the thermal heating source has a higher temperature than the water and transfers heat to the water to increase the temperature of the water). The heat exchanger can be any process that transfers thermal energy to or from the water. The heat exchanger can remove thermal energy from the water to cool and/or decrease the temperature of the water. Or, the heat exchanger can transfer thermal energy to the water to heat and/or increase the temperature of the water. The cooler may be any method suitable for cooling the water. Non-limiting examples of suitable cooling process are refrigeration process, evaporative coolers, and thermal transfer cooling systems (such as, chillers and such where the thermal (cooling) source has a lower temperature than the water and removes heat from the water to decrease the temperature of the water). Any of the clarification, disinfection, coagulation, aeration, filtration, sludge treatment, digestion, nutrient control, solid/liquid separation, and/or polisher processes may further include before, after and/or during one or both of a heating and cooling process. It can be appreciated that a heat exchanger typically includes at least one of heating and cooling process.

The water handling system may or may not include a digestion process. Typically, the digestion process is one of an anaerobic or aerobic digestion process. In some configurations, the digestion process may include one of an anaerobic or aerobic digestion process followed by the other of the anaerobic or aerobic digestion processes. For example, one such configuration can be an aerobic digestion process followed by an anaerobic digestion process. Commonly, the digestion process comprises microorganisms that breakdown the biodegradable material contained in the water. In some embodiments, the biodegradable material includes a target material. Furthermore, the digestion process converts the target material species into a species that can be removed and/or detoxified by the rare earth-containing composition, additive, and/or particle or particulate. The anaerobic digestion of biodegradable material proceeds in the absence of oxygen, while the aerobic digestion of biodegradable material proceeds in the presence of oxygen. In some water handling systems the digestion process is typically referred to as biological stage/digester or biological treatment stage/digester. Moreover, in some systems the disinfection process comprises a digestion process.

The water handling system may or may not include a nutrient control process. Furthermore, the water handling system may include one or more nutrient control processes. The nutrient control process typically includes nitrogen and/or phosphorous control. Moreover, nitrogen control commonly may include nitrifying bacteria. Typically, phosphorous control refers to biological phosphorous control, preferably controlling phosphorous that can be used as a nutrient for algae. Nutrient control typically includes processes associated with control of oxygen demand substances, which include in addition to nutrients, pathogens, and inorganic and synthetic organic compositions. The nutrient control process can occur before or after the disinfection process. In some embodiments, the nutrient control process converts the target material species into a species that can be removed and/or detoxified by the rare earth-containing composition, additive, and/or particle or particulate.

The water handling system may or may not include a solid/liquid separation process. Preferably, the water handling system includes one or more solid/liquid separation processes. The solid/liquid separation process can comprise any process for separating a solid phase from a liquid phase, such as water. Non-limiting examples of suitable solid liquid separation processes are clarification (including trickling filtration), filtration (as described above), vacuum and/or pressure filtration, cyclone (including hydrocyclones), floatation, sedimentation (including gravity sedimentation), coagulation (as described above), sedimentation (including, but not limited to grit chambers), and combinations thereof.

The water handling system may or may not include a polisher. The polishing process can include one or more of removing fine particulates from the water, an ion-exchange process to soften the water, an adjustment to the pH value of the water, or a combination thereof. Typically, the polishing process is after the disinfection step.

While the water handling system typically includes one or more of a clarifying, disinfecting, coagulating, aerating, filtering, separating solids and liquids, digesting, and polishing processes, the water handling system may further include additional processing equipment. The additional processing equipment includes without limitation holding tanks, reactors, purifiers, treatment vessels or units, mixing vessels or elements, wash circuits, precipitation vessels, separation vessels or units, settling tanks or vessels, reservoirs, pumps, cooling towers, heat exchangers, valves, boilers, gas liquid separators, nozzles, tenders, and such. Furthermore, the water handling system includes conduit(s) interconnecting the unit operations and/or additional processing equipment. The conduits include without limitation piping, hoses, channels, aqua-ducts, ditches, and such. The water is conveyed to and from the unit operations and/or additional processing equipment by the conduit(s). Moreover, each unit operations and/or additional processing equipment is in fluid communication with the other unit operations and/or additional processing equipment by the conduits.

The Target Material

The aqueous medium that is treated by the rare earth-containing composition, additive, and/or particles may contain one or more target materials. The one or more target material-containing species may include metals (other than scandium, yttrium and lanthanoids), metalloids, and/or radioactive isotopes in various forms. In some aqueous media, the target material-containing species include, without limitation, a hydrated metal (including without limitation alkali metals, alkaline earth metals, actinoids, transition metals, and post-transition metals and excluding scandium, yttrium and lanthanoids), metalloid, and/or radioactive isotope, a hydrated metal, metalloid, or radioactive isotope oxyspecies in the form of an anion, cation, or having no net charge (e.g., $M_aO_x^{n+}$ or $M_aO_x^0$ where $0<a<4$, $0<x<4$, and $0<n<6$), a positively, negatively, or uncharged metal, metalloid, or radioactive isotope carbonate (e.g., $M_c(CO_3)_y$ where $0<c\leq4$ and $0<y\leq4$), or a positively, negatively, or uncharged metal, metalloid, or radioactive isotope hydroxyl species (particularly a metal or metalloid hydroxide (e.g., $M(OH)_z$ where $0<z\leq8$)), a positively, negatively, uncharged metal, metalloid, or radioactive isotope oxyhydroxyl species and mixtures thereof. The target material-containing species may be in the form of a solid, a dissolved species, or a suspension.

In some embodiments, the rare earth-containing composition removes anionic, cationic, oxy, hydroxyl, hydrated, or a combination thereof species of a target material, where the target material "M" has an atomic number of 5, 13, 22-33, 40-52, 72-84, and 89-94. Examples of hydrated hydroxyl and hydrated oxy compounds (which may be anionic, neutral or cationic and hereinafter referenced by the symbol "MS") include, but are not limited to, $M(H_2O)_6^n$, $M(H_2O)_5OH^{(n-1)}$, $M(OH)^{(n-1)}M(H_2O)_4(OH)_2^{(n-2)}$, $M(OH)_2^{(n-2)}$, $M(H_2O)_3(OH)_3^{(n-3)}$, $M(OH)_3^{(n-3)}$, $M(H_2O)_2(OH)_4^{(n-4)}$, $M(OH)_4^{(n-4)}$, $M(H_2O)(OH)_5^{(n-5)}$, $M(OH)_5^{(n-5)}$, $M(OH)_6^{(n-6)}$, $M(H_2O)_5O^{(n-2)}$, $MO^{(n-2)}$, $M(H_2O)_4(O)_2^{(n-4)}$, $MO_2^{(n-4)}$, $M(H_2O)_3(O)_3^{(n-6)}$, $MO_3^{(n-6)}$, $M(H_2O)_2(O)_4^{(n-8)}$, $MO_4^{(n-8)}$, $M(H_2O)(O)_5^{(n-10)}$, $MO_5^{(n-10)}$, $M(O)_6^{(n-12)}$, $M(H_2O)_5CO_3^{(n-2)}$, $MCO_3^{(n-2)}$, $M(H_2O)_4(CO_3)_2^{(n-4)}$, $M(CO_3)_2^{(n-4)}$, $M(H_2O)_3(CO_3)_3^{(n-6)}$, $M(CO_3)_3^{(n-6)}$, $M(H_2O)_2(CO_3)_4^{(n-8)}$, $M(CO_3)_4^{(n-8)}$, $M(H_2O)(CO_3)_5^{(n-10)}$, $M(CO_3)_5^{(n-10)}$, $M(CO_3)_6^{(n-12)}$, $M(H_2O)_4^n$, $M(H_2O)_3OH^{(n-1)}$, $M(H_2O)_2(OH)_2^{(n-2)}$, $M(H_2O)(OH)_3^{(n-3)}$, $M(H_2O)_3O^{(n-2)}$, $M(H_2O)_2(O)_2^{(n-4)}$, $M(H_2O)(O)_3^{(n-6)}$, and $M(O)_4^{(n-8)}$. In the foregoing formulas, n is a real number no greater than eight and represents the charge or oxidation state of the metal or metalloid "M" (for example when M is Pb(II) n is 2, and when M is Pb(IV) n is 4). In general, M has a positive charge "n" no greater than about 8.

Figure 39:
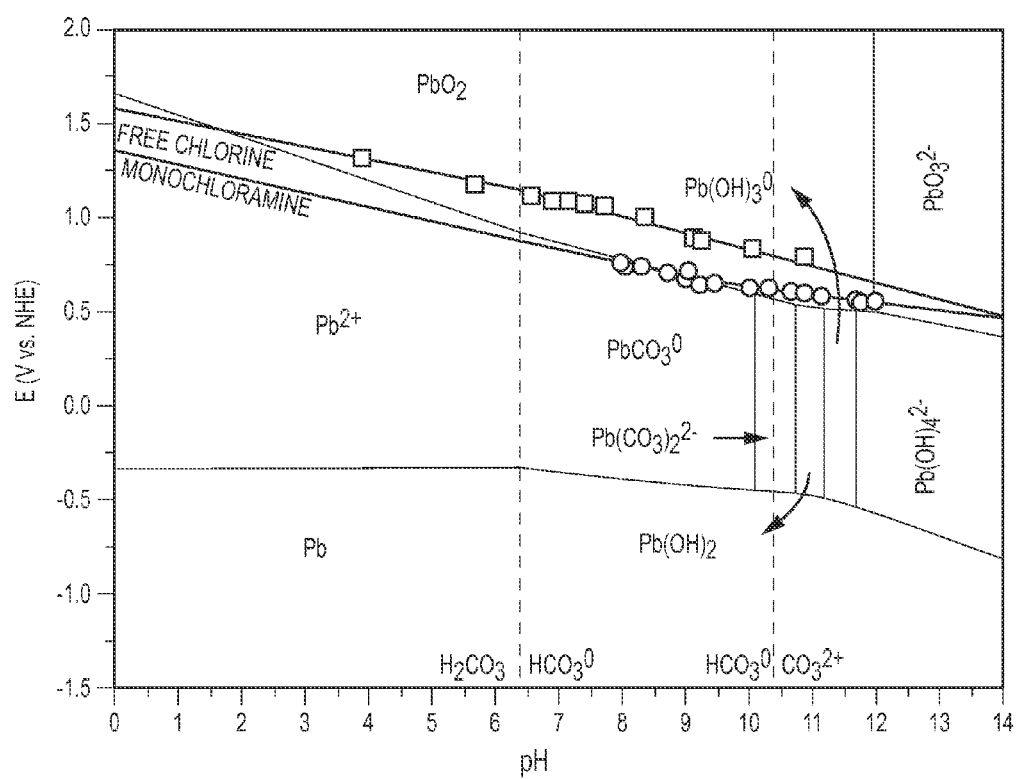
FIG. 39 depicts a prior art Pourbaix diagram under specified conditions for primary species of lead.
Figure 40A:
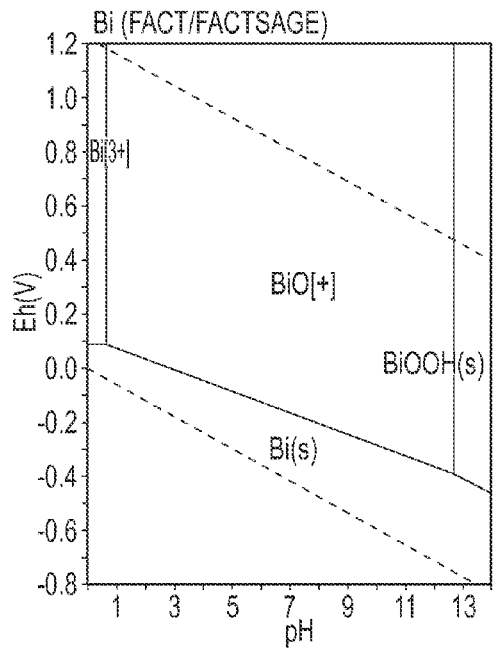
FIGS. 40A-C depict prior art Pourbaix diagrams under specified conditions for primary species of bismuth.
Figure 40B:
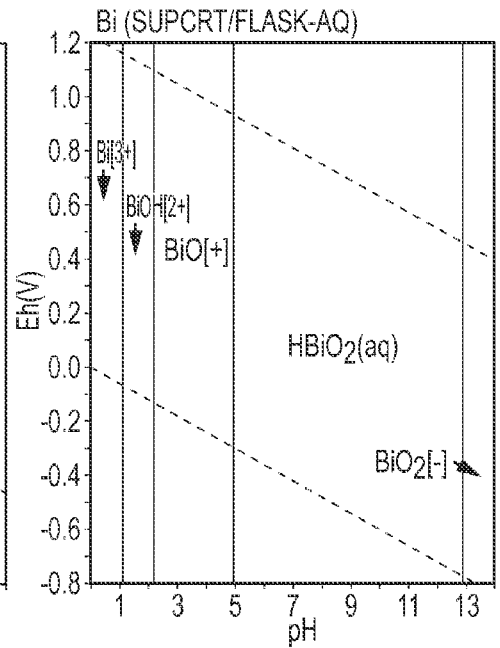
Figure 40C:
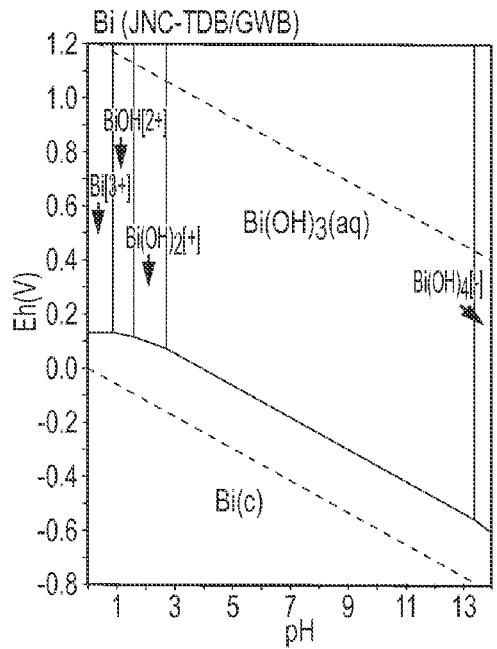
Figure 41A:
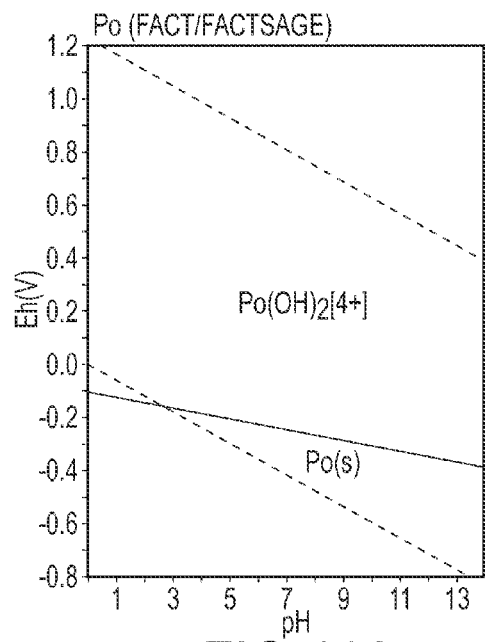
FIGS. 41A-B depict prior art Pourbaix diagrams under specified conditions for primary species of polonium.
Figure 41B:
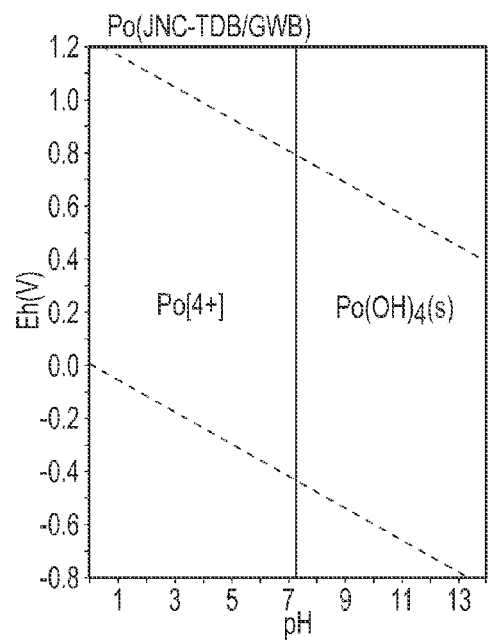
Figure 42A:
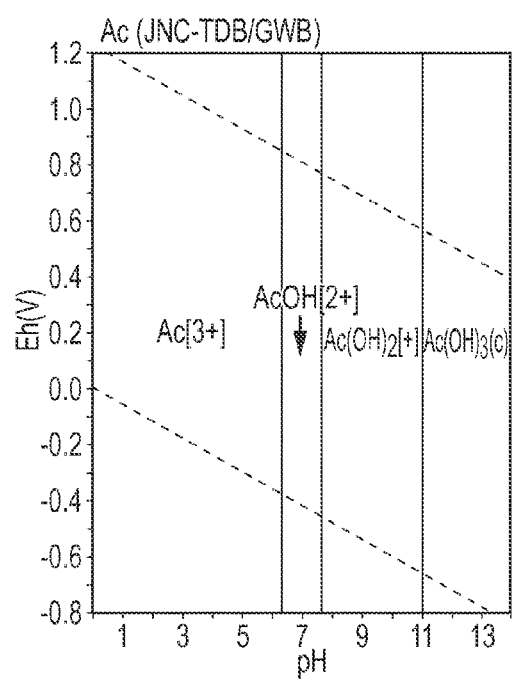
FIGS. 42A-B depict prior art Pourbaix diagrams under specified conditions for primary species of actinium.
Figure 42B:
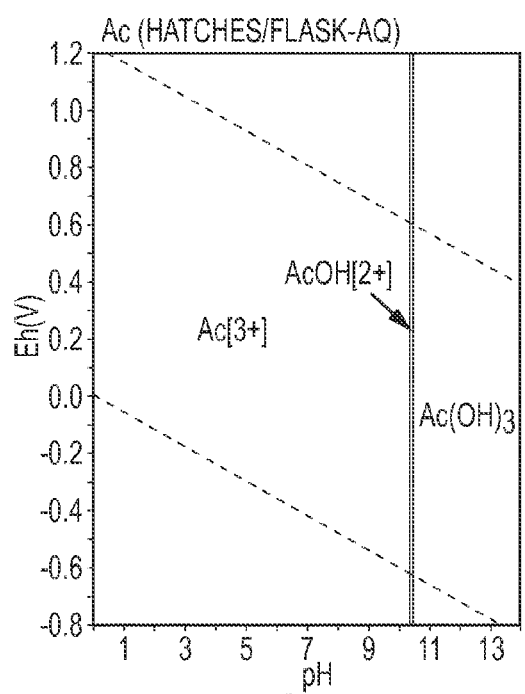
Figure 43A:
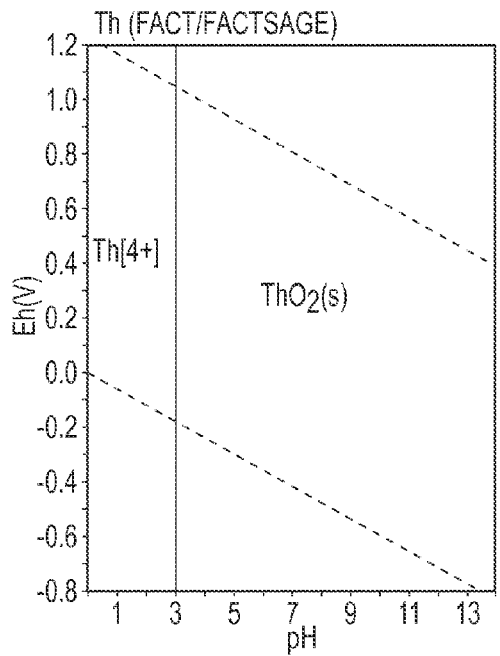
FIGS. 43A-E depict prior art Pourbaix diagrams under specified conditions for primary species of thorium.
Figure 43B:
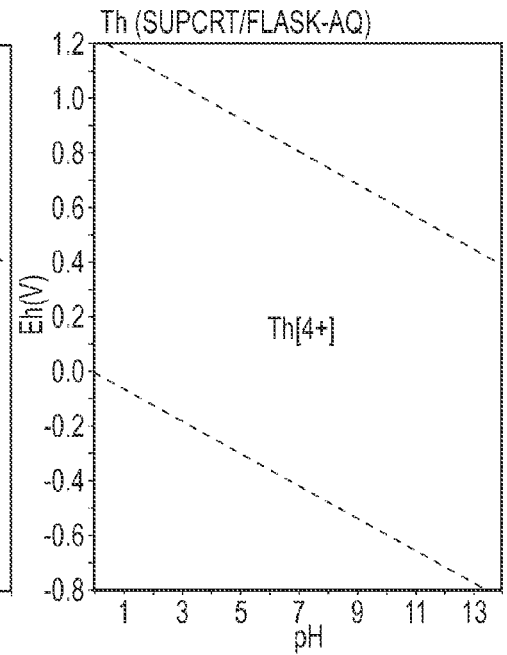
Figure 43C:
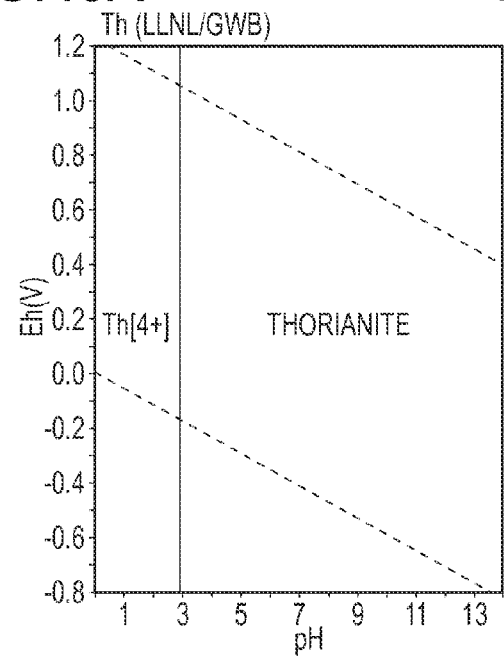
Figure 43D:
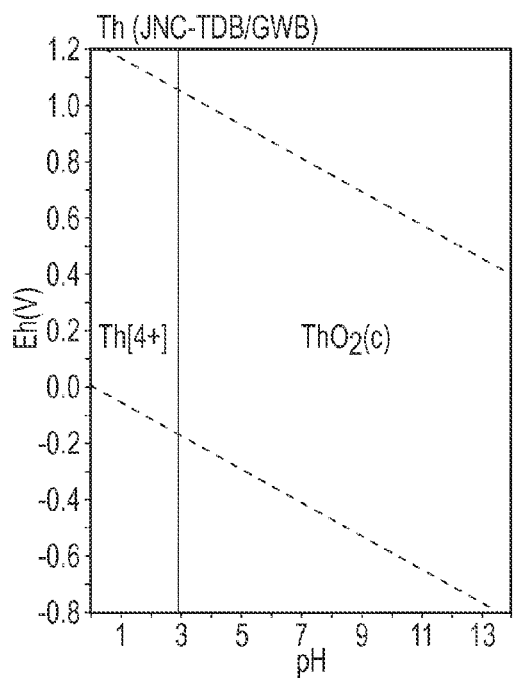
Figure 43E:
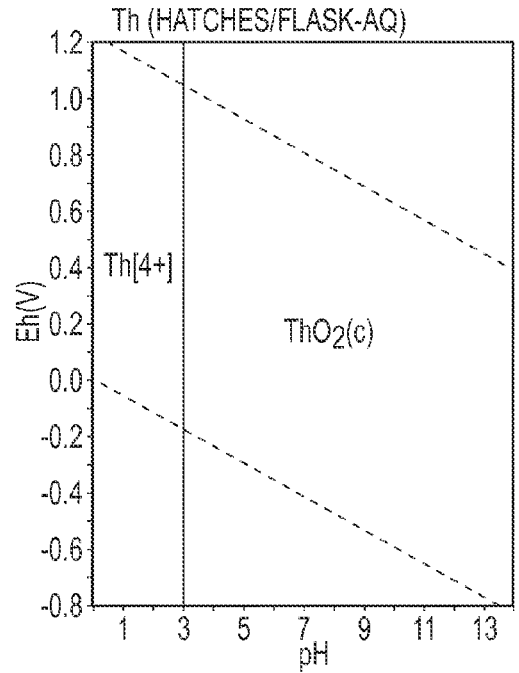
Figure 44A:
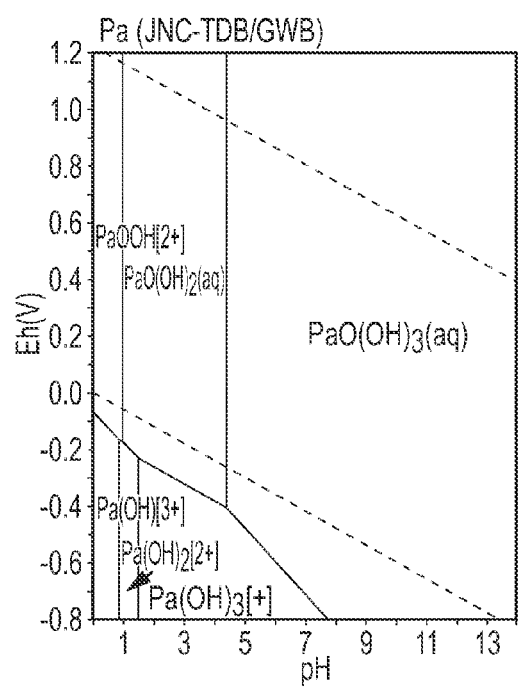
FIGS. 44A-B depict prior art Pourbaix diagrams under specified conditions for primary species of protactinium.
Figure 44B:
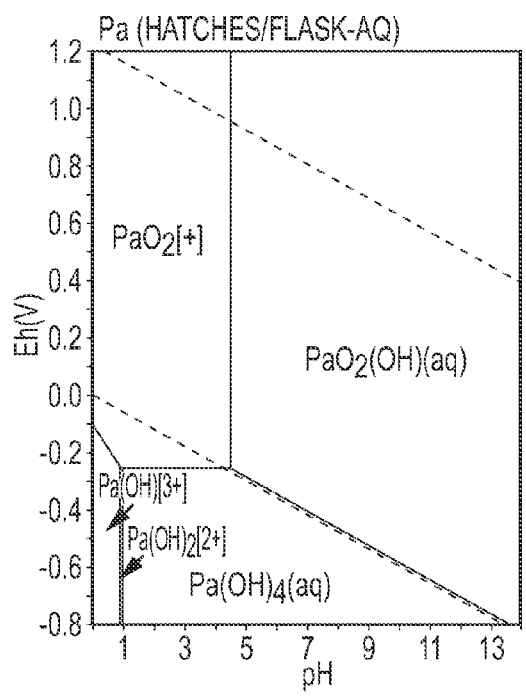
Figure 45B:
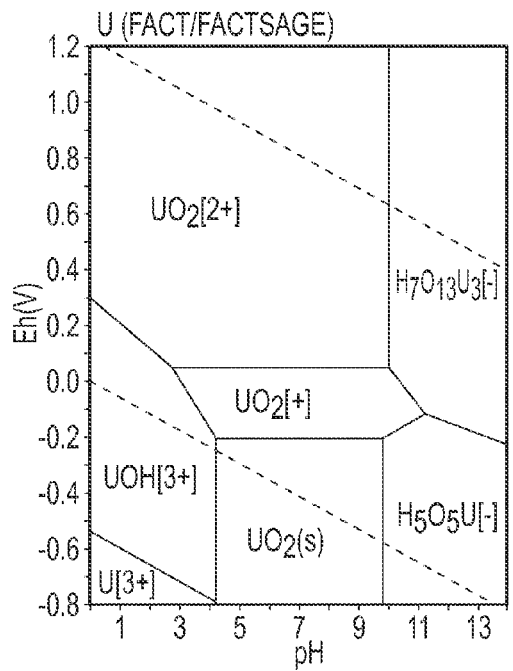
Figure 45B:
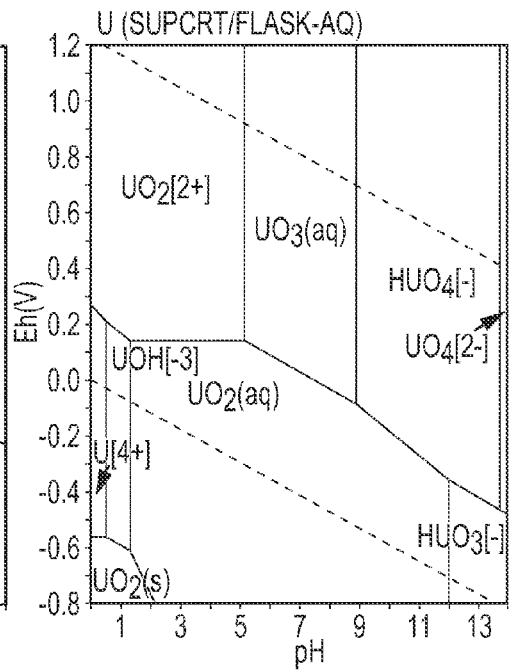
Figure 45D:
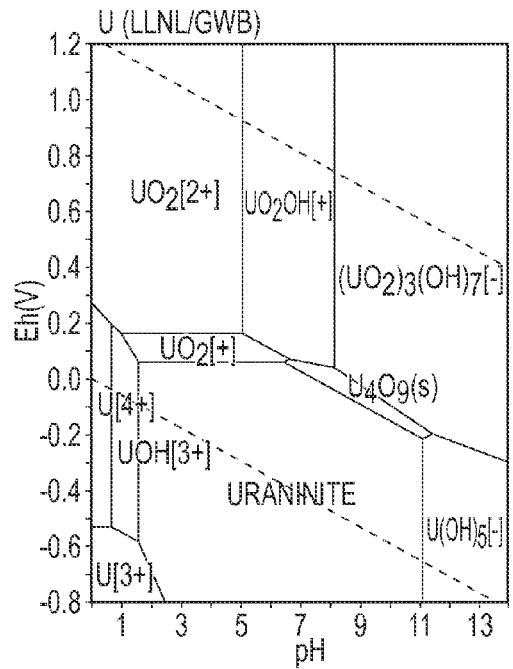
Figure 45D:
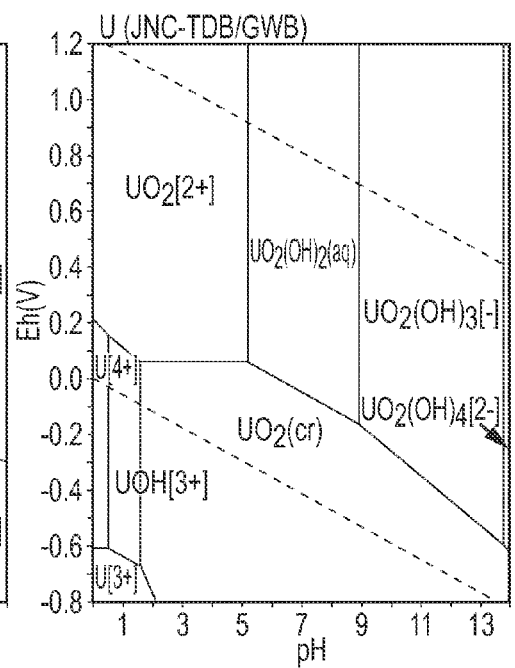
Figure 45G:
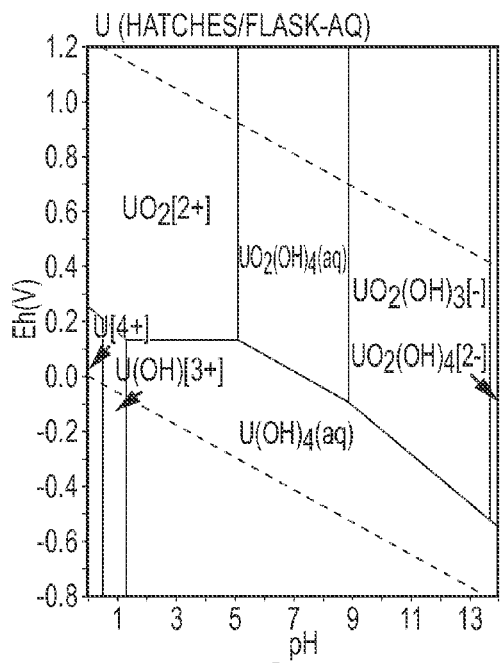
Figure 45G:
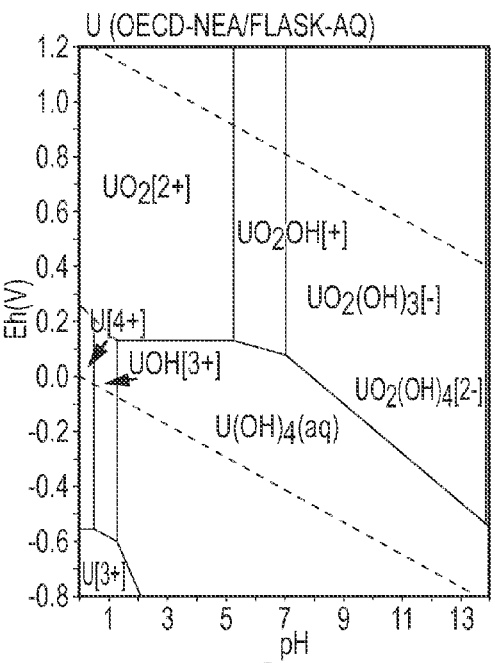
Figure 45G:
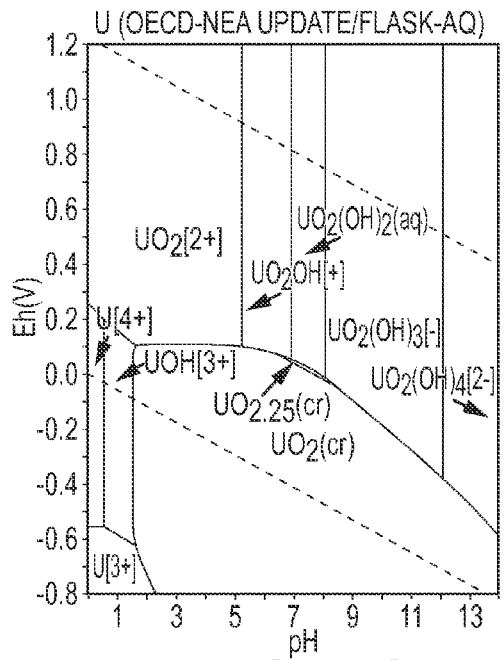
Figure 46C:
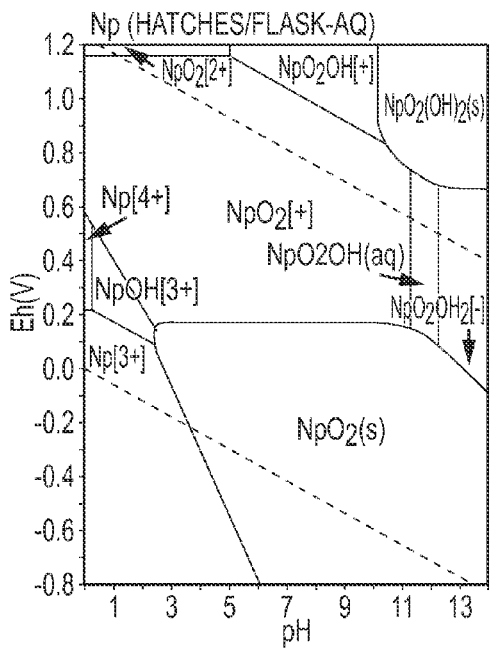
Figure 46D:
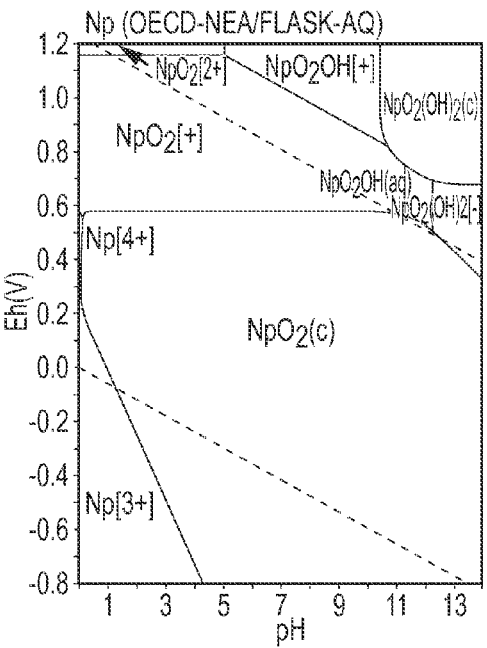
Figure 46E:
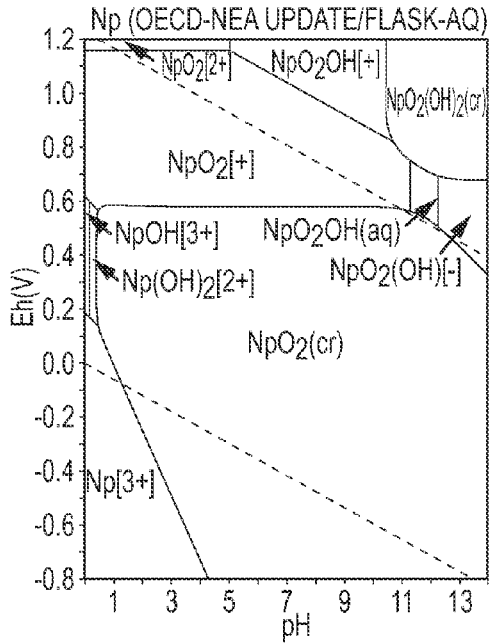
Figure 47B:
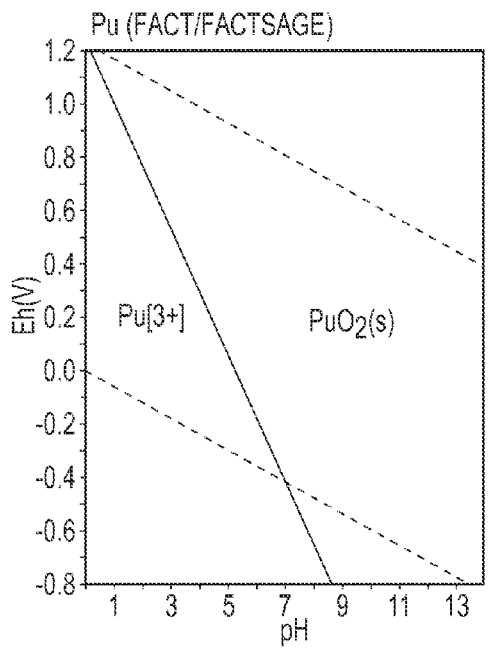
Figure 47B:
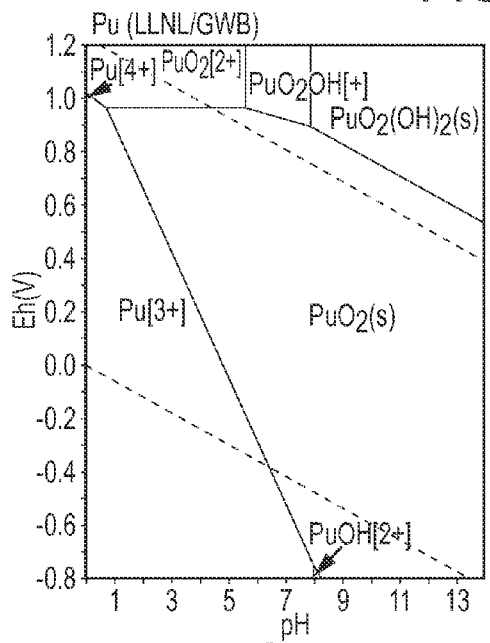
Figure 47C:
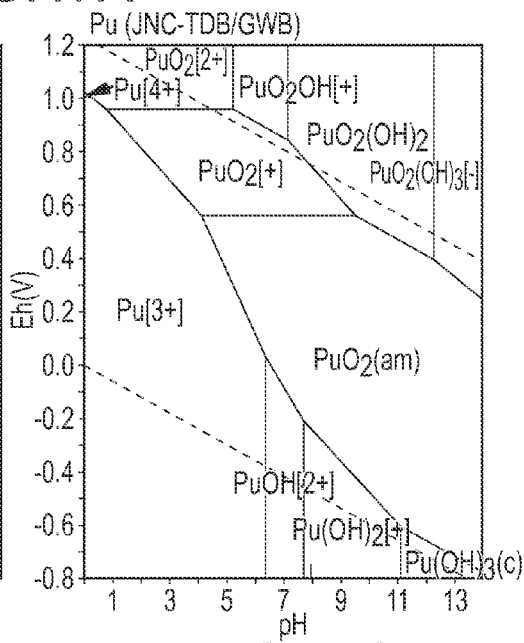
Figure 47D:
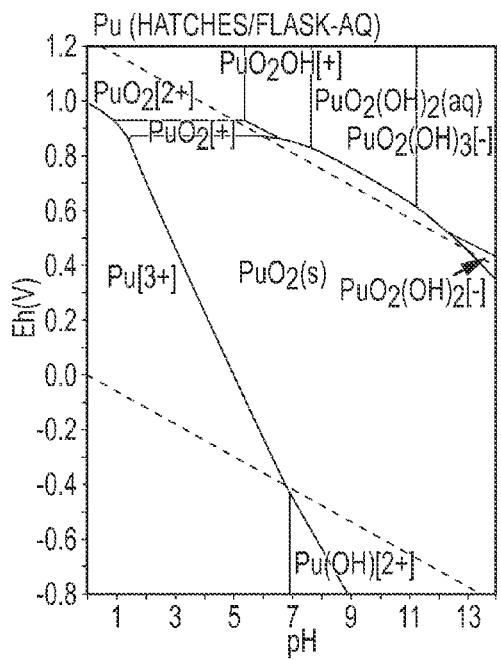
Figure 47E:
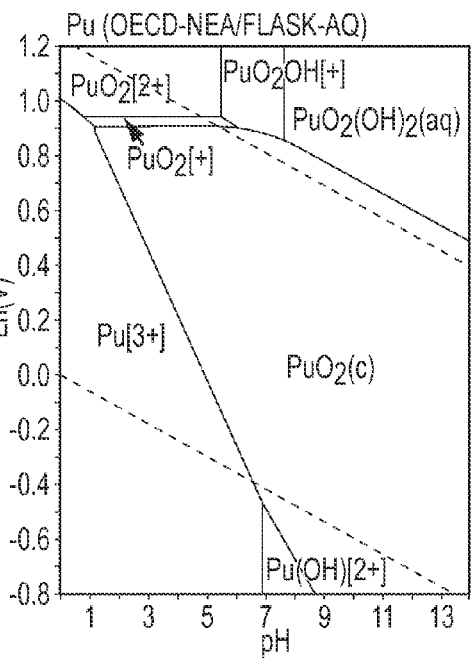
Figure 47F:
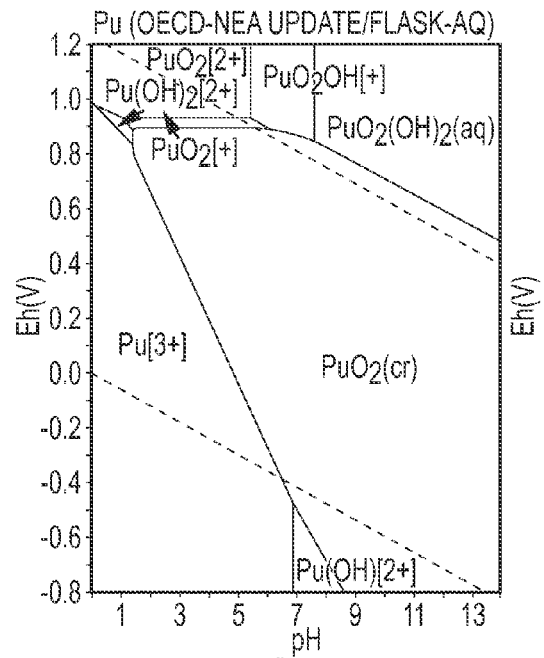

Pourbaix diagrams are depicted in FIGS. 2-47 for each of the metals, metalloids, and radioactive isotopes. FIGS. 2-47 depict the primary species of target material under different thermodynamic conditions of an aqueous solution. With reference to FIG. 39, the target material lead has the following species: $Pb(H_2O)_6^{2+}$, $Pb(H_2O)_4(O)_2$, $Pb(H_2O)_5CO_3$, $Pb(H_2O)_4(CO_3)_2^{2-}$, $Pb(H_2O)_3(OH)_3^-$, $Pb(H_2O)_4(OH)_2$, $Pb(H_2O)_2(OH)_4^{2-}$, and $Pb(H_2O)(O)_3^{2-}$. The state of the lead compounds (whether $solid_{(s)}$ or $aqueous_{(aq)}$ are shown in the lead Pourbaix diagrams. Typically, the lead comprises lead having a +2 oxidation state. With reference to FIG. 27, the target material antimony has the following species: $Sb(H_2O)_2(OH)_4^{1-}$, $Sb(H_2O)_4(OH)_2^{1+}$, $Sb(H_2O)_3(OH)_3$, $Sb(H_2O)(OH)_5$, and $Sb(OH)_6^{1-}$. Typically, the antimony comprises antimony having one of a +5 or +3 oxidation state. With reference to FIG. 40, the target material bismuth has the following species: $Bi(H_2O)_6^{3+}$, $Bi(H_2O)_5(OH)^{2+}$, $Bi(H_2O)_4(OH)_2^{1+}$, $Bi(H_2O)_3(OH)_3$, and $Bi(H_2O)_2(OH)_4^{1-}$. Typically, the bismuth comprises bismuth having one of a +5 or +3 oxidation state.

There are a number of possible mechanisms for removing target materials. The precise mechanism may depend on a number of variables including the particular form and/or characteristics of the rare earth-containing composition, additive, and/or particle or particulate, the particular form and/or characteristics of the target material, the pH of the medium 104, the Eh of the medium 104, the temperature of the medium 104, the components in the medium 104, and other parameters known to those of skill in the art.

While not wishing to be bound by any theory, the anionic form of the target material may be one or more of sorbed, precipitated, complexed, ionically bound, inter-valance shell complexed (with any one or more hybridized or non-hybridized s, p, d or f orbitals), covalently bounded or a combination thereof with the rare earth-containing composition. The anionic forms may comprise an oxyanion, hydroxyl, hydrated or combination thereof of the target material having a net negative charge. While not wishing to be bound by any theory, the target material may selectively interact with a face or an edge of rare earth-containing composition particulate. Another theory, which we do not wish to be bound by, is that the anionic target material forms a substantially insoluble product with a rare earth. The rare earth may be in the form of a substantially water soluble rare earth-containing salt or in the form of a substantially water insoluble material that strongly sorbs, binds, chemically reacts or such with the anionic target material.

While not wishing to be bound by any theory, there are a number of mechanisms for removing cationic forms of the target materials. The cationic forms may comprise complexed, hydroxyl, hydrated or combination thereof of the target material having a net positive charge. While not wishing to be bound by any theory, the cationic form of the target material may be one or more of sorbed, precipitated, complexed, ionically bound, inter-valance shell complexed (with any one or more hybridized or non-hybridized s, p, d or f orbitals), covalently bounded or a combination thereof with the rare earth-containing composition. While not wishing to be bound by any theory, the target material may selectively interact with a face or an edge of rare earth-containing composition particulate. Another theory, which we do not wish to be bound by, is that the cationic target material form a substantially insoluble and/or stable product with rare earth cation.

While not wishing to be bound by any theory, another possible mechanism for the removal of anionic, cationic, or uncharged species containing the target material is that a species, such as a water of hydration, hydroxyl radical, hydroxide ion, or carbonate species, compounded, complexed, or otherwise attached to the target material acts as a chemical entity that attaches, sorbs and/or chemically bonds to the rare earth or rare earth-containing composition. While not wanting to be limited by theory and/or by way of illustration, a possible cationic metal or metalloid adsorption process may comprise, as show in chemical equation (2):

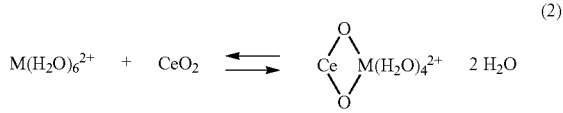

(2)

The rare earth may be in the form of a substantially water soluble rare earth-containing salt or in the form of a substantially water insoluble material that strongly sorbs, binds, chemically reacts or otherwise attaches to the cationic target material, as shown in chemical equation (3).

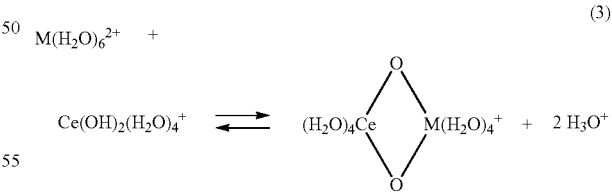

(3)

where M has an atomic number commonly of one of 5, 13, 22-33, 40-52, 72-84, and 89-94 and more commonly one of 5, 13, 22 to 33, 40 to 52, 56, 72, 80-84, 88, and 90-94. Although the number of waters of hydration is shown as "4" for ceria oxide, it is to be understood that more or less waters of hydration may be present depending on the application.

While not wanting to be limited by theory and by way of further example, a possible cationic lead adsorption process may comprise, as show in chemical equation (4):

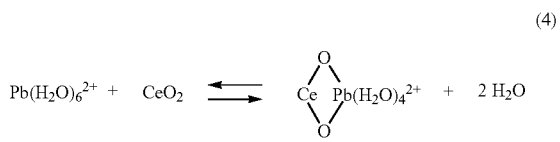

(4)

The rare earth cations may be in the form of a substantially water soluble rare earth-containing salt or in the form of a substantially water insoluble material that strongly sorbs, binds, chemically reacts or such with the cationic target material, as shown in chemical equation (5).

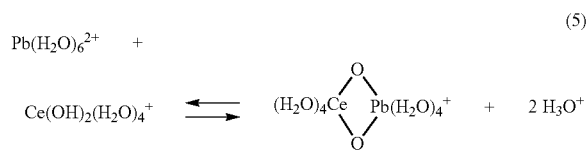

(5)

While not wishing to be bound by any theory, another possible mechanism the rare earth-containing additive, such as cerium (IV) oxide, may oxidize the target material and/or target material-containing species. The contacting of the rare earth-containing oxidizing agent and the target material-containing species may one or both: a) chemically interact with the target material-containing species and b) form a reduced rare earth and/or rare earth-containing oxidizing agent and an oxidized target material and/or target material-containing species. By way of illustration, a cerium (IV) oxidizing agent may be formed by contacting a first cerium-containing composition having cerium in a +3 oxidation state with an oxidant (as listed below) to form a second cerium-containing composition having cerium in a +4 oxidation state (or cerium (IV) oxidizing agent). Commonly, the second cerium-containing composition comprises $CeO_2$ particles. The cerium (IV) oxidizing agent then oxidizes the target material or target material-containing species forming the first (reduced) cerium (III)-containing composition.

Regardless of the precise mechanism, contact of the rare earth-containing additive with the target material-containing species forms a rare earth- and target material-containing product. The rare earth- and target material-containing product can be in the form of a material dissolved in the water or a solid material either contained within the water or a solid material phase separated from the water. The solid rare earth- and target material-containing product may be a precipitate, a solid particle suspended within the water, a flocculated solid particle, and combination thereof.

As can be seen from the prior art Pourbaix diagrams in FIGS. 2-47, the primary species of a metal or metalloid in solution depends on pH and Eh. The values are commonly selected such that the water is electrochemically stable and the target material is a dissolved (not solid) species. Cationic forms of lead, for example, typically, but not necessarily, are present, as the primary species, in aqueous media having a pH of less than about pH 7 and Eh of less than about +1 V. As discussed below, the form of metal or metalloid present in solution, and therefore the efficacy of precipitating, sorbing, or otherwise removing the metal or metalloid from, and/or de-toxifying, the aqueous medium by treatment with the rare earth-containing composition, additive, and/or particle or particulate can be increased substantially by adjusting one or both of the pH and Eh of the medium. It can be appreciated that, while the efficacy of precipitating, sorbing, or removing the target material has been illustrated for various pH and Eh values, the concept of adjusting one or both of pH and Eh is applicable for effectively removing and/or detoxifying an aqueous solution for components, including interferents, other than the metal and/or metalloid-containing target materials.

In accordance with some embodiments, the target material is removed from the aqueous media having a selected pH value. Commonly, the selected pH value of the aqueous media may be from about pH 0 to about pH 14, more commonly the pH of the aqueous media may be from about pH 1 to about pH 13, even more commonly the pH of the aqueous media may be from about pH 2 to about pH 12, even more commonly the pH of the aqueous media may be from about pH 3 to about pH 11, yet even more commonly the pH of the aqueous media may be from about pH 4 to about pH 10, still yet even more commonly the pH of the aqueous media may be from about pH 5 to about pH 9, or still yet even more commonly the pH of the aqueous media may be from about pH 6 to about pH 8.

In one embodiment, the aqueous media typically has a selected pH value of from about pH 6 to about pH 9, and more typically the aqueous media has a pH of from about pH 6.5 to about pH 8.5

Commonly in other embodiments, the aqueous media may be substantially acidic having a selected pH of about pH 0, more commonly having a selected pH of about pH 1, even more commonly having a selected pH of about pH 2, yet even more commonly having a selected pH of about pH 3, or still yet even more commonly having a selected pH about pH 4. Even more commonly in other embodiments, the aqueous media may be substantially neutral having a selected pH of about pH 5, more commonly having a selected pH of about pH 6, even more commonly having a selected pH of about pH 7, yet even more commonly having a selected pH of about pH 8, or still yet even more commonly having a selected pH of about pH 9. Commonly in other embodiments, the aqueous media may be substantially basic having a selected pH of about pH 10, more commonly having a selected pH of about pH 11, even more commonly having a selected pH of about pH 12, yet even more commonly having a selected pH of about pH 13, or still yet even more commonly having a selected pH about pH 14.

In accordance with some embodiments, the target material is removed from the aqueous media having a selected Eh value with respect to standardized reference electrode, such as a standard hydrogen electrode (SHE). Commonly, the selected Eh of the aqueous medium is at least about −0.5 V, more commonly at least about −0.4 V, more commonly at least about −0.3 V, more commonly at least about −0.2 V, more commonly at least about −0.1 V, more commonly at least about 0 V, more commonly at least about 0.1 V, more commonly at least about 0.2 V, more commonly at least about 0.3 V, and more commonly at least about 0.4 V, and more commonly at least about 0.5 V. Commonly, the selected Eh of the aqueous medium is below the level at which water is not electrochemically stable, more commonly no more than about 1.7 V, more commonly no more than about 1.6 V, more commonly no more than about 1.5 V, more commonly no more than about 1.4 V, more commonly no more than about 1.3 V, more commonly no more than about 1.2 V, more commonly no more than about 1.1 V, more commonly no more than about 1.0 V, more commonly no more than about 0.9 V, more commonly no more than about 0.8 V, and more commonly no more than about 0.7 V.

The rare earth to target material ratio of the insoluble rare earth- and target material-containing product can also vary depending on the solution pH and/or Eh value. In other words, rare earths having a rare earth to target material ratio less than 1 have a greater molar removal capacity of target material than rare earths having a rare earth to target material ratio of 1 or more than 1. In some embodiments, the greater the pH value the greater the rare earth to target material ratio. In other embodiments, the greater the pH value the smaller the rare earth to target material ratio. In yet other embodiment, the rare earth to target material ratio is substantially unchanged over a range of pH values. In some embodiments, the rare earth to target material ratio is no more than about 0.1, the rare earth to target material ratio is no more than about 0.2, the rare earth to target material ratio is no more about 0.3, the rare earth to target material ratio is no more than about 0.4, the rare earth to target material ratio is no more than about 0.5, the rare earth to target material ratio is no more than about 0.6, the rare earth to target material ratio is no more than about 0.7, the rare earth to target material ratio is no more than about 0.8, the rare earth to target material ratio is no more than about 0.9, the rare earth to target material ratio is no more than about 1.0, the rare earth to target material ratio is no more than about 1.1, the rare earth to target material ratio is no more than about 1.2, the rare earth to target material ratio is no more than about 1.3, the rare earth to target material ratio is no more than about 1.4, the rare earth to target material ratio is no more than about 1.5, the rare earth to target material ratio is no more than about 1.6, the rare earth to target material ratio is no more than about 1.7, the rare earth to target material ratio is no more about 1.8, the rare earth to target material ratio is no more than about 1.9, the rare earth to target material ratio is no more than about 1.9, or the rare earth to target material ratio is more than about 2.0 at a pH value of no more than about pH −2, at a pH value of more than about pH −1, at a pH value of more than about pH 0, at a pH value of more than about pH 1, at a pH value of more than about pH 2, at a pH value of more than about pH 3, at a pH value of more than about pH 4, at a pH value of more than about pH 5, at a pH value of more than about pH 6, at a pH value of more than about pH 7, at a pH value of more than about pH 8, at a pH value of more than about pH 9, at a pH value of more than about pH 10, at a pH value of more than about pH 11, at a pH value of more than about pH 12, at a pH value of more than about pH 13, or at a pH value of more than about pH 14.

In some embodiments, the rare earth to target material ratio is no more than about 0.1, the rare earth to target material ratio is no more than about 0.2, the rare earth to target material ratio is no more about 0.3, the rare earth to target material ratio is no more than about 0.4, the rare earth to target material ratio is no more than about 0.5, the rare earth to target material ratio is no more than about 0.6, the rare earth to target material ratio is no more than about 0.7, the rare earth to target material ratio is no more than about 0.8, the rare earth to target material ratio is no more than about 0.9, the rare earth to target material ratio is no more than about 1.0, the rare earth to target material ratio is no more than about 1.1, the rare earth to target material ratio is no more than about 1.2, the rare earth to target material ratio is no more than about 1.3, the rare earth to target material ratio is no more than about 1.4, the rare earth to target material ratio is no more than about 1.5, the rare earth to target material ratio is no more than about 1.6, the rare earth to target material ratio is no more than about 1.7, the rare earth to target material ratio is no more about 1.8, the rare earth to target material ratio is no more than about 1.9, the rare earth to target material ratio is no more than about 1.9, or the rare earth to target material ratio is more than about 2.0 at a water pH value of no more than about pH −2, at a water pH value of more than about pH −1, at a water pH value of more than about pH 0, at a water pH value of more than about pH 1, at a water pH value of more than about pH 2, at a water pH value of more than about pH 3, at a water pH value of more than about pH 4, at a water pH value of more than about pH 5, at a water pH value of more than about pH 6, at a water pH value of more than about pH 7, at a water pH value of more than about pH 8, at a water pH value of more than about pH 9, at a water pH value of more than about pH 10, at a water pH value of more than about pH 11, at a water pH value of more than about pH 12, at a water pH value of more than about pH 13, or at a water pH value of more than about pH 14.

For $CeO_2$ as the rare earth-containing composition, additive, and/or particle or particulate, removal capacities of approximately 0.1 mg target material/g REO (e.g. $CeO_2$) or less can be encountered. These can have rare earth:target material ratios that are significantly larger than 2. For example, 0.1 mg is 0.0001 g, so 1 g $CeO_2$/0.0001 g target material=10,000. In such embodiments, the rare earth to target material ratio is commonly no more than about 50,000, the rare earth to target material ratio is more commonly no more than about 47,500, the rare earth to target material ratio is more commonly no more about 45,000, the rare earth to target material ratio is more commonly no more than about 42,500, the rare earth to target material ratio is more commonly no more than about 40,000, the rare earth to target material ratio is no more than about 37,500, the rare earth to target material ratio is more commonly no more than about 35,000, the rare earth to target material ratio is more commonly no more than about 35,000, the rare earth to target material ratio is more commonly no more than about 32,500, the rare earth to target material ratio is more commonly no more than about 30,000, the rare earth to target material ratio is more commonly no more than about 37,500, the rare earth to target material ratio is more commonly no more than about 35,000, the rare earth to target material ratio is more commonly no more than about 32,500, the rare earth to target material ratio is more commonly no more than about 30,000, the rare earth to target material ratio is more commonly no more than about 27,500, the rare earth to target material ratio is more commonly no more than about 25,000, the rare earth to target material ratio is more commonly no more than about 22,500, or the rare earth to target material ratio is more commonly no more about 20,000, at a water pH value of no more than about pH −2, at a water pH value of more than about pH −1, at a water pH value of more than about pH 0, at a water pH value of more than about pH 1, at a water pH value of more than about pH 2, at a water pH value of more than about pH 3, at a water pH value of more than about pH 4, at a water pH value of more than about pH 5, at a water pH value of more than about pH 6, at a water pH value of more than about pH 7, at a water pH value of more than about pH 8, at a water pH value of more than about pH 9, at a water pH value of more than about pH 10, at a water pH value of more than about pH 11, at a water pH value of more than about pH 12, at a water pH value of more than about pH 13, or at a water pH value of more than about pH 14.

The concentration of the target material and target material-containing species can vary depending on a number of factors. The concentration of either or both can be, for example, commonly at least about 5 ppm, more commonly at least about 50 ppm, more commonly at least about 100 ppm, more commonly at least about 500 ppm, more commonly at least about 1,000 ppm, more commonly at least about 5,000 ppm, more commonly at least about 10,000 ppm, and more commonly at least about 100,000 ppm.

Medium Pre-Treatment

In step 108, the medium 104 is optionally pre-treated to produce a selected primary species of the target material. The selected primary species is generally more effectively removed by the rare earth-containing composition, additive, and/or particle than the primary species in the medium 104. For example, one or more of the Eh and pH values may be altered for more effective removal and/or detoxification of the target material. The primary species of lead, for instance, is elemental ($Pb_s$) when the Eh is less (more negative) than about −0.3. By increasing the Eh and varying the pH value of the aqueous solution the primary species of lead can become one or more of $Pb(H_2O)_6^{2+}$, $Pb(H_2O)_5CO_3$, $Pb(H_2O)_4(CO_3)_2^{2+}$, $Pb(H_2O)_5(OH)_2$, or $Pb(H_2O)_2(OH)_4^{2-}$. As will be appreciated, pH is a measure of the activity of hydrogen ions while Eh is a measure of the electrochemical (oxidation/reduction) potential.

The type of pre-treatment employed can depend on the application.

In one application, an acid, acid equivalent, base, or base equivalent is added to adjust the pH to a desired pH value. Examples of acids or acid equivalents include monoprotic acids and polyprotic acids, such as mineral acids, sulfonic acids, carboxylic acids, vinylogous carboxylic acids, nucleic acids, and mixtures thereof. Examples of bases and base equivalents include strong bases (such as potassium hydroxide, barium hydroxide, cesium hydroxide, sodium hydroxide, strontium hydroxide, calcium hydroxide, magnesium hydroxide, lithium hydroxide, and rubidium hydroxide), superbases, carbonates, ammonia, hydroxides, metal oxides (particularly alkoxides), and counteranions of weak acids.

In one application, oxidation and reduction reactions can be used to adjust the Eh value. Eh is a measure of the oxidation or reduction potential of the medium 104. The oxidation or reduction potential is commonly referred to as electromotive force or EMF. The EMF is typically measured with respect to a standardized reference electrode. Non-limiting examples of standardized reference electrodes are hydrogen electrode (commonly referred to as SHE), copper copper sulfate electrode, and silver/silver chloride to name a few.

In one variation, the target material or target material-containing species is contacted with an oxidizing agent to oxidize the target material or target material-containing species. The oxidizing agent may comprise a chemical oxidizing agent, an oxidation process, or combination of both.

A chemical oxidizing agent comprises a chemical composition in elemental or compounded form. The chemical oxidizing agent accepts an electron from the target material or target material-containing species. In the accepting of the electron, the oxidizing agent is reduced to form a reduced form of the oxidizing agent. Non-limiting examples of preferred chemical oxidizing agents are chlorine, chloroamines, chlorine dioxide, hypochlorites, trihalomethane, haloacetic acid, ozone, hydrogen peroxide, peroxygen compounds, hypobromous acid, bromoamines, hypobromite, hypochlorous acid, isocyanurates, tricholoro-s-triazinetriones, hydantoins, bromochloro-dimethyldantoins, 1-bromo-3-chloro-5,5-dimethyldantoin, 1,3-dichloro-5,5-dimethyldantoin, sulfur dioxide, bisulfates, and combinations thereof. It is further believed that in some configurations one or more the following chemical compositions may oxidize the target material or target material-containing species: bromine, BrCl, permanganates, phenols, alcohols, oxyanions, arsenites, chromates, trichlomisocyanuric acid, and surfactants. The chemical oxidizing agent may further be referred to as an "oxidant" or an "oxidizer".

An oxidation process comprises a physical process that alone or in combination with a chemical oxidizing agent. The oxidation process removes and/or facilitates the removal an electron from the target material or target material-containing species. Non-limiting examples of oxidation processes are electromagnetic energy, ultra violet light, thermal energy, ultrasonic energy, and gamma rays.

In another variation, the target material or target material-containing species is contacted with a reducing agent to reduce the target material or target material-containing species. The oxidizing agent may comprise a chemical oxidizing agent, an oxidation process, or combination of both.

A chemical reducing agent comprises a chemical composition in elemental or compounded form. The chemical reducing agent donates an electron to the target material or target material-containing species. In the donating the electron, the reducing agent is oxidized to form an oxidized form of the oxidizing agent. Non-limiting examples of preferred chemical reducing agents are lithium aluminum hydride, nascent (atomic) hydrogen, sodium amalgam, sodium borohydride, compounds containing divalent tin ion, sulfite compounds, hydrazine, zinc-mercury amalgam, diisobutylaluminum hydride, Lindlar catalyst, oxalic acid, formic acid, ascorbic acid, phosphites, hypophosphites, phosphorous acids, dithiothreitols, and compounds containing the divalent iron ion. The chemical reducing agent may further be referred to as a "reductant" or a "reducer".

A redox process is a physical process that alone or in combination with a chemical oxidizing agent transfers electrons to or form a target material or target material-containing species. Non-limiting examples of oxidation processes are electromagnetic energy, ultra violet light, thermal energy, ultrasonic energy, gamma rays, and biological processes.

In one variation, the medium is contacted with a halogenated species, such as chlorine, bromine, iodine, or an acid, base, or salt thereof. As will be appreciated, halogens impact the Eh of the medium. In some configurations, halogens can impact the pH value of the aqueous media.

Other types of pre-treatment may be employed to remove species from the medium that can impair removal of the target material or target material-containing species and/or adjustment of the pH and/or Eh of the medium.

The pre-treatment can comprise one or more of clarifying, disinfecting, coagulating, aerating, filtering, separating solids and liquids, digesting, and polishing processes. More specifically, the pre-treatment process can commonly comprise one of clarifying, disinfecting, coagulating, aerating, filtering, separating solids and liquids, digesting, and polishing processes, more commonly any two of clarifying, disinfecting, coagulating, aerating, filtering, separating solids and liquids, digesting, and polishing processes arranged in any order, even more commonly any three of clarifying, disinfecting, coagulating, aerating, filtering, separating solids and liquids, digesting, and polishing processes arranged in any order, yet even more commonly any four of clarifying, disinfecting, coagulating, aerating, filtering, separating solids and liquids, digesting, and polishing processes arranged in any order, still yet even more commonly any five of clarifying, disinfecting, coagulating, aerating, filtering, separating solids and liquids, digesting, and polishing processes arranged in any order, still yet even more commonly any six of clarifying, disinfecting, coagulating, aerating, filtering, separating solids and liquids, digesting, and polishing processes arranged in any order, still yet even more commonly any seven of clarifying, disinfecting, coagulating, aerating, filtering, separating solids and liquids, digesting, and polishing processes arranged in any order, still yet even more commonly any eight of clarifying, disinfecting, coagulating, aerating, filtering, separating solids and liquids, digesting, and polishing processes arranged in any order, still yet even more commonly any nine of clarifying, disinfecting, coagulating, aerating, filtering, separating solids and liquids, digesting, and polishing processes arranged in any order, still yet even more commonly any ten of clarifying, disinfecting, coagulating, aerating, filtering, separating solids and liquids, digesting, and polishing processes arranged in any order, still yet even more commonly any eleven of clarifying, disinfecting, coagulating, aerating, filtering, separating solids and liquids, digesting, and polishing processes arranged in any order, and yet still even more commonly each of clarifying, disinfecting, coagulating, aerating, filtering, separating solids and liquids, digesting, and polishing process arranged in any order. In some configurations, the pre-treatment may comprise or may further comprise processing by one or more of the additional process equipment of the water-handling system.

Contact of Medium with Rare Earth-Containing Additive

In step 112, the optionally pre-treated medium is contacted with the rare earth-containing composition, additive, or particle or particulate to form a rare earth- and target material-containing product. As noted, the rare earth-containing composition, additive, and/or particle or particulate chemically and/or physically reacts with, sorbs, precipitates, chemically transforms, or otherwise deactivates or binds with the target material or target material-containing species. In one configuration, the rare earth-containing additive reacts with, sorbs, precipitates, chemically transforms, or otherwise deactivates or binds with at least about 25%, more commonly at least about 50%, more commonly more commonly more than about 50%, more commonly at least about 75%, and even more commonly at least about 95% of the target material or target material-containing species. The rare earth- and target material-containing product includes the rare earth, the target material, and, depending on the materials involved, potentially one or more other constituents or components of the rare earth-containing composition and/or target material-containing species. While not wishing to be bound by any theory, it is believed that the binding mechanism, in some processes, is by waters of hydration, hydroxyl radical, hydroxide ion, or carbonate species, compounded, complexed, or otherwise attached to the target material acts as a chemical entity that attaches, sorbs and/or chemically bonds to the rare earth or rare earth-containing composition.

The temperature of the medium 104, during the contacting step, can vary. Typically, the temperature of the aqueous solution can vary during the contacting step. For example, the temperature of the aqueous solution can vary depending on the water. Commonly, the temperature of the aqueous solution is ambient temperature. Typically, the solution temperature ranges from about −5 degrees Celsius to about 50 degrees Celsius, more typically from about 0 degrees Celsius to about 45 degrees Celsius, yet even more typically from about 5 degrees Celsius to about 40 degrees Celsius and still yet even more typically from about 10 degrees Celsius to about 35 degrees Celsius. It can be appreciated that each of the waters comprising each of the clarifying, disinfecting, coagulating, aerating, filtering, separating solids and liquids, digesting, and polishing processes may include optional processing units and/or operations that heat and/or cool one or more of each of the waters. In some configurations, each of the waters may be heated to have a temperature of typically at least about 20 degrees Celsius, more typically at least about 25 degrees Celsius, even more typically at least about 30 degrees Celsius, yet even more typically of at least about 35 degrees Celsius, still yet even more typically of at least about 40 degrees Celsius, still yet even more typically of at least about 45 degrees Celsius, still yet even more typically of at least about 50 degrees Celsius, still yet even more typically of at least about 60 degrees Celsius, still yet even more typically of at least about 70 degrees Celsius, still yet even more typically of at least about 80 degrees Celsius, still yet even more typically of at least about 90 degrees Celsius, still yet even more typically of at least about 100 degrees Celsius, still yet even more typically of at least about 110 degrees Celsius, still yet even more typically of at least about 120 degrees Celsius, still yet even more typically of at least about 140 degrees Celsius, still yet even more typically of at least about 150 degrees Celsius, or still yet even more typically of at least about 200 degrees Celsius. In some configurations, each of the waters comprising each of the clarifying, disinfecting, coagulating, aerating, filtering, separating solids and liquids, digesting, and polishing processes may be cooled to have a temperature of typically of no more than about 110 degrees Celsius, more typically of no more than about 100 degrees Celsius, even more typically of no more than about 90 degrees Celsius, yet even more typically of no more than about 80 degrees Celsius, still yet even more typically of no more than about 70 degrees Celsius, still yet even more typically of no more than about 60 degrees Celsius, still yet even more typically of no more than about 50 degrees Celsius, still yet even more typically of no more than about 45 degrees Celsius, still yet even more typically of no more than about 40 degrees Celsius, still yet even more typically of no more than about 35 degrees Celsius, still yet even more typically of no more than about 30 degrees Celsius, still yet even more typically of no more than about 25 degrees Celsius, still yet even more typically of no more than about 20 degrees Celsius, still yet even more typically of no more than about 15 degrees Celsius, still yet even more typically of no more than about 10 degrees Celsius, still yet even more typically of no more than about 5 degrees Celsius, or still yet even more typically of no more than about 0 degrees Celsius.

Separation of the Rare Earth- and Target Material-Containing Product from Medium In optional step 116, the product is removed from the medium 104 to form a treated medium 124. In one configuration, commonly at least about 25%, more commonly at least about 50%, more commonly more commonly more than about 50%, more commonly at least about 75%, and even more commonly at least about 95% of the rare earth- and target material-containing product is removed from the medium. It can be appreciated that, in such instances, the product comprises an insoluble material.

The solid rare earth- and target material-containing product may be removed by any suitable technique, such as by a liquid/solid separation system. Non-limiting examples of liquid/solid separation systems are filtration, floatation, sedimentation, cyclone, and centrifuging. Alternatively, the rare earth-containing additive is in the form of a particulate bed or supported porous and permeable matrix, such as a filter, through which the media passes.

Alternatively, the rare earth- and target material-containing product dissolved in the water may remain in the water in a de-activated form. Non-limiting examples of de-activated rare earth- and target material-containing product that may remain dissolved are environmentally stable co-ordination complexes of a target material-containing species and the rare earth-containing composition.

In accordance with some embodiments, the treated medium 124 has a lower content of at least one target material compared to the target material-containing medium 104.

Commonly, the treated medium 124 content is at least about 0.9 of the medium target material-containing medium 104, more commonly the treated medium 124 content is at least about 0.8 of the medium target material-containing medium 104, even more commonly the treated medium 124 content is at least about 0.7 of the target material-containing medium 104, yet even more commonly the treated medium 124 content is at least about 0.6 of the target material-containing medium 104, still yet even more commonly the treated medium 124 content is at least about 0.5 of the target material-containing medium 104, still yet even more commonly the treated medium 124 content is at least about 0.4 of the target material-containing medium 104, still yet even more commonly the treated medium 124 content is at least about 0.3 of the target material-containing medium 104, still yet even more commonly the treated medium 124 content is at least about 0.2 of the target material-containing medium 104, still yet even more commonly the treated medium 124 content is at least about 0.1 of the target material-containing medium 104, still yet even more commonly the treated aqueous media 124 content is at least about 0.05 of the target material-containing medium 104, still yet even more commonly the treated medium 124 content is at least about 0.01 of the target material-containing medium 104, still yet even more commonly the treated 124 content is at least about 0.005 of the target material-containing medium 104, still yet even more commonly the treated medium 124 content is at least about 0.001 of the target material-containing medium 104, still yet even more commonly the treated medium 124 content is at least about 0.5 of the target material-containing medium 104, still yet even more commonly the treated medium 124 content is at least about 0.0005 of the target material-containing medium 104, still yet even more commonly the treated medium 124 content is at least about 0.0001 of the target material-containing medium 104, still yet even more commonly the treated medium 124 content is at least about $5\times10^{-5}$ of the target material-containing medium 104, still yet even more commonly the treated medium 124 content is at least about $1\times10^{-5}$ of the target material-containing medium 104, still yet even more commonly the treated medium 124 content is at least about $5\times10^{-6}$ of the target material-containing medium 104, and still yet even more commonly the treated medium 124 content is at least about $1\times10^{-6}$ of the target material-containing medium 104. Typically, the target material content in the treated medium 124 content is no more than about 100,000 ppm, more typically the target material content in the treated medium 124 content is no more than about 10,000 ppm, even more typically the target material content in the treated medium 124 content is no more than about 1,000 ppm, yet even more typically the target material content in the treated medium 124 content is no more than about 100 ppm, still yet even more typically the target material content in the treated medium 124 content is no more than about 10 ppm, still yet even more typically the target material content in the treated medium 124 content is no more than about 1 ppm, still yet even more typically the target material content in the treated medium 124 content is no more than about 100 ppb, still yet even more typically the target material content in the treated medium 124 content is no more than about 10 ppb, still yet even more typically the target material content in the treated medium 124 content is no more than about 1 ppb, and yet still even more typically the target material content in the treated medium 124 content is no more than about 0.1 ppb.

Step 116 can include optional treatment steps.

The treatment can comprise one or more of clarifying, disinfecting, coagulating, aerating, filtering, separating solids and liquids, digesting, and polishing processes. More specifically, the treatment process can commonly comprise one of clarifying, disinfecting, coagulating, aerating, filtering, separating solids and liquids, digesting, and polishing, more commonly any two of clarifying, disinfecting, coagulating, aerating, filtering, separating solids and liquids, digesting, and polishing arranged in any order, even more commonly any three of clarifying, disinfecting, coagulating, aerating, filtering, separating solids and liquids, digesting, and polishing arranged in any order, yet even more commonly any four of clarifying, disinfecting, coagulating, aerating, filtering, separating solids and liquids, digesting, and polishing arranged in any order, still yet even more commonly any five of clarifying, disinfecting, coagulating, aerating, filtering, separating solids and liquids, digesting, and polishing arranged in any order, still yet even more commonly any six of clarifying, disinfecting, coagulating, aerating, filtering, separating solids and liquids, digesting, and polishing arranged in any order, still yet even more commonly any seven of clarifying, disinfecting, coagulating, aerating, filtering, separating solids and liquids, digesting, and polishing arranged in any order, still yet even more commonly any eight of clarifying, disinfecting, coagulating, aerating, filtering, separating solids and liquids, digesting, and polishing arranged in any order, still yet even more commonly any nine of clarifying, disinfecting, coagulating, aerating, filtering, separating solids and liquids, digesting, and polishing arranged in any order, still yet even more commonly any ten of clarifying, disinfecting, coagulating, aerating, filtering, separating solids and liquids, digesting, and polishing arranged in any order, still yet even more commonly any eleven of clarifying, disinfecting, coagulating, aerating, filtering, separating solids and liquids, digesting, and polishing arranged in any order, and yet still even more commonly each of clarifying, disinfecting, coagulating, aerating, filtering, separating solids and liquids, digesting, and polishing arranged in any order.

Regeneration of Rare Earth in Rare Earth- and Target Material-Containing Product for Recycle The separated rare earth- and target material-containing product may be subjected to suitable processes for removal of the target material from the rare earth to enable the rare earth to be recycled to step 112. Regeneration processes include, for example, desorbtion, oxidation, reduction, thermal processes, irradiation, and the like.

As used herein cerium (III) may refer to cerium (+3), and cerium (+3) may refer to cerium (III). As used herein cerium (IV) may refer to cerium (+4), and cerium (+4) may refer to cerium (IV).

EXAMPLES

The following examples are provided to illustrate certain embodiments and are not to be construed as limitations on the embodiments, as set forth in the appended claims. All parts and percentages are by weight unless otherwise specified.

Example 1

A set of tests were conducted to determine a maximum arsenic loading capacity of soluble cerium (III) chloride $CeCl_3$ in an arsenic-containing stream to reduce the arsenic concentration to less than 50 ppm. As shown by Table 1, arsenic-containing streams (hereinafter alkaline leach solutions) tested had the following compositions:

TABLE 1

| Test Number | Volume of DI (mL) | $Na_2CO_3$ (g) | $Na_2SO_4$ (g) | $Na_2HAsO_4$—$7H_2O$ (g) | As g/L |
|---|---|---|---|---|---|
| 1 | 500 | 10 | 8.875 | 1.041 | 0.5 |
| 2 | 500 | 10 | 8.875 | 2.082 | 1 |
| 3 | 500 | 10 | 8.875 | 4.164 | 2 |
| 4 | 500 | 10 | 8.875 | 6.247 | 3 |
| 5 | 500 | 10 | 8.875 | 8.329 | 4 |
| 6 | 500 | 10 | 8.875 | 10.411 | 5 |
| 7 | 500 | 10 | 8.875 | 12.493 | 6 |

The initial pH of the seven alkaline leach solutions was approximately pH 11, the temperatures of the solutions were approximately 70 to 80° C., and the reaction times were approximately 30 minutes.

Seven alkaline leach solutions were made with varying arsenic (V) concentrations, which can be seen in Table 1 above. Each solution contained the same amount of sodium carbonate (20 g/L) and sodium sulfate (17.75 g/L). In a first series of tests, 3.44 mL of cerium chloride ($CeCl_3$) were added to every isotherm and equates to 0.918 g $CeO_2$ (approximately 0.05 mole Ce) In a second series of tests, 6.88 mL of cerium chloride was added to every test and equates to 1.836 g $CeO_2$ (approximately 0.1 mole Ce). Below is the guideline on how each isotherm test was performed.

In a first step, 200 mL of solution were measured out by weight and transferred into a 400 mL Pyrex beaker. The beaker was then placed on hot/stir plate and heated to 70-80° C. while being stirred.

In a second step, 3.44 mL of cerium chloride were measured out, by weight, and poured into the mixing beaker of hot alkaline leach solution. Upon the addition of cerium chloride, a white precipitate formed instantaneously. To ensure that the white precipitate was not cerium carbonate [$Ce_2(CO_3)_3 \cdot xH_2O$], step three was performed.

In the third step, 4.8 mL of concentrated HCl were slowly added dropwise. Fizzing was observed. The solution continued to mix for 30 minutes and was then allowed to cool for 4 hours before sampling.

The results are shown in Table 2:
Analysis Using ICP-AES

TABLE 2

| Approximate Moles of Cerium Added | Arsenic (g/L) | Molar Ratio (Ce/As) | Final As Concentration (mg/L) | Arsenic Removed (mg) | Loading Capacity (mg/g) | Percent Arsenic Removed |
|---|---|---|---|---|---|---|
| 0.005 | 0.5 | 4.2 | 0 | 100 | 104 | 100 |
|  | 1.0 | 2.1 | 8 | 199 | 206 | 99 |
|  | 2.0 | 1.0 | 159 | 367 | 380 | 92 |
|  | 3.0 | 0.7 | 903 | 412 | 426 | 69 |
|  | 4.0 | 0.5 | 1884 | 408 | 422 | 51 |
|  | 5.0 | 0.4 | 2663 | 445 | 461 | 45 |
|  | 6.0 | 0.4 | 3805 | 409 | 422 | 34 |
| 0.01 | 0.5 | 8.3 | 0 | 102 | 53 | 100 |
|  | 1.0 | 4.2 | 0 | 201 | 104 | 100 |
|  | 2.0 | 2.1 | 55 | 388 | 201 | 97 |
|  | 3.0 | 1.4 | 109 | 577 | 299 | 96 |
|  | 4.0 | 1.1 | 435 | 709 | 367 | 89 |
|  | 5.0 | 0.8 | 1149 | 759 | 392 | 76 |
|  | 6.0 | 0.7 | 1861 | 810 | 419 | 67 |

Figure 48:
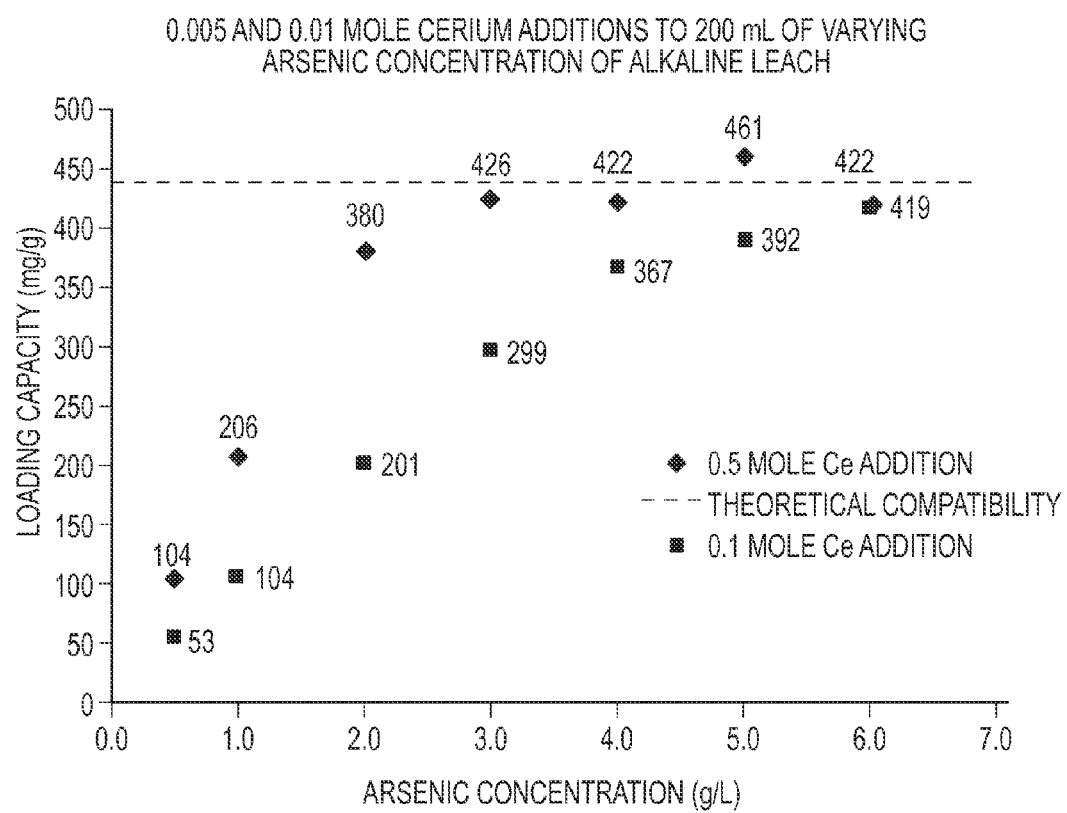
FIG. 48 is a plot of loading capacity (mg/g) (vertical axis) versus arsenic concentration (g/L) (horizontal axis)
Figure 49:
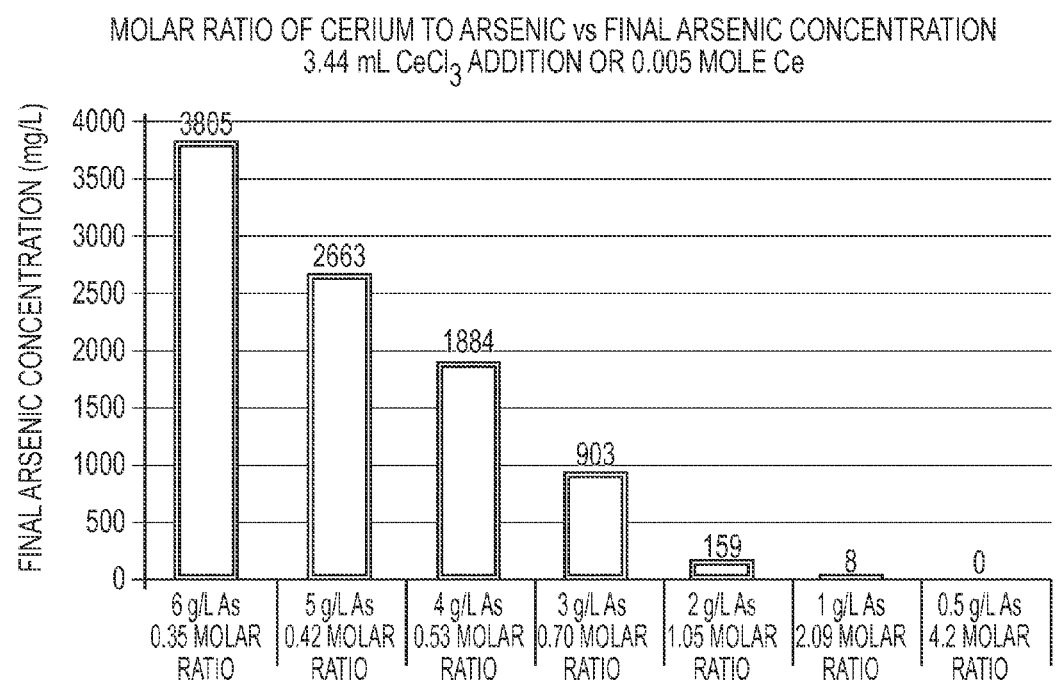
FIG. 49 is a plot of final arsenic concentration (mg/L) (vertical axis) versus molar ratio of cerium:arsenic (horizontal axis)
Figure 50:
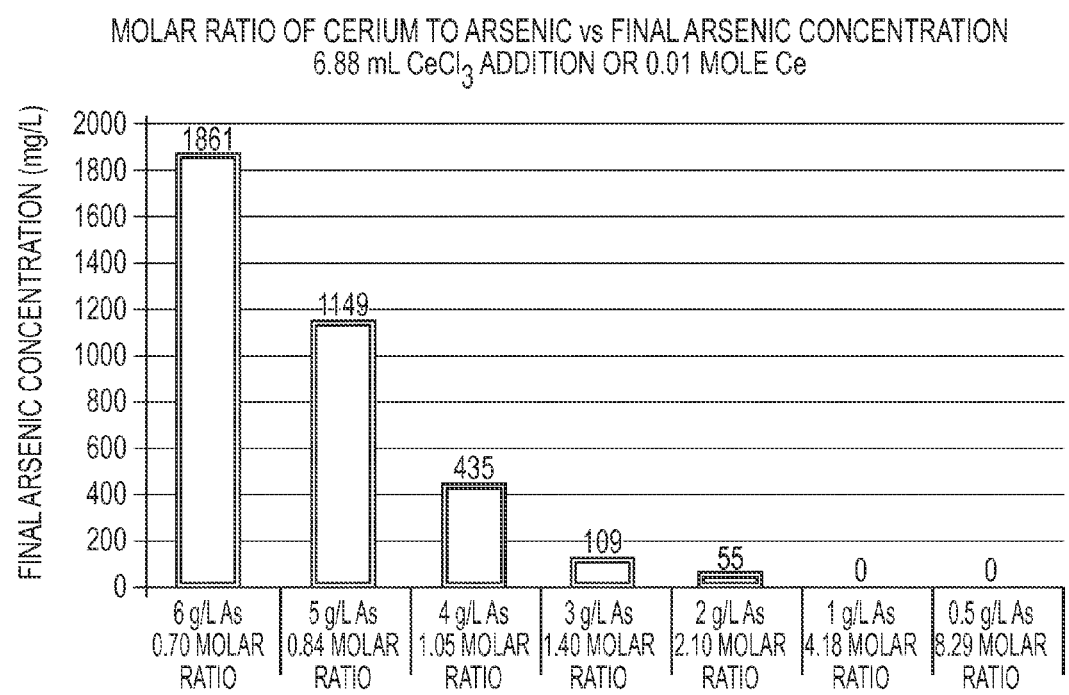
FIG. 50 is a plot of final arsenic concentration (mg/L) (vertical axis) versus molar ratio of cerium to arsenic (horizontal axis)

FIG. 48 shows that the loading capacity begins to level off at the theoretical capacity of 436 mg/g if cerium arsenate ($CeAsO_4$) was formed, leading one to believe it was formed. FIG. 49 displays that the molar ratio of cerium to arsenic required to bring down the arsenic concentration to less than 50 ppm lies somewhere between a 1 molar and 2 molar ratio. However, at a 2 molar ratio a loading capacity of 217 was achieved. FIG. 50 shows very similar results (essentially double the addition of $CeCl_3$); at a molar ratio between 1 and 2, the dissolved arsenic concentration can be below 50 ppm. This capacity may be improved with a lower molar ratio and tighter pH control.

Example 2

In this example, the product of cerium and arsenic was shown to contain more arsenic than would be anticipated based upon the stoichiometry of gasparite, the anticipated product of cerium and arsenic. Furthermore, the X-ray diffraction pattern suggests that the product is amorphous or nanocrystalline and is consistent with ceria or, possibly, gasparite. The amorphous or nanocrystalline phase not only permits the recycling of process water after arsenic sequestration but does so with a far greater arsenic removal capacity than is observed from other forms of cerium addition, decreasing treatment costs and limiting environmental hazards.

Eight 50 mL centrifuge tubes were filled with 25 mL each of a fully oxidized solution of arsenate/sulfate/NaOH while another eight 50 mL centrifuge tubes were filled with 25 mL each of a fully reduced solution of arsenite/sulfide/NaOH that had been sparged with molecular oxygen for 2 hours. Both solutions contained 24 g/L arsenic, 25 g/L NaOH, and the equivalent of 80 g/L sulfide. Each sample was then treated with either cerium (IV) nitrate or cerium (III) chloride. The cerium salt solutions were added in doses of 1, 2, 3, or 5 mL. No pH adjustments were made, and no attempt was made to adjust the temperature from ambient 22° C.

Fifteen of sixteen test samples showed the rapid formation of a precipitate that occupied the entire ~25 mL volume. The reaction between the two concentrated solutions took place almost immediately, filling the entire solution volume with a gel-like precipitate. The sixteenth sample, containing 5 mL of cerium (IV) remained bright yellow until an additional 5 mL of 50% NaOH was added, at which point a purple solid formed.

Solids formed from the reaction of cerium and arsenic were given an hour to settle with little clarification observed. The samples were then centrifuged at 50% speed for 5 minutes. At this point, the total volume of the solution and the volume of settled solids were recorded, and a 5 mL sample was collected for analysis. Since little more than 5 mL of supernatant solution was available (the concentration of arsenic was 24 g/L, meaning that the concentration of cerium was also quite elevated), the samples were filtered using 0.45 micron papers. The four samples with 5 mL of cerium salt added were not filtered. The supernatant solutions were collected and the volume recorded.

The filter cake from the reaction was left over the weekend in plastic weight boats atop a drying oven. Seventy-two hours later, the content of each boat was weighed, and it was determined that the pellets were still very moist (more mass present than was added to the sample as dissolved solids). The semi-dry solids of the samples with 2 mL of cerium salt solution were transferred to a 130° C. drying oven for one hour, then analyzed by XRD.

Figure 51:
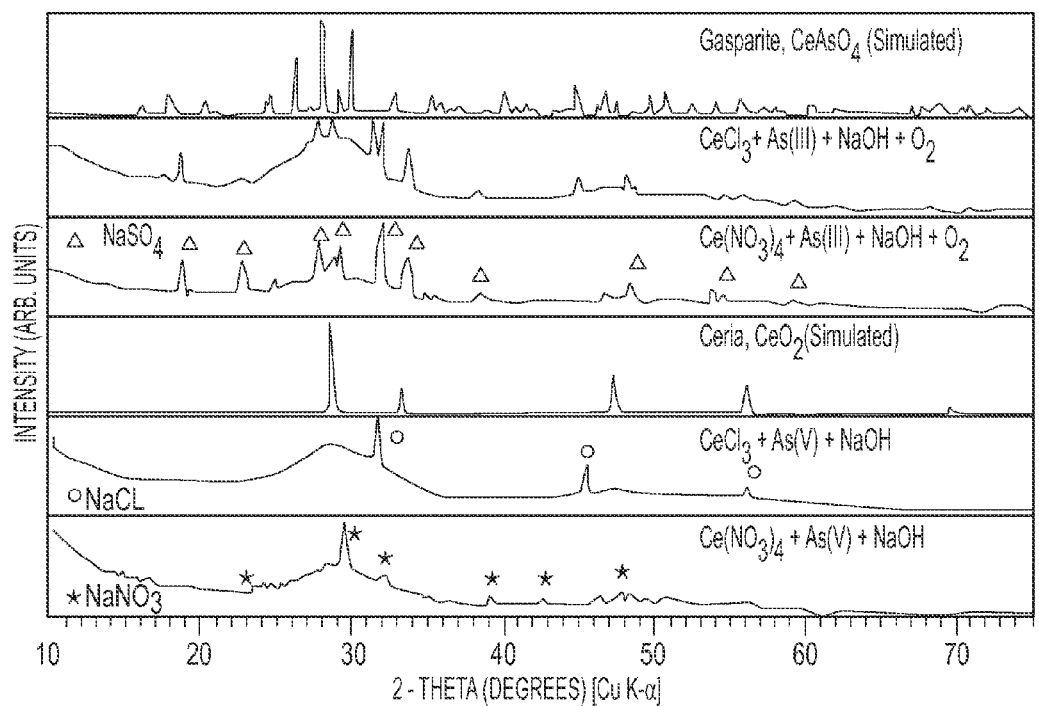
FIG. 51 is a series of XRD patterns for precipitates formed upon addition of Ce (III) or Ce (IV) solutions to sulfide-arsenite solutions and sulfate-arsenate solutions.

The XRD results are shown in FIG. 51. XRD results are presented for gasparite (the expected product) and the various systems that were present during the experiments, with "ceria" corresponding to cerium dioxide. As can be seen from FIG. 51, the XRD analysis did not detect any crystalline peaks or phases of arsenic and cerium solids in the various systems. The only crystalline material present was identified as either NaCl, NaNO$_3$ (introduced with the rare earth solutions) or Na$_2$SO$_4$ that was present in the samples prepared from Na$_2$SO$_4$. However, the broad diffraction peaks at about 29, 49, and 57 degrees 2-Theta could be indicative of very small particles of ceria or, possibly, gasparite.

Figure 52:
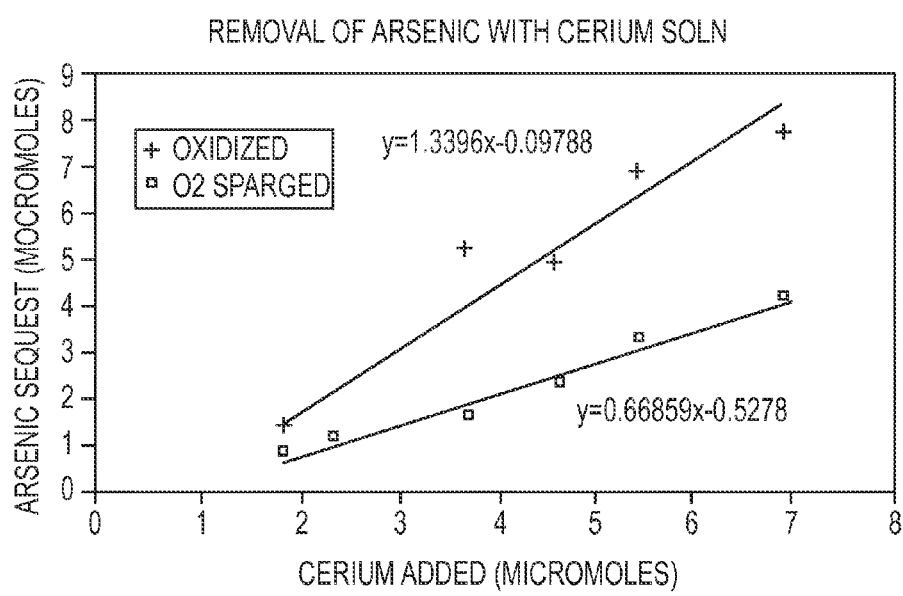
FIG. 52 is a plot of arsenic sequestered (micromoles) (vertical axis) and cerium added (micromoles) (horizontal axis)

The arsenic content of supernatant solutions was measured using ICP-AES. It was observed that both cerium (IV) and cerium (III) effectively removed arsenic from the system to about the same extent. As can be seen from Table 3 below and FIG. 52, a greater difference in arsenic removal was found between the fully oxidized system, and the system which was fully reduced before molecular oxygen sparging. FIG. 52 shows a plot for arsenic micromoles removed in an "oxidized" system staring with arsenate and a "molecular oxygen sparged" system starting with arsenite, which was subsequently oxidized to arsenate through molecular oxygen sparging.

TABLE 3

| Cerium Additive | mL Ce | Arsenite/sulfide/NaOH + O2 | | | Arsenate/sulfate/ NaOH | |
|---|---|---|---|---|---|---|
| | | CeO$_2$ (g) | As ppm | As capacity (mg/g) | As ppm | As capacity (mg/g) |
| cerium (III) chloride | 1 | 0.33 | 21200 | 242 | 20000 | 276 |
| | 2 | 0.65 | 18800 | 271 | 8700 | 576 |
| | 3 | 0.98 | 11200 | 324 | 1000 | 596 |
| cerium (IV) nitrate | 1 | 0.26 | 21600 | 265 | 19200 | 429 |
| | 2 | 0.52 | 18800 | 237 | 8000 | 764 |
| | 3 | 0.77 | 13600 | 322 | 3200 | 672 |
| control | 0 | 0.0 | 25200 | | 24400 | |

FIG. 52 shows the amount of arsenic consumed by the formation of precipitated solids, plotted as a function of the amount of cerium added. The resultant soluble arsenic concentrations from this experiment can be divided into two groups: samples containing fully oxidized arsenate and sulfate and samples containing arsenite and sulfite that was sparged with molecular oxygen. The oxidation state of the cerium used as the soluble fixing agent had considerably less impact on the efficacy of the process, allowing both Ce(III) and Ce(IV) data to be fit with a single regression line for each test solution. In the case of the fully oxidized solution, arsenic sequestration with the solids increases in an arsenic to cerium molar ratio of 1:3, potentially making a product with a stoichiometry of Ce$_3$As$_4$.

Example 3

A series of experiments were performed, the experiments embody the precipitation of arsenic, in the As (V) state, from a highly concentrated waste stream of pH less than pH 2 by the addition of a soluble cerium salt in the Ce (III) state followed by a titration with sodium hydroxide (NaOH) solution to a range of between pH 6 and pH 10.

In a first test, a 400 mL solution containing 33.5 mL of a 0.07125 mol/L solution of NaH$_2$AsO$_4$ was stirred in a beaker at room temperature. The pH was adjusted to roughly pH 1.5 by the addition of 4.0 mol/L HNO$_3$, after which 1.05 g of Ce(NO$_3$)$_3$.6 H$_2$O was added. No change in color or any precipitate was observed upon the addition of the cerium (III) salt. NaOH (1.0 mol/L) was added to the stirred solution at a dropwise pace to bring the pH to pH 10.1. The pH was held at pH 10.2±0.2 for a period of 1.5 hours under magnetic stir. After the reaction, the solution was removed from the stir plate and allowed to settle undisturbed for 12 to 18 hours. The supernatant was decanted off and saved for ICP-MS analysis of Ce and As. The solids were filtered through a 0.4 µm cellulose membrane and washed thoroughly with 500 to 800 mL of de-ionized water. The solids were air-dried and analyzed by X-ray diffraction.

In a second test, a simulated waste stream solution was prepared with the following components: As (1,200 ppm), F (650 ppm), Fe (120 ppm), S (80 ppm), Si (50 ppm), Ca (35 ppm), Mg (25 ppm), Zn (10 ppm), and less than 10 ppm of Al, K, and Cu. The pH of the solution was titrated down to pH 0.4 with concentrated HCl (12.1 mol/L), and the solution was heated to 70° C. A solution of CeCl$_3$ (6.3 mL, 1.194 mol/L) was added to the hot solution, and the pH was slowly increased to pH 7.5 by dropwise addition of NaOH (20 wt. %, 6.2 mol/L). The solution was then allowed to age at 70° C. under magnetic stirring for 1.5 hours, holding pH at pH 7.5±0.2. The solution was then removed from the heat and allowed to settle undisturbed for 12 to 18 hours. The supernatant was decanted off and saved for ICP-MS analysis of Ce and As. The precipitated solids were centrifuged and washed twice before being filtered through a 0.4 µm cellulose membrane and washed thoroughly with 500 to 800 mL of de-ionized water. The solids were air-dried and analyzed by X-ray diffraction.

In a third test, solid powders of the novel Ce—As compound were tested for stability in a low-pH leach test. 0.5 g of the novel Ce—As compound were added to 10 mL of an acetic acid solution with a pH of either pH 2.9 or pH 5.0. The container was sealed and rotated for 18±2 hours at 30±2 revolutions per minute at an ambient temperature in the range of 22±5° C. After the required rotation time, the solution was filtered through a 0.2 micron filter and analyzed by ICP-MS for Ce and As which may have been leached from the solid. Less than 1 ppm of As was detected by ICP-MS.

Figure 53:
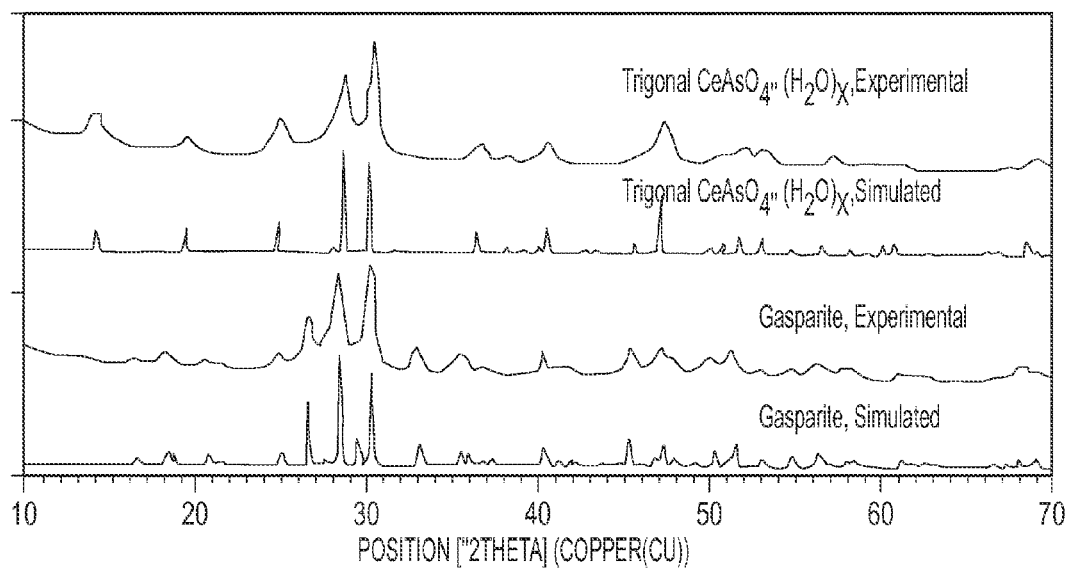
FIG. 53 is a series of XRD patterns exhibiting the structural differences between gasparite ($CeAsO_4$) and the novel trigonal phase $CeAsO_4 \cdot (H_2O)_X$.
Figure 54:
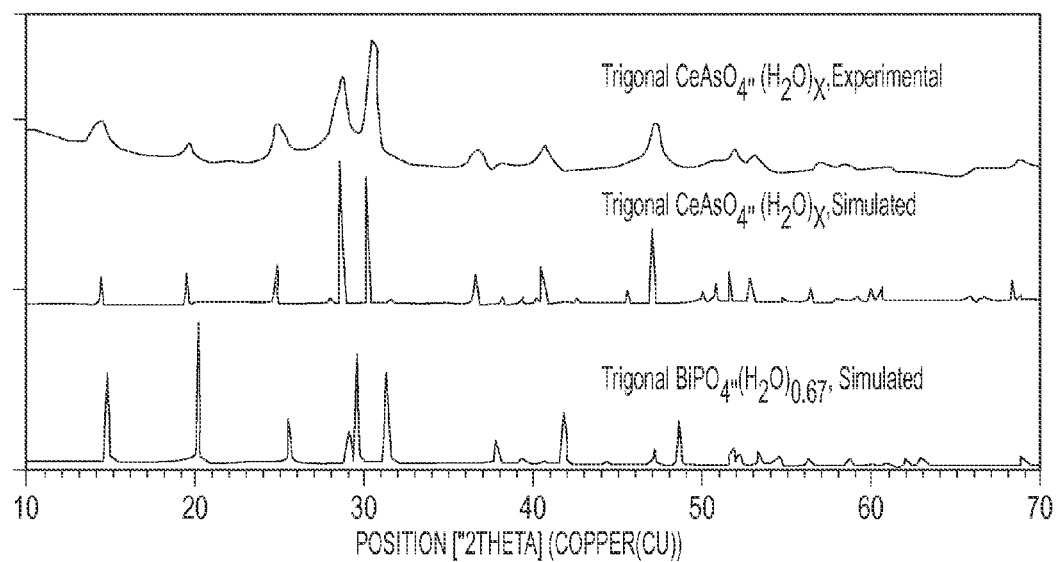
FIG. 54 is a series of XRD patterns exhibiting the structural differences among trigonal $CeAsO_4 \cdot (H_2O)_X$ (experimental), trigonal $CeAsO_4 \cdot (H_2O)_X$ (simulated), and trigonal $BiPO_4 \cdot (H_2O)_{0.67}$ (simulated)

FIG. 53 compares the X-Ray Diffraction ("XRD") results for the novel Ce—As compound (shown as trigonal CeAsO$_4$.(H$_2$O)$_x$ (both experimental and simulated) and gasparite (both experimental and simulated). FIG. 9 compares the XRD results for trigonal CeAsO$_4$.(H$_2$O)$_x$ (both experimental and simulated) and trigonal BiPO$_4$.(H$_2$O)$_{0.67}$ (simulated). The XRD results show that the precipitated crystalline compound is structurally different from gasparite (CeAsO$_4$), which crystallizes in a monoclinic space group with a monazite-type structure, and is quite similar to trigonal BiPO$_4$.(H$_2$O)$_{0.67}$.

Experiments with different oxidation states of Ce and As demonstrate that the novel Ce—As compound requires cerium in the Ce (III) state and arsenic in the As(V) state. pH titration with a strong base, such as sodium hydroxide, seems to be necessary. As pH titration with sodium carbonate produces either gasparite, a known and naturally occurring compound or a combination of gasparite and trigonal $CeAsO_4 \cdot (H_2O)_x$. The use of cerium chloride and cerium nitrate both successfully demonstrated the successful synthesis of the novel compound. The presence of other metal species, such as magnesium, aluminum, silicon, calcium, iron, copper, and zinc, have not been shown to inhibit the synthesis of the novel compound. The presence of fluoride will compete with arsenic removal and produce an insoluble $CeF_3$ precipitate. Solutions containing only arsenic and cerium show that a Ce:As atomic ratio of 1:1 is preferable for forming the novel compound, and solutions containing excess cerium have produced a cerium oxide ($CeO_2$) precipitate in addition to the novel compound. Additionally, the novel compound appears to be quite stable when challenged with a leach test requiring less than 1 ppm arsenic dissolution in solution of pH 2.9 and pH 5.0.

Example 4

In this Example, a test solution containing 1.0 ppmw chromium calculated as Cr was prepared by dissolving reagent grade potassium dichromate in distilled water. This solution contained $Cr^{+6}$ in the form of oxyanions and no other metal oxyanions. A mixture of 0.5 gram of lanthanum oxide ($La_2O_3$) and 0.5 gram of cerium dioxide ($CeO_2$) was slurried with 100 milliliters of the test solution in a glass container. The resultant slurries were agitated with a Teflon coated magnetic stir bar for 15 minutes. After agitation the water was separated from the solids by filtration through Whatman #41 filter paper and analyzed for chromium using an inductively coupled plasma atomic emission spectrometer. This procedure was repeated twice, but instead of slurrying a mixture of lanthanum oxide and cerium dioxide with the 100 milliliters of test solution, 1.0 gram of each was used. The results of these tests 1-3 are set forth below in Table 4.

TABLE 4

| Example Number | Oxyanion in Water Before Test Element | (ppmw) | Slurried Material | Oxyanion in Water After Test (ppmw) | Oxyanion Removed (percent) |
|---|---|---|---|---|---|
| 1 | Cr | 1.0 | 0.5 gm $La_2O_3$ 0.5 gm $CeO_2$ | ≦0.013 | ≧98.7 |
| 2 | Cr | 1.0 | 1.0 gm $CeO_2$ | ≦0.001 | ≧99.9 |
| 3 | Cr | 1.0 | 1.0 gm $La_2O_3$ | ≦0.015 | ≧98.5 |
| 4 | Sb | 1.0 | 0.5 gm $La_2O_3$ 0.5 gm $CeO_2$ | ≦0.016 | ≧98.4 |
| 5 | Sb | 1.0 | 1.0 gm $CeO_2$ | ≦0.016 | ≧98.4 |
| 6 | Sb | 1.0 | 1.0 gm $La_2O_3$ | ≦0.100 | ≧90.0 |
| 7 | Mo | 1.0 | 0.5 gm $La_2O_3$ 0.5 gm $CeO_2$ | ≦0.007 | ≧99.3 |
| 8 | Mo | 1.0 | 1.0 gm $CeO_2$ | ≦0.001 | ≧99.9 |
| 9 | Mo | 1.0 | 1.0 gm $La_2O_3$ | ≦0.009 | ≧99.1 |
| 10 | V | 1.0 | 1.0 gm $La_2O_3$ | ≦0.004 | ≧99.6 |
| 11 | V | 1.0 | 1.0 gm $CeO_2$ | 0.120 | 88.0 |
| 12 | V | 1.0 | 1.0 gm $La_2O_3$ | ≦0.007 | ≧99.3 |
| 13 | U | 2.0 | 0.5 gm $La_2O_3$ 0.5 gm $CeO_2$ | ≦0.017 | ≧98.3 |
| 14 | U | 2.0 | 1.0 gm $CeO_2$ | 0.500 | 75.0 |
| 15 | U | 2.0 | 1.0 gm $La_2O_3$ | ≦0.050 | ≧95.0 |
| 16 | W | 1.0 | 0.5 gm $La_2O_3$ 0.5 gm $CeO_2$ | ≦0.050 | ≧95.0 |
| 17 | W | 1.0 | 1.0 gm $CeO_2$ | ≦0.050 | ≧95.0 |
| 18 | W | 1.0 | 1.0 gm $La_2O_3$ | ≦0.050 | ≧95.0 |

As can be seen the lanthanum oxide, the cerium dioxide and the equal mixture of each were effective in removing over 98 percent of the chromium from the test solution.

Tests 4-6

The procedures of Tests 1-3 were repeated except that a test solution containing 1.0 ppmw antimony calculated as Sb was used instead of the chromium test solution. The antimony test solution was prepared by diluting with distilled water a certified standard solution containing 100 ppmw antimony along with 100 ppmw each of As, Be, Ca, Cd, Co, Cr, Fe, Li, Mg, Mn, Mo, Ni, Pb, Se, Sr, Ti, Tl, V, and Zn. The results of these tests are also set forth in Table 4 and show that the two rare earth compounds alone or in admixture were effective in removing 90 percent or more of the antimony from the test solution.

Tests 7-9

The procedures of Tests 1-3 were repeated except that a test solution containing 1.0 ppmw molybdenum calculated as Mo was used instead of the chromium test solution. The molybdenum test solution was prepared by diluting with distilled water a certified standard solution containing 100 ppmw molybdenum along with 100 ppmw each of As, Be, Ca, Cd, Co, Cr, Fe, Li, Mg, Mn, Ni, Pb, Sb, Se, Sr, Ti, Tl, V, and Zn. The results of these tests are set forth in Table 4 and show that the lanthanum oxide, the cerium dioxide and the equal weight mixture of each were effective in removing over 99 percent of the molybdenum from the test solution.

Tests 10-12

The procedures of Tests 1-3 were repeated except that a test solution containing 1.0 ppmw vanadium calculated as V was used instead of the chromium test solution. The vanadium test solution was prepared by diluting with distilled water a certified standard solution containing 100 ppmw vanadium along with 100 ppmw each of As, Be, Ca, Cd, Co, Cr, Fe, Li, Mg, Mn, Mo, Ni, Pb, Sb, Se, Sr, Ti, Tl, and Zn. The results of these tests are set forth in Table 4 and show that the lanthanum oxide and the equal weight mixture of lanthanum oxide and cerium dioxide were effective in removing over 98 percent of the vanadium from the test solution, while the cerium dioxide removed about 88 percent of the vanadium.

Tests 13-15

The procedures of Tests 1-3 were repeated except that a test solution containing 2.0 ppmw uranium calculated as U was used instead of the chromium test solution. The uranium test solution was prepared by diluting a certified standard solution containing 1,000 ppmw uranium with distilled water. This solution contained no other metals. The results of these tests are set forth in Table 4 and show that, like in Tests 10-12, the lanthanum oxide and the equal weight mixture of lanthanum oxide and cerium dioxide were effective in removing the vast majority of the uranium from the test solution. However, like in those examples, the cerium dioxide was not as effective removing about 75 percent of the uranium.

Tests 16-18

The procedures of Tests 1-3 were repeated except that a test solution containing 1.0 ppmw tungsten calculated as W was used instead of the chromium test solution. The tungsten test solution was prepared by diluting a certified standard solution containing 1,000 ppmw tungsten with distilled water. The solution contained no other metals. The results of these tests are set forth in Table 4 and show that the lanthanum oxide, cerium dioxide, and the equal weight mixture of lanthanum oxide and cerium dioxide were equally effective in removing 95 percent or more of the tungsten from the test solution.

Example 5

This example demonstrates the affinity of halogens for rare earth metals. A series of tests were performed to determine if certain halogens, particularly fluoride (and other halogens), compete with the binding of arsenic to cerium chloride. Arsenic is known to bind strongly to cerium chloride in an aqueous medium when using water soluble cerium chloride ($CeCl_3$). This halogen binding affinity was determined by doing a comparison study between a stock solution containing fluoride and one without fluoride. Materials used were: $CeCl_3$ (1.194 M Ce or 205.43 g/L (Rare Earth Oxide or REO) and 400 mL of the stock. The constituents of the stock solution, in accordance with NSF P231 "general test water 2" ("NSF"), are shown in Tables 5 and 6:

TABLE 5

Amount of Reagents Added

| Compound | Amount of Reagent Added to 3.5 L (g) | Amount of Reagent Added to 3.5 L (g) No Fluoride |
|---|---|---|
| NaF | 5.13 | 0 |
| $AlCl_3 \cdot 6H_2O$ | 0.13 | 0.13 |
| $CaCl_2 \cdot 2 H_2O$ | 0.46 | 0.46 |
| $CuSO_4 \cdot 5H_2O$ | 0.06 | 0.06 |
| $FeSO_4 \cdot 7H_2O$ | 2.17 | 2.16 |
| KCl | 0.16 | 0.15 |
| $MgCl_2 \cdot 6H_2O$ | 0.73 | 0.74 |
| $Na_2SiO_3 \cdot 9H_2O$ | 1.76 | 1.76 |
| $ZnSO_4 \cdot 7H_2O$ | 0.17 | 0.17 |
| $Na_2HAsO_4 \cdot 7H_2O$ | 18.53 | 18.53 |

TABLE 6

Calculated Analyte Concentration

| Element | Theoretical Concentration (gm/L) | Theoretical Concentration (mg/L) No Fluoride |
|---|---|---|
| Cl | 19032 | 15090 |
| Na | 1664 | 862 |
| K | 24 | 22 |
| Cu | 4 | 4 |
| Fe | 125 | 124 |
| Zn | 11 | 11 |
| As | 1271 | 1271 |
| Mg | 25 | 20 |
| Ca | 36 | 36 |
| Al | 16 | 16 |
| Si | 50 | 50 |
| S | 79 | 79 |
| F | 663 | 0 |

The initial pH of the stock solution was pH approximately 0-1. The temperature of the stock solution was elevated to 70° C. The reaction or residence time was approximately 90 minutes.

The procedure for precipitating cerium arsenate with and without the presence of fluorine is as follows:

Step 1:
Two 3.5 L synthetic stock solutions were prepared, one without fluorine and one with fluorine. Both solutions contained the compounds listed in Table 5.

Step 2:
400 mL of synthetic stock solution was measured gravimetrically (402.41 g) and transferred into a 600 mL Pyrex beaker. The beaker was then placed on hot/stir plate and was heated to 70° C. while being stirred.

Step 3:
Enough cerium chloride was added to the stock solution to meet a predetermined molar ratio of cerium to arsenic. For example, to achieve a molar ratio of one ceria mole to one mole of arsenic 5.68 mL of cerium chloride was measure gravimetrically (7.17 g) and added to the stirring solution. Upon addition of cerium chloride a yellow/white precipitate formed instantaneously, and the pH dropped due to the normality of the cerium chloride solution being 0.22. The pH was adjusted to approximately 7 using 20% sodium hydroxide.

Step 4:
Once the cerium chloride was added to the 70° C. solution, it was allowed to react for 90 minutes before being sampled.

Step 5:
Repeat steps 2-4 for all desired molar ratios for solution containing fluoride and without fluoride.

Figure 55:
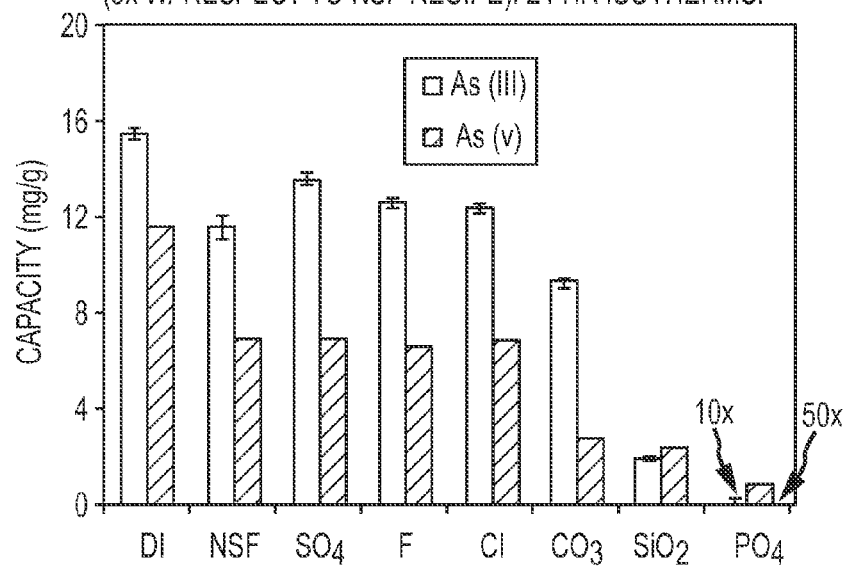
FIG. 55 is a plot of arsenic capacity (mg As/g $CeO_2$) against various solution compositions.
Figure 56:
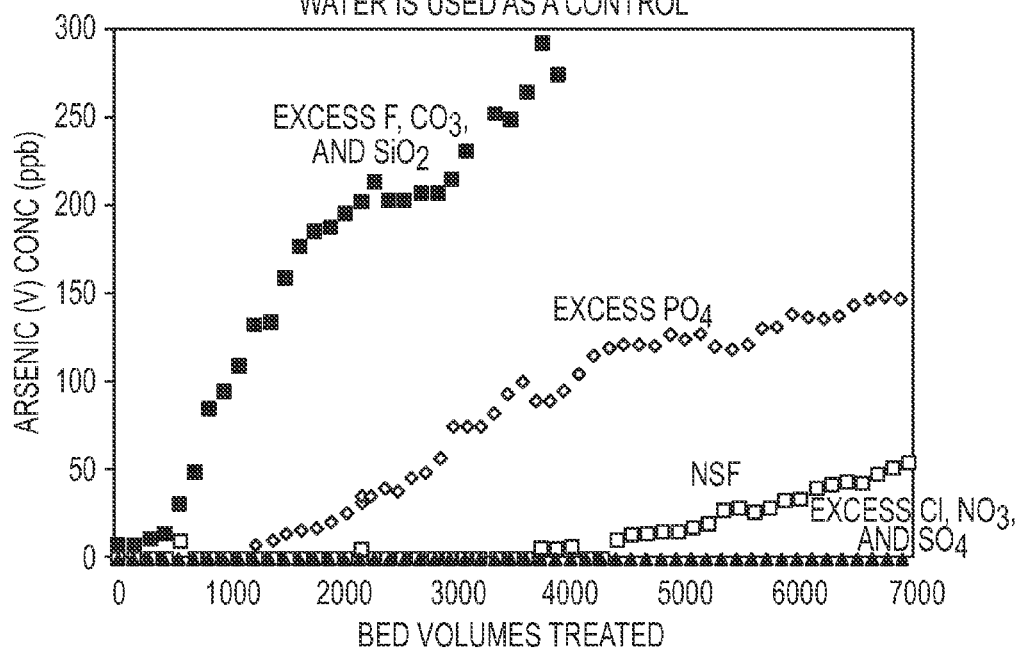
FIG. 56 is a plot of arsenic (V) concentration (ppb) against bed volumes treated.

The results are presented in Table 7 and FIGS. 55 and 56.

Table 7. The residual arsenic concentration in supernatant solution after precipitation with cerium chloride solution.

TABLE 7

| Molar Ratio | Residual As Concentration w/Fluoride Present (mg/L) | Residual As Concentration no Fluoride Present (mg/L) |
|---|---|---|
| 1.00 | 578 | 0 |
| 1.10 | 425 | 0 |
| 1.20 | 286 | 0 |
| 1.30 | 158.2 | 0 |
| 1.40 | 58.1 | 0 |
| 1.50 | 13.68 | 0 |
| 1.60 | 3.162 | 0 |
| 1.71 | 0 | 0 |
| 1.81 | 10.2 | 0 |
| 1.90 | 0 | 0 |
| 2.01 | 0 | 0 |

A comparison of loading capacities for solutions containing or lacking fluoride shows a strong affinity for halogens and halogenated compounds. FIG. 55 shows the affinity of cerium III for fluoride in the presence of arsenic. FIG. 56 shows that the loading capacities (which is defined as mg of As per gram of $CeO_2$) for solutions lacking fluoride are considerably higher at low molar ratios of cerium to arsenic. Sequestration of fluorinated organic compounds, particularly fluorinated pharmaceutical compounds, using rare earth metals, and particularly cerium, is clearly indicated.

Solutions with a cerium to arsenic molar ratio of approximately 1.4 to 1 or greater had a negligible difference in the loading capacities between solution that contained $F^-$ and not having $F^-$. This leads one to believe that an extra 40% cerium was needed to sequester the $F^-$; then the remaining cerium could react with the arsenic.

These results confirm that the presence of fluoride effectively competes with the sequestration of arsenic and other target materials. The interference comes from the competing reaction forming $CeF_3$; this reaction has a much more favorable Ksp. In light of these results, fluorine and other halogens should be removed prior to addition of the rare earth-containing additive.

Example 6

This example demonstrates the successful removal of sulfate-containing compounds, halogenated compounds, carbonate-containing compounds, and phosphate-containing compounds, using a cerium dioxide powder. A cerium powder, having a 400 ppb arsenic removal capacity, was contacted with various solutions containing arsenic (III) as arsenite and arsenic (V) as arsenate and elevated concentrations of the compounds that compete for the known binding affinity between arsenic and cerium. The competing organic compounds included sulfate ions, fluoride ions, chloride ions, carbonate ions, silicate ions, and phosphate ions at concentrations of approximately 500% of the corresponding NSF concentration for the ion. The cerium dioxide powder was further contacted with arsenic-contaminated distilled and NSF P231 "general test water 2" ("NSF") water. Distilled water provided the baseline measurement.

The results are presented in FIG. 55. As can be seen from FIG. 55, the ions in NSF water caused, relative to distilled water, a decreased cerium dioxide capacity for both arsenite and arsenate, indicating a successful binding of these compounds to the rare earth metal. The presence of carbonate ion decreased the cerium dioxide removal capacity for arsenate more than arsenite. The presence of silicate ion decreased substantially cerium dioxide removal capacities for both arsenite and arsenate. Finally, phosphate ion caused the largest decrease in cerium dioxide removal capacities for arsenic (10×NSF concentration) and arsenate (50×NSF concentration), with the largest decrease in removal capacity being for arsenite.

Example 7

A number of tests were undertaken to evaluate solution phase or soluble cerium ion precipitations.

Test 1:

Solutions containing 250 ppm of Cr(VI) were amended with a molar equivalent of cerium supplied as either Ce(III) chloride or Ce(IV) nitrate. The addition of Ce(III) to chromate had no immediate visible effect on the solution, however 24 hours later there appeared to be a fine precipitate of dark solids. In contrast, the addition of Ce(IV) led to the immediate formation of a large amount of solids.

As with the previous example, aliquots were filtered, and the pH adjusted to pH 3 for Ce(IV) and pH 5 for Ce(III). The addition of Ce(III) had a negligible impact on Cr solubility, however Ce(IV) removed nearly 90% of the Cr from solution at pH 3.

Test 2:

Solutions containing 50 ppm of molybdenum Spex ICP standard, presumably molybdate, were amended with a molar equivalent of Ce(III) chloride. As with previous samples, a solid was observed after the cerium addition and an aliquot was filtered through a 0.45 micron syringe filter for ICP analysis. At pH 3, nearly 30 ppm Mo remained in solution, but as pH was increased to 5, the Mo concentration dropped to 20 ppm, and near pH 7 the Mo concentration was shown to be only 10 ppm.

Example 8

These examples examined the adsorption and desorption of a series of non-arsenic anions using methods analogous to those established for the arsenic testing.

Permanganate:

Two examples were performed. In the first example, 40 g of ceria powder were added to 250 mL of 550 ppm $KMnO_4$ solution. In the second example, 20 g of ceria powder were added to 250 mL of 500 ppm $KMnO_4$ solution and pH was lowered with 1.5 mL of 4 N HCl. Lowering the slurry pH increased the Mn loading on ceria four fold.

In both examples the ceria was contacted with permanganate for 18 hours then filtered to retain solids. The filtrate solutions were analyzed for Mn using ICP-AES, and the solids were washed with 250 mL of DI water. The non-pH adjusted solids were washed a second time.

Filtered and washed Mn-contacted solids were weighed and divided into a series of three extraction tests and a control. These tests examined the extent to which manganese could be recovered from the ceria surface when contacted with 1N NaOH, 10% oxalic acid, or 1M phosphate, in comparison to the effect of DI water under the same conditions.

The sample of permanganate-loaded ceria powder contacted with water as a control exhibited the release of less than 5% of the Mn. As with arsenate, NaOH effectively promoted desorption of permanganate from the ceria surface. This indicates that the basic pH level, or basification, acts as an interferer to permanganate removal by ceria. In the case of the second example, where pH was lowered, the effect of NaOH was greater than in the first case where the permanganate adsorbed under higher pH conditions.

Phosphate was far more effective at inducing permanganate desorption than it was at inducing arsenate desorption. Phosphate was the most effective desorption promoter we examined with permanganate. In other words, the ability of the ceria powder to remove permanaganate in the presence of phosphate appears to be relatively low as the capacity of the ceria powder for phosphate is much higher than for permanganate.

Oxalic acid caused a significant color change in the permanganate solution, indicating that the Mn(VII) was reduced, possibly to Mn(II) or Mn(IV), wherein the formation of MnO or $MnO_2$ precipitates would prevent the detection of additional Mn that may or may not be removed from the ceria. A reductant appears therefore to be an interferer to ceria removal of Mn(VII). In the sample that received no pH adjustment, no desorbed Mn was detected. However, in the sample prepared from acidifying the slurry slightly a significant amount of Mn was recovered from the ceria surface.

Chromate 250 mL of solution was prepared using 0.6 g sodium dichromate, and the solution was contacted with 20 g of cerium powder for 18 hours without pH adjustment. The slurry was filtered and the solids were washed with DI water then divided into 50 mL centrifuge tubes to test the ability of three solutions to extract chromium from the ceria surface.

Ceria capacity for chromate was significant and a loading of >20 mg Cr/g ceria was achieved without any adjustments to pH or system optimization (pH of filtrate was approximately 8). Likewise, the extraction of adsorbed chromate was also readily accomplished. Raising the pH of the slurry containing chromate-laden ceria using 1 N NaOH was the most effective method of desorbing chromium that was tested. Considerably less chromate was desorbed using phosphate and even less was desorbed using oxalic acid. This indicates that phosphate and oxalic acid are not as strong interferers to chromate removal when compared to permanganate removal. In the control sample, only 5% of the chromate was recovered when the loaded solid was contacted with distilled water.

Antimony

The solubility of antimony is rather low and these reactions were limited by the amount of antimony that could be dissolved. In this case, 100 mg of antimony (III) oxide was placed into 1 L of distilled water with 10 mL concentrated HCl, allowed several days to equilibrate, and was filtered through a 0.8 micron polycarbonate membrane to remove undissolved antimony. The liter of antimony solution was contacted with 16 g of ceria powder, which was effective removing antimony from solution, but had too little Sb(III) available to generate a high loading on the surface. In part due to the low surface coverage and strong surface-anion interactions, the extraction tests revealed little Sb recovery. Even the use of hydrogen peroxide, which would be expected to convert Sb(III) to a less readily adsorbed species of Sb(V), did not result in significant amounts of Sb recovery.

Arsenic

Tables 8-11 show the test parameters and results.

Table 8: Loading of Cerium Oxide Surface with Arsenate and Arsenite for the Demonstration of Arsenic Desorbing Technologies.

TABLE 8

| A | B<br>[As]<br>(g/L) | C<br>Mass<br>CeO2<br>(g) | D<br>pH | E<br>Resid<br>[As]<br>(ppm) | F<br>As-<br>loading<br>(mg/g) | G<br>Wet<br>Mass | H<br>Wet<br>mass | I<br>Dry<br>(g) | J<br>%<br>Solids | K<br>Rinse<br>Vol<br>(mL) | L<br>Rinse<br>[As]<br>(ppm) | M<br>Final<br>[As]<br>(mg/g) |
|---|---|---|---|---|---|---|---|---|---|---|---|---|
| As (III) | 2.02 | 40.0 | 9.5 | 0 | 50.5 | 68 | 7.48 | 4.63 | 61.9 | 250 | 0 | 50.5 |
| As (V) | 1.89 | 40.0 | 5 | 149 | 43.5 | 69 | 8.86 | 5.33 | 60.2 | 250 | 163 | 42.5 |

TABLE 9

Loading of cerium oxide surface with arsenate and arsenite for the demonstration of arsenic desorbing technologies.

| | [As]<br>(g/L) | pH | Residual<br>[As] (ppm) | As-loading<br>(mg/g) | Rinse [As]<br>(ppm) | Final [As]<br>(mg/g) |
|---|---|---|---|---|---|---|
| As (III) | 2.02 | 9.5 | 0 | 50.5 | 0 | 50.5 |
| As (V) | 1.89 | 5 | 149 | 43.5 | 163 | 42.5 |

TABLE 10

Arsenic extraction from the ceria surface using redox and competition reactions

| Extractant | pH | % As(III)<br>recovered | % As(V)<br>recovered |
|---|---|---|---|
| Water | 7 | 0.0 | 1.7 |
| 1N NaOH | 13 | 0.2 | 60.5 |
| 20% NaOH | 14 | 2.1 | 51.8 |
| 0.25 $PO_4^{3-}$ | 8 | 0.4 | 15.0 |
| 10 g/L $CO_3^{2-}$ | 10 | 2.0 | 7.7 |
| 10% oxalate | 2.5 | 3.0 | 16.5 |
| 30% $H_2O_2$ | 6 | 2.0 | 1.5 |
| $H_2O_2$/NaOH | 13 | 25.2 | 31.0 |
| 0.1M ascorbate | 4 | 0.0 | 0.0 |

TABLE 11

Loading and extraction of other adsorbed elements from the ceria surface (extraction is shown for each method as the 'percent loaded that is recovered)

| | chromate | antimony | Per-<br>manganate | Per-<br>manganate |
|---|---|---|---|---|
| loading pH | 8 | 2 | 6 | 11 |
| loading (mg/g) | 20 | 1 | 4 | 0.7 |
| water (% rec) | 5.1 | <2 | 2.6 | 3.4 |
| 1N NaOH (% rec) | 83 | <2 | 49.9 | 17.8 |
| 10% oxalic (% rec) | 25.8 | 2.3 | 22.8 | <3 |
| 0.5M $PO_4^{3-}$ (% rec) | 60.7 | | 78.6 | 45.8 |
| 30% $H_2O_2$ (% rec) | | 2.3 | | |

Example 9

Struvite particles comprising $NH_4MgPO_4 \cdot 6H_2O$ were mixed in $CeCl_3$ solutions having different molar ratios of $CeCl_3$ to $NH_4MgPO_4 \cdot 6H_2O$ of about 0.8, 1.0, 1.2 and 1.5 $CeCl_3$ to $NH_4MgPO_4 \cdot 6H_2O$. In each instance, the mass of the struvite was about 0.2 g, and the concentration of $CeCl_3$ was about 0.5 mole/L. Furthermore, controls of about 0.2 grams of struvite in about 0.1 L de-ionized water were prepared. The pH value of each solution was adjusted to a pH of about pH 4.3±0.2. Magnetic stir-bars were used to stir each sample solution. After stirring for at least about 16 hours, the solids were filtered from the solution. The filtered solids were analyzed by x-ray diffraction and the solutions were analyzed by ICP-MS. Final solution pH values of the solutions ranged from about pH 4.6 to about pH 8.0. The results are summarized in Table 12.

TABLE 12

| | Nominal Concentrations | | | | Residual Concentrations | | | | |
|---|---|---|---|---|---|---|---|---|---|
| Sample<br>ID | Struvite<br>(mg) | pH<br>Initial | Mg<br>(ppm) | P<br>(ppm) | Ce<br>(ppm) | pH<br>Final | Mg<br>(ppm) | P<br>(ppm) | Ce<br>(ppm) | P<br>Removal |
| A | 205 | 5.0 | 203 | 258 | 935 | 8.0 | 140 | 7.9 | <0.1 | 96.9% |
| B | 205 | 5.6 | 203 | 259 | 1171 | 7.9 | 170 | 8.8 | <0.1 | 96.6% |
| C | 199 | 5.6 | 197 | 251 | 1360 | 5.3 | 170 | <0.5 | 62 | >99.8% |
| D | 202 | 4.9 | 200 | 255 | 1732 | 4.7 | 190 | <0.5 | 270 | >99.8% |
| CONTROL | 198 | 5.6 | 196 | 250 | 0 | 9.3 | 19 | 21 | 0 | N/A |
| CONTROL | 204 | 5.0 | 202 | 257 | 0 | 5.1 | 190 | 260 | 0 | N/A |
| CONTROL | 200 | 7.0 | 198 | 253 | 0 | 7.5 | 70 | 100 | 0 | N/A |

Example 10

Struvite, $NH_4MgPO_4.6H_2O$, particles were mixed in about 0.1 L solutions containing different rare earth chlorides. The rare earth chloride solutions were about 0.15 mol/L solutions of $LaCl_3$, $CeCl_3$, $PrCl_3$ and $NdCl_3$. The mass of struvite added to each rare earth chloride solution was about 0.2 g and the molar ratio of the rare earth chloride to struvite was about 1.0. The pH of rare earth chloride solution was adjusted to a pH of about pH 4.3±0.2. Magnetic stir-bars were used to stir each sample solution. After stirring for at least about 16 hours, the solids were filtered from the solution. The filtered solids were analyzed by x-ray diffraction and the solutions were analyzed by ICP-MS. Final solution pH values ranged from about pH 4.6 to about pH 8.0. The results are summarized in Table 13.

TABLE 13

| Rare Earth Element | Nominal Concentrations | | | | Residual Concentrations | | | | P Removal |
|---|---|---|---|---|---|---|---|---|---|
| | Struvite (mg) | pH Initial | Mg (ppm) | P (ppm) | REE (ppm) | pH Final | Mg (ppm) | P (ppm) | REE (ppm) | |
| La | 202 | 2.3 | 200 | 255 | 1142 | 2.7 | 150 | <0.5 | 200 | >99.8% |
| Ce | 201 | 7.0 | 199 | 254 | 1148 | 5.4 | 110 | <0.5 | 220 | >99.8% |
| Pr | 201 | 3.41 | 199 | 254 | 1156 | 3.8 | 190 | <0.5 | 0.17 | >99.8% |
| Nd | 202 | 2.7 | 200 | 255 | 1188 | 3.3 | 180 | <0.5 | .012 | >99.8% |

Example 11

Example 11 is a control having about 0.2 g of struvite, $NH_4MgPO_4.6H_2O$, particles mixed in about 0.1 L of a 0.15 mol/L acidic ferric chloride, $FeCl_3$, solution. The molar ratio of ferric chloride to struvite was about 1.0 and the initial pH of the solution was about pH 2.5. The initial pH of the control solution was low enough to dissolve the struvite without the presence of ferric chloride. A magnetic stir-bar was used to stir the control solution. After stirring for at least about 16 hours, the solids were filtered from the control solution. The filtered solids were analyzed by x-ray diffraction and the control solution was analyzed by ICP-MS. Final solution pH value was about pH 2.3. The results are summarized in Table 14.

TABLE 14

| Metal Element | Nominal Concentrations | | | | Residual Concentrations | | | | P Removal |
|---|---|---|---|---|---|---|---|---|---|
| | Struvite (mg) | pH Initial | Mg (ppm) | P (ppm) | REE (ppm) | pH Final | Mg (ppm) | P (ppm) | Metal (ppm) | |
| Fe | 200 | 2.5 | 198 | 252 | 454 | 2.3 | 190 | 22 | 2.2 | 91.3% |

The Examples 9-11 show that struvite can be more effectively removed with rare earth-containing compositions than with other removal materials such as ferric chloride.

Example 12

Table 15 summarizes deposit material removal capacities from deinoized and NSF waters for cerium dioxide.

TABLE 15

| Deposit Material | Removal Capacity (mg/g) | |
|---|---|---|
| | DI | NSF |
| Antimonate | 10.91 | — |
| Arsenite | 11.78 | 13.12 |
| Arsenate | 0.86 | 7.62 |
| Nitrate | — | 0.00 |
| Phosphate | — | 35.57 |
| Sulfate | — | 46.52 |

Example 13

Experiments were performed to remove metals and metalloids from de-ionized and NSF standardized waters (see Table 16) by a cerium-containing composition.

TABLE 16

| Contaminant | Removal Capacity (mg/g) | |
|---|---|---|
| | DI | NSF |
| Antimony | 10.91 | |
| Arsenic (III) | 11.78 | 13.12 |
| Arsenic (V) | 0.86 | 7.62 |
| Cadmium | 10.73 | 9.75 |
| Chromium (VI) | 4.35 | 0.01 |
| Copper | 9.91 | 11.65 |
| Lead | 15.23 | 7.97 |
| Mercury | 12.06 | 3.33 |
| Uranium | 12.20 | 9.10 |
| Zinc | 8.28 | 10.32 |

As can be seen from Table 16, a cerium-containing composition is effective in removing species comprising the target materials of Table 16.

Example 14

Experiments were performed to qualitatively determine the ability of a cerium-containing additive to remove metals and metalloids from de-ionized and NSF standardized waters (see Table 17).

TABLE 17

|  | Contaminant | Can Be removed | |
|---|---|---|---|
|  |  | DI | NSF |
| Metals | Antimony | Yes | — |
|  | Arsenic (III) | Yes | Yes |
|  | Arsenic (V) | Yes | Yes |
|  | Cadmium | Yes | Yes |
|  | Chromium (VI) | Yes | — |
|  | Copper | Yes | Yes |
|  | Lead | Yes | Yes |
|  | Mercury | Yes | Yes |
|  | Uranium | Yes | Yes |
|  | Zinc | Yes | Yes |

As can be seen from Table 16, a cerium-containing composition is effective in removing species comprising the target materials of Table 17.

Example 15

Experiments were performed to qualitatively determine the removal of organic, metal, metalloids and non-metal contaminants from de-ionized and NSF standardized waters (see Tables 18 and 19).

TABLE 18

Pb in NSF 53 Water Removal Capacities

| Media | pH | Average Removal Capacity (mg Pb/g media) | Average % Removal |
|---|---|---|---|
| $CeO_2$ | 6.5 | 11.65 | 97.97 |
| Agglomerated $CeO_2$ | 6.5 | 6.35 | 54.41 |
| $CeO_2$ | 8.5 | 12.65 | 97.96 |
| Agglomerated $CeO_2$ | 8.5 | 6.85 | 52.43 |

TABLE 19

| Media | Sample | pH | Initial [Pb] (ug/L) | Volume Treated (L) | Time Tested (Hr) | Mass Media (g) | Final [Pb] (ug/L) | Removal Capacity (mg Pb/g media) | % Removal |
|---|---|---|---|---|---|---|---|---|---|
| $CeO_2$ | 1 | 6.5 | 477 | 0.50 | 24 | 0.0176 | 9.28 | 13.29 | 98.05 |
|  | 2 | 6.5 | 477 | 0.50 | 24 | 0.0274 | 10.7 | 8.51 | 97.76 |
|  | 3 | 6.5 | 477 | 0.50 | 24 | 0.0178 | 9.04 | 13.14 | 98.10 |
| Agglomerated $CeO_2$ | 1 | 6.5 | 438 | 0.50 | 24 | 0.0194 | 195 | 6.26 | 55.48 |
|  | 2 | 6.5 | 438 | 0.50 | 24 | 0.0178 | 209 | 6.43 | 52.28 |
|  | 3 | 6.5 | 438 | 0.50 | 24 | 0.0191 | 195 | 6.36 | 55.48 |
| $CeO_2$ | 1 | 8.5 | 490 | 0.50 | 24 | 0.0216 | 8.28 | 11.15 | 98.31 |
|  | 2 | 8.5 | 490 | 0.50 | 24 | 0.0174 | 11.9 | 13.74 | 97.57 |
|  | 3 | 8.5 | 490 | 0.50 | 24 | 0.0184 | 9.84 | 13.05 | 97.99 |
| Agglomerated $CeO_2$ | 1 | 8.5 | 487 | 0.50 | 24 | 0.0204 | 215 | 6.67 | 55.85 |
|  | 2 | 8.5 | 487 | 0.50 | 24 | 0.0181 | 242 | 6.77 | 50.31 |
|  | 3 | 8.5 | 487 | 0.50 | 24 | 0.0175 | 238 | 7.11 | 51.13 |

$CeO_2$ is in the form of a powder and agglomerated CeO2 is agglomerated with a polymeric binder.

Insoluble forms of lead may be removed from an aqueous media containing one or both of soluble and insoluble forms of lead by the rare-earth containing composition. The insoluble lead may be in the form of colloidal and/or particulate lead, such as, but not limited to a lead oxide, lead hydroxide, and/or lead oxy(hydroxyl). The insoluble lead composition may be in a hydrated form having one or more waters of hydration.

The NSF testing water composition in defined in one or more of the following documents: "NSF/ANSI 42-2007a NSF International Standard/American National Standard for Drinking Water Treatment Units—Drinking Water Treatment Units—Aesthetic Effects" Standard Developer—NSF International, Designated as a ANSI Standard, Oct. 22, 2007, American National Standards; "NSF/ANSI 53-2009e NSF International Standard/American National Standard Drinking Water Treatment Units—Health Effects" Standard Developer—NSF International, designated as an ANSI Standard, Aug. 28, 2009; and "NSF/ANSI 61-2009 NSF International Standard/American National Standard for Drinking Water Additives—Drinking Water System Components—Health Effects" Standard Developer NSF International, designated as an ANSI Standard, Aug. 26, 2009.

Example 16

High surface area ("HAS") ceria (Surface area: 130±10 $m^2/g$) having a loading of about 20 mg was contacted with an analyte having about 0.5 mg/L of the reagent in question and qualifying as NSF 53 water. The NSF water components are provided in Table 20 below:

TABLE 20

NSF 53 Water Components

| Reagent | Concentration (mg/L) |
|---|---|
| Sodium Bicarbonate | 20 |
| Magnesium Sulfate | 30 |
| Calcium Chloride | 30 |

The analyte had a pH of pH 12.25±0.25, a temperature of 20-25° C. (or ambient room temperature.

The analyte was contacted with the HSF ceria for approximately 24 hours.

The reagents in question were bismuth, chromium, cobalt, manganese, zinc and zirconium species. Under the above conditions, the primary species were believed to be in colloidal form.

The media were prepared by measuring 20 mg of HSA ceria in a plastic weigh boat and wetting the HAS ceria media with deionized water for at least 30 minutes.

The analyte was prepared in 2.0 L batches in NSF 53. Lead removal water without added lead. 1,000 mg/L SPEX nitric based standards were obtained and were used to prepare 0.5 mg/L influents of the reagents in question. This solution was mixed with a high shear blender (Ninja Model: BL500 30) for 30 seconds. The pH adjusted to pH 12.25±0.25 with 3M NaOH and mixed for an additional 60 seconds. Previous test with higher concentrations showed that at a pH of 12.25±0.25 particulates were present.

The isotherm was prepared by pouring 500 mL of influent into 4 500 mL bottles. The previously wetted media were poured into each 500 mL sample bottle. Bottles were capped and sealed with electrical tape. Each bottle was then placed within a rolling container that could hold up to 10 bottles. The containers were sealed with duct tape and placed on the rolling apparatus. Samples and controls were rolled for 24 hours. After 24 hours, the rolling containers were removed from the apparatus and the bottles were retrieved from the containers.

For each metal sample, a 5 mL sample was taken and diluted with the addition of 3 mL concentration nitric acid and filtered with a 0.2 µm filter. The samples were acidified to ensure that all metals were in soluble form. Metal samples were analyzed by Inductively Coupled Plasma-Mass Spectrometry (ICP-MS). To confirm the presence of colloidal metals, samples were first filtered to remove any particulates then acidified to ensure metals were in soluble form. Analysis for these test were all below the detection limit for the metal analyzed. All isotherms were prepared and tested in the same manner and were thus readily comparable.

As shown in Table 21, colloidal bismuth, chromium, manganese, and zinc were all removed from NSF 53 water with HSA Ceria. The ability to remove the reagent in question was based on at least a 10% removal of the reagent in question from the influent.

TABLE 21

| Metal | Initial [M+] (ug/L) | Final [M+] (ug/L) | Removal Capacity (mg M+/g media) | % Removal |
|---|---|---|---|---|
| Bismuth | 409.6 | 88.53 | 7.73 | 78.39 |
| Chromium | 318.4 | 262.93 | 1.38 | 17.42 |
| Cobalt | 374.4 | 398.4 | −0.59 | −6.41 |
| Manganese | 417.6 | 366.4 | 1.27 | 12.26 |
| Zinc | 603.2 | 499.73 | 2.53 | 17.15 |
| Zirconium | 321.6 | 346.13 | −0.62 | −7.63 |

*The Final Conc, Removal Capacity, and % Removal were averages taken from three samples This table 22 shows the breakdown of cobalt and zirconium.

TABLE 22

| Metal | Initial [M+] (ug/L) | Final [M+] (ug/L) | Removal Capacity (mg M+/g media) | % Removal |
|---|---|---|---|---|
| Cobalt 9A | 374.40 | 369.60 | 0.12 | 1.28 |
| Cobalt 9B | 374.40 | 440.00 | −1.62 | −17.52 |
| Cobalt 9C | 374.40 | 385.60 | −0.27 | −2.99 |
| Zirconium 12A | 321.60 | 316.80 | 0.12 | 1.49 |
| Zirconium 12B | 321.60 | 296.00 | 0.60 | 7.96 |
| Zirconium 12C | 321.60 | 425.60 | −2.59 | −32.34 |

Colloidal bismuth, chromium, manganese, and zinc were all removed from NSF 53 water with HSA ceria. These results give us an understanding that, under ideal conditions, these reagents could be removed using HSA ceria.

Example 17

This example compares various test results to draw conclusions on how changes in, temperature, surface area, speciation, and concentration affect the loading capacity of arsenic onto ceria. The experimental procedure is set forth below:

Material: $CeO_2$: LOI-4.6%, SA-140 $m^2/g$;
   $CeO_2$: LOI-6.3%, SA-210 $m^2/g$
Loading: 40 g
Test Solution Constituents (Added to 20 L of DI Water):
   2244.45 g of $NiSO_4.6H_2O$
   119.37 g of $CuSO_4.5H_2O$
   57.81 $H_3BO_3$
   406.11 NaCl
   15.01 $FeSO_4.7H_2O$
   4.79 g of $CoSO_4.7H_2O$
   70 con HCl
Test Solution Conditions:
   pH: 1.63
   Density: 1.08 mL/g
Column Influent:
   pH: For all columns it ranged from pH 1.1 to 1.2
   Density: For all columns it was 1.08 g/mL
   Temperature: All columns were run at ambient room temperature ~21° C. or 70° C.
   Flowrate: Flow rates ranged from 1 to 1.8 mL/min, or 2.2%-4.0% Bed Volume
   Approximate Amount of Flocculent Used: 22 drops of 1% Nalco 7871
   Column Bed Dimensions: For all columns 8.5-9 cm by 2.54 cm ID
Media:
   150 g of ACS certified NaCl was added to 1 L volumetric. The salt was then diluted up to the 1 L mark using DI water. The salt was then transferred to a 2 L beaker and heated to a boil. Next, 15 mL of concentrated HCl was added the boiling water while being stirred using a magnetic stir bar. Quickly after the HCl addition, 40.00 g of dry $CeO_2$ was slowly added to the mixing acidic salt solution. This solution is allowed to stir for 5 minutes. Next, 22 drops of 1% Nalco 7871 were added to clarify the solution and prevent classification of the material when it is added into the column.
Loading the Column:
   The flocculated $CeO_2$ media are transferred into a 2.54 cm by 30 cm glass column. DI water is flown through the bed at 12 mL/min to settle the bed until it completely settled down to 8.5 cm. The DI water on top of the bed was decanted and replaced with the influent solution then capped and tightly sealed.

TABLE 23

| As Concentration (mg/L) | Speciation | Temp. (° C.) | Loading at Theoretical | Loading at Theoretical Rare Earth Oxide |
|---|---|---|---|---|
| 1000 | V | 21 | 43 | 45 |
| 3000 | V | 21 | 46 | 48 |
| 1000 | III | 21 | 47 | 49 |
| 3000 | III | 21 | 50 | 52 |
| 1000 | V | 21 | 46 | 50 |
| 3000 | V | 21 | 50 | 54 |
| 1000 | III | 21 | 46 | 49 |
| 3000 | III | 21 | 53 | 56 |
| 1000 | V | 70 | 59 | 61 |
| 3000 | V | 70 | 67 | 70 |
| 1000 | III | 70 | 58 | 61 |
| 3000 | III | 70 | 64 | 67 |
| 1000 | V | 70 | 68 | 72 |
| 3000 | V | 70 | 77 | 82 |
| 1000 | III | 70 | 58 | 62 |
| 3000 | III | 70 | 74 | 74 |
| 6000 | V | 70 | 83 | 89 |
| 6000 | V | 21 | 72 | 78 |

TABLE 23-continued

| As Concentration (mg/L) | Speciation | Temp. (° C.) | Loading at Theoretical | Loading at Theoretical Rare Earth Oxide |
|---|---|---|---|---|
| 6000 | III | 70 | 77 | 82 |
| 6000 | III | 21 | 69 | 73 |

Figure 57:
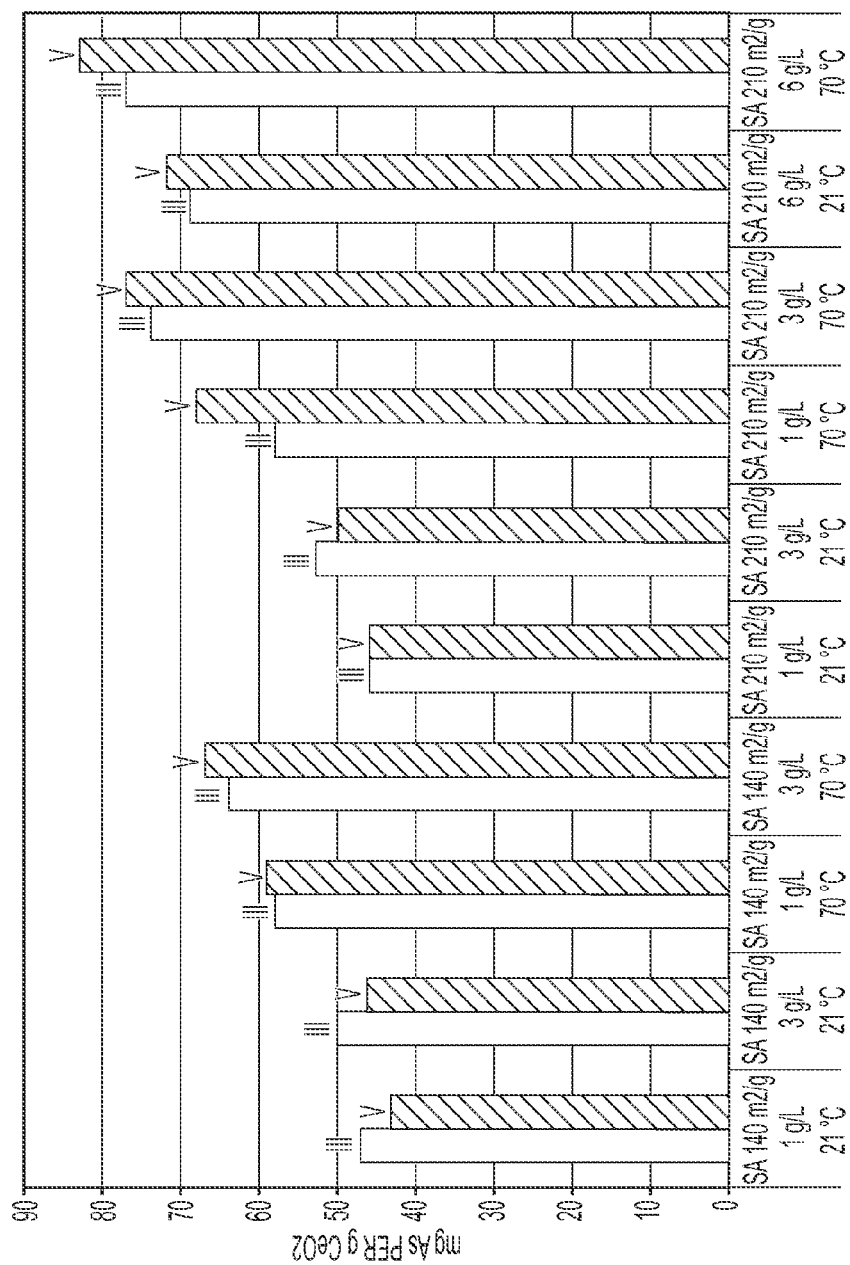
FIG. 57 is a plot of mg As/g $CeO_2$ (vertical axis) against test solution conditions (horizontal axis)
Figure 58:
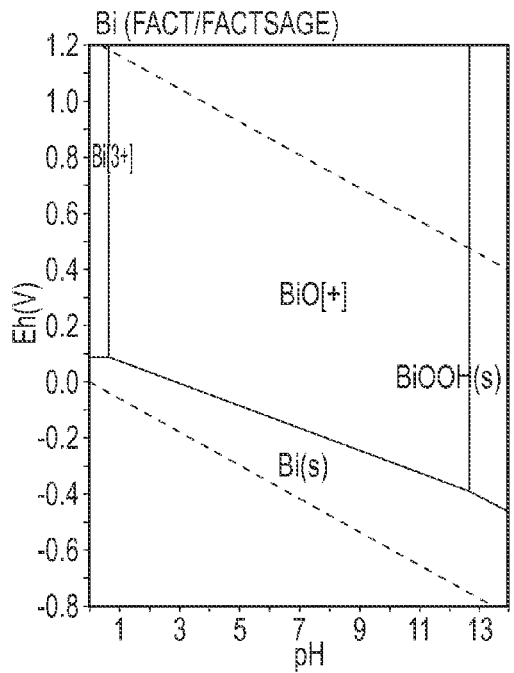
FIG. 58 depicts a prior art Pourbaix diagram under specified conditions for primary species of bismuth.
Figure 59:
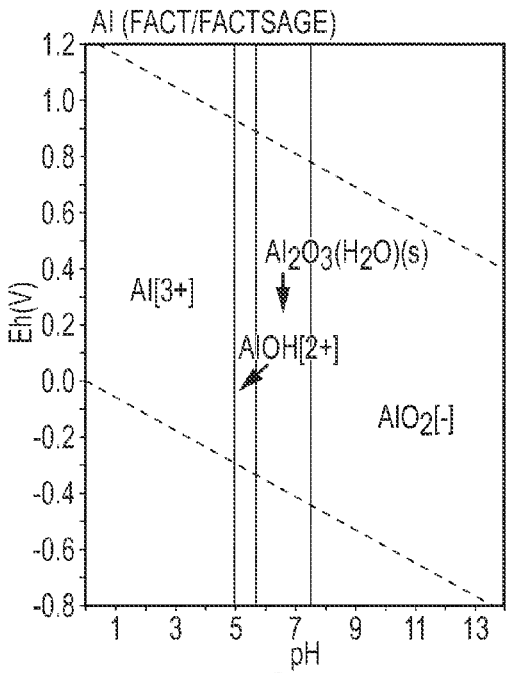
FIG. 59 depicts a prior art Pourbaix diagram under specified conditions for primary species of aluminum.
Figure 60:
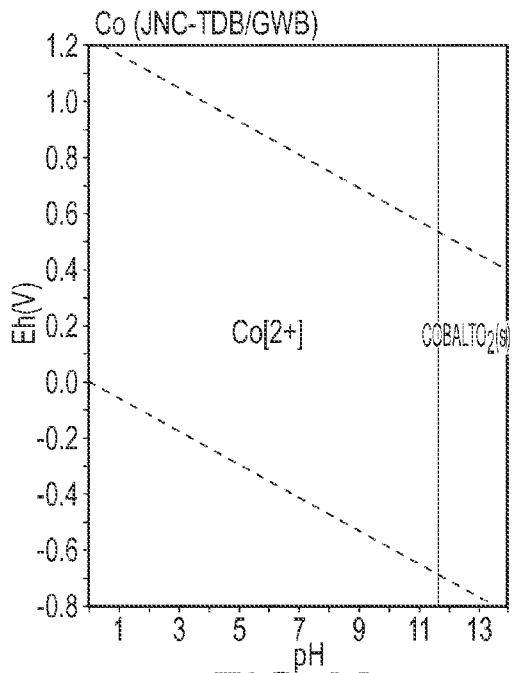
FIG. 60 depicts a prior art Pourbaix diagram under specified conditions for primary species of cobalt.
Figure 61:
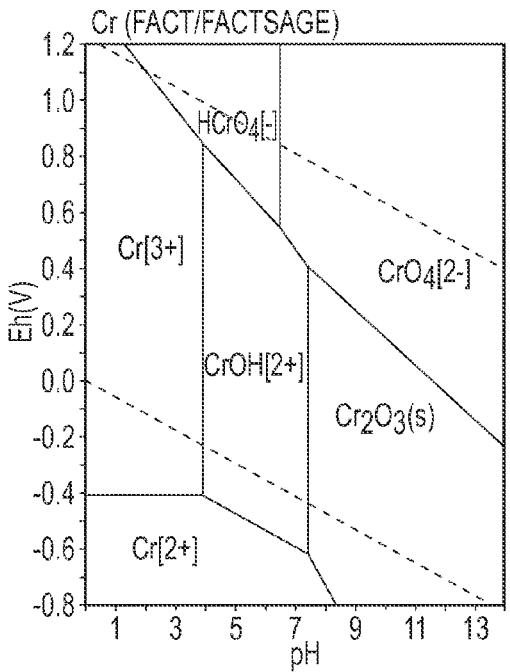
FIG. 61 depicts a prior art Pourbaix diagram under specified conditions for primary species of chromium.
Figure 62:
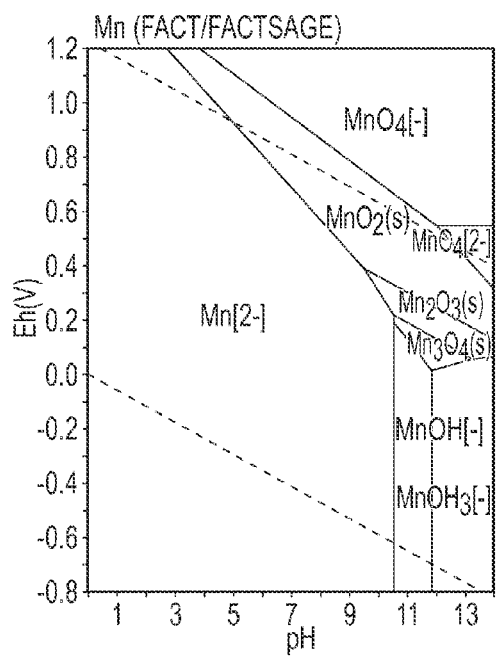
FIG. 62 depicts a prior art Pourbaix diagram under specified conditions for primary species of manganese.
Figure 63:
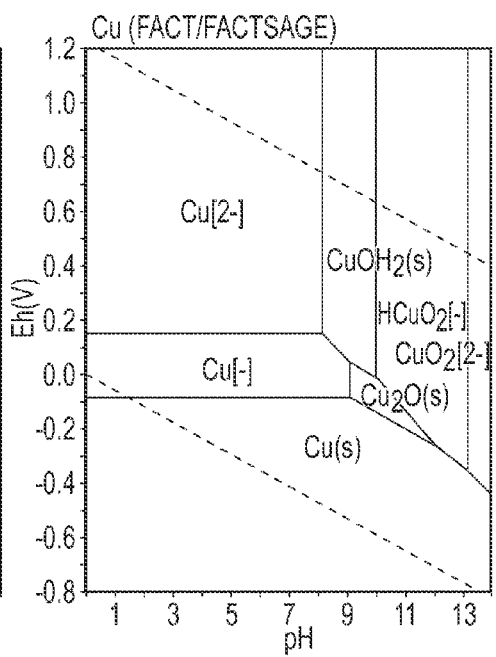
FIG. 63 depicts a prior art Pourbaix diagram under specified conditions for primary species of copper.
Figure 64:
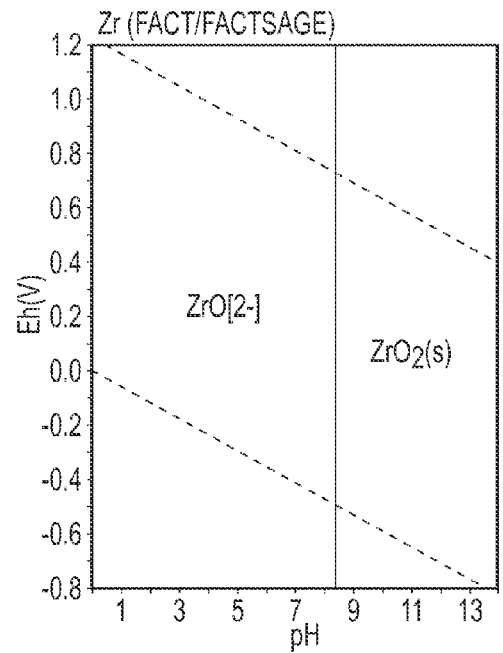
FIG. 64 depicts a prior art Pourbaix diagram under specified conditions for primary species of zirconium.
Figure 65:
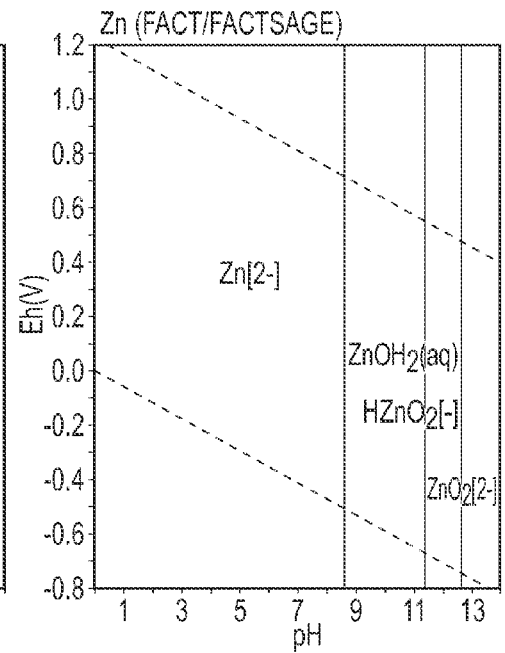
FIG. 65 depicts a prior art Pourbaix diagram under specified conditions for primary species of zinc.
Figure 66A:
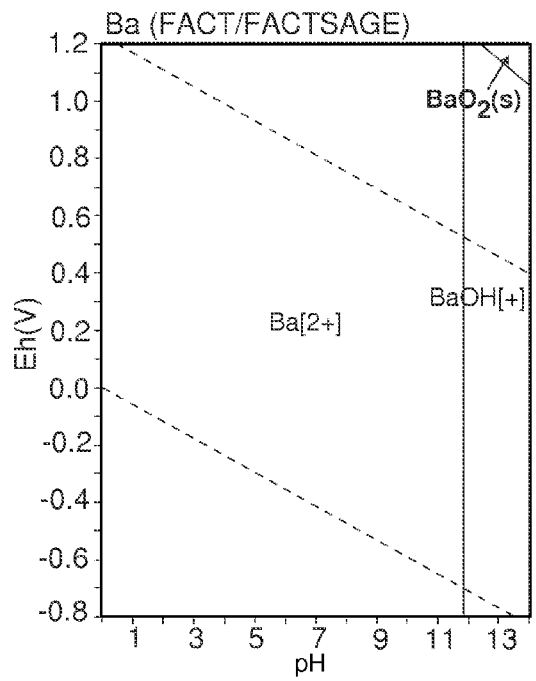
FIGS. 66 A-E depict prior art Pourbaix diagrams under specified conditions for primary species of barium.
Figure 66B:
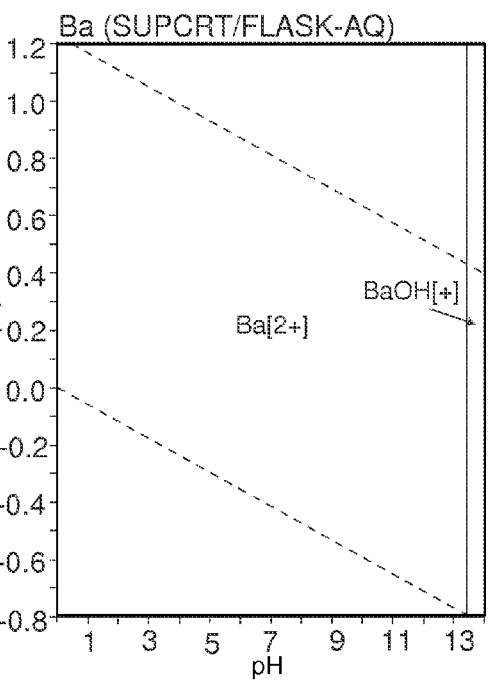
Figure 66C:
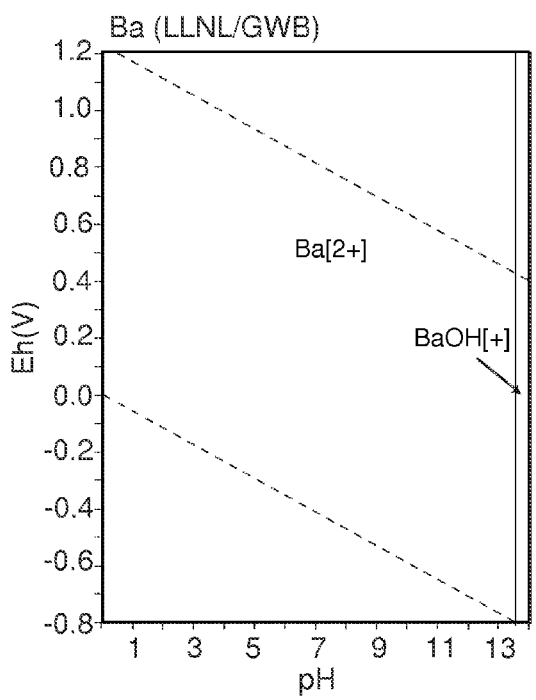
Figure 66D:
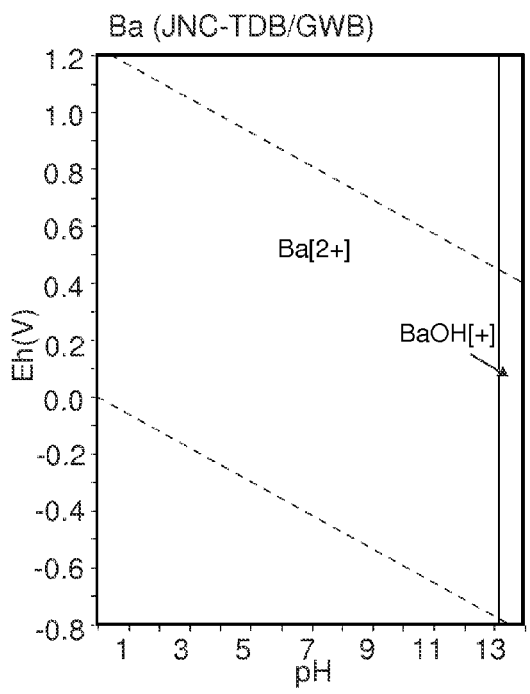
Figure 67A:
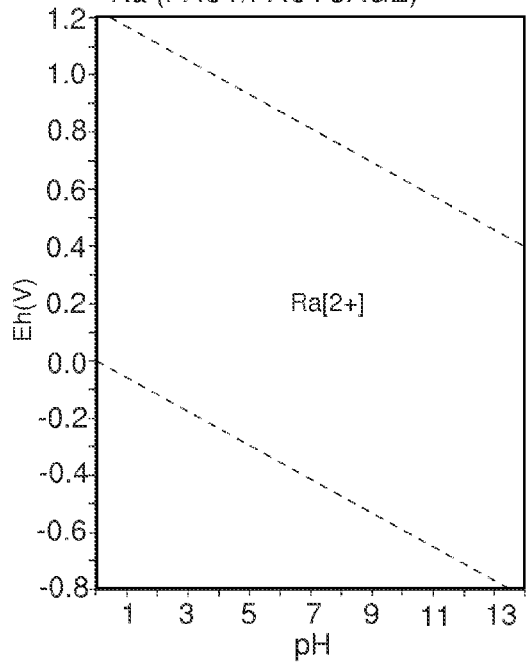
FIGS. 67 A-E depict prior art Pourbaix diagrams under specified conditions for primary species of radium.
Figure 67B:
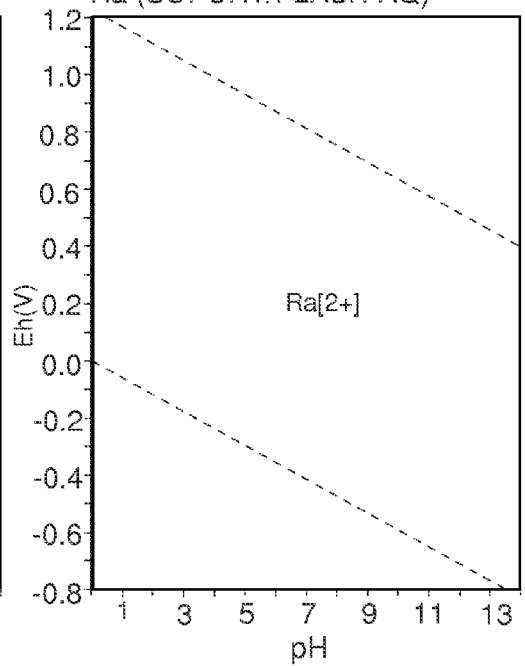
Figure 67C:
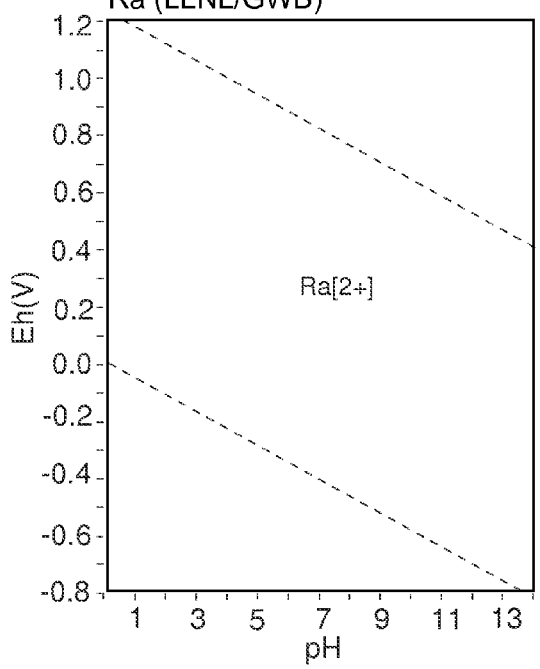
Figure 67D:
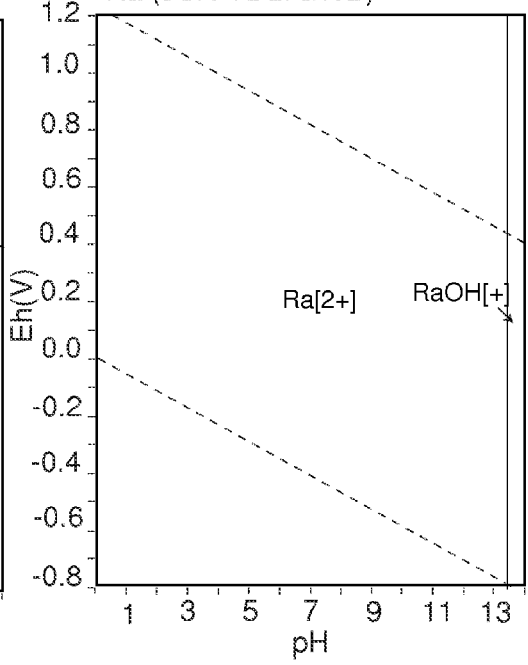
Figure 67E:
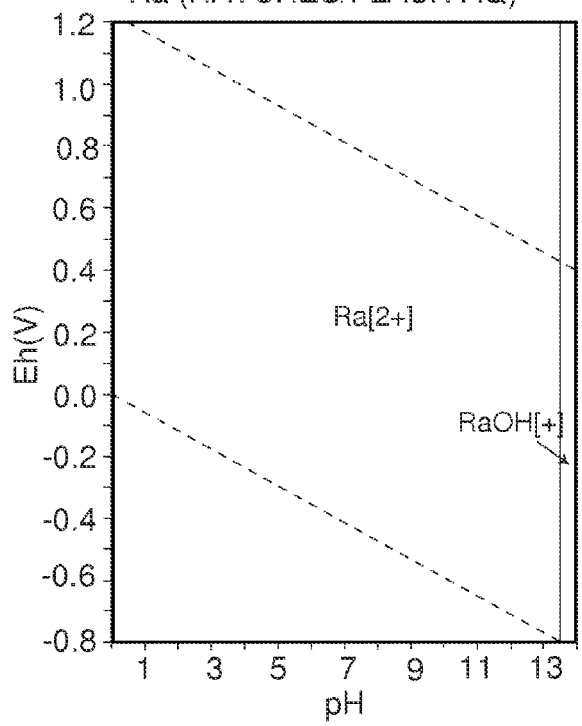

As can be seen from Table 23 and FIG. 57, the arsenic species loading capacity of cerium (IV) oxide loading is affected by changes in temperature, surface area, speciation, and arsenic species concentration.

Example 18

This example determined what colloidal metals can be removed by high surface area ("HSA") cerium (IV) oxide from NSF 53 water. The test parameters were as follows:

Parameters:

Material: HSA ceria oxide (Surface area: 130±10 m²/g)

Loading: 20 mg

Analyte Conc: 0.5 mg/L of the reagent in question NSF 53 water

TABLE 24

| NSF 53 Water Components | |
|---|---|
| Reagent | Concentration (mg/L) |
| Sodium Bicarbonate | 20 |
| Magnesium Sulfate | 30 |
| Calcium Chloride | 30 | pH: Varies

Temperature: 20-25 C ambient room temperature

Contact Duration: 24 hours

Metals Tested Bismuth, Chromium, Cobalt, Manganese, Zinc, Zirconium, Aluminum, and Copper Media Preparation:

20 mg of HSA ceria oxide was measured out in a plastic weigh boat. The media were wetted with DI water for at least 30 minutes.

Influent Preparation:

Influent was prepared in 2.0 L batches in NSF 53 Lead removal water without added Lead. 1000 mg/L SPEX nitric based standards were obtained and were used to prepare 0.5 mg/L influents of the reagents in question. This solution was first mixed with a high shear blender (Ninja Model: BL500 30) for 30 seconds, then pH adjusted with 3M NaOH or conc. HCl, the solution was then mixed for an additional 30 seconds. Oxidation-Reduction-Potential ("ORP") values were then adjusted using solid Sodium Sulfite or 12.5% NaClO solution (see Table 25).

TABLE 25

Test Conditions

| Sample ID | Metal | Metal Species | Target pH | Target ORP (mV) | Actual ORP (mV) | Actual pH |
|---|---|---|---|---|---|---|
| 1 | Bismuth | BiOOH (S) | 12.75-14 | −400-400 | 20 | 13 |
| **1A | Bismuth | Bi(S) | 1-14 | −400 | 225 | 1.68 |
| 2 | Chromium | $Cr_2O_3$ (S) | >7.5 | −400-100 | 56 | 8.54 |
| 2A | Cobalt | $CoO_2$(S) | 12 | na | na | 12.12 |
| 3 | Manganese | $MnO_2$ (S) | 5-14 | 500 | 350 | 11.95 |
| 3A | Manganese | $Mn_2O_3$ (S) | 11-12 | 200-300 | 279 | 11.04 |
| 3B | Manganese | $Mn_3O_4$ (S) | 12 ± 0.5 | 0-100 | 14 | 12 |
| 5 | Zinc | $Zn(OH)_2$ (S) | 8.5-11.5 | −500-600 | 420 | 10.28 |
| 6 | Zirconium | $ZrO_2$ (S) | >8.5 | na | na | 12.06 |
| 7 | Aluminum | $Al_2O_3(H_2O)$(S) | 5.75-7.5 | −400-800 | 275 | 6.74 |
| 8 | Copper | $Cu(OH)_2$ (S) | 8-10 | 100-700 | 500 | 9.50 |
| 8a | Copper | $Cu_2O$ (S) | 9-12 | −100-50 | 49 | 9.91 |

**Correct ORP value was not obtained

Test Procedure:

Isotherm Prep Procedure:

Four 500 mL bottles were charged with 500 g influent each. The previously wetted media were poured into each 500 mL sample bottle. Bottles were capped and sealed with electrical tape. Each bottle was then placed within a rolling container that could hold up to 10 bottles. The containers were then sealed with duct tape and placed on the rolling apparatus. Samples were rolled for 24 hours. After 24 hours, the rolling containers were removed from the apparatus and the bottles were retrieved from the containers.

Sample Prep Procedure for Analysis:

For each metal sample, a 5 mL sample was taken and diluted with the addition of 5 mL 10% Nitric acid and then filtered with a 0.2 μm filter. The samples were acidified to ensure that all metals were in soluble form. Metal samples were analyzed by Inductively Coupled Plasma-Mass Spectrometry (ICP-MS). To confirm the presence of insoluble metals, samples were first filtered with a 0.2 μm filter to remove any insoluble metals then acidified to ensure all samples were the same. All isotherms were prepared and tested in the same manner and were thus readily comparable.

Results:

As shown in Tables 26-27, $Cr_2O_3$ (S), $Mn_3O_4$ (S) $Al_2O_3$ $(H_2O)$ (S), $Cu(OH)_2$ (S), and $Cu_2O$ (S) were all removed from NSF 53 water with HSA Ceria. The ability to remove the reagent in question was based on at least a 10% removal of the reagent in question from the influent.

TABLE 26

| Sample ID | Metal | Metal Species | Initial [M+] (ug/L) | Final [M+] (ug/L) | Removal Capacity (mg M+/g media) | % Removal |
|---|---|---|---|---|---|---|
| 1 | Bismuth | BiOOH (S) | | | | |
| **1A | Bismuth | Bi(S) | | | | |
| 2 | Chromium | $Cr_2O_3$ (S) | 286.11 | 61.04 | 5.54 | 78.67 |
| 2A | Cobalt | $CoO_2$ (S) | 371.4 | 395.40 | −0.59 | −6.46 |
| 3 | Manganese | $MnO_2$ (S) | 24.10 | 59.35 | −0.88 | −146.23 |
| 3A | Manganese | $Mn_2O_3$ (S) | 31.84 | 114.10 | −2.03 | −258.35 |
| 3B | Manganese | $Mn_3O_4$ (S) | 414.6 | 363.40 | 1.27 | 12.35 |
| 5 | Zinc | $Zn(OH)_2$ (S) | 27.50 | 13.42 | 0.35 | 51.21 |
| 6 | Zirconium | $ZrO_2$ (S) | 319.1 | 343.63 | −0.62 | −7.69 |
| 7 | Aluminum | $Al_2O_3(H_2O)$(S) | 349.80 | 1.72 | 8.70 | 99.51 |
| 8 | Copper | $Cu(OH)_2$ (S) | 291.96 | 2.12 | 7.22 | 99.27 |
| 8a | Copper | $Cu_2O$ (S) | 343.10 | 2.92 | 8.25 | 99.15 |

*The Final Conc, Removal Capacity, and % Removal were averages taken from three samples
**Correct ORP value was not obtained

TABLE 27

INSOLUBLE METAL REMOVED

| Metal Used | Metal Species | Initial [M+] (ug/L) | Final [M+] (ug/L) | Removal Capacity (mg M+/g media) | % Removal |
|---|---|---|---|---|---|
| Cobalt 2AA | $CoO_2$ (S) | 371.40 | 366.60 | 0.12 | 1.29 |
| Cobalt 2AB | $CoO_2$ (S) | 371.40 | 437.00 | −1.62 | −17.66 |
| Cobalt 2AC | $CoO_2$ (S) | 371.40 | 382.60 | −0.27 | −3.02 |
| Manganese 3A | $MnO_2$ (S) | 24.102 | 41 | −0.39 | −68.04 |
| Manganese 3B | $MnO_2$ (S) | 24.102 | 72 | −1.19 | −197.57 |
| Manganese 3C | $MnO_2$ (S) | 24.102 | 66 | −1.05 | −173.09 |
| Manganese 3AA | $Mn_2O_3$ (S) | 31.84 | 69 | −0.91 | −117.40 |
| Manganese 3AB | $Mn_2O_3$ (S) | 31.84 | 115 | −2.05 | −260.80 |
| Manganese 3AC | $Mn_2O_3$ (S) | 31.84 | 158 | −3.13 | −396.86 |
| Zinc 5A | $Zn(OH)_2$ (S) | 27.5 | 27 | 0.00 | 0.20 |
| Zinc 5B | $Zn(OH)_2$ (S) | 27.5 | −22 | 1.22 | 178.84 |
| Zinc 5C | $Zn(OH)_2$ (S) | 27.5 | 34 | −0.17 | −25.41 |
| Zirconium 6A | $ZrO_2$ (S) | 319.10 | 314.30 | 0.12 | 1.50 |
| Zirconium 6B | $ZrO_2$ (S) | 319.10 | 293.50 | 0.60 | 8.02 |
| Zirconium 6C | $ZrO_2$ (S) | 319.10 | 423.10 | −2.59 | −32.59 |

Conclusions:

Colloidal chromium, aluminum, and copper were all removed from NSF 53 water with HSA ceria. Some experiments indicated that cobalt, zinc, and zirconium were also removed. The ability of HAS ceria to remove manganese was unclear.

Example 19

This example determined whether colloidal metals can be removed by high surface area ("HSA") cerium (IV) oxide from NSF 53 water. The test parameters were as follows:

Parameters:

Material: HSA Ceria (Surface area: 130±10 m²/g).

Loading: 20 mg.

Analyte Conc: 0.5 mg/L of the reagent in question NSF 53 water, see Table 34.

TABLE 34

NSF 53 Water Components

| Reagent | Concentration (mg/L) |
|---|---|
| Sodium Bicarbonate | 20 |
| Magnesium Sulfate | 30 |
| Calcium Chloride | 30 | pH, ORP: Varies see Table: 28.

Temperature: 20-25 C ambient room temperature.

Contact Duration: 24 hours.

Metals Tested Bismuth, Chromium, Cobalt, Manganese, Zinc, Zirconium, Aluminum, and Copper.

Media Preparation:

20 mg of HSA Ceria was measured out in a plastic weigh boat. The media were wetted with DI water for at least 30 minutes.

Influent Preparation:

Influent was prepared in 2.0 L batches in NSF 53 Lead removal water without added Lead. 1000 mg/L SPEX nitric based standards were obtained and were used to prepare 0.5 mg/L influents of the reagents in question. This solution was first mixed with a high shear blender (Ninja Model: BL500 30) for 30 seconds, then pH adjusted with 3M NaOH or conc. HCl, the solution was then mixed for an additional 30 seconds. ORP values were then adjusted using solid Sodium Sulfite or 12.5% NaClO solution.

TABLE 28

| Sample ID | Metal | Metal Species | Target pH | Target ORP (mV) | Actual ORP (mV) | Actual pH |
|---|---|---|---|---|---|---|
| 1 | Bismuth | $BiOOH_{(S)}$ | 12.75-14 | −400-400 | 20 | 13.00 |
| **1A | Bismuth | $Bi_{(S)}$ | 1-14 | −400 | 20-225 | 12.05 |
| 2 | Chromium | $Cr_2O_{3\ (S)}$ | >7.5 | −400-100 | 56 | 8.54 |

TABLE 28-continued

| Sample ID | Metal | Metal Species | Target pH | Target ORP (mV) | Actual ORP (mV) | Actual pH |
|---|---|---|---|---|---|---|
| 2A | Cobalt | $CoO_{2(S)}$ | 12 | na | na | 12.12 |
| 3 | Manganese | $MnO_{2(S)}$ | 5-14 | 500 | 350 | 11.95 |
| 3A | Manganese | $Mn_2O_{3(S)}$ | 11-12 | 200-300 | 279 | 11.04 |
| 3B | Manganese | $Mn_3O_{4(S)}$ | 12 ± 0.5 | 0-100 | 14 | 12.05 |
| 5 | Zinc | $Zn(OH)_{2(S)}$ | 8.5-11.5 | −500-600 | 420 | 10.28 |
| 6 | Zirconium | $ZrO_{2(S)}$ | >8.5 | na | na | 12.06 |
| 7 | Aluminum | $Al_2O_3(H_2O)_{(S)}$ | 5.75-7.5 | −400-800 | 275 | 6.74 |
| 8 | Copper | $Cu(OH)_{2(S)}$ | 8-10 | 100-700 | 500 | 9.50 |
| 8a | Copper | $Cu_2O_{(S)}$ | 9-12 | −100-50 | 49 | 9.91 |

**ORP value estimated, correct value for $Bi_{(S)}$ never obtained value recorded corresponds to $BiO^+$ Procedure:

Isotherm Prep Procedure:

Four 500 mL bottles were charged with 500 g influent each. The previously wetted media were poured into each 500 mL sample bottle. Bottles were capped and sealed with electrical tape. Each bottle was then placed within a rolling container that could hold up to 10 bottles. The containers were then sealed with duct tape and placed on the rolling apparatus. Samples were rolled for 24 hours. After 24 hours, the rolling containers were removed from the apparatus and the bottles were retrieved from the containers.

Sample Prep Procedure for Analysis:

For each metal sample, a 5 mL sample was taken and diluted with the addition of 5 mL 10% Nitric acid and then filtered with a 0.2 μm filter. The samples were acidified to ensure that all metals were in soluble form. Metal samples were analyzed by Inductively Coupled Plasma-Mass Spectrometry (ICP-MS). To confirm the presence of insoluble metals, samples were first filtered with a 0.2 μm filter to remove any insoluble metals then acidified to ensure all samples were the same. All isotherms were prepared and tested in the same manner and were thus readily comparable.

Results

The results are presented in Tables 29-30.

TABLE 29

| Sample ID | Metal | Target Metal Species | Initial [M+] (ug/L) | Final [M+] (ug/L) | Removal Capacity (mg M+/g media) | % Removal |
|---|---|---|---|---|---|---|
| 1 | Bismuth | $BiOOH_{(S)}$ | 557.17 | 27.77 | 13.16 | 95.02 |
| 1A | Bismuth | $BiO^+$ | 409.6 | 88.53 | 7.73 | 78.39 |
| 2 | Chromium | $Cr_2O_{3(S)}$ | 286.11 | 61.04 | 5.54 | 78.67 |
| 2A | Cobalt | $CoO_{2(S)}$ | 371.4 | 395.40 | −0.59 | −6.46 |
| 3 | Manganese | $MnO_{2(S)}$ | 493 | 59.35 | 10.67 | 87.96 |
| 3A | Manganese | $Mn_2O_{3(S)}$ | 512.5 | 114.10 | 9.79 | 77.74 |
| 3B | Manganese | $Mn_3O_{4(S)}$ | 414.6 | 363.40 | 1.27 | 12.35 |
| 5 | Zinc | $Zn(OH)_{2(S)}$ | 532 | 13.42 | 12.85 | 97.48 |
| 6 | Zirconium | $ZrO_{2(S)}$ | 319.1 | 343.63 | −0.62 | −7.69 |
| 7 | Aluminum | $Al_2O_3(H_2O)_{(S)}$ | 349.80 | 1.72 | 8.70 | 99.51 |
| 8 | Copper | $Cu(OH)_{2(S)}$ | 291.96 | 2.12 | 7.22 | 99.27 |
| 8a | Copper | $Cu_2O_{(S)}$ | 343.10 | 2.92 | 8.25 | 99.15 |

*The Final Conc, Removal Capacity, and % Removal were averages taken from three samples

TABLE 30

INSOLUBLE METAL REMOVED

| Metal Used | Target Metal Species | Initial [M+] (ug/L) | Final [M+] (ug/L) | Removal Capacity (mg M+/g media) | % Removal |
|---|---|---|---|---|---|
| Cobalt 2AA | $CoO_{2(S)}$ | 371.40 | 366.60 | 0.12 | 1.29 |
| Cobalt 2AB | $CoO_{2(S)}$ | 371.40 | 437.00 | −1.62 | −17.66 |
| Cobalt 2AC | $CoO_{2(S)}$ | 371.40 | 382.60 | −0.27 | −3.02 |

TABLE 30-continued

INSOLUBLE METAL REMOVED

| Metal Used | Target Metal Species | Initial [M+] (ug/L) | Final [M+] (ug/L) | Removal Capacity (mg M+/g media) | % Removal |
|---|---|---|---|---|---|
| Zirconium 6A | $ZrO_{2(S)}$ | 319.10 | 314.30 | 0.12 | 1.50 |
| Zirconium 6B | $ZrO_{2(S)}$ | 319.10 | 293.50 | 0.60 | 8.02 |
| Zirconium 6C | $ZrO_{2(S)}$ | 319.10 | 423.10 | −2.59 | −32.59 |

*This table was included due to the negative removal capacities or negative final concentrations of insoluble Cobalt, Manganese, Zinc, and Zirconium.

Conclusions

All metals solutions were prepared in NSF 53 Arsenic test water without the addition of As. These solutions were all challenged with HSA cerium oxide ($CeO_2$) There was definite removal of Bi (target species $BiOOH_{(S)}$, $BiO^+$) There was definite removal of Cr (target species $Cr_2O_{3(S)}$), Mn (target species $MnO_{2(S)}$, $Mn_2O_{3(S)}$, and $Mn_3O_{4(S)}$), Zn (target species $Zn(OH)_{2(S)}$), Al (target species $Al_2O_3(H_2O)_{(S)}$), Cu (target species $Cu(OH)_{2(S)}$ and $Cu_2O_{(S)}$), and Zr (target species $ZrO_{2(S)}$). There was apparent removal of Co (target species $CoO_{2(S)}$) in trial 2AA. These results give us an understanding that under controlled conditions, insoluble compounds of Al, Co, Cr, Cu, Mn, Zn, and Zr could be removed using HSA cerium oxide ($CeO_2$).

FIGS. 58-65 show prior art Pourbaix diagrams for the above materials.

Example 20

This example determined whether selected soluble metals can be removed by HAS cerium (IV) oxide from NSF 53 water.

Parameters:

Material: HSA Ceria (Surface area: $130\pm10$ m$^2$/g).

Loading: 20 mg.

Analyte Conc: 0.5 mg/L of the reagent in question NSF 53 water, see Table 31.

TABLE 31

NSF 53 Water Components

| Reagent | Concentration (mg/L) |
|---|---|
| Sodium Silicate | 95 |
| Sodium Bicarbonate | 250 |
| Magnesium Sulfate | 130 |
| Sodium Nitrate | 12 |
| Calcium Chloride | 150 | pH, ORP: Varies see Table: 32.

Temperature: 20-25 C ambient room temperature.

Contact Duration: 24 hours.

Metals Tested Aluminum ($Al^{3+}$), Barium ($Ba^{2+}$), Cadmium ($Cd^{2+}$), Chromium ($Cr^{3+}$), Cobalt ($Co^{2+}$), Copper ($Cu^{2+}$), Iron ($Fe^{2+}$), Manganese ($Mn^{2+}$), and Nickel ($Ni^{2+}$).

Media Preparation:

20 mg of HSA Ceria was measured out in a plastic weigh boat. The media were wetted with DI water for at least 30 minutes.

Influent Preparation:

Influent was prepared in 2.0 L batches in NSF 53 Lead removal water without added arsenic. 1000 mg/L SPEX nitric based standards were obtained and used to prepare 0.5 mg/L influents of the reagents in question. This solution was mixed using a stir plate, then pH adjusted with 3M NaOH or 3M HCl. ORP values were then adjusted using solid Sodium Sulfite or 12.5% NaClO solution.

TABLE 32

| Sample ID | Metal | Species | Page | Group | pH Range | Actual pH | ORP Range | Actual ORP |
|---|---|---|---|---|---|---|---|---|
| 1 | Aluminum | $Al^{3+}$ | 22 | 13 | <4.5 | 3.26 | >0 | 375 |
| 2 | Barium | $Ba^{2+}$ | 40 | 2 | <11 | 7.93 | any | 305 |
| 3 | Cadmium | $Cd^{2+}$ | 60 | 12 | 1-8.5 | 7.29 | 0-800 | 320 |
| 4 | Chromium | $Cr^{3+}$ | 78 | 6 | <3 | 2.23 | 0-800 | 400 |
| 5 | Cobalt | $Co^{2+}$ | 74 | 9 | 1-8.5 | 7.07 | 0-800 | 370 |
| 6 | Copper | $Cu^{2+}$ | 86 | 11 | <7.5 | 5.62 | >200 | 385 |
| 7 | Iron | $Fe^{2+}$ | 102 | 8 | <7 | 4.46 | 0-400 | 160 |
| 8 | Manganese | $Mn^{2+}$ | 146 | 7 | <9 | 7.63 | 0-800 | 225 |
| 9 | Nickel | $Ni^{2+}$ | 170 | 10 | <9 | 7.84 | >-400 | 245 |

Procedure:

Isotherm Prep Procedure:

Four 500 mL bottles were charged with 500 g influent each. The previously wetted media were poured into each 500 mL sample bottle. Bottles were capped and sealed with electrical tape. Each bottle was then placed within a rolling container that could hold up to 10 bottles. The containers were then sealed with duct tape and placed on the rolling apparatus. Samples were rolled for 24 hours. After 24 hours, the rolling containers were removed from the apparatus and the bottles were retrieved from the containers.

Sample Preparation Procedure for Analysis:

For each metal sample, a 6 mL sample was taken and diluted with the addition of 0.667 mL concentration nitric acid and then filtered with a 0.2 µm filter. The samples were acidified to ensure that all metals were in soluble form. Metal samples were analyzed by ICP-MS. All isotherms were prepared and tested in the same manner and were thus readily comparable.

Results:

The results are presented in Tables 32-33.

TABLE 33

| Sample ID | Metal | Metal Species | Initial [M+] (ug/L) | Final [M+] (ug/L) | Removal Capacity (mg M+/g media) | % Removal |
|---|---|---|---|---|---|---|
| 1 | Aluminum | $Al^{3+}$ | 520.6927 | 517.14 | 0.09 | 0.68 |
| 2 | Barium | $Ba^{2+}$ | 536.0268 | 500.73 | 0.84 | 6.59 |
| 3 | Cadmium | $Cd^{2+}$ | 487.4688 | 101.46 | 9.05 | 79.19 |
| 4 | Chromium | $Cr^{3+}$ | 559.3613 | 509.80 | 1.22 | 8.86 |
| 5 | Cobalt | $Co^{2+}$ | 504.0252 | 398.98 | 2.53 | 20.84 |
| 6 | Copper | $Cu^{2+}$ | 464.801 | 126.75 | 8.21 | 72.73 |
| 7 | Iron | $Fe^{2+}$ | 651.8104 | 544.92 | 2.59 | 16.40 |
| 8 | Manganese | $Mn^{2+}$ | 520.5816 | 203.97 | 7.33 | 60.82 |
| 9 | Nickel | $Ni^{2+}$ | 486.8021 | 427.84 | 1.44 | 12.11 |

TABLE 33-continued

| Sample ID | Metal | Metal Species | Initial [M+] (ug/L) | Final [M+] (ug/L) | Removal Capacity (mg M+/g media) | % Removal |
|---|---|---|---|---|---|---|

*The Final Conc, Removal Capacity, and % Removal were averages taken from three samples Conclusions:

There was definite removal by HSA ceria of dissolved or water soluble $Al^{3+}$, $Ba^{2+}$, $Cd^{2+}$, $Cr^{3+}$, $Co^{2+}$, $Cu^{2+}$, $Fe^{2+}$, $Mn^{2+}$ and $Ni^+$ from NSF 53 water.

FIGS. 3A-E (aluminum), 6A-E (chromium), 7A-F (manganese), 8A-F (iron), 9A-E (cobalt), 10A-E (nickel), 11A-E (copper), 24A-C (cadmium), 66A-E (barium), and 67A-E (radium) are prior art Pourbaix Diagrams for the above metals.

A number of variations and modifications of the disclosure can be used. One of more embodiments of the disclosure can used separately and in combination. That is, any embodiment alone can be used and all combinations and permutations thereof can be used. It would be possible to provide for some features of the disclosure without providing others.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the various embodiments, configurations, or aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that any claim and/or combination of claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment.

Moreover, though the description of the disclosure has included descriptions of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    contacting, in an aqueous liquid medium, a rare earth-containing additive with one or more of a metal or metalloid hydroxide, carbonate, and hydrate to remove the one or more of the metal or metalloid hydroxide, carbonate, and hydrate from the aqueous liquid medium.

2. The method of claim 1, wherein the metal or metalloid has an atomic number selected from the group consisting of 5, 13, 22-33, 40-52, 56, 72-84, and 88-94 and the one or more of the metal or metalloid hydroxide, carbonate, and hydrate is selected from the group consisting of:
    $M(H_2O)_6{}^n$, $M(H_2O)_5OH^{(n-1)}$, $M(OH)^{(n-1)}$, $M(H_2O)_4(OH)_2{}^{(n-2)}$, $M(OH)_2{}^{(n-2)}$, $M(H_2O)_3(OH)_3{}^{(n-3)}$, $M(OH)_3{}^{(n-3)}$, $M(H_2O)_2(OH)_4{}^{(n-4)}$, $M(OH)_4{}^{(n-4)}$, $M(H_2O)(OH)_5{}^{(n-5)}$, $M(OH)_5{}^{(n-5)}$, $M(OH)_6{}^{(n-6)}$, $M(H_2O)_5CO_3{}^{(n-2)}$, $MCO_3{}^{(n-2)}$, $M(H_2O)_4(CO_3)_2{}^{(n-4)}$, $M(CO_3)_2{}^{(n-4)}$, $M(H_2O)_3(CO_3)_3{}^{(n-6)}$, $M(CO_3)_3{}^{(n-6)}$, $M(H_2O)_2(CO_3)_4{}^{(n-8)}$, $M(CO_3)_4{}^{(n-8)}$, $M(H_2O)(CO_3)_5{}^{(n-10)}$, $M(CO_3)_5{}^{(n-10)}$, $M(CO_3)_6{}^{(n-12)}$, $M(H_2O)_4{}^n$, $M(H_2O)_3OH^{(n-1)}$, $M(H_2O)_2(OH)_2{}^{(n-2)}$, and $M(H_2O)(OH)_3{}^{(n-3)}$,
    wherein "M" is the metal or metalloid,
    wherein "n" is a real number ≤8, and
    wherein "n" represents a charge or oxidation state of "M".

3. The method of claim 2, wherein the aqueous liquid medium has an Eh and pH sufficient to render the one or more of a metal or metalloid hydroxide, carbonate, and hydrate as a primary species of M.

4. The method of claim 1, wherein the rare earth-containing additive is in the form of cerium (IV) and/or cerium (III) and wherein M is lead.

5. The method of claim 1, wherein metal or metalloid is in the form of a hydroxide.

6. The method of claim 1, wherein metal of metalloid is in the form of a carbonate.

7. The method of claim 1, wherein metal or metalloid is in the form a metal or metalloid hydrate.

8. The method of claim 1, wherein the metal or metalloid is one or more of boron, vanadium, chromium, cadmium, antimony, lead, and bismuth.

9. The method of claim 1, wherein, before the contacting of the aqueous liquid medium with the rare earth-containing additive, the contacting step comprises the sub-step of:
    introducing, to the aqueous liquid medium, an agent to convert a metal or metalloid to a primary species, wherein the agent is selected from the group consisting of an oxidizing agent, a reducing agent, a base and/or base equivalent and a acid and/or acid equivalent, wherein the primary species is in the form of the one or more of the metal or metalloid hydroxide, carbonate, and hydrate.

10. The method of claim 1, wherein the rare earth-containing additive is selected from the group consisting of water soluble and water insoluble rare earth-containing additives.

11. The method of claim 1, wherein the lead hydrate is selected from the group consisting of:

$Pb(H_2O)_6{}^n$, $Pb(H_2O)_5OH^{(n-1)}$, $Pb(H_2O)_4(OH)_2{}^{(n-2)}m$, $Pb(H_2O)_3(OH)_3{}^{(n-3)}$, $Pb(H_2O)_2(OH)_4{}^{(n-4)}$, $Pb(H_2O)(OH)_5{}^{(n-5)}$, $Pb(H_2O)_5CO_3{}^{(n-2)}$, $M(H_2O)_4(CO_3)_2{}^{(n-4)}$, $Pb(H_2O)_3(CO_3)_3{}^{(n-6)}$, $Pb(H_2O)_2(CO_3)_4{}^{(n-8)}$, $Pb(H_2O)(CO_3)_5{}^{(n-10)}$, $Pb(H_2O)_4{}^n$, $Pb(H_2O)_3OH_{(n-1)}$, $Pb(H_2O)_2(OH)_2{}^{(n-2)}$, $P(H_2O)(OH)_3{}^{(n-3)}$, wherein "n" is a real number ≤8, and wherein "n" represents a charge or oxidation state of Pb.

12. A method, comprising:

contacting, in an aqueous liquid medium, a rare earth-containing additive with one or more of a lead hydroxide, lead carbonate, and lead hydrate to remove the one or more of the hydroxide, lead carbonate, and lead hydrate from the aqueous liquid medium.

13. The method of claim 12, wherein the one or more of the lead hydroxide, lead carbonate, and lead hydrate is selected from the group consisting of:

$Pb(H_2O)_6{}^n$, $Pb(H_2O)_5OH^{(n-1)}$, $Pb(OH)^{(n-1)}$, $Pb(H_2O)_4(OH)_2{}^{(n-2)}$, $Pb(OH)_2{}^{(n-2)}$, $Pb(H_2O)_3(OH)_3{}^{(n-3)}$, $Pb(OH)_3{}^{(n-3)}$, $Pb(H_2O)_2(OH)_4{}^{(n-4)}$, $Pb(OH)_4{}^{(n-4)}$, $Pb(H_2O)(OH)_5{}^{(n-5)}$, $Pb(OH)_5{}^{(n-5)}$, $Pb(OH)_6{}^{(n-6)}$, $Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}$, $Pb(H_2O)_2(CO_3)_4{}^{(n-8)}$, $Pb(CO_3)_4{}^{(n-8)}$, $Pb(H_2O)(CO_3)_5{}^{(n-10)}$, $Pb(CO_3)_5{}^{(n-10)}$, $Pb(CO_3)_6{}^{(n-12)}$, $Pb(H_2O)_4{}^n$, $Pb(H_2O)_3OH^{(n-1)}$, $Pb(H_2O)_2(OH)_2{}^{(n-2)}$, and $P(H_2O)(OH)_3{}^{(n-3)}$, wherein "n" is a real number ≤8, and wherein "n" represents a charge or oxidation state of Pb.

14. The method of claim 13, wherein the aqueous liquid medium has an Eh and pH sufficient to render the one or more of the metal or metalloid hydroxide, carbonate, and hydrate as primary species.

15. The method of claim 12, wherein the one or more of the lead hydroxide, lead carbonate, and lead hydrate is selected from the group consisting of:

$Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}$, $Pb(H_2O)_2(CO_3)_4{}^{(n-8)}$, $Pb(CO_3)_4{}^{(n-8)}$, $Pb(H_2O)(CO_3)_5{}^{(n-10)}$ and $Pb(CO_3)_6{}^{(n-12)}$, wherein "n" is a real number ≤8, and wherein "n" represents a charge or oxidation state of Pb.

16. The method of claim 12, wherein the rare earth-containing additive is in the form of cerium (IV) and/or cerium (III).

17. The method of claim 16, wherein the rare earth-containing additive further comprises lanthanum.

18. The method of claim 12, wherein the one or more of the lead hydroxide, is selected from the group consisting of:

$Pb(H_2O)_5OH^{(n-1)}$, $Pb(OH)^{(n-1)}$, $Pb(H_2O)_4(OH)_2{}^{(n-2)}$, $Pb(OH)_2{}^{(n-2)}$, $Pb(H_2O)_3(OH)_3{}^{(n-3)}$, $Pb(OH)_3{}^{(n-3)}$, $Pb(H_2O)_2(OH)_4{}^{(n-4)}$, $Pb(OH)_4{}^{(n-4)}$, $Pb(H_2O)(OH)_5{}^{(n-5)}$, $Pb(OH)_5{}^{(n-5)}$, $Pb(OH)_6{}^{(n-6)}$, $Pb(H_2O)_3OH^{(n-1)}$, $Pb(H_2O)_2(OH)_2{}^{(n-2)}$, and $P(H_2O)(OH)_3{}^{(n-3)}$, wherein "n" is a real number ≤8, and wherein "n" represents a charge or oxidation state of Pb.

19. The method of claim 12, wherein, before the contacting of the aqueous liquid medium with the rare earth-containing additive, the contacting step comprises the sub-step of:

introducing, to the aqueous liquid medium, an agent to convert lead to a primary species, wherein the agent is selected from the group consisting of an oxidizing agent, a reducing agent, a base and/or base equivalent and a acid and/or acid equivalent, wherein the primary species is in the form of the one or more of lead hydroxide, lead carbonate, and lead hydrate.

20. A method, comprising:

contacting, in an aqueous liquid medium, a rare earth-containing additive comprising cerium (IV) oxide, $CeO_2$, with one or more of a metal or metalloid hydroxide, carbonate, and hydrate to remove the one or more of the metal or metalloid hydroxide, carbonate, and hydrate from the aqueous liquid medium.

21. The method of claim 20, wherein the metal or metalloid has an atomic number selected from the group consisting of 5, 13, 22-33, 40-52, 56, 72-84, and 88-94 and the one or more of the metal or metalloid hydroxide, carbonate, and hydrate is selected from the group consisting of:

$M(H_2O)_6{}^n$, $M(H_2O)_5OH^{(n-1)}$, $M(OH)^{(n-1)}$, $M(OH_2O)_4(OH)_2{}^{(n-2)}$, $M(OH)_2{}^{(n-2)}$, $M(H_2O)_3(OH)_3{}^{(n-3)}$, $M(OH)_3{}^{(n-3)}$, $M(H_2O)_2(OH)_4{}^{(n-4)}$, $M(OH)_4{}^{(n-4)}$, $M(H_2O)(OH)_5{}^{(n-5)}$, $M(OH)_5{}^{(n-5)}$, $M(OH)_6{}^{(n-6)}$, $M(H_2O)_5CO_3{}^{(n-2)}$, $MCO_3{}^{(n-2)}$, $M(H_2O)_4(CO_3)_2{}^{(n-4)}$, $M(CO_3)_2{}^{(n-4)}$, $M(H_2O)_3(CO_3)_3{}^{(n-6)}$, $M(CO_3)_3{}^{(n-6)}$, $M(H_2O)_2(CO_3)_4{}^{(n-2)}$, $M(CO)_4{}^{(n-8)}$, $M(H_2O)(CO_3)_5{}^{(n-10)}$, $M(CO_3)_5{}^{(n-10)}$, $M(CO_3)_6{}^{(n-12)}$, $M(H_2O)_4{}^n$, $M(OH_2O)_3OH^{(n-1)}$, $M(OH_2O)_2(OH)_2{}^{(n-2)}$, $M(OH_2O)(OH)_3{}^{(n-3)}$, wherein "M" is the metal or metalloid, wherein "n" is a real number ≤8, and wherein "n" represents a charge or oxidation state of "M".

22. The method of claim 20, wherein the metal is lead and the one or more of the metal hydroxide, metal carbonate, and metal hydrate is selected from the group consisting of:

$Pb(H_2O)_6{}^n$, $Pb(H_2O)_5OH^{(n-1)}$, $Pb(OH)^{(n-1)}$, $Pb(H_2O)_4(OH)_2{}^{(n-2)}$, $Pb(OH)_2{}^{(n-2)}$, $Pb(H_2O)_3(OH)_3{}^{(n-3)}$, $Pb(OH)_3{}^{(n-3)}$, $Pb(H_2O)_2(OH)_4{}^{(n-4)}$, $Pb(OH)_4{}^{(n-4)}$, $Pb(H_2O)(OH)_5{}^{(n-5)}$, $Pb(OH)_5{}^{(n-5)}$, $Pb(OH)_6{}^{(n-6)}$, $Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}$, $Pb(H_2O)_2(CO_3)_4{}^{(n-8)}$, $Pb(CO_3)_4{}^{(n-8)}$, $Pb(H_2O)(CO_3)_5{}^{(n-10)}$, $Pb(CO_3)_5{}^{(n-10)}$, $Pb(CO_3)_6{}^{(n-12)}$, $Pb(H_2O)_4{}^n$, $Pb(H_2O)_3OH^{(n-1)}$, $Pb(H_2O)_2(OH)_2{}^{(n-2)}$, and $P(H_2O)(OH)_3{}^{(n-3)}$, wherein "n" is a real number ≤8, and wherein "n" represents a charge or oxidation state of Pb.

23. The method of claim 20, wherein the metal or metalloid has an atomic number selected from the group consisting of 5, 13, 22-33, 40-52, 56, 72-84, and 88-94 and wherein the metal or metalloid hydroxide is selected from the group consisting of:

$M(H_2O)_5OH^{(n-1)}$, $M(OH)^{(n-1)}$, $M(H_2O)_4(OH)_2{}^{(n-2)}$, $M(OH)_2{}^{(n-2)}$, $M(H_2O)_3(OH)_3{}^{(n-3)}$, $M(OH)_3{}^{(n-3)}$, $M(H_2O)_2(OH)_4{}^{(n-4)}$, $M(OH)_4{}^{(n-4)}$, $M(H_2O)(OH)_5{}^{(n-5)}$, $M(OH)_5{}^{(n-5)}$, $M(OH)_6{}^{(n-6)}$, $M(H_2O)_3OH^{(n-1)}$, $M(H_2O)_2(OH)_2{}^{(n-2)}$, and $M(H_2O)(OH)_3{}^{(n-3)}$, wherein "M" is the metal or metalloid, wherein "n" is a real number ≤8, and wherein "n" represents a charge or oxidation state of "M".

24. The method of claim 20, wherein the metal or metalloid has an atomic number selected from the group consisting of 5, 13, 22-33, 40-52, 56, 72-84, and 88-94 and wherein the metal or metalloid carbonate is selected from the group consisting of:

$M(H_2O)_5CO_3{}^{(n-2)}$, $MCO_3{}^{(n-2)}$, $M(H_2O)_4(CO_3)_2{}^{(n-4)}$, $M(CO_3)_2{}^{(n-4)}$, $M(H_2O)_3(CO_3)_3{}^{(n-6)}$, $M(CO_3)_3{}^{(n-6)}$, $M(H_2O)_2(CO_3)_4{}^{(n-8)}$, $M(CO_3)_4{}^{(n-8)}$, $M(H_2O)(CO_3)_5{}^{(n-10)}$, $M(CO_3)_5{}^{(n-10)}$, and $M(CO_3)_6{}^{(n-12)}$, wherein "M" is the metal or metalloid, wherein "n" is a real number ≤8, and wherein "n" represents a charge or oxidation state of "M".

25. The method of claim 20, wherein the metal or metalloid has an atomic number selected from the group consisting of 5, 13, 22-33, 40-52, 56, 72-84, and 88-94 and wherein the metal or metalloid hydrate is selected from the group consisting of:

$M(H_2O)_6{}^n$, $M(H_2O)_5OH^{(n-1)}$, $M(_2O)_4(OH)_2{}^{(n-2)}$, $M(H_2O)_3(OH)_3{}^{(n-3)}$, $M(H_2O)_2(OH)_4{}^{(n-4)}$, $M(H_2O)(OH)_5{}^{(n-5)}$, $M(H_2O)_5CO_3{}^{(n-2)}$, $M(H_2O)_4(CO^3)_2{}^{(n-4)}$, $M(H_2O)_3(CO_3)_3{}^{(n-6)}$, $M(H_2O)_2(CO_3)_4{}^{(n-8)}$, $M(H_2O)(CO_3)_5{}^{(n-10)}$, $M(H_2O)_4{}^n$, $M(H_2O)_3{}^{(n-1)}$, $M(H_2O)_2(OH)_2{}^{(n-2)}$, and $M(H_2O)(OH)_3{}^{(n-3)}$, wherein "M" is the metal or metalloid, wherein "n" is a real number ≤8, and wherein "n" represents a charge or oxidation state of "M".

26. The method of claim 20, wherein the aqueous liquid medium has an Eh and pH sufficient to render the one or more of a metal or metalloid hydroxide, carbonate, and hydrate as a primary species.

27. The method of claim 20, wherein the rare earth-containing additive further comprises cerium (III).

28. The method of claim 20, wherein the rare earth-containing additive further comprises lanthanum.

29. The method of claim 20, wherein the rare earth-containing additive is in the form of cerium (IV) other than cerium (IV) oxide.

30. The method of claim 20, wherein, before the contacting of the aqueous liquid medium with the rare earth-containing additive, the contacting step comprises the sub-step of:

introducing, to the aqueous liquid medium, an agent to convert the metal or metalloid to a primary species, wherein the agent is selected from the group consisting of an oxidizing agent, a reducing agent, a base and/or base equivalent and a acid and/or acid equivalent, wherein the primary species is in the form of the metal or metalloid hydroxide.

31. The method of claim 20, wherein, before the contacting of the aqueous liquid medium with the rare earth-containing additive, the contacting step comprises the sub-step of:

introducing, to the aqueous liquid medium, an agent to convert the metal or metalloid to a primary species, wherein the agent is selected from the group consisting of an oxidizing agent, a reducing agent, a base and/or base equivalent and a acid and/or acid equivalent, wherein the primary species is in the form of the metal or metalloid carbonate.

32. The method of claim 20, wherein, before the contacting of the aqueous liquid medium with the rare earth-containing additive, the contacting step comprises the sub-step of:

introducing, to the aqueous liquid medium, an agent to convert the metal or metalloid to a primary species, wherein the agent is selected from the group consisting of an oxidizing agent, a reducing agent, a base and/or base equivalent and a acid and/or acid equivalent, wherein the primary species is in the form of the metal or metalloid hydrate.

33. The method of claim 20, wherein the metal is lead and the one or more of the metal carbonate is selected from the group consisting of:

$Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}$, $Pb(H_2O)_2(CO_3)_4{}^{(n-8)}$, $Pb(CO_3)_4{}^{(n-8)}$, $Pb(H_2O)(CO_3)_5{}^{(n-10)}$, $Pb(CO_3)_5{}^{(n-10)}$, and $Pb(CO_3)_6{}^{(n-12)}$, wherein "n" is a real number ≤8, and wherein "n" represents a charge or oxidation state of Pb.

34. The method of claim 20, wherein the metal or metalloid is lead, wherein, before the contacting of the aqueous liquid medium with the rare earth-containing additive, the contacting step comprises the sub-step of:

introducing, to the aqueous liquid medium, an agent to convert lead to a primary species, wherein the agent is selected from the group consisting of an oxidizing agent, a reducing agent, a base and/or base equivalent and a acid and/or acid equivalent, wherein the primary species is selected from the group consisting of:

$Pb(H_2O)_6{}^n$, $Pb(H_2O)_5OH^{(n-1)}$, $Pb(OH)^{(n-1)}$, $Pb(H_2O)_4(OH)_2{}^{(n-2)}$, $Pb(OH)_2{}^{(n-2)}$, $Pb(H_2O)_3(OH)_3{}^{(n-3)}$, $Pb(OH)_3{}^{(n-3)}$, $Pb(H_2O)_2(OH)_4{}^{(n-4)}$, $Pb(OH)_4{}^{(n-4)}$, $Pb(H_2O)(OH)_5{}^{(n-5)}$, $Pb(OH)_5{}^{(n-5)}$, $Pb(OH)_6{}^{(n-6)}$, $Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}$, $Pb(H_2O)_2(CO_3)_4{}^{(n-8)}$, $Pb(CO_3)_4{}^{(n-8)}$, $Pb(H_2O)(CO_3)_5{}^{(n-10)}$, $Pb(CO_3)_5{}^{(n-10)}$, $Pb(CO_3)_6{}^{(n-12)}$, $Pb(H_2O)_4{}^n$, $Pb(H_2O)_3OH^{(n-1)}$, $Pb(H_2O)_2(OH)_2{}^{(n-2)}$, and $P(H_2O)(OH)_3{}^{(n-3)}$, wherein "n" is a real number ≤8, and wherein "n" represents a charge or oxidation state of Pb.

35. The method of claim 20, wherein the metal or metalloid is lead, wherein, before the contacting of the aqueous liquid medium with the rare earth-containing additive, the contacting step comprises the sub-step of:

introducing, to the aqueous liquid medium, an agent to convert lead to a primary species, wherein the agent is selected from the group consisting of an oxidizing agent, a reducing agent, a base and/or base equivalent and a acid and/or acid equivalent, wherein the primary species is selected from the group consisting of:

$Pb(H_2O)_5CO_3{}^{(n-2)}$, $PbCO_3{}^{(n-2)}$, $M(H_2O)_4(CO_3)_2{}^{(n-4)}$, $Pb(CO_3)_2{}^{(n-4)}$, $Pb(H_2O)_3(CO_3)_3{}^{(n-6)}$, $Pb(CO_3)_3{}^{(n-6)}Pb(H_2O)_2(CO_3)_4{}^{(n-8)}$, $Pb(CO_3)_4{}^{(n-8)}$, $Pb(H_2O)(CO_3)_5{}^{(n-10)}$, $Pb(CO_3)_5{}^{(n-10)}$, and $Pb(CO_3)_6{}^{(n-12)}$, wherein "n" is a real number ≤8, and wherein "n" represents a charge or oxidation state of Pb.

* * * * *